United States Patent
Nakazawa et al.

(10) Patent No.: US 10,424,812 B2
(45) Date of Patent: Sep. 24, 2019

(54) NON-AQUEOUS ELECTROLYTIC SOLUTION AND NON-AQUEOUS ELECTROLYTE SECONDARY BATTERY USING THE SAME

(71) Applicant: MITSUBISHI CHEMICAL CORPORATION, Chiyoda-ku (JP)

(72) Inventors: Eiji Nakazawa, Inashiki-gun (JP); Shuhei Sawa, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 114 days.

(21) Appl. No.: 15/471,625

(22) Filed: Mar. 28, 2017

(65) Prior Publication Data

US 2017/0200976 A1 Jul. 13, 2017

Related U.S. Application Data

(63) Continuation of application No. PCT/JP2015/077582, filed on Sep. 29, 2015.

(30) Foreign Application Priority Data

Sep. 30, 2014 (JP) .................. 2014-201660

(51) Int. Cl.
| | |
|---|---|
| *H01M 10/0567* | (2010.01) |
| *H01M 4/587* | (2010.01) |
| *H01M 4/38* | (2006.01) |
| *H01M 10/0525* | (2010.01) |
| *H01M 4/505* | (2010.01) |
| *H01M 4/525* | (2010.01) |
| *H01M 10/0569* | (2010.01) |
| *H01M 4/133* | (2010.01) |
| *H01M 4/134* | (2010.01) |

(52) U.S. Cl.
CPC ....... *H01M 10/0567* (2013.01); *H01M 4/386* (2013.01); *H01M 4/387* (2013.01); *H01M 4/505* (2013.01); *H01M 4/525* (2013.01); *H01M 4/587* (2013.01); *H01M 10/0525* (2013.01); *H01M 10/0569* (2013.01); *H01M 4/133* (2013.01); *H01M 4/134* (2013.01); *H01M 2300/004* (2013.01); *H01M 2300/0028* (2013.01)

(58) Field of Classification Search
CPC ........ H01M 10/0567; H01M 10/0569; H01M 10/0525; H01M 4/587; H01M 4/386; H01M 4/387; H01M 4/505; H01M 4/525; H01M 4/133; H01M 4/134; H01M 2300/0028; H01M 2300/004
See application file for complete search history.

(56) References Cited

U.S. PATENT DOCUMENTS

| | | | |
|---|---|---|---|
| 6,117,596 A | 9/2000 | Lee et al. | |
| 2004/0096750 A1 | 5/2004 | Kim et al. | |
| 2006/0068283 A1 | 3/2006 | Segawa et al. | |
| 2007/0002522 A1 | 1/2007 | Takeda et al. | |
| 2009/0297951 A1 | 12/2009 | Katsura et al. | |
| 2009/0309060 A1 | 12/2009 | Oka et al. | |
| 2012/0170172 A1 | 7/2012 | Oka et al. | |
| 2012/0171581 A1 | 7/2012 | Abe et al. | |
| 2013/0069601 A1 | 3/2013 | Coowar et al. | |
| 2015/0093653 A1 | 4/2015 | Coowar et al. | |

FOREIGN PATENT DOCUMENTS

| | | |
|---|---|---|
| CN | 1501541 A | 6/2004 |
| CN | 102498605 A | 6/2012 |
| EP | 2 037 468 A1 | 3/2009 |
| JP | 64-30178 | 2/1989 |
| JP | 64-30178 A | 2/1989 |

(Continued)

OTHER PUBLICATIONS

Combined Office Action and Search Report dated Oct. 26, 2018 in Chinese Patent Application No. 201580053244.9, 17 pages (with English translation).

(Continued)

*Primary Examiner* — Laura Weiner
(74) *Attorney, Agent, or Firm* — Oblon, McClelland, Maier & Neustadt, L.L.P.

(57) ABSTRACT

An object of the present invention is to provide a non-aqueous electrolytic solution which can improve a non-aqueous electrolyte secondary battery in high-temperature storage characteristics and load characteristics, and a non-aqueous electrolyte secondary battery using the non-aqueous electrolytic solution. The present invention is directed to a non-aqueous electrolytic solution for use in a non-aqueous electrolyte secondary battery which comprises a positive electrode and a negative electrode each being capable of having occluded therein and releasing metal ions, wherein the non-aqueous electrolytic solution contains an electrolyte, a non-aqueous solvent, and a compound represented by the following general formula (A):

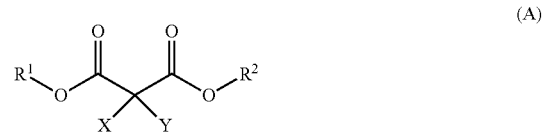

(A)

wherein each of $R^1$, $R^2$, and Y represents a hydrocarbon group having 1 to 12 carbon atoms and optionally having a substituent, and X represents a hydrogen or fluorine atom, wherein $R^1$, $R^2$, and Y are the same or different.

10 Claims, No Drawings

(56) References Cited

FOREIGN PATENT DOCUMENTS

| | | |
|---|---|---|
| JP | 11-135148 | 5/1999 |
| JP | 2002-367673 A | 12/2002 |
| JP | 2005-276517 A | 10/2005 |
| JP | 2006-294414 | 10/2006 |
| JP | 2006-294414 A | 10/2006 |
| JP | 2007-43105 | 2/2007 |
| JP | 2007-149535 A | 6/2007 |
| JP | 2010-153346 | 7/2010 |
| JP | 2013-175454 A | 9/2013 |
| JP | 2014-29848 | 2/2014 |
| JP | 2014-29848 A | 2/2014 |
| WO | WO 2008/001955 A1 | 1/2008 |
| WO | WO 2011/034067 A1 | 3/2011 |
| WO | 2011/154692 A1 | 12/2011 |

OTHER PUBLICATIONS

Extended European Search Report dated Jun. 27, 2017 in Patent Application No. 15846631.8.
International Search Report dated Dec. 22, 2015 in PCT/JP2015/077582, filed on Sep. 29, 2015.
Notice of Reasons for Refusal dated Jun. 4, 2019, in Japanese Patent Application No. 2016-552083 filed Sep. 29, 2015 (with machine generated English translation) (citing document AO).

NON-AQUEOUS ELECTROLYTIC SOLUTION AND NON-AQUEOUS ELECTROLYTE SECONDARY BATTERY USING THE SAME

FIELD OF THE INVENTION

The present invention relates to a non-aqueous electrolytic solution and a non-aqueous electrolyte secondary battery using the same.

BACKGROUND ART

As mobile electronic devices, such as a cell phone and a laptop personal computer, have rapidly progressed, demands are made on the batteries used as a main power source or a backup power source for the electronic devices, wherein the batteries should be increased in capacity. As such demands are increasing, non-aqueous electrolyte batteries, such as a lithium-ion secondary battery, having a high energy density, as compared to a nickel-cadmium battery and a nickel-hydrogen battery, have attracted attention.

As a representative example of an electrolytic solution for a lithium-ion secondary battery, there can be mentioned a non-aqueous electrolytic solution obtained by dissolving an electrolyte, such as $LiPF_6$, $LiBF_4$, $LiN(CF_3SO_2)_2$, or $LiCF_3(CF_2)_3SO_3$, in a mixed solvent of a high permittivity solvent, such as ethylene carbonate or propylene carbonate, and a low viscosity solvent, such as dimethyl carbonate, diethyl carbonate, or ethylmethyl carbonate.

As a negative electrode active material for the lithium-ion secondary battery, a carbonaceous material capable of having occluded therein and releasing lithium ions is mainly used. Representative examples of the carbonaceous materials include natural graphite, artificial graphite, and amorphous carbon. A metal or alloy negative electrode using as a negative electrode active material, for example, silicon or tin intended to further increase the capacity has been known. On the other hand, as a positive electrode active material, a transition metal composite oxide capable of having occluded therein and releasing lithium ions is mainly used. Representative examples of transition metals in the transition metal composite oxide include cobalt, nickel, manganese, and iron.

For example, in the non-aqueous electrolyte secondary battery using the above-mentioned non-aqueous electrolytic solution, the reactivity varies depending on the composition of the non-aqueous electrolytic solution used, and therefore the battery characteristics considerably change according to the non-aqueous electrolytic solution used in the battery. For improving the non-aqueous electrolyte secondary battery in battery characteristics, such as storage characteristics, and enhancing the safety of the battery upon being overcharged, various studies have been made on the non-aqueous solvents and electrolytes used in the non-aqueous electrolytic solution.

In patent document 1, with respect to a lithium secondary battery comprising a positive electrode using a lithium-transition metal oxide, such as lithium cobalt oxide, as an active material, a negative electrode using graphite, and a non-aqueous electrolytic solution, studies are made on the improvement of the cycle characteristics by adding a malonate compound to the electrolytic solution.

In patent document 2, with respect to an electrolytic solution for an electrical double layer capacitor, studies are made on the improvement of the electrolytic solution in resistance to reduction and the suppression of leakage of a current during the constant voltage charging by adding a malonate or tricarboxylate compound to the electrolytic solution.

In patent document 3, with respect to a lithium secondary battery comprising a positive electrode using an amorphous material comprised of $V_2O_5$ or $P_2O_5$ as an active material, a negative electrode using metal lithium, and a non-aqueous electrolytic solution, studies are made on the improvement of the cycle characteristics by adding a dicarboxylic acid compound to the electrolytic solution.

In patent document 4, with respect to a lithium secondary battery comprising a positive electrode using a lithium-transition metal oxide, such as lithium cobalt oxide, as an active material, a negative electrode using artificial graphite, and a non-aqueous electrolytic solution, studies are made on the improvement of the capacity maintaining ratio after high-temperature cycles by adding a specific carboxylate compound to the electrolytic solution.

PRIOR ART REFERENCES

Patent Documents

Patent document 1: Japanese Unexamined Patent Publication Hei 11-135148

Patent document 2: International Patent Application Publication No. WO2008-001955

Patent document 3: Japanese Unexamined Patent Publication Sho 64-30178

Patent document 4: International Patent Application Publication No. WO2011-034067

SUMMARY OF THE INVENTION

Problems to be Solved by the Invention

However, recently, there are further increasing demands for the lithium non-aqueous electrolyte secondary battery having improved characteristics. Specifically, the battery is demanded to have a high level of all performances, including high-temperature storage characteristics, energy density, output characteristics, life, high-rate charge-discharge characteristics, and low-temperature characteristics, but such a battery has not been achieved. This is because a problem is encountered in that there is a trade-off relationship between durability properties, such as high-temperature storage characteristics, and properties, such as a capacity, a resistance, and output characteristics, making it difficult to achieve excellent general balance between all these performances in a conventional battery.

Patent documents 1, 3, and 4 disclose that the cycle characteristics are improved by using the electrolytic solution described in patent documents 1, 3, and 4, which contains a malonate compound, such as dimethyl malonate, a dicarboxylic acid compound, such as succinic acid, or a characteristic compound, such as methyl 2-(methanesulfonyloxy)propionate. However, such an electrolytic solution has high reactivity on the electrode, and is needed to be improved in respect of the expansion of the stored gas during the storage at high temperatures.

The electrolyte actually used or described in patent document 2 is only a quaternary ammonium salt, and the effect obtained when using an alkali metal salt, such as a lithium salt, as an electrolyte salt is not clarified. Further, in patent document 2, the use of the invention is limited to an electrical double layer capacitor, and patent document 2 has no description that the invention is used in a lithium secondary battery.

Means for Solving the Problems

The present invention has been made in view of the above-mentioned problems. Specifically, an object of the present invention is to provide a non-aqueous electrolytic solution which can improve a non-aqueous electrolyte secondary battery in high-temperature storage characteristics and load characteristics, achieving excellent general balance between the durability and performances, such as a capacity, a resistance, and output characteristics. Further, another object of the present invention is to provide a non-aqueous electrolyte battery using the above-mentioned non-aqueous electrolytic solution.

The present inventors have conducted extensive and intensive studies. As a result, it has been found that the above-mentioned problems can be solved by adding a specific compound to the non-aqueous electrolytic solution, and the present invention has been completed.

The gist of the present invention is as follows.

(a) A non-aqueous electrolytic solution for use in a non-aqueous electrolyte secondary battery which comprises a positive electrode and a negative electrode each being capable of having occluded therein and releasing metal ions, wherein the non-aqueous electrolytic solution contains an electrolyte, a non-aqueous solvent, and a compound represented by the following general formula (A):

[Chemical formula 1]

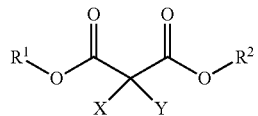

(A)

wherein each of $R^1$, $R^2$, and Y represents a hydrocarbon group having 1 to 12 carbon atoms and optionally having a substituent, and X represents a hydrogen or fluorine atom, wherein $R^1$, $R^2$, and Y are the same or different.

(b) The non-aqueous electrolytic solution according to item (a) above, wherein, in the general formula (A), X is a hydrogen atom.

(c) The non-aqueous electrolytic solution according to item (a) or (b) above, wherein, in the general formula (A), each of $R^1$, $R^2$, and Y represents a hydrocarbon group having 1 to 12 carbon atoms and having no substituent.

(d) The non-aqueous electrolytic solution according to item (a) or (b) above, wherein, in the general formula (A), each of $R^1$, $R^2$, and Y represents an alkyl group having 1 to 12 carbon atoms and having no substituent.

(e) The non-aqueous electrolytic solution according to any one of items (a) to (d) above, wherein the amount of the added compound represented by the general formula (A) is 0.001 to 10% by mass, based on the mass of the non-aqueous electrolytic solution.

(f) The non-aqueous electrolytic solution according to any one of items (a) to (e) above, which further contains at least one additive selected from the group consisting of a cyclic carbonate having a carbon-carbon unsaturated bond, a cyclic carbonate having a fluorine atom, a nitrile compound, an isocyanate compound, a compound having an isocyanuric acid skeleton, a fluorinated salt, an acid anhydride compound, an acrylate compound, an aromatic compound, a cyclic ether compound, an oxalato salt, and a cyclic sulfonic ester.

(g) The non-aqueous electrolytic solution according to any one of items (a) to (f) above, wherein the non-aqueous solvent comprises a linear carboxylate.

(h) A non-aqueous electrolyte secondary battery comprising a positive electrode and a negative electrode each being capable of having occluded therein and releasing metal ions, and a non-aqueous electrolytic solution, wherein the non-aqueous electrolytic solution is the non-aqueous electrolytic solution according to any one of items (a) to (g) above.

(i) The non-aqueous electrolyte secondary battery according to item (h) above, wherein a negative electrode active material of the negative electrode capable of having occluded therein and releasing metal ions has carbon as a constituent element.

(j) The non-aqueous electrolyte secondary battery according to item (h) above, wherein a negative electrode active material of the negative electrode capable of having occluded therein and releasing metal ions has silicon (Si) or tin (Sn) as a constituent element.

(k) The non-aqueous electrolyte secondary battery according to item (h) above, wherein a negative electrode active material of the negative electrode capable of having occluded therein and releasing metal ions is a mixture or composite of metal particles capable of forming an alloy together with Li and graphite particles.

Effects of the Invention

By the present invention, there can be provided a non-aqueous electrolyte secondary battery which is excellent in performances, such as high-temperature storage characteristics and load characteristics, and which has excellent general balance between the performances.

Complete elucidation of the action and principle of the fact that the non-aqueous electrolyte secondary battery produced using the non-aqueous electrolytic solution of the present invention has excellent general balance between the performances has not yet been made, but the action and principle are presumed as follows. The action and principle in the present invention are not limited to those described below.

The compound represented by the general formula (A) has, for example, an active hydrogen atom on the carbon atom (α-position) disposed between carbonyl groups. Proton tautomerism due to this hydrogen causes the compound to have tautomers of a keto form and an enol form. Further, the compound of the general formula (A) has at the α-position not only a hydrogen atom but also a hydrocarbon group Y. The hydrocarbon group has an electron donating property higher than that of a hydrogen atom, and therefore lowers the acidity of the above-mentioned hydrogen atom. Consequently, in the non-aqueous electrolyte secondary battery, a side reaction of the compound represented by the general formula (A) with a base component, such as an alcoholate formed on the negative electrode, is suppressed, and further the reduction reactivity of the non-aqueous electrolytic solution on the negative electrode is lowered, so that generation of gas, such as hydrogen, is suppressed.

The above-mentioned hydrocarbon group Y is considered to influence not only the reactivity of the hydrogen atom at the α-position but also the equilibrium state of the tautomers of keto form and enol form. The compound represented by the general formula (A) is slightly reduced on the negative electrode, although the reactivity of the reduction is lowered, as compared to a compound which is not substituted with a hydrocarbon group at the α-position. This reduction forms a radical anion at the α-position of the compound, and the formed radical anion is considered to cause keto-enol tautomerism like the hydrogen atom. An electron donating hydrocarbon group is bonded to the α-position of the compound, and therefore it is considered that the stability of the radical anion at the α-position is so poor that the equilibrium shifts to the enol side. The enol-form tautomer has an anion on the oxygen atom of a carbonyl group, and therefore is considered to more strongly interact with the transition metal element in the positive electrode active material. Such a strong interaction with the positive electrode active material is considered to lower the activity on the surface of the positive electrode, suppressing a decomposition reaction of the non-aqueous electrolytic solution on the surface of the positive electrode active material.

MODE FOR CARRYING OUT THE INVENTION

Hereinbelow, an embodiment of the present invention will be described in detail, but the present invention is not limited to the embodiment described below, and the present invention can be changed or modified within the scope of the present invention.

In the present specification, the units "% by weight", "ppm by weight", and "part(s) by weight" have, respectively, the same meanings as those of "% by mass", "ppm by mass", and "part(s) by mass". Further, the unit simply indicated by "ppm" means "ppm by weight".

1. Non-Aqueous Electrolytic Solution 1-1. Non-Aqueous Electrolytic Solution of the Present Invention The non-aqueous electrolytic solution of the present invention is characterized by containing a compound represented by the general formula (A) below.

1-1-1. Compound Represented by the General Formula (A)

[Chemical formula 2]

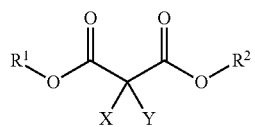

(A)

In the formula (A), each of $R^1$, $R^2$, and Y represents a hydrocarbon group having 1 to 12 carbon atoms and optionally having a substituent, and X represents a hydrogen or fluorine atom. $R^1$, $R^2$, and Y may be the same or different. $R^1$, $R^2$, and Y are not bonded together to form a ring.

Examples of the substituents include a cyano group, an isocyanato group, an acyl group (—(C=O)—Ra), an acyloxy group (—O(C=O)—Ra), an alkoxycarbonyl group (—(C=O)O—Ra), a sulfonyl group (—SO$_2$—Ra), a sulfonyloxy group (—O(SO$_2$)—Ra), an alkoxysulfonyl group (—(SO$_2$)—O—Ra), an alkoxycarbonyloxy group (—O—(C=O)—O—Ra), an ether group (—O—Ra), an acryl group, a methacryl group, halogens (preferably fluorine), and a trifluoromethyl group. In the above substituents, Ra represents an alkyl group having 1 to 10 carbon atoms, an alkenyl group having 2 to 10 carbon atoms, or an alkynyl group having 2 to 10 carbon atoms. The number of the carbon atoms in the substituent are not included in the number of the carbon atoms in the hydrocarbon group having 1 to 12 carbon atoms for $R^1$, $R^2$, and Y.

Among these substituents, preferred are a cyano group, an isocyanato group, an acyl group (—(C=O)—Ra), an acyloxy group (—O(C=O)—Ra), and an alkoxycarbonyl group (—(C=O)O—Ra), further preferred are a cyano group, an acyl group (—(C=O)—Ra), and an alkoxycarbonyl group (—(C=O)O—Ra), especially preferred are a cyano group and an alkoxycarbonyl group (—(C=O)O—Ra), and most preferred is a cyano group.

As mentioned above, in the formula (A), each of $R^1$, $R^2$, and Y represents a hydrocarbon group having 1 to 12 carbon atoms and optionally having a substituent.

Specific examples of the hydrocarbon groups include an alkyl group, a cycloalkyl group, an alkenyl group, an alkynyl group, and an aryl group which may be bonded through an alkylene group. Of these, preferred are an alkyl group, an alkenyl group, and an alkynyl group, further preferred are an alkyl group and an alkenyl group, and especially preferred is an alkyl group. When $R^1$, $R^2$, and Y are the above-described hydrocarbon groups, it is possible to prevent the compound represented by the general formula (A) from reacting with a decomposition product of the non-aqueous electrolytic solution to markedly increase the resistance of the electrode.

Specific examples of the alkyl groups include a methyl group, an ethyl group, a n-propyl group, an i-propyl group, a n-butyl group, a s-butyl group, an i-butyl group, a t-butyl group, a n-pentyl group, a t-amyl group, a hexyl group, a heptyl group, an octyl group, a nonyl group, and a decyl group. Of these, preferred are an ethyl group, a n-propyl group, a n-butyl group, a n-pentyl group, and a hexyl group, and more preferred are an ethyl group, a n-propyl group, and a n-butyl group. From the viewpoint of the difficulty of production of the compound and the availability of an industrial product of the compound, the alkyl group is especially preferably an ethyl group or a n-butyl group. Further, when the compound having an alkyl group as Y is used, from a similar point of view, the alkyl group is especially preferably an ethyl group or a n-butyl group, most preferably a n-butyl group.

Specific examples of the cycloalkyl groups include a cyclopentyl group, a cyclohexyl group, a cycloheptyl group, a cyclooctyl group, and an adamantly group, and preferred are a cyclohexyl group and an adamantly group.

Specific examples of the alkenyl groups include a vinyl group, an allyl group, a methallyl group, a 2-butenyl group, a 3-methyl-2-butenyl group, a 3-butenyl group, and a 4-pentenyl group. Of these, preferred are a vinyl group, an allyl group, a methallyl group, and a 2-butenyl group, further preferred are a vinyl group, an allyl group, and a methallyl group, especially preferred are an allyl group and a methallyl group, and most preferred is an allyl group. When the hydrocarbon group is such an alkenyl group, steric hindrance is appropriate, and further the increase of the electrode resistance due to a reaction of the compound of the general formula (A) on the electrode can be controlled to be at an advantageous degree.

Specific examples of the alkynyl groups include an ethynyl group, a 2-propynyl group, a 2-butynyl group, a 3-butynyl group, a 4-pentynyl group, and a 5-hexynyl group. Of these, preferred are an ethynyl group, a 2-propynyl group, a 2-butynyl group, and a 3-butynyl group, further preferred are a 2-propynyl group and a 3-butynyl group, and especially preferred is a 2-propynyl group. When the hydrocarbon group is such an alkynyl group, steric hindrance is appropriate, and further the increase of the electrode resistance due to a reaction of the compound of the general formula (A) on the electrode can be controlled to be at an advantageous degree.

Specific examples of the aryl groups which may be bonded through an alkylene group include a phenyl group, a tolyl group, a benzyl group, and a phenethyl group.

In the general formula (A), X represents a hydrogen or fluorine atom. X is preferably a hydrogen atom from the viewpoint of the reactivity of the non-aqueous electrolytic solution and the resistance of a film formed from the electrolytic solution.

From the viewpoint of the reactivity of the compound represented by the general formula (A) with the electrode, it is preferred that the hydrocarbon group having 1 to 12 carbon atoms, which is $R^1$, $R^2$, and Y in the formula (A), is unsubstituted. In this case, the compound represented by the general formula (A) is lowered in the reactivity on the electrode and the reactivity with a base component, such as a reduction product of the non-aqueous electrolytic solution formed on the electrode. As a result, deterioration of a non-aqueous electrolyte secondary battery obtained using the non-aqueous electrolytic solution of the present invention (hereinafter, frequently referred to simply as "non-aqueous electrolyte secondary battery" or "non-aqueous electrolyte secondary battery of the present invention") due to a side reaction is suppressed. Especially, it is preferred that, among $R^1$, $R^2$, and Y, Y is an unsubstituted hydrocarbon group.

As specific examples of the compounds represented by the general formula (A) used in the non-aqueous electrolytic solution of the present invention, there can be mentioned compounds of the structures shown below.

[Chemical formula 3]

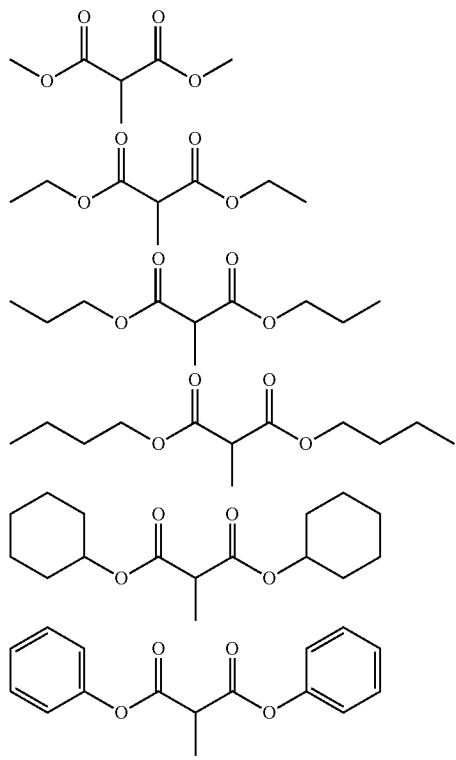

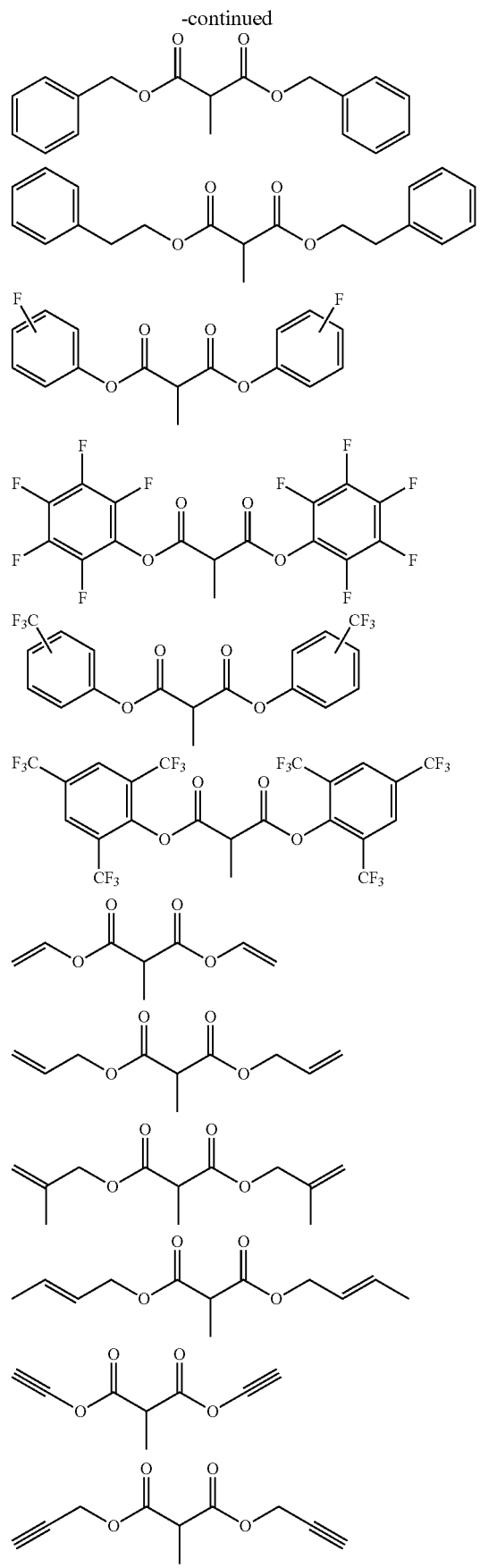

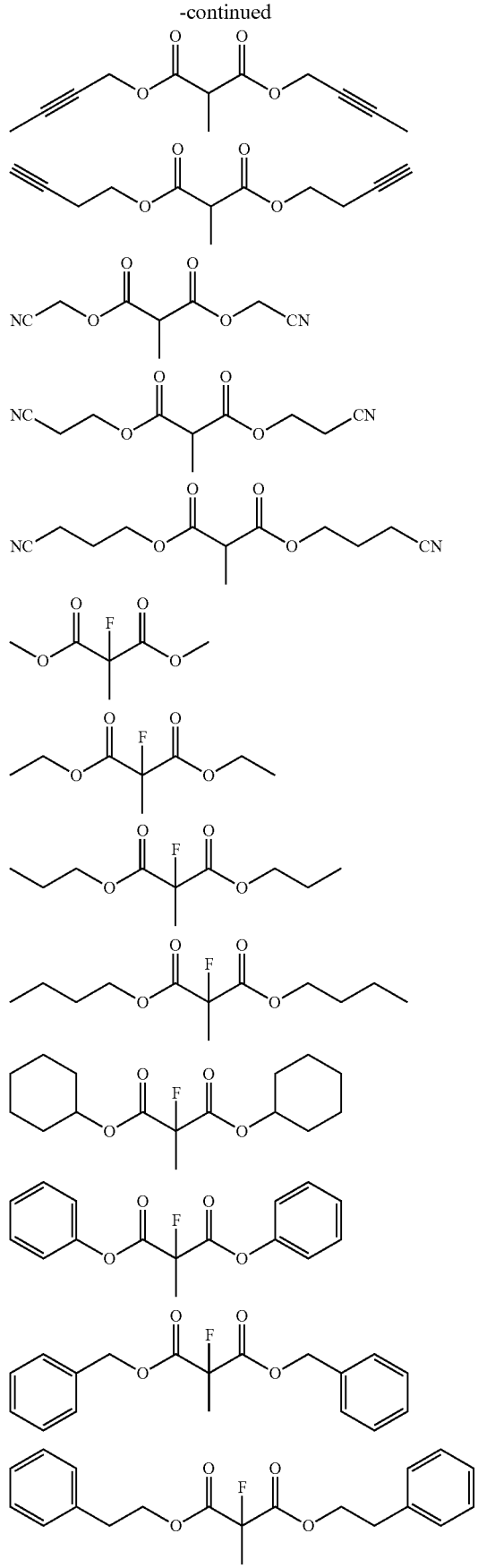
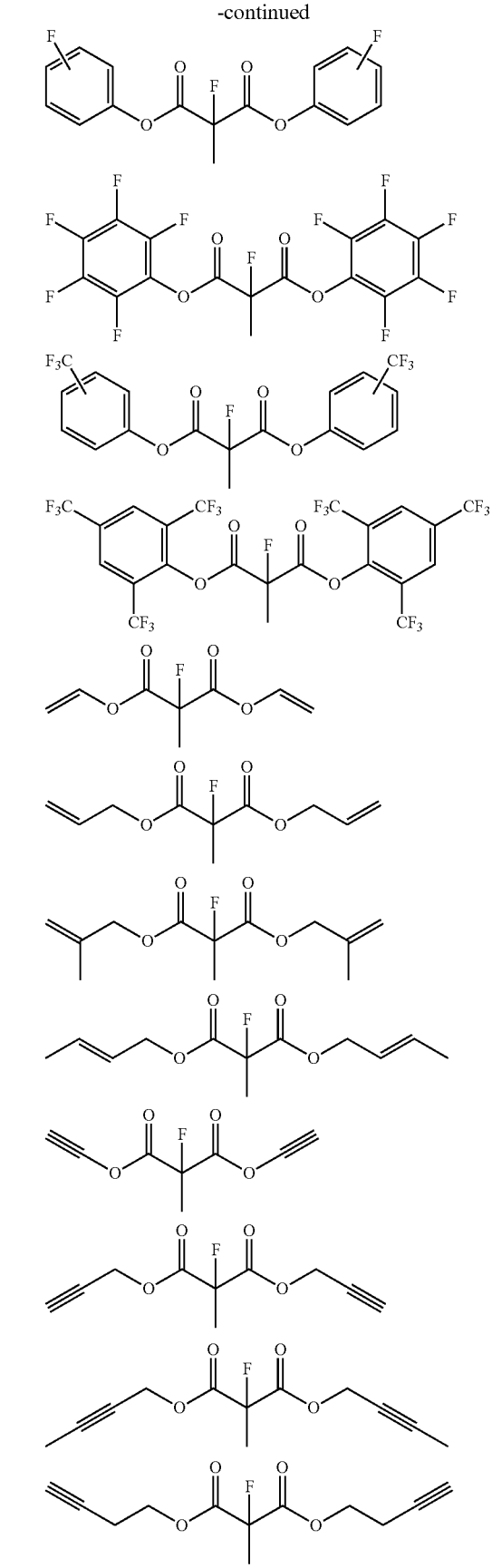

[Chemical formula 4]
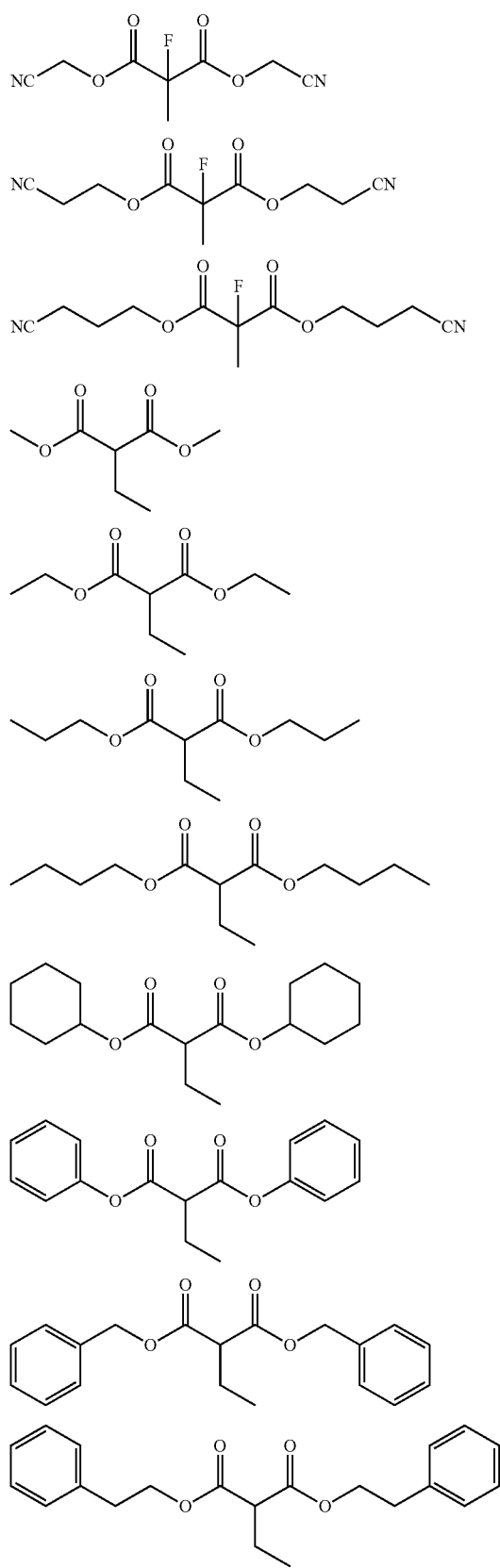
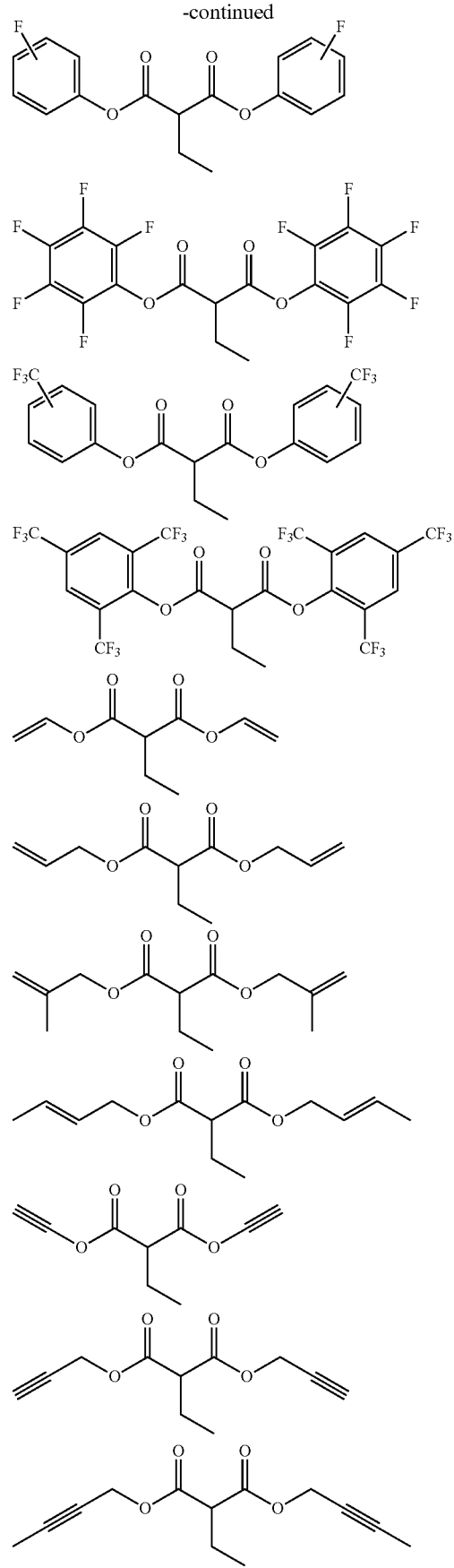

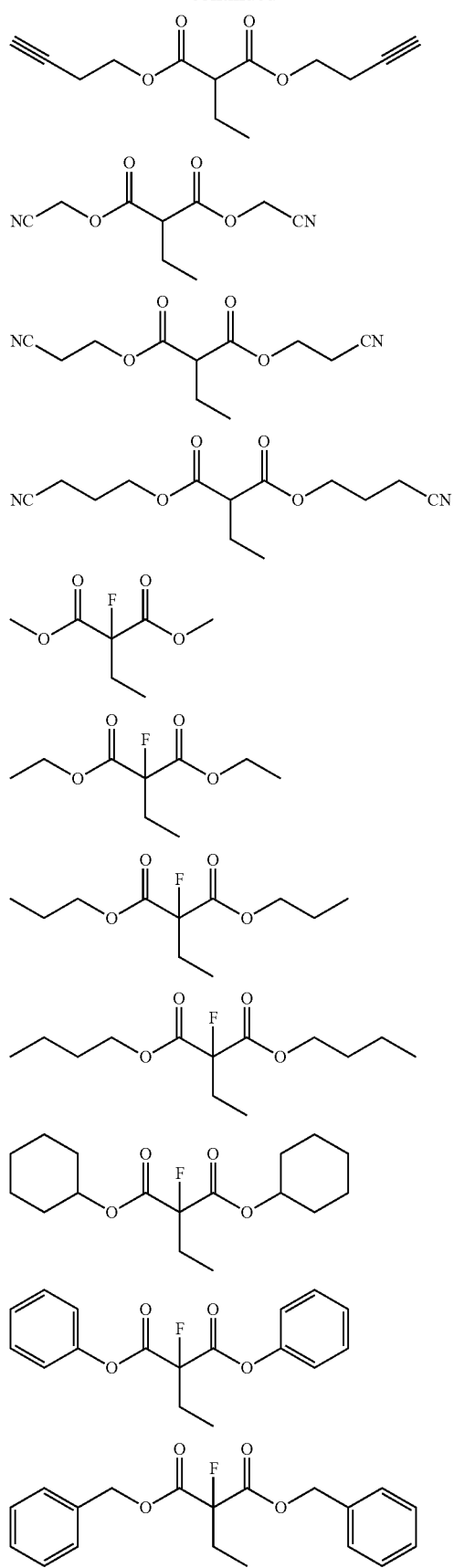
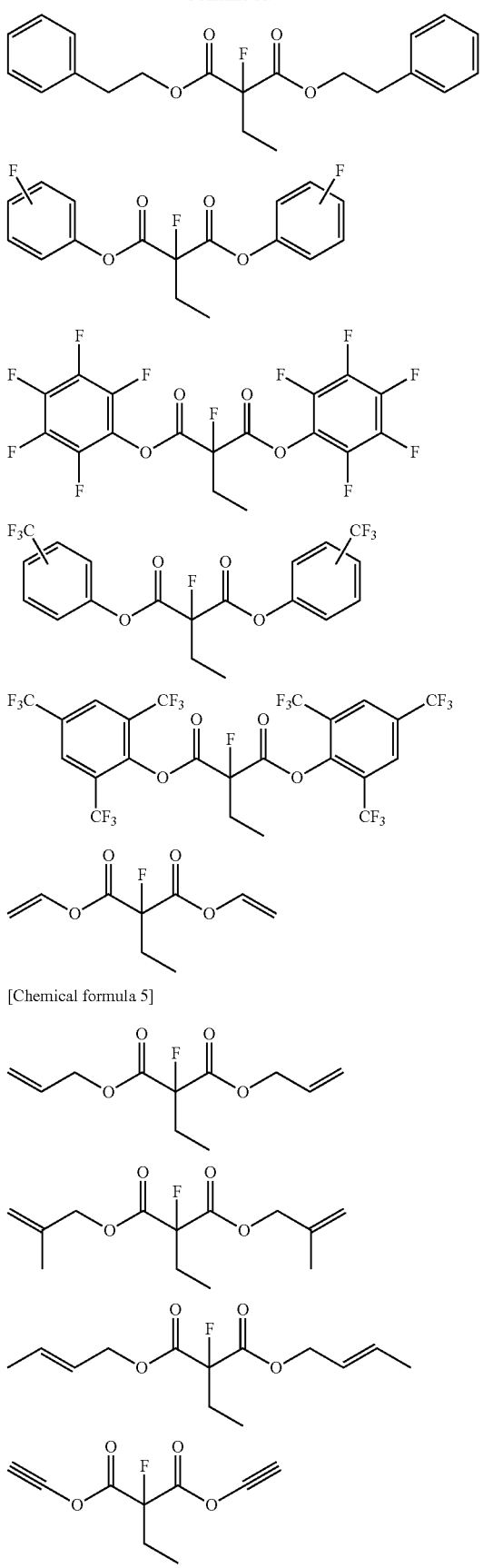
[Chemical formula 5]

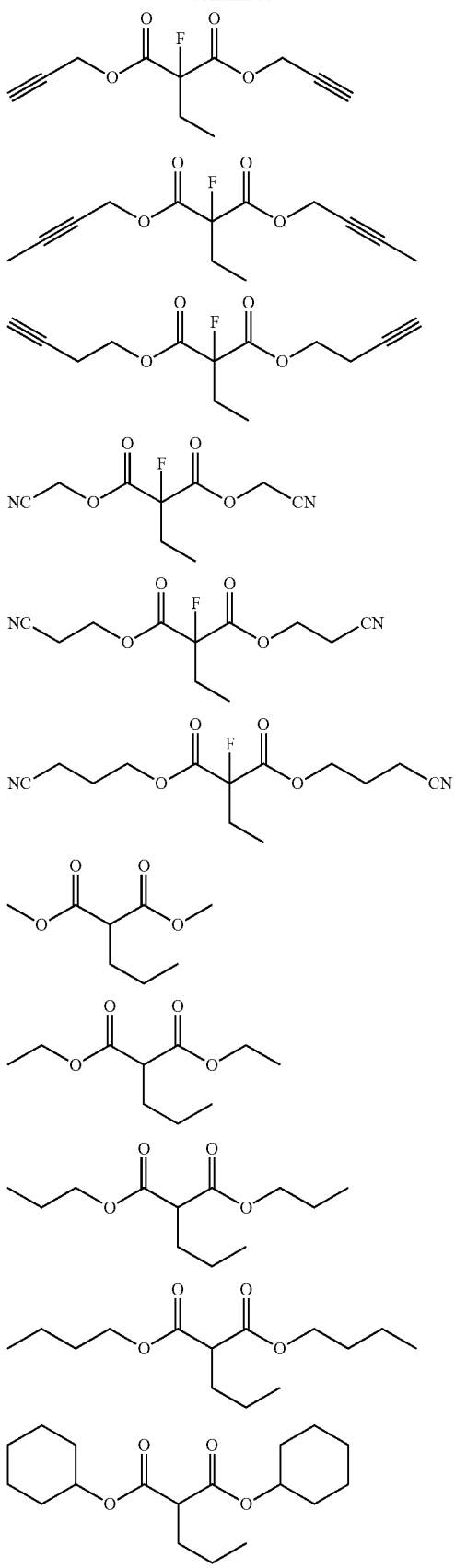
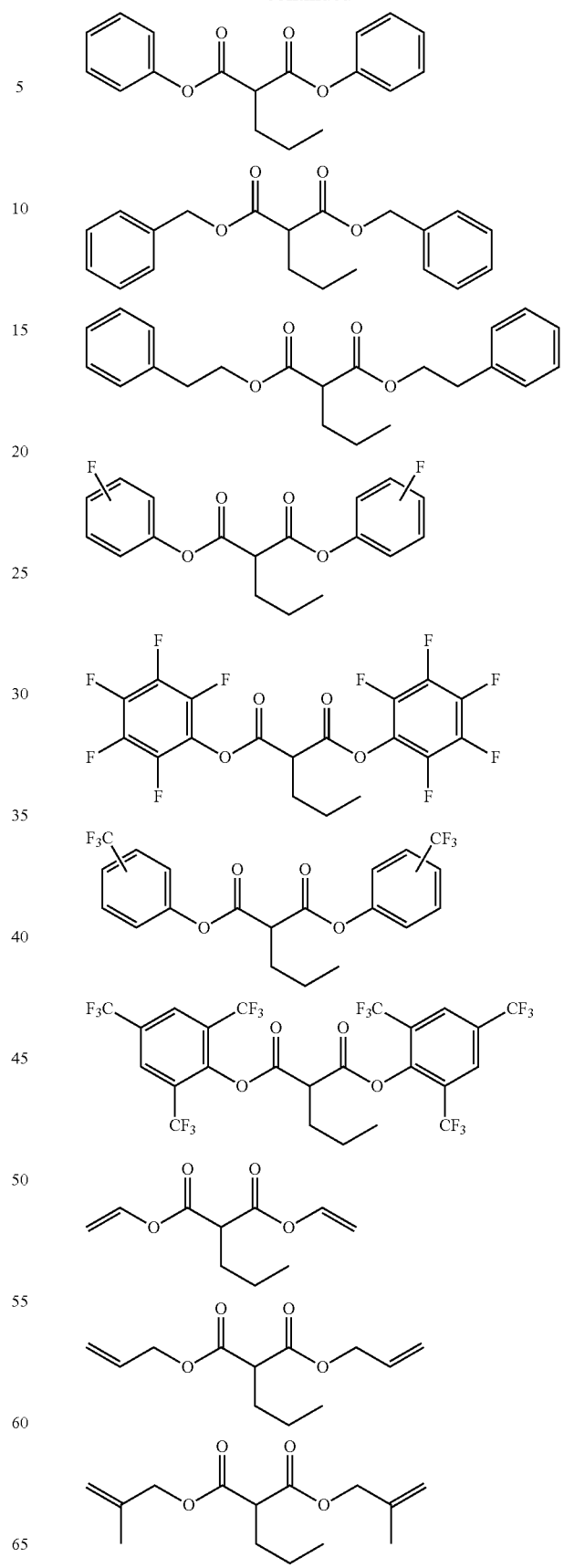

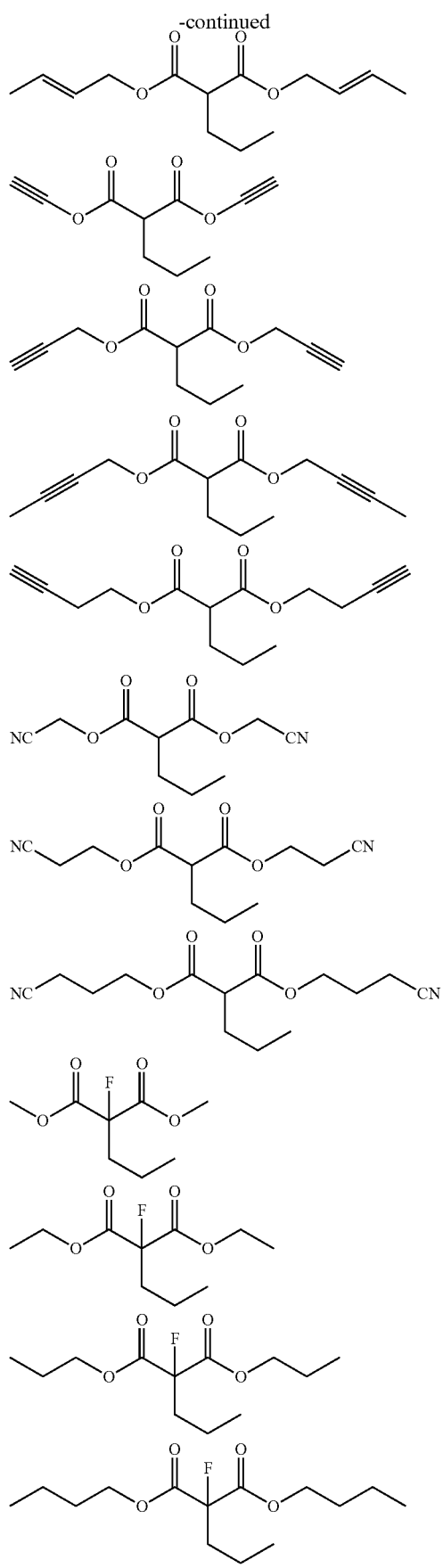
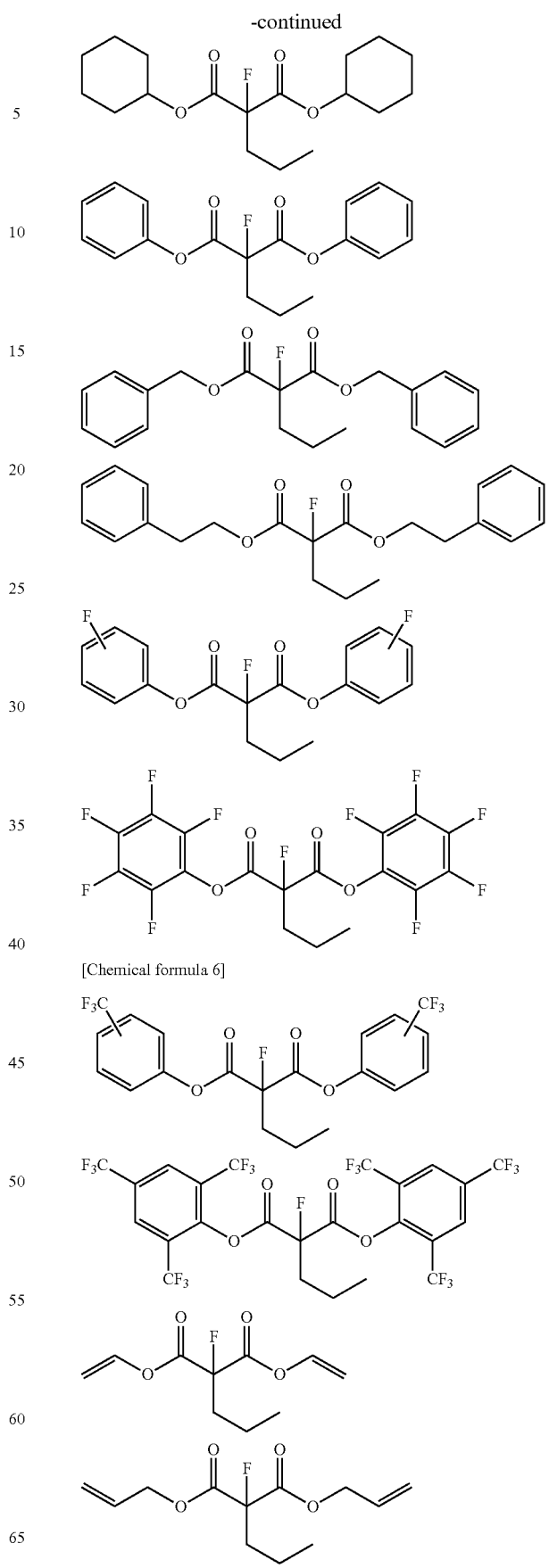

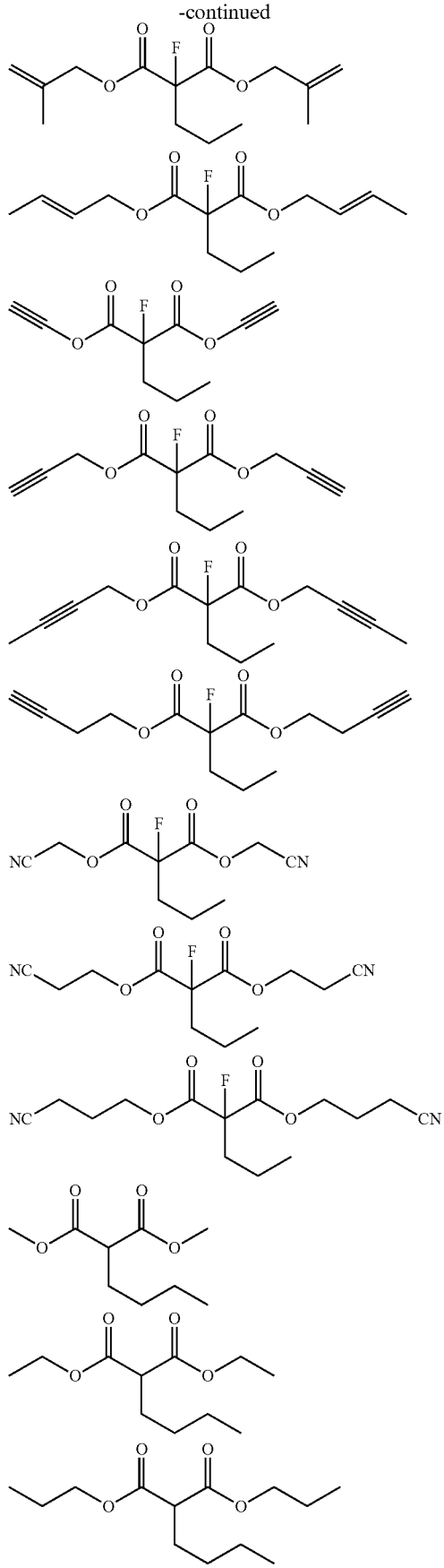
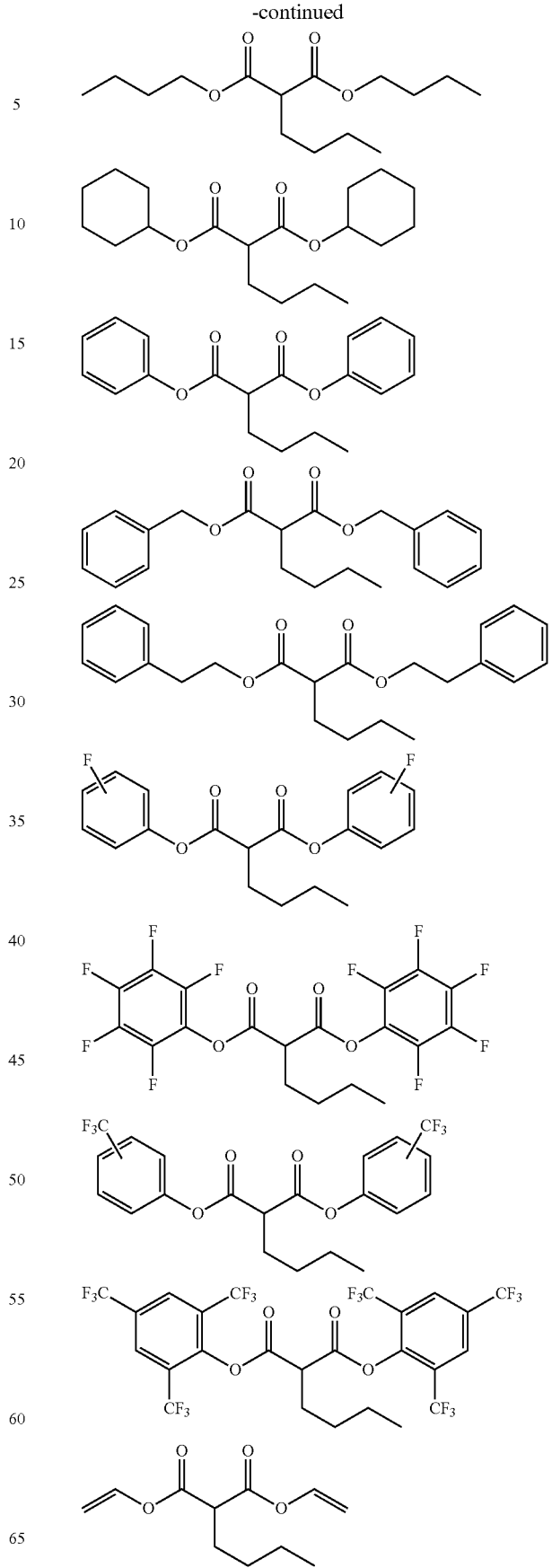

-continued
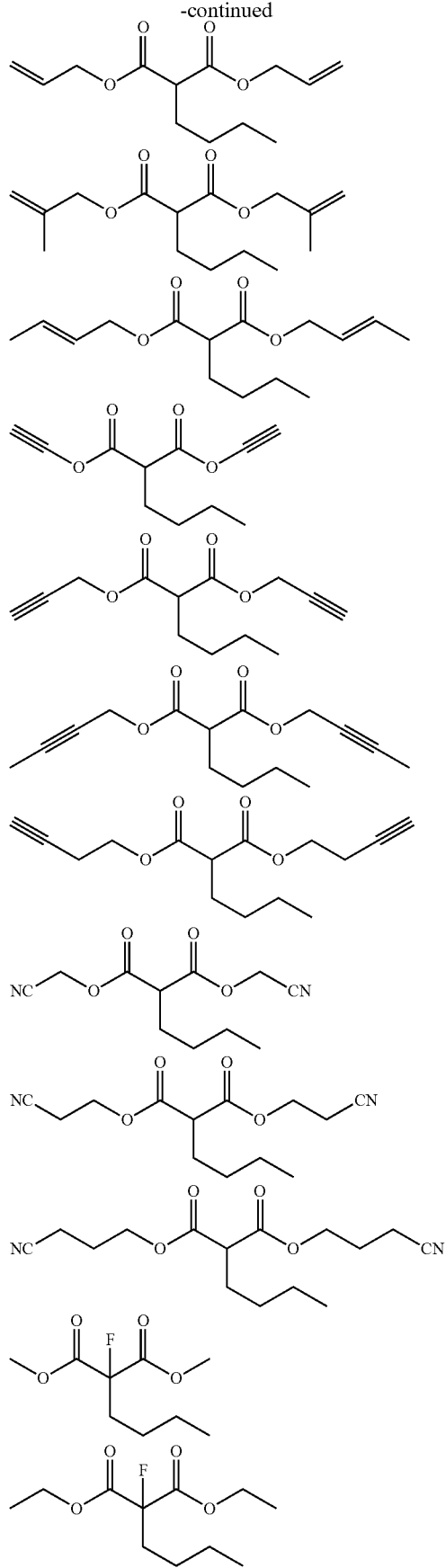
[Chemical formula 7]
-continued
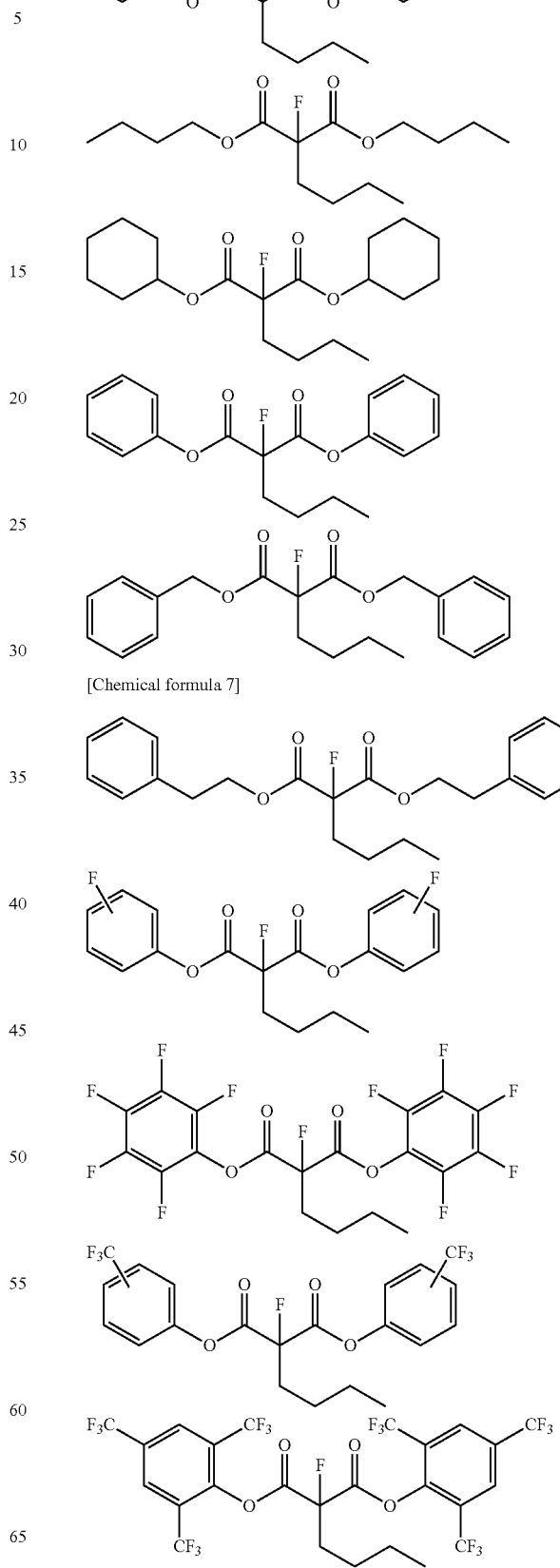

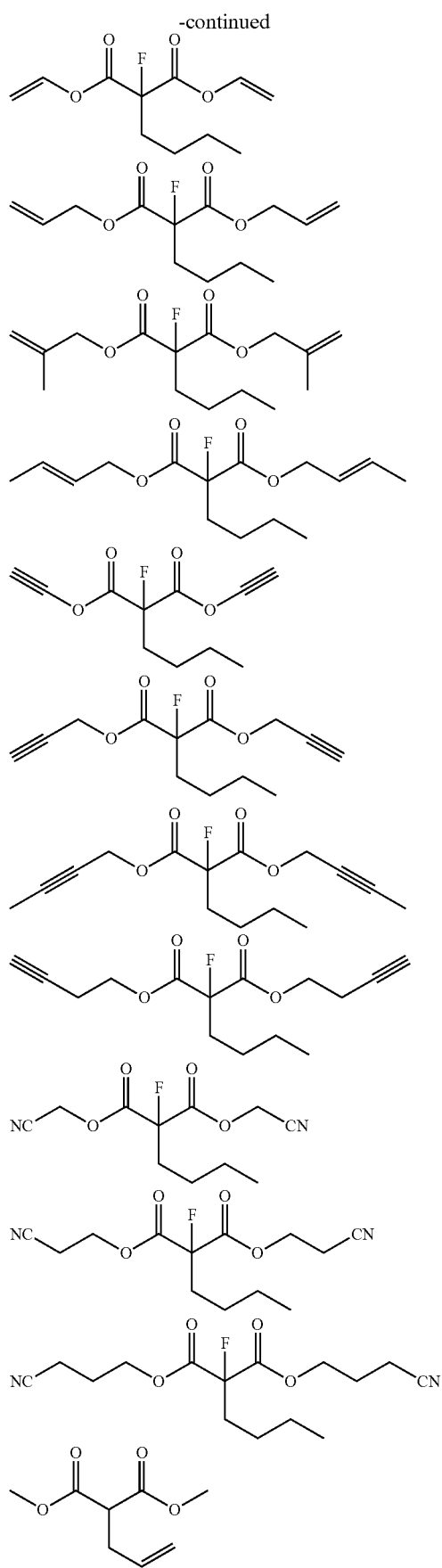
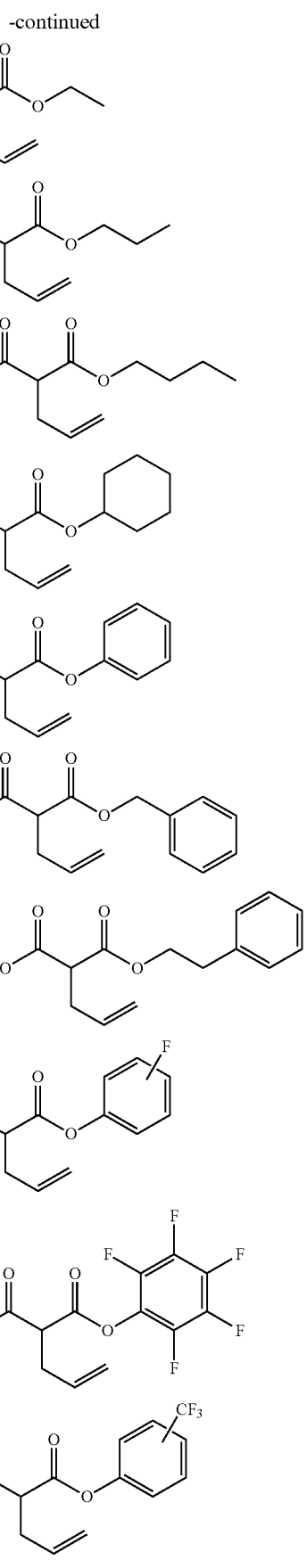

25
-continued
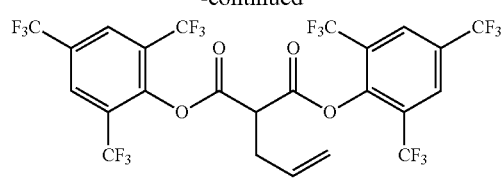
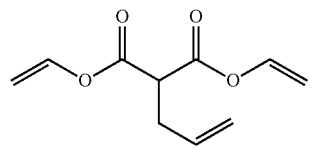
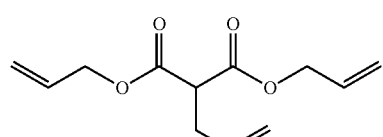
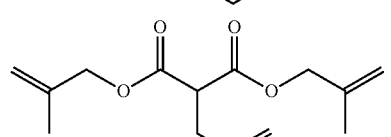
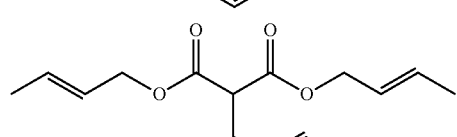
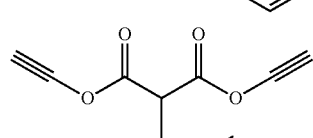
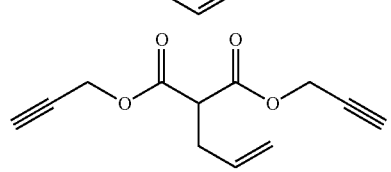
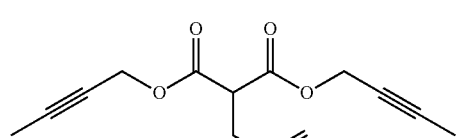
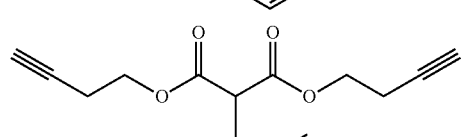
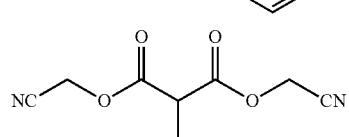
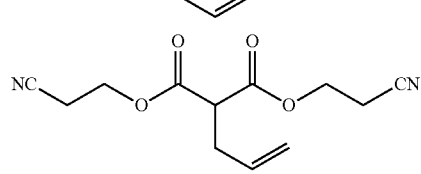
26
-continued
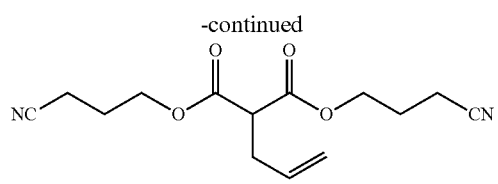
[Chemical formula 8]
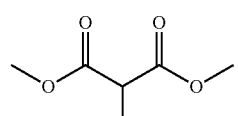
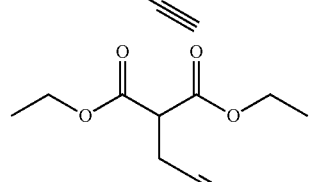
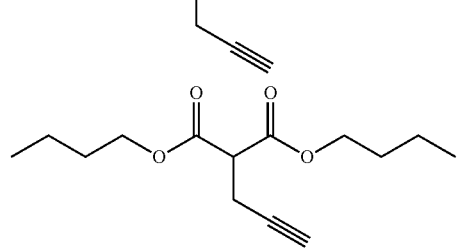
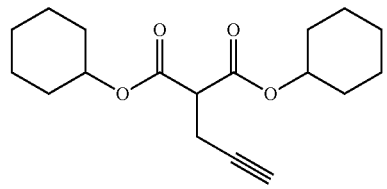
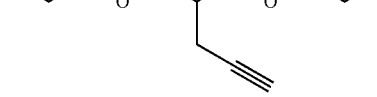
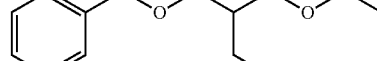
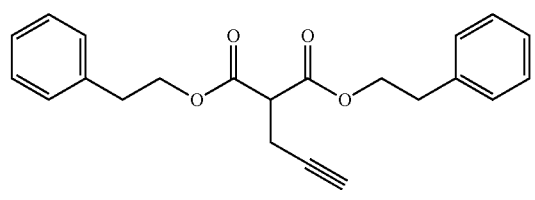

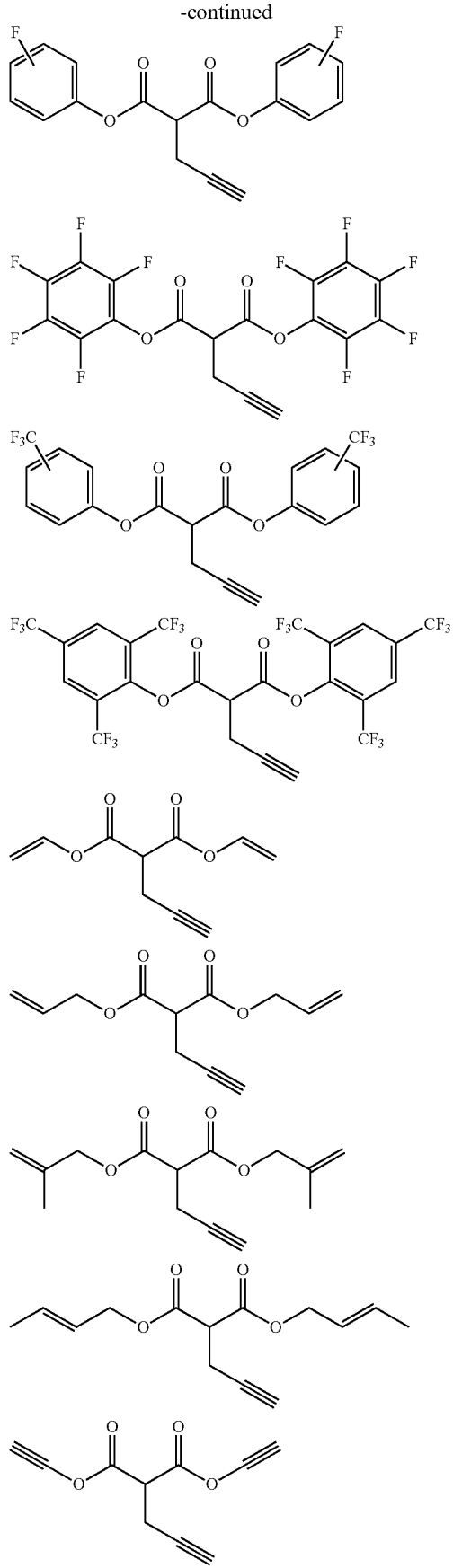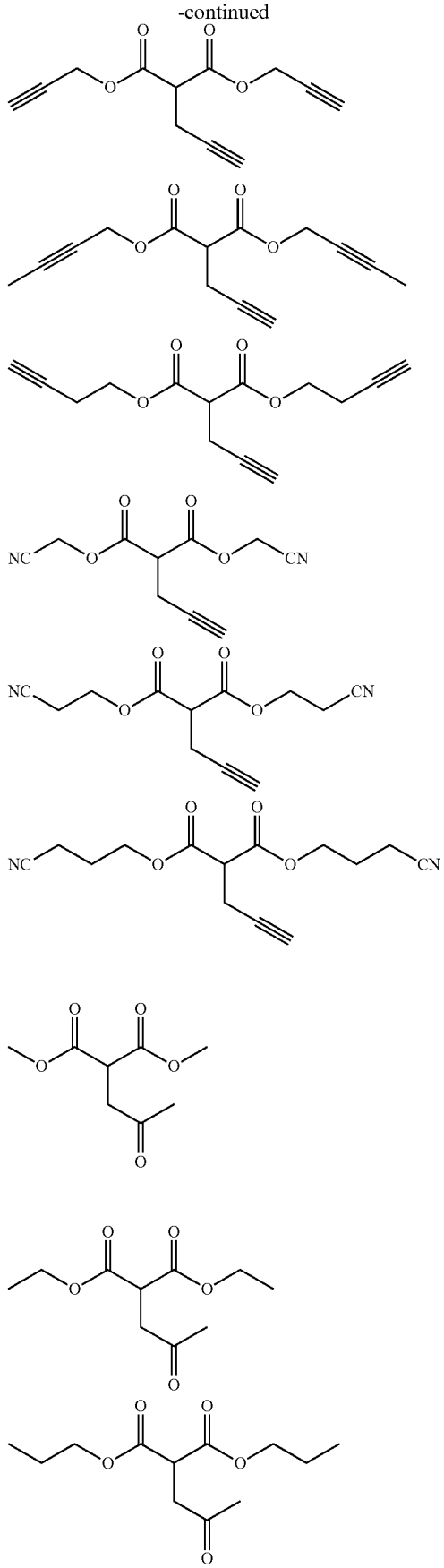

-continued
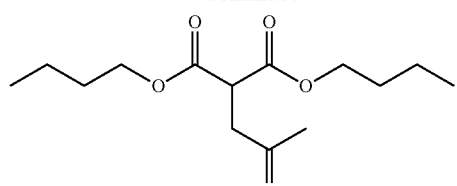
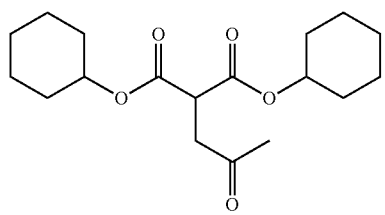
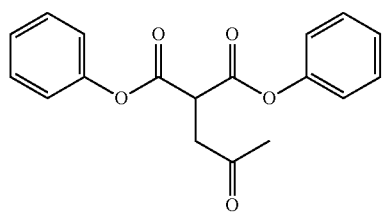
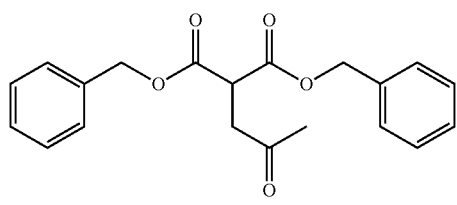
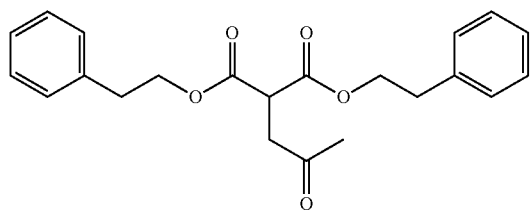
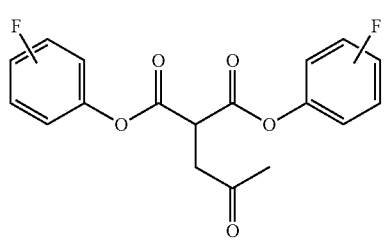
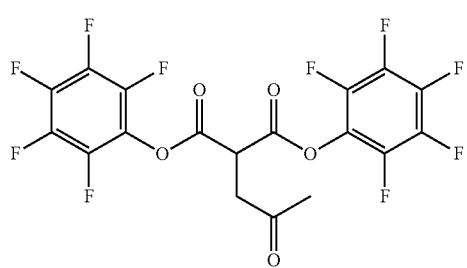
-continued
[Chemical formula 9]
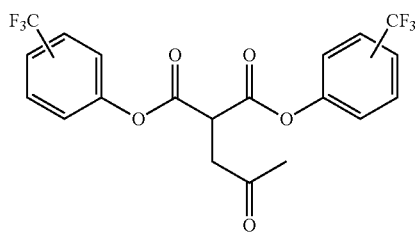
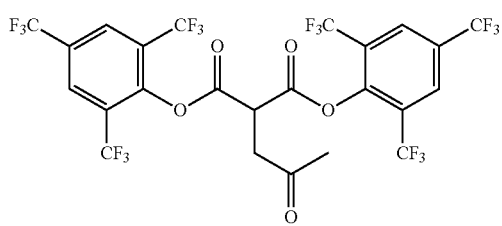
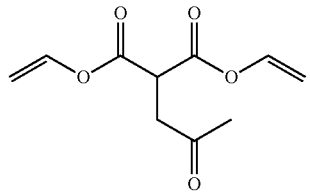
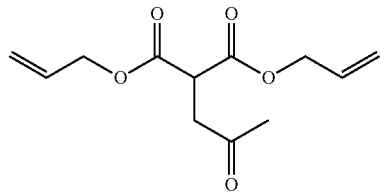
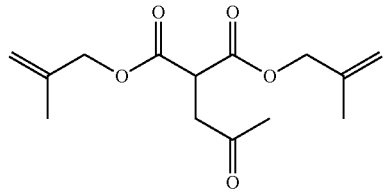
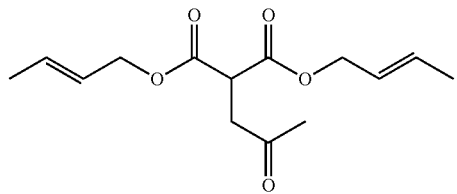
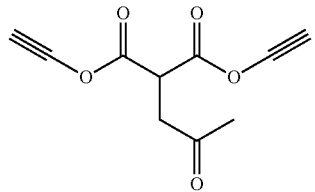
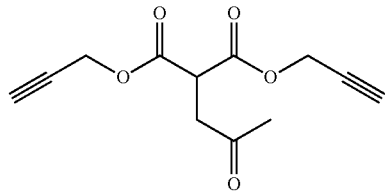

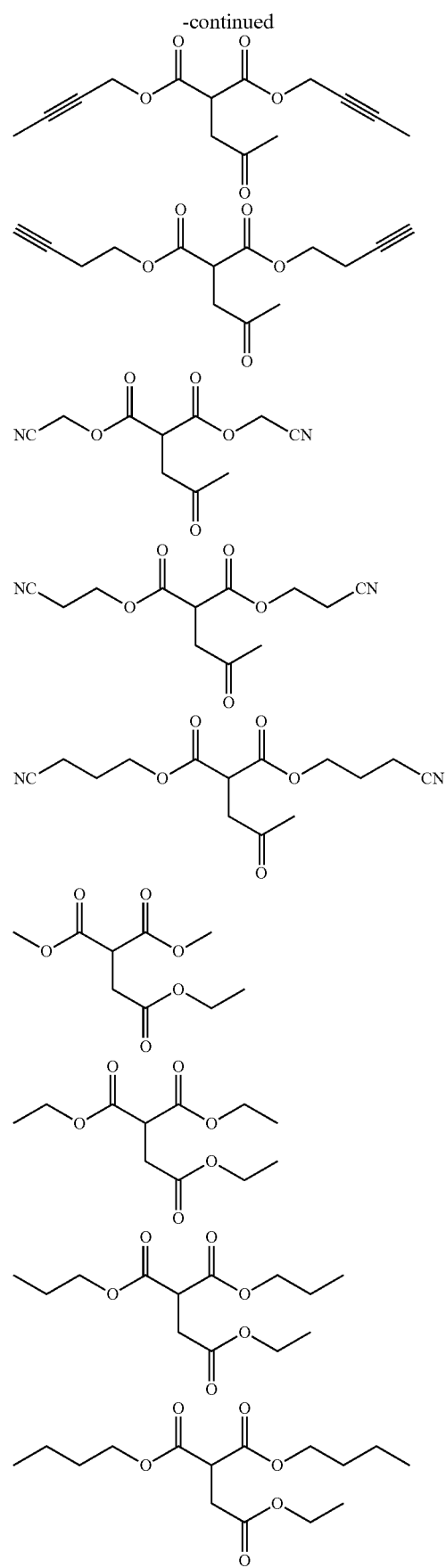

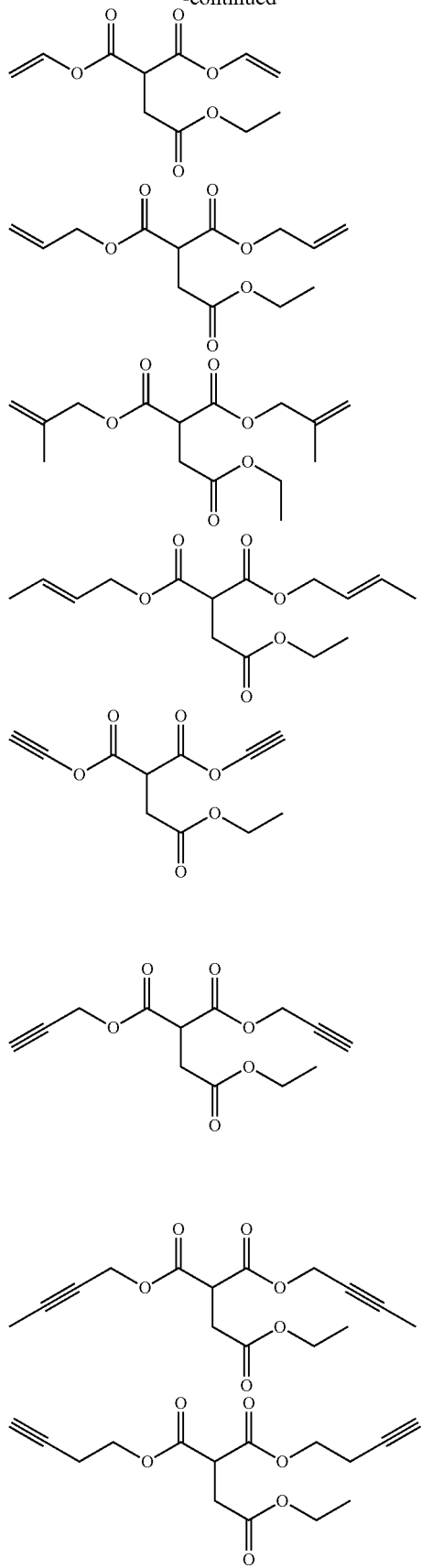
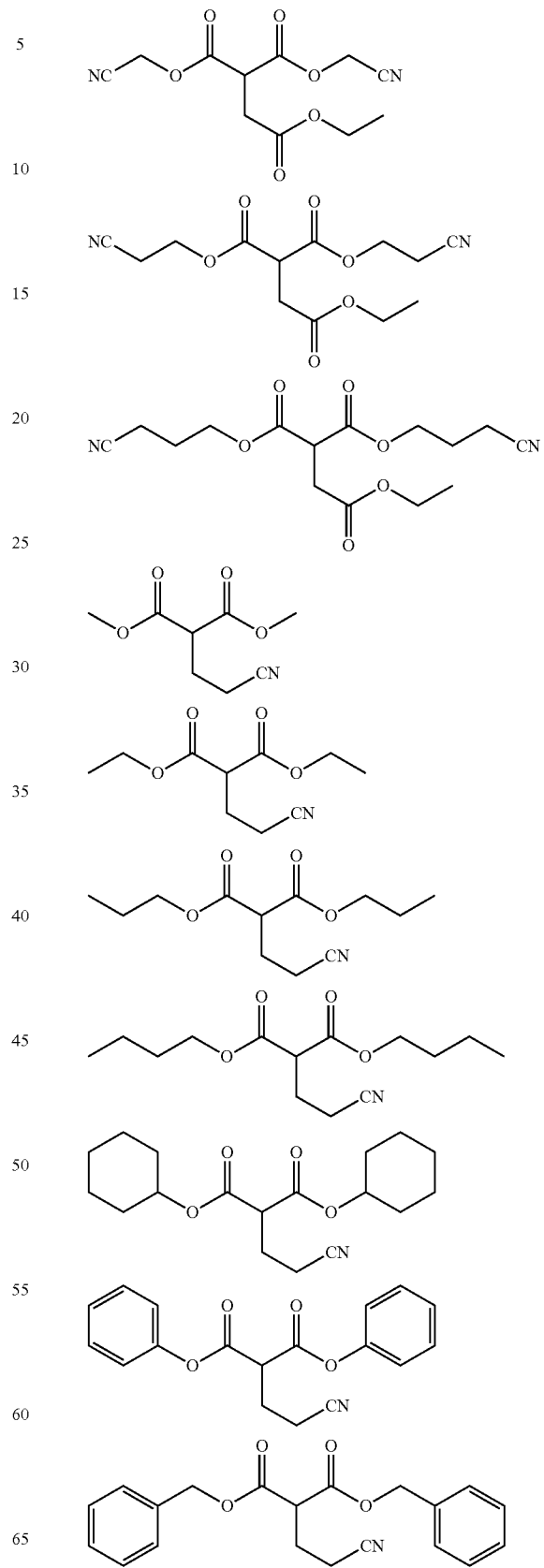

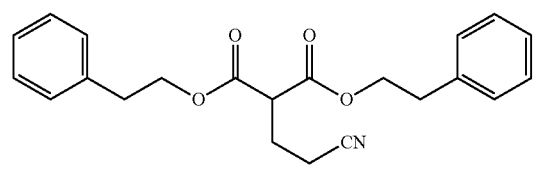
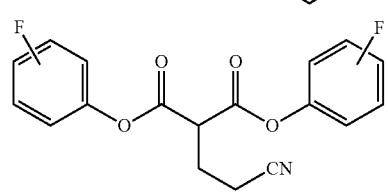
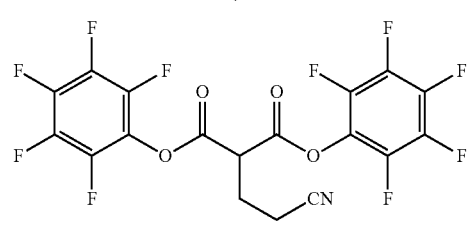
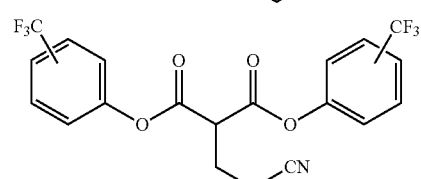
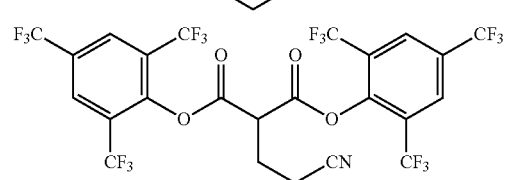
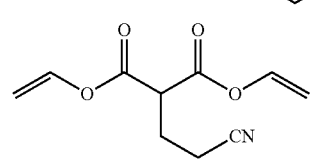
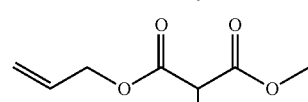
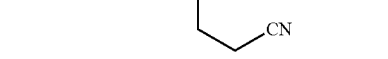
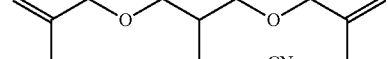
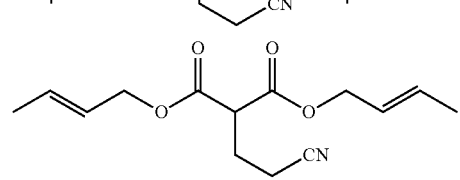
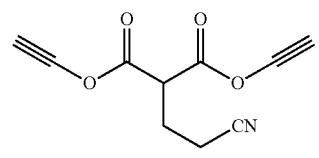
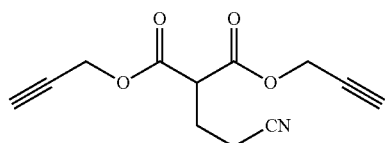
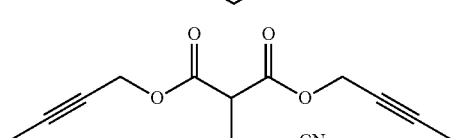
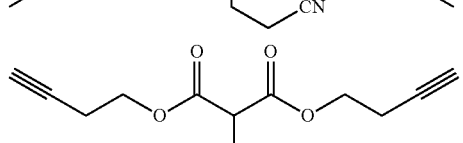
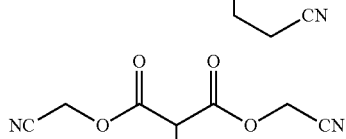
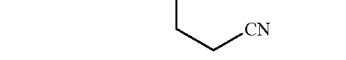
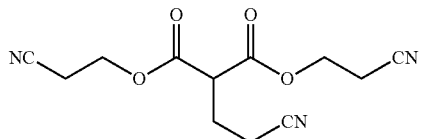
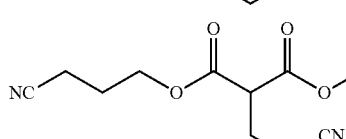
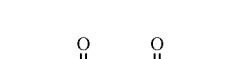
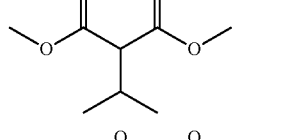
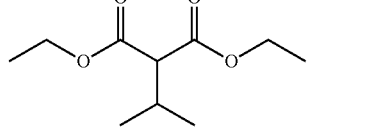
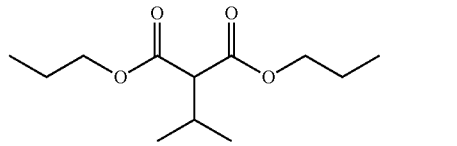
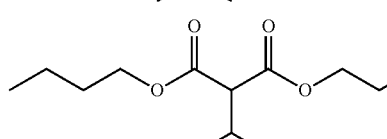
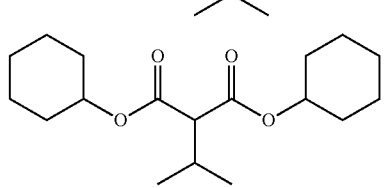

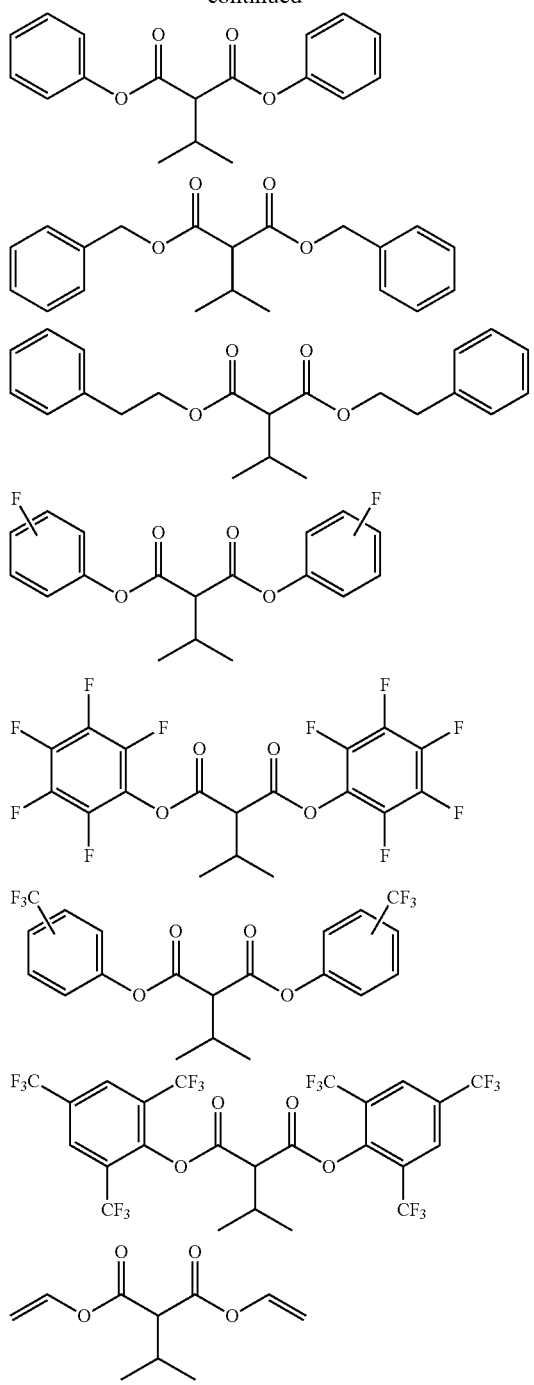
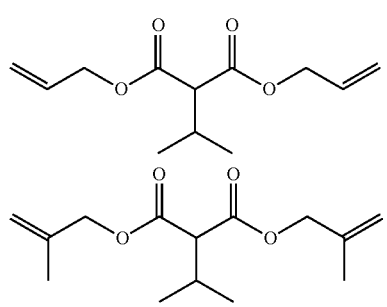
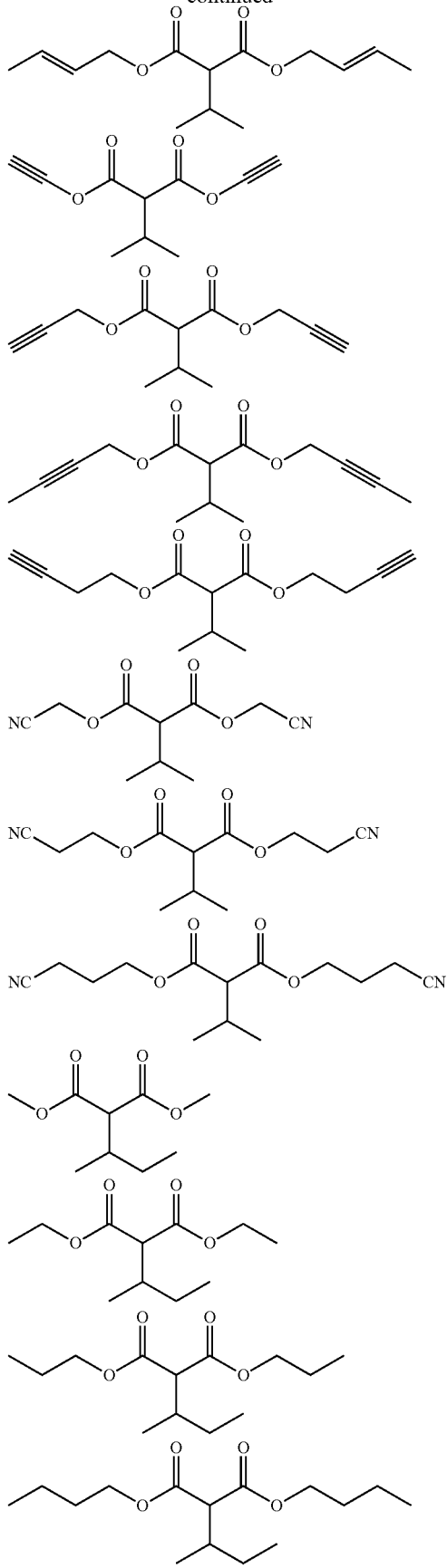

-continued
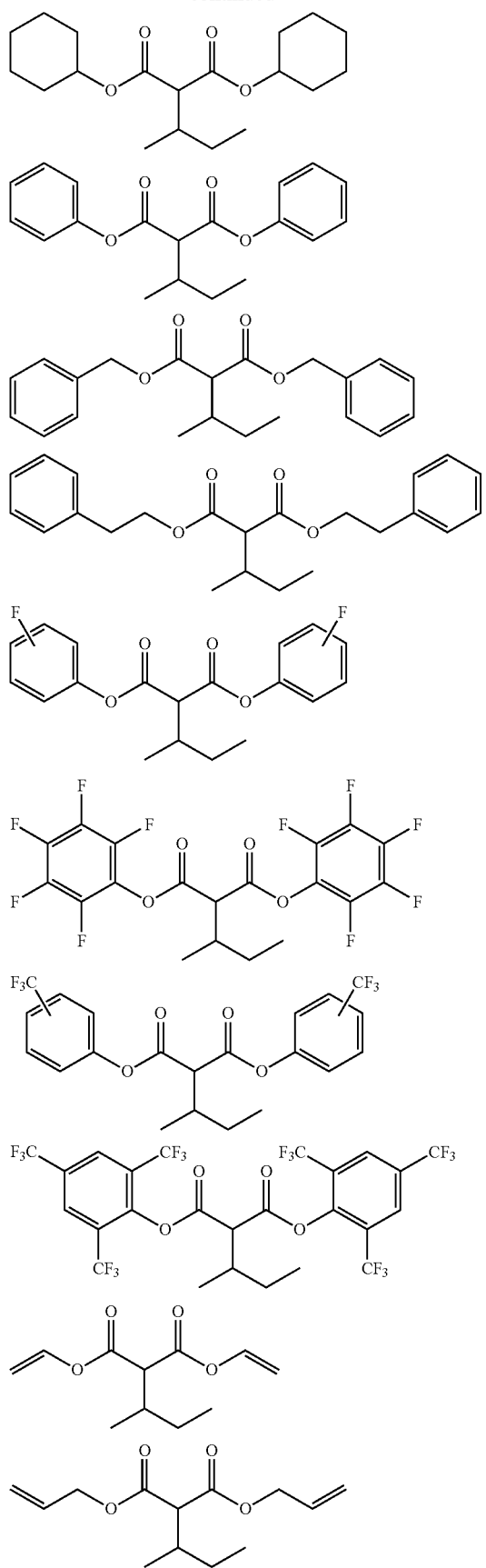
-continued
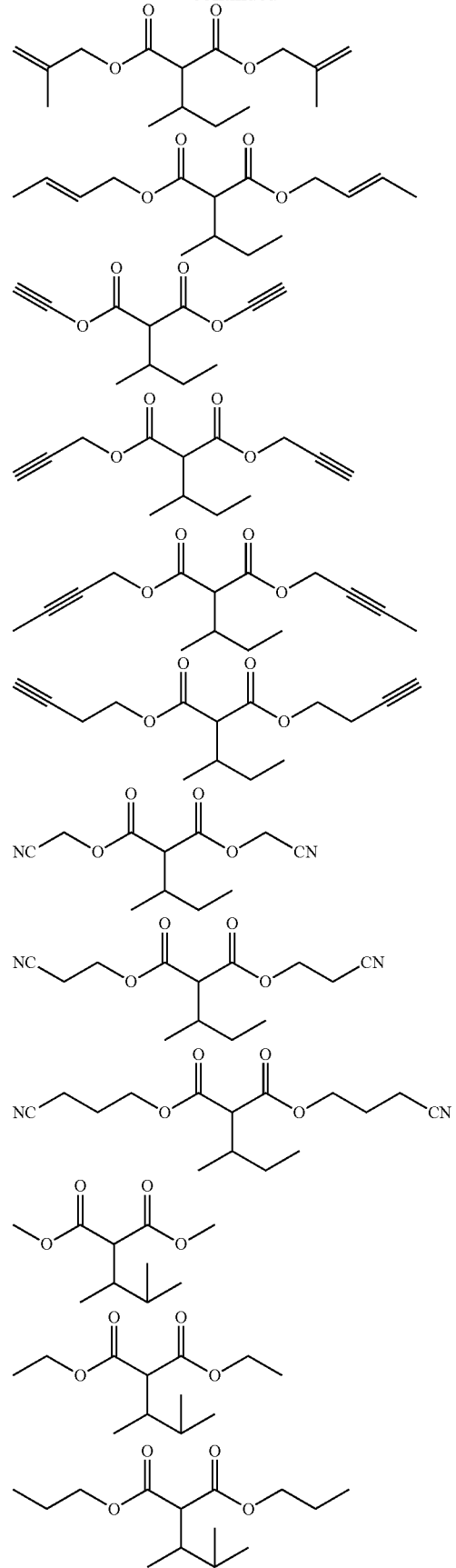

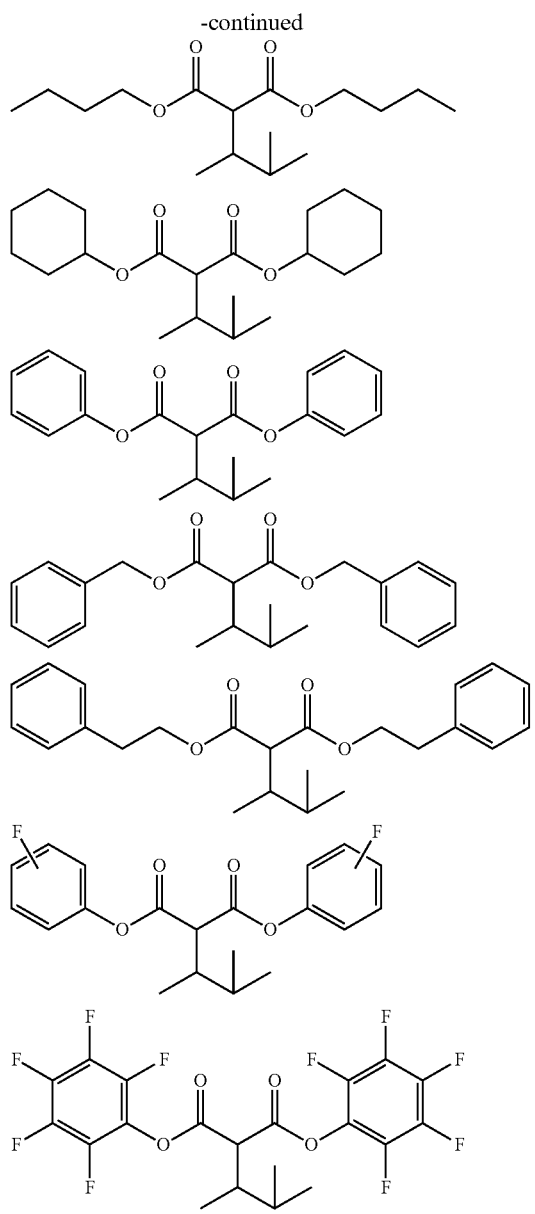
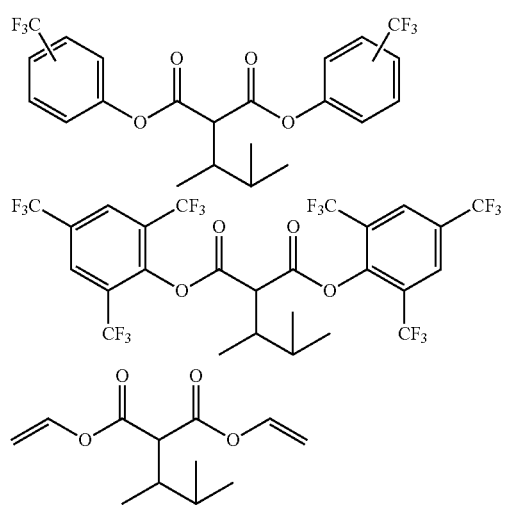
[Chemical formula 12]
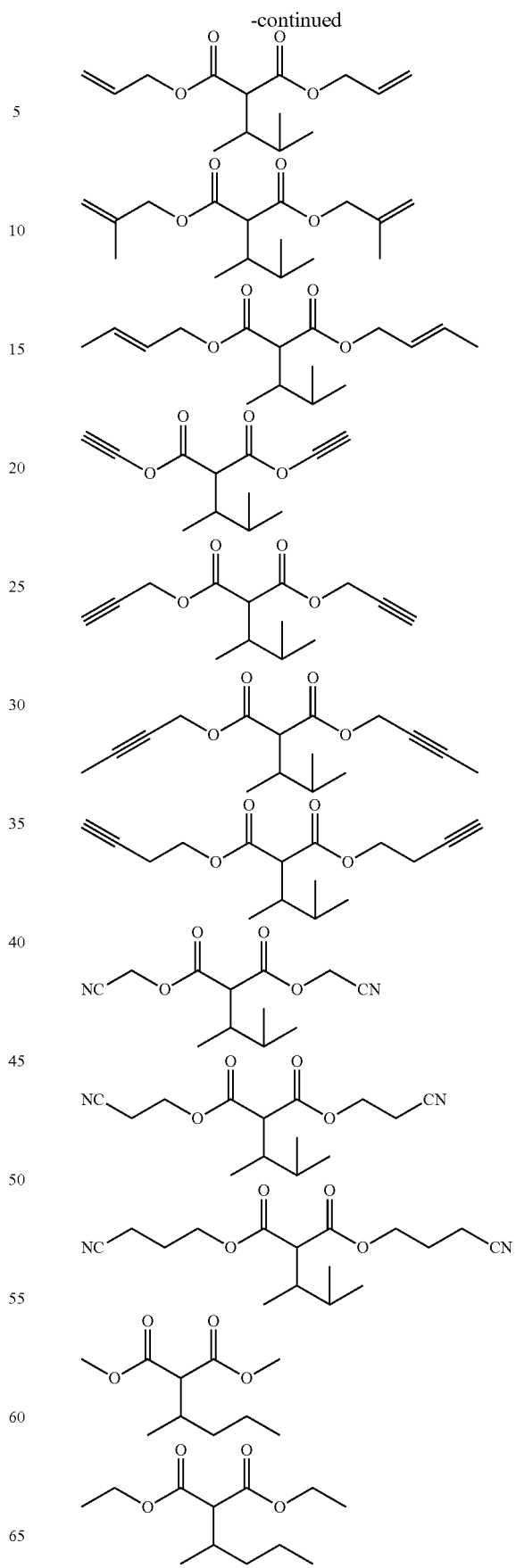

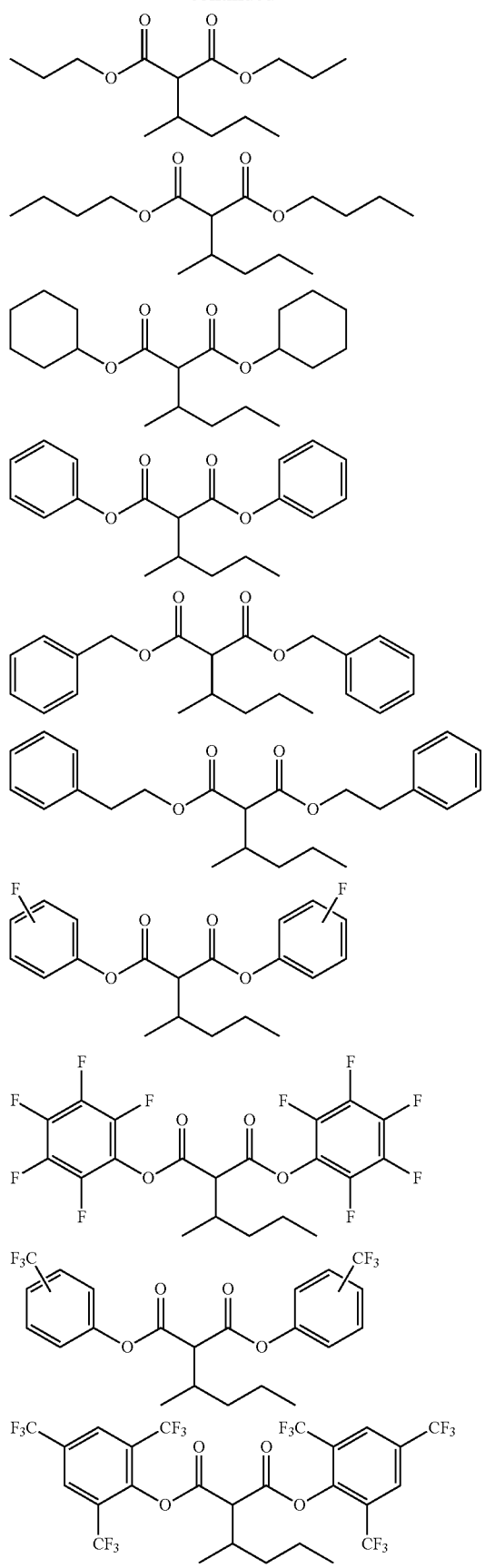
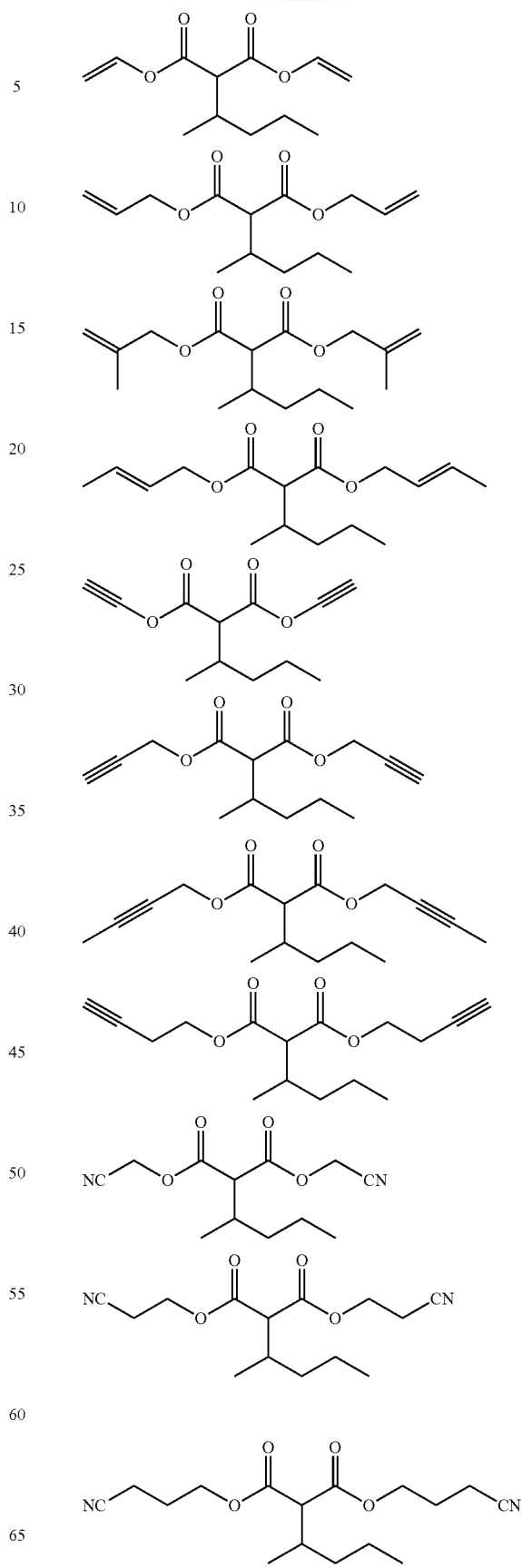

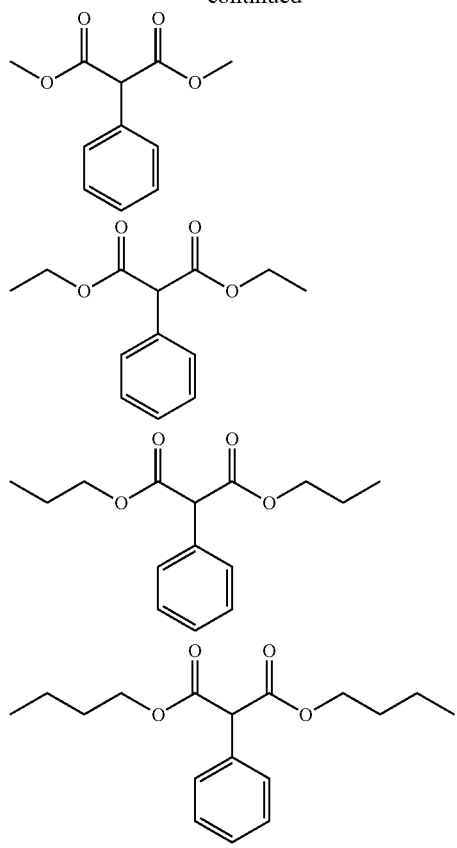
[Chemical formula 13]
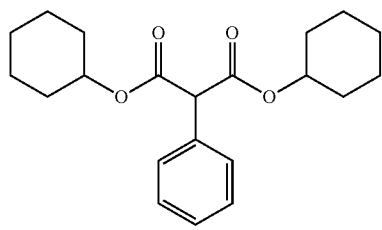
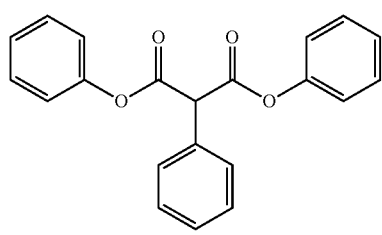
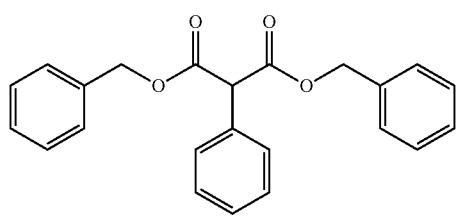
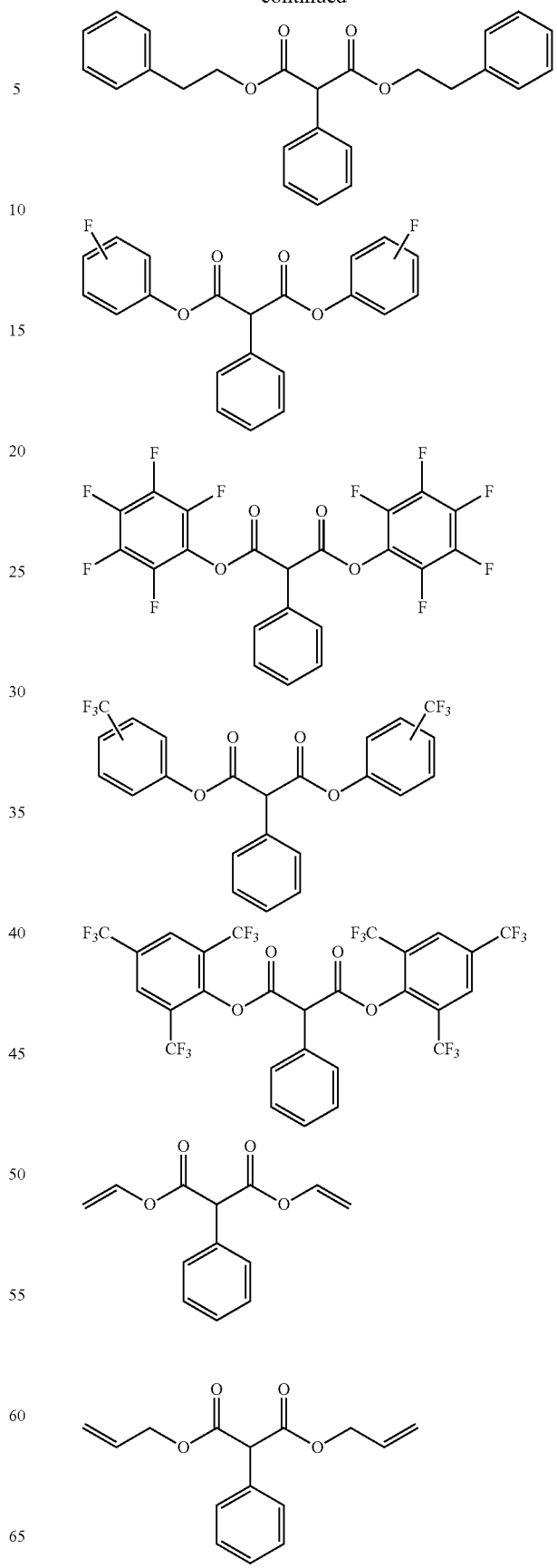

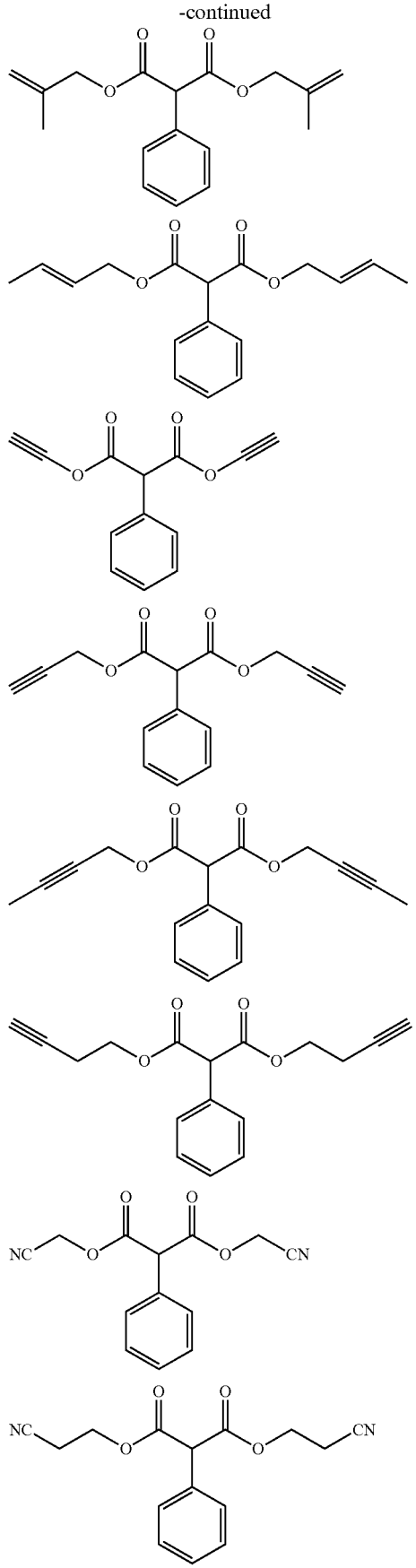
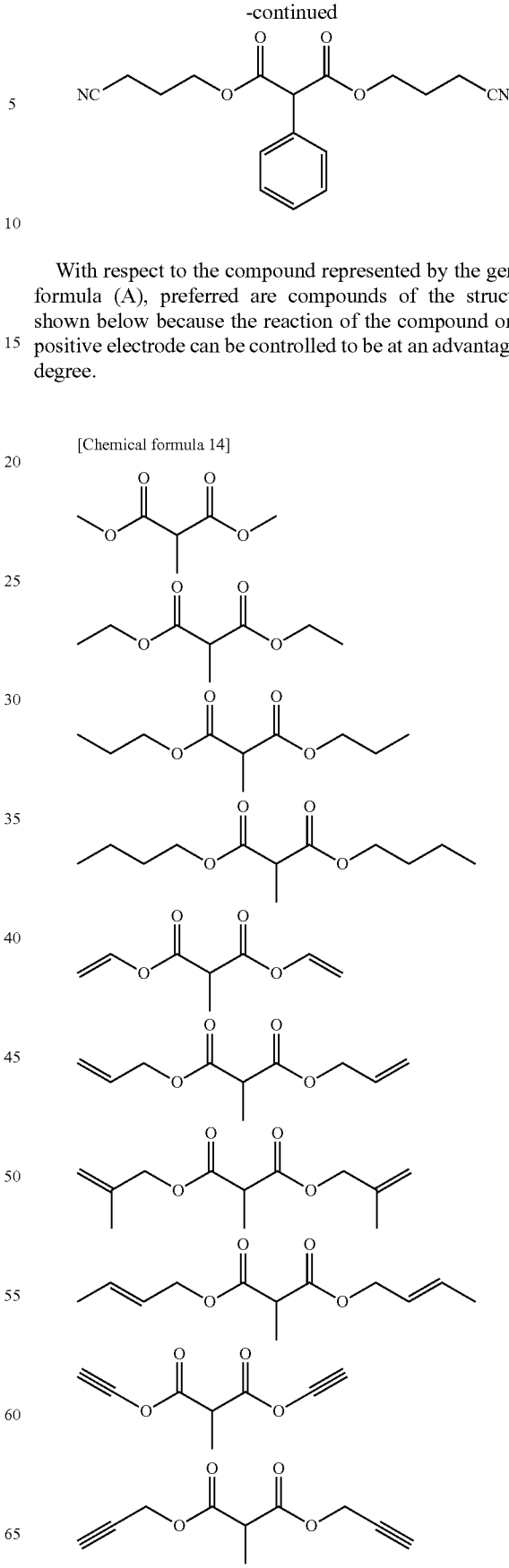
With respect to the compound represented by the general formula (A), preferred are compounds of the structures shown below because the reaction of the compound on the positive electrode can be controlled to be at an advantageous degree.
[Chemical formula 14]

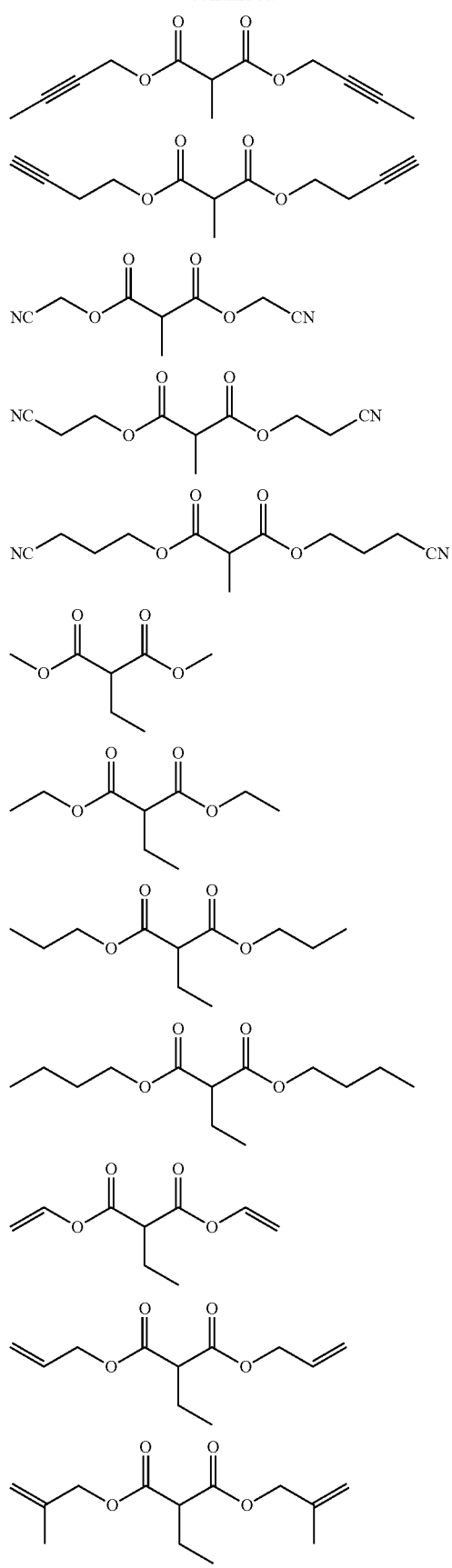

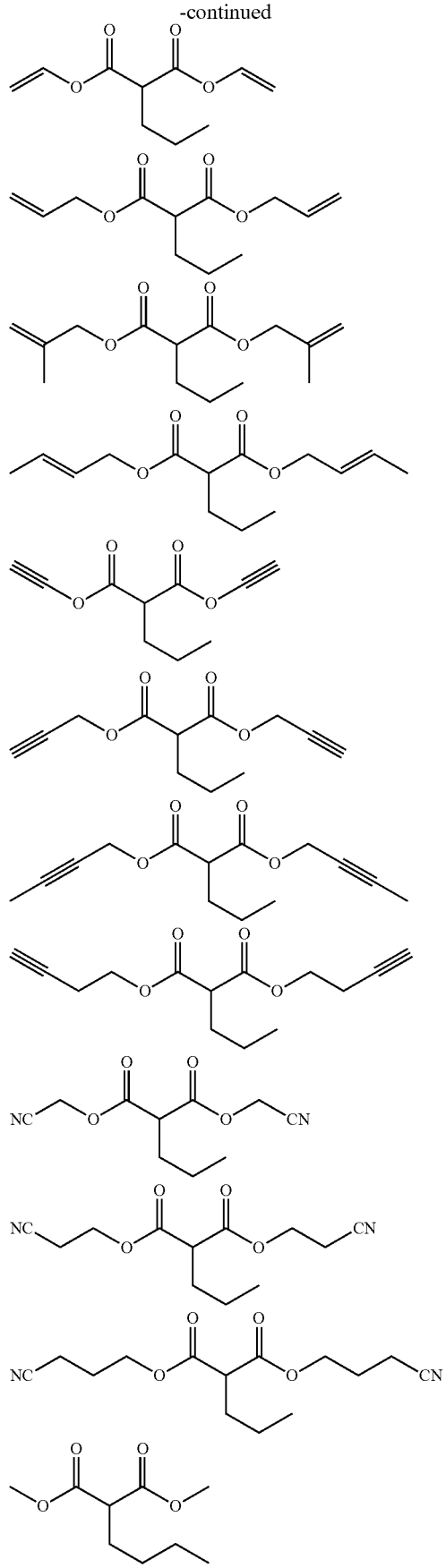
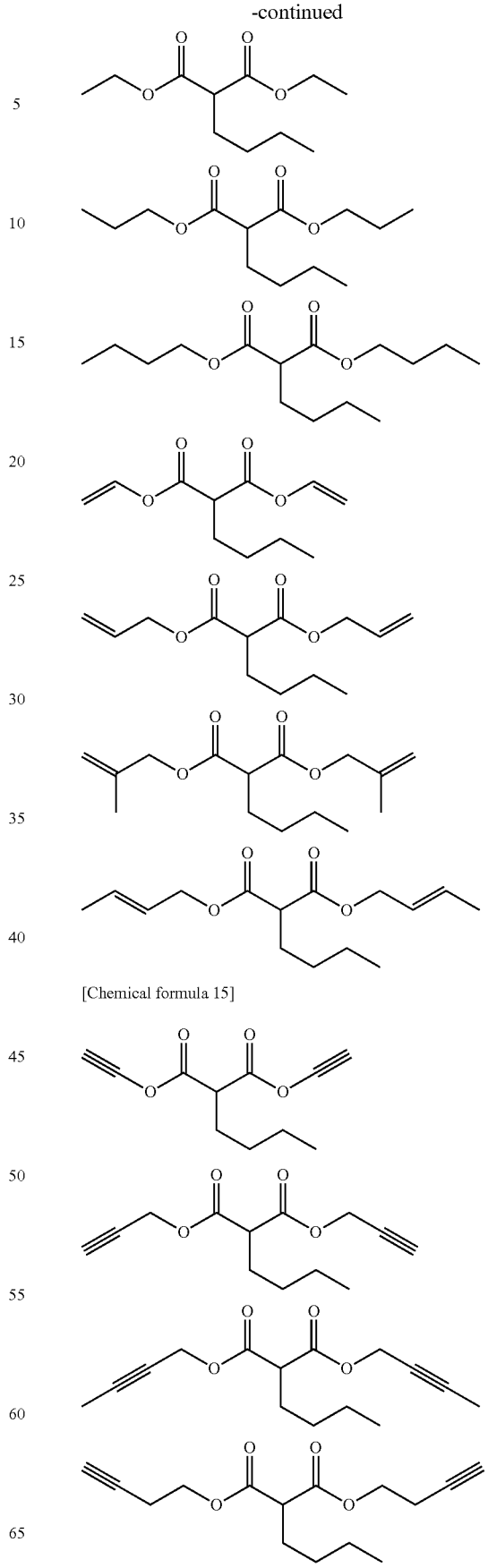

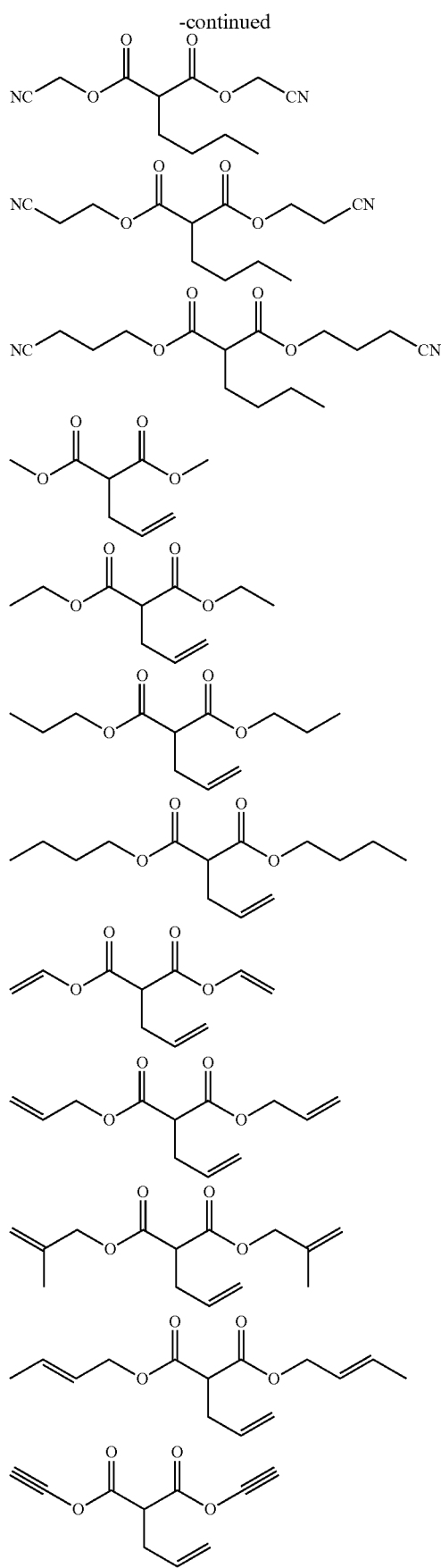
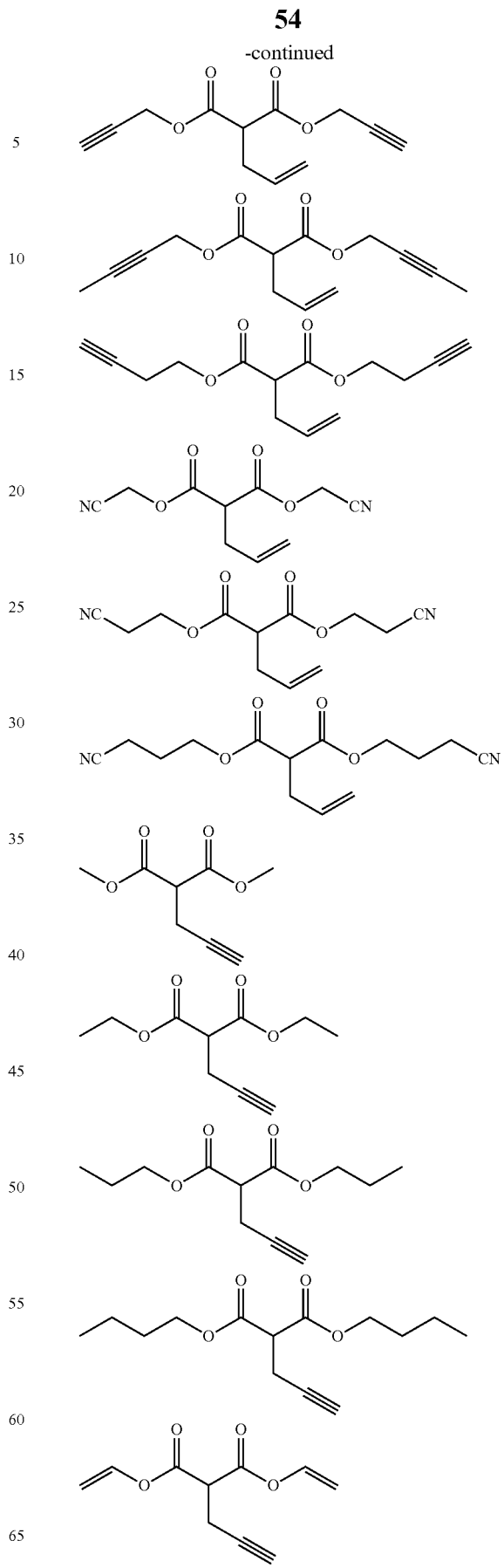

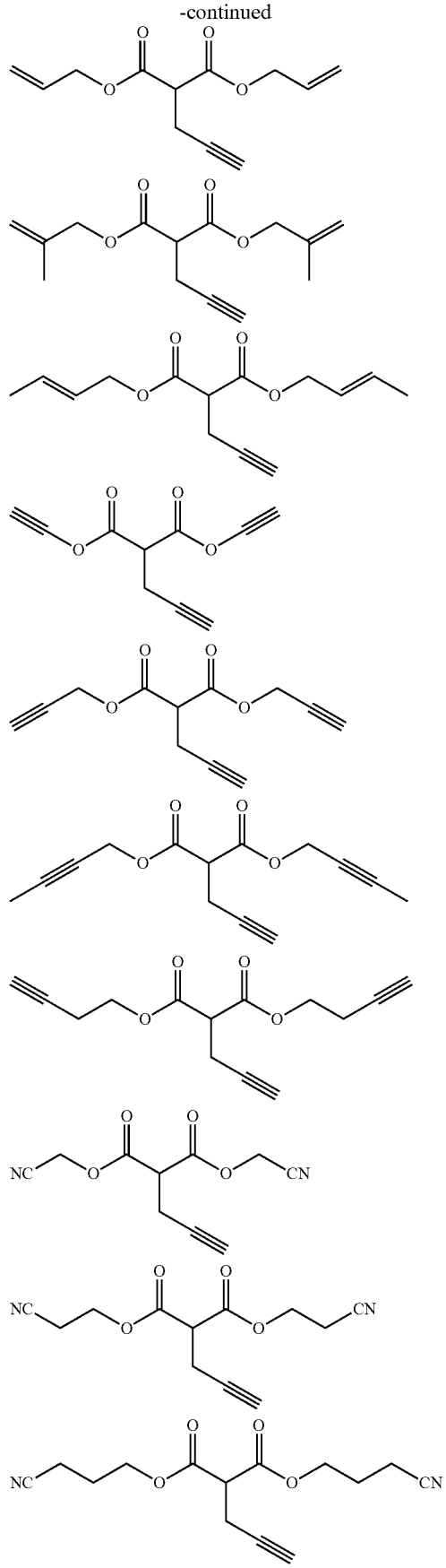
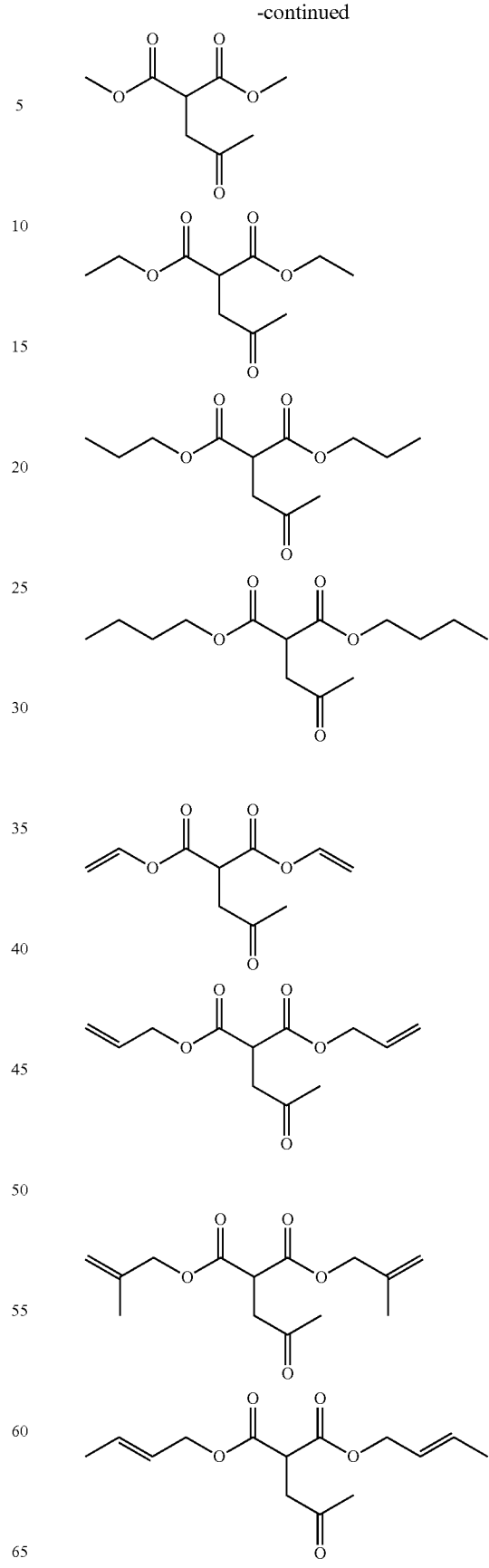

-continued
[Chemical formula 16]
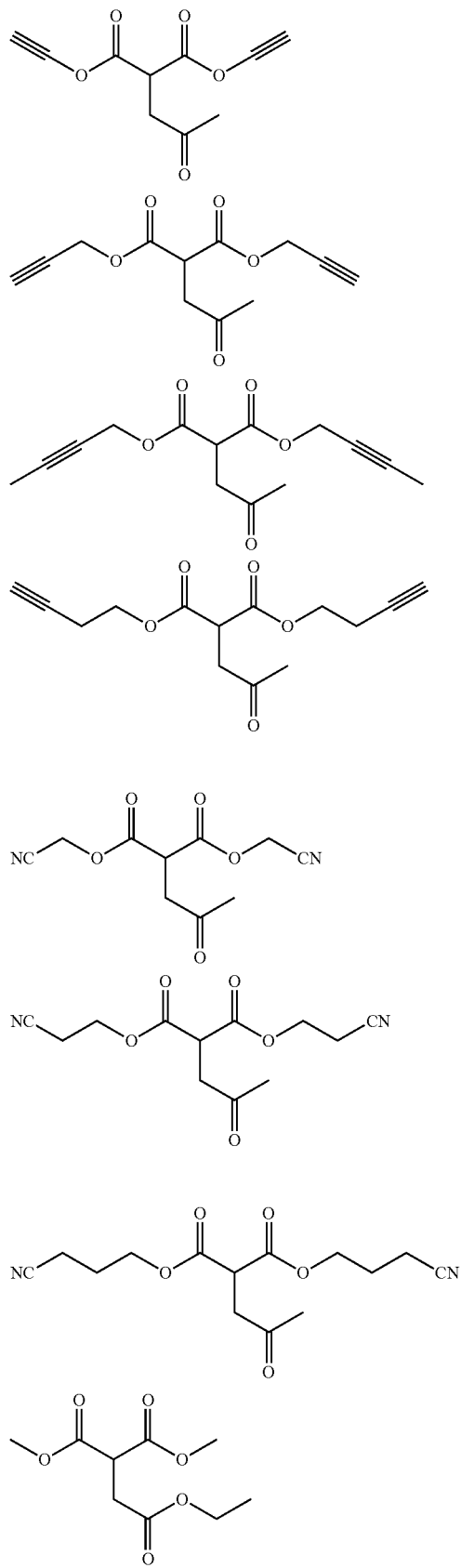
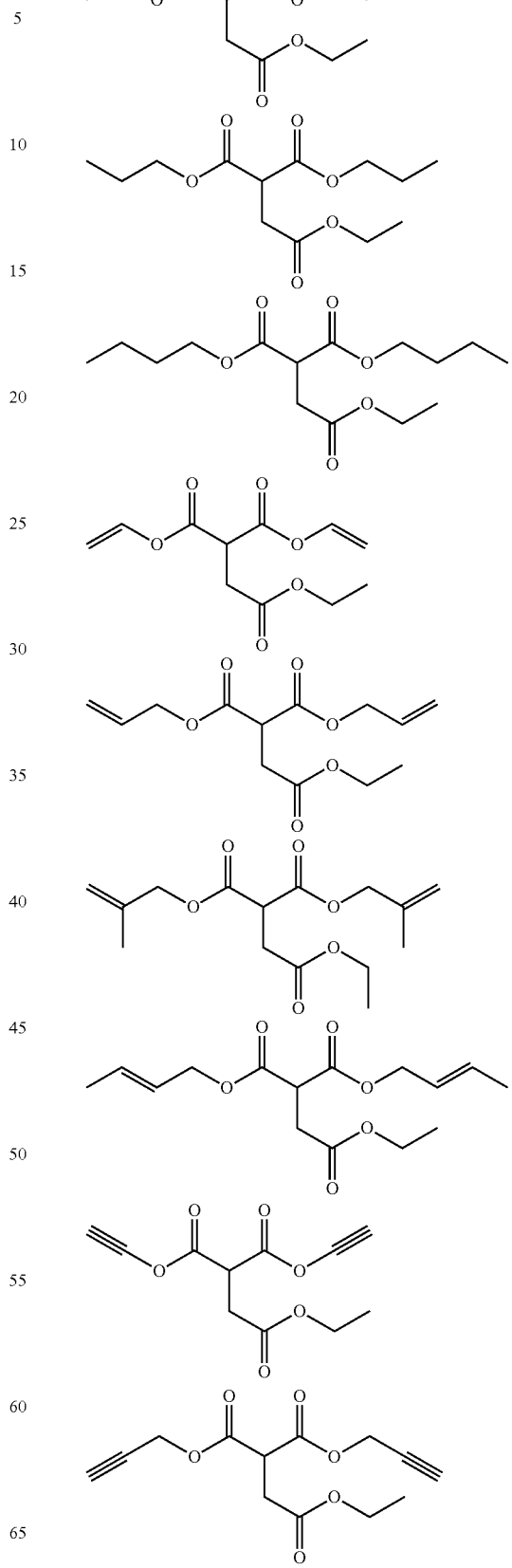

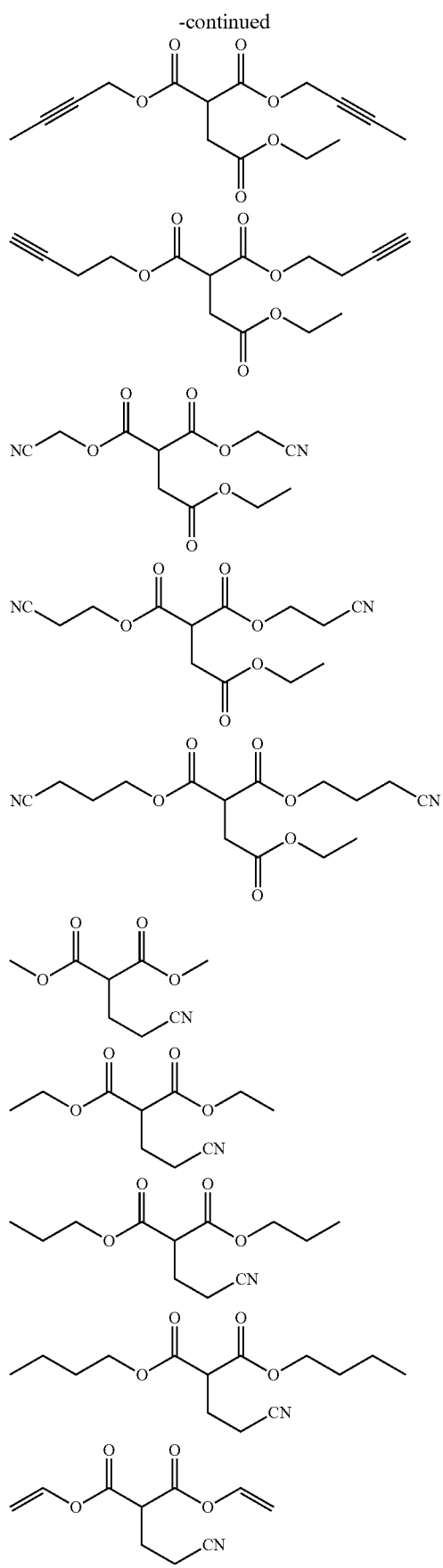
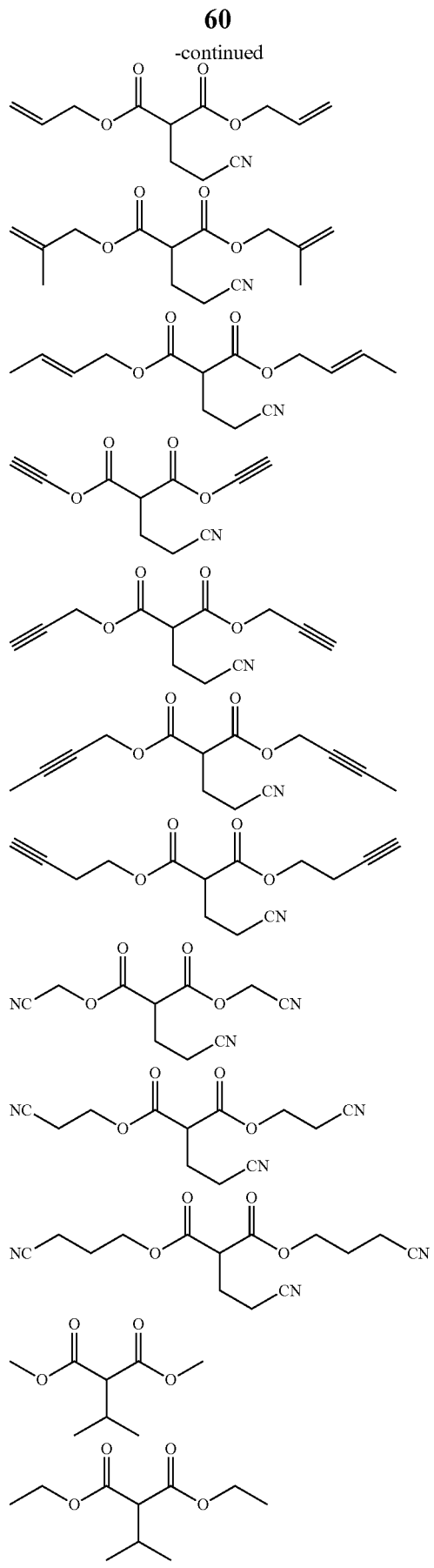

-continued
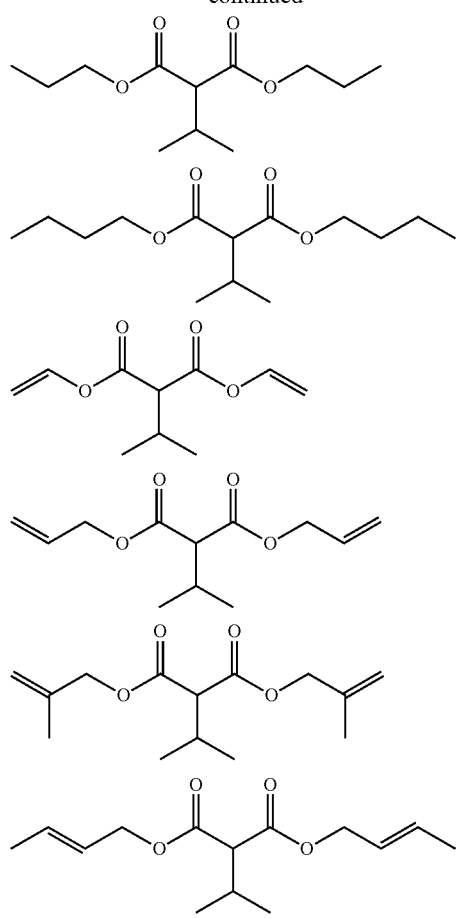
[Chemical formula 17]
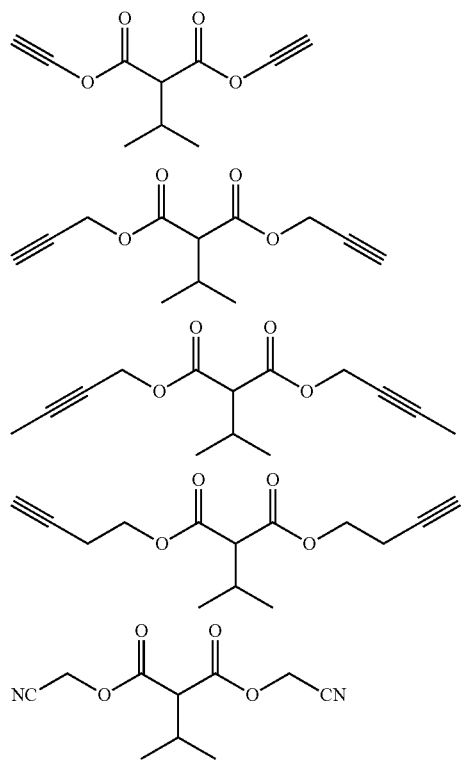
-continued
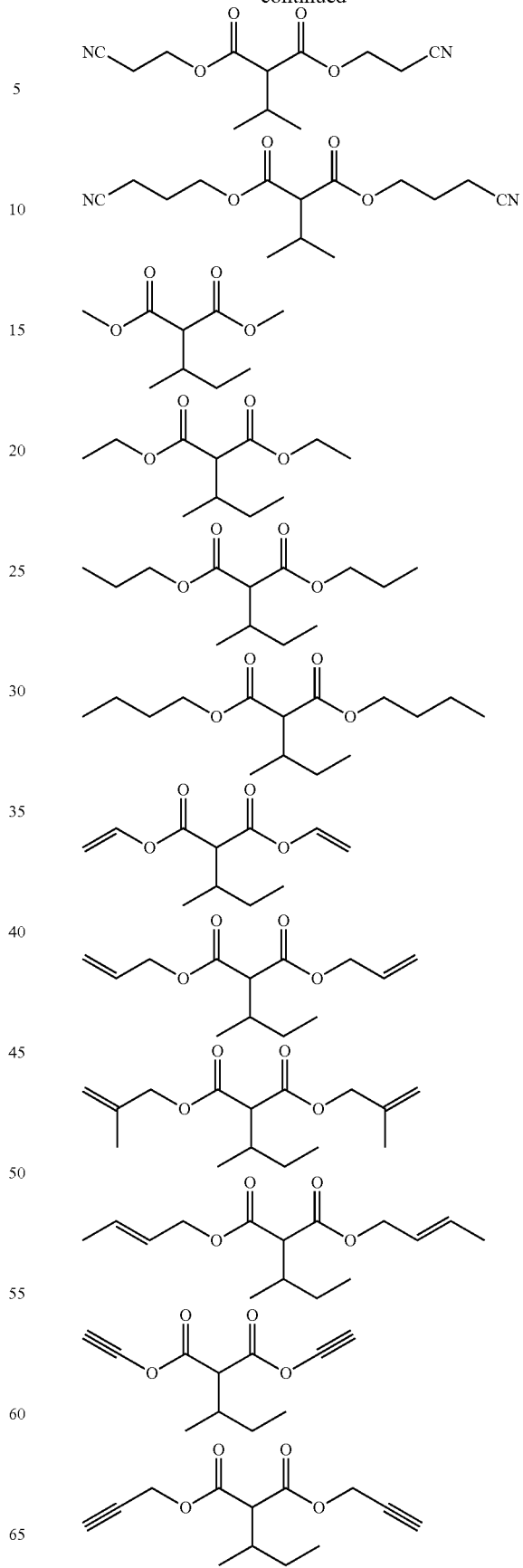

-continued
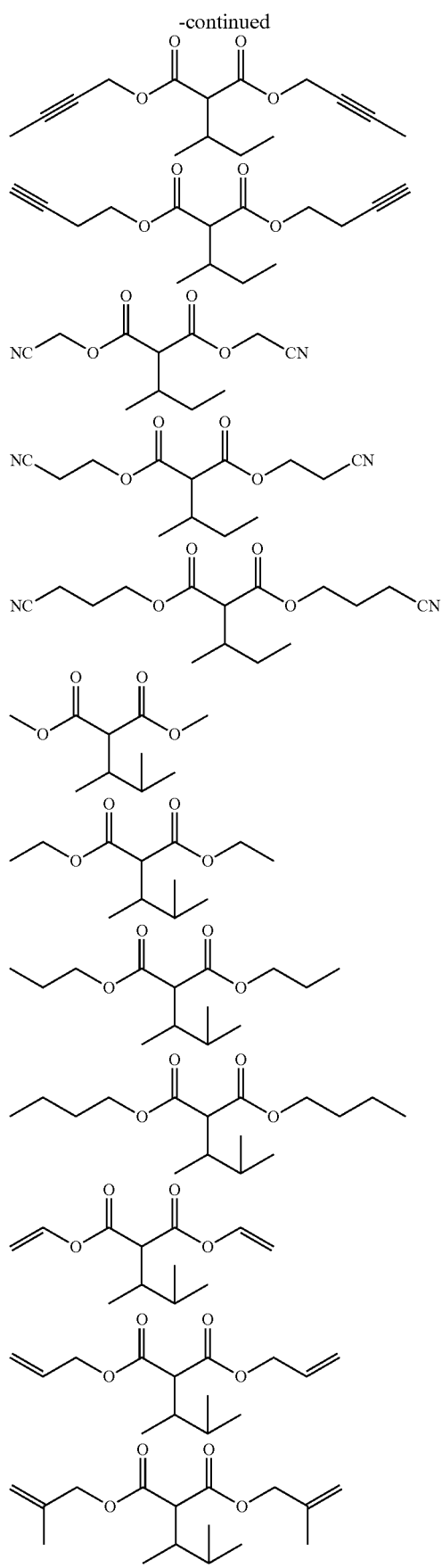
-continued
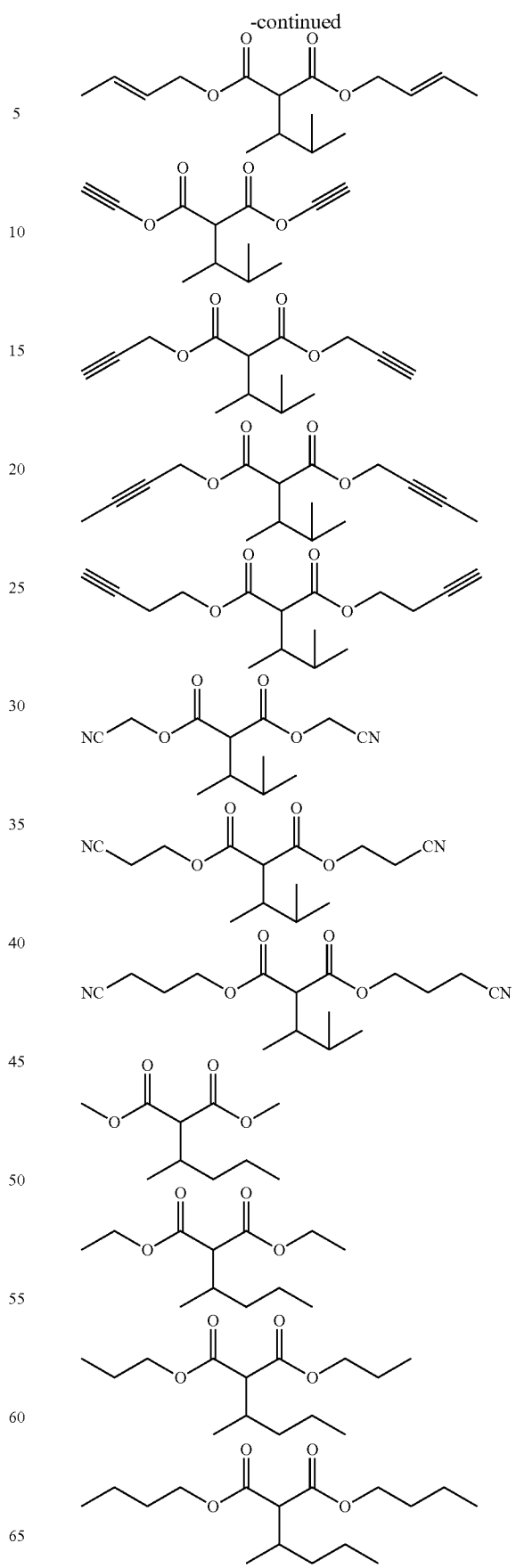

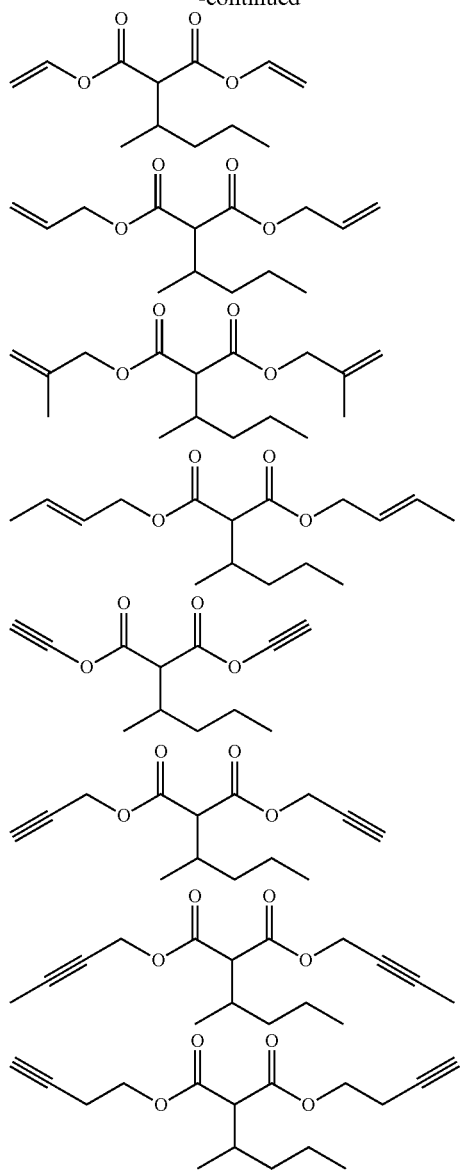
[Chemical formula 18]
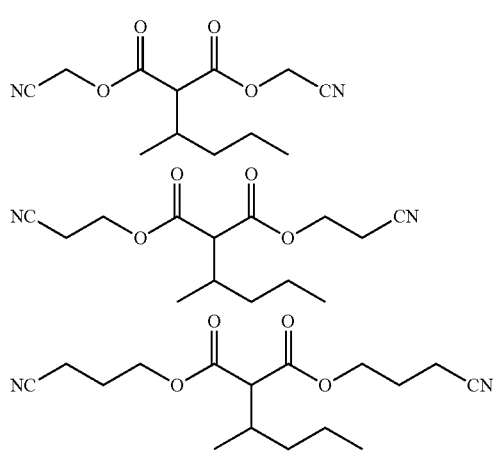
With respect to the compound represented by the general formula (A), more preferred are compounds of the structures shown below because the reaction of the compound on the negative electrode can be controlled to be at an advantageous degree.
[Chemical formula 19]
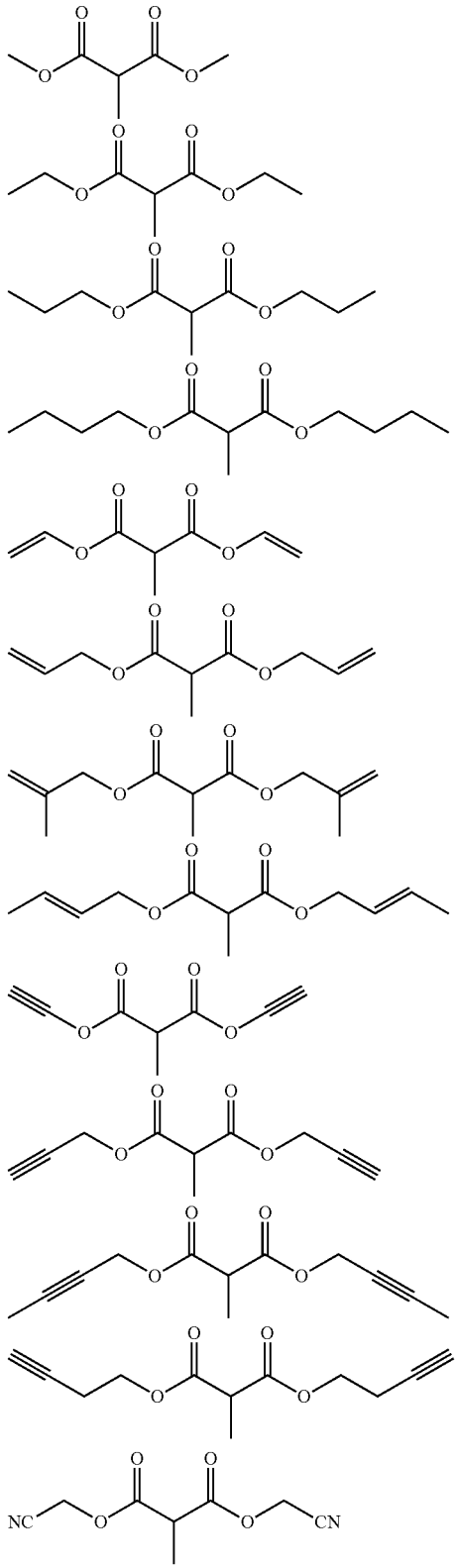

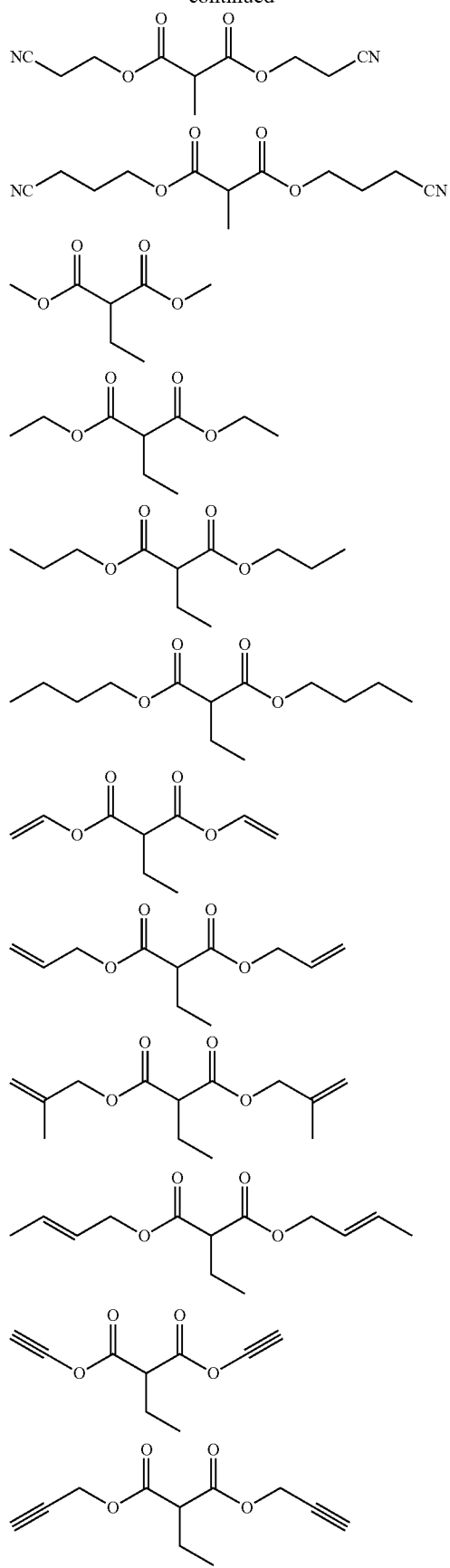
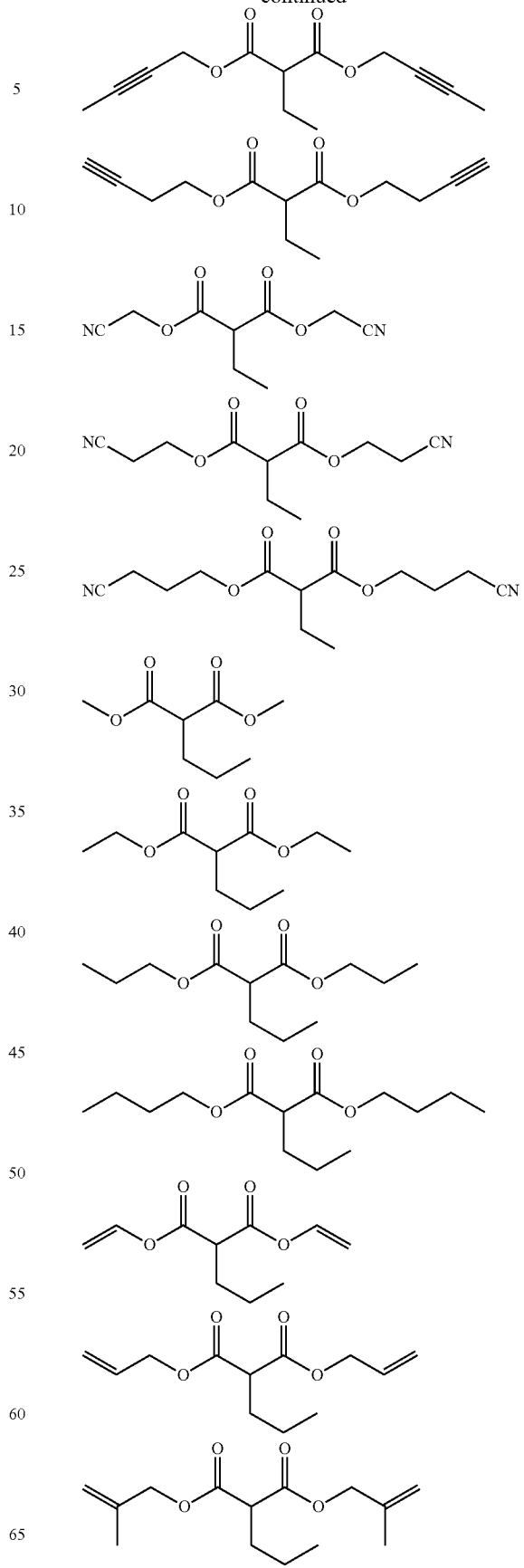

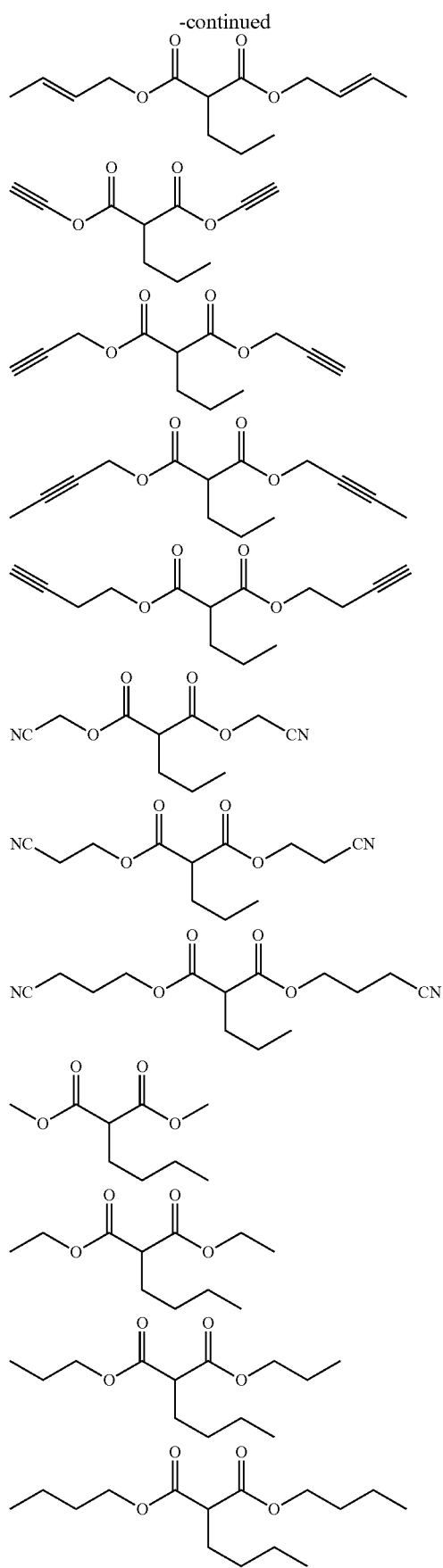
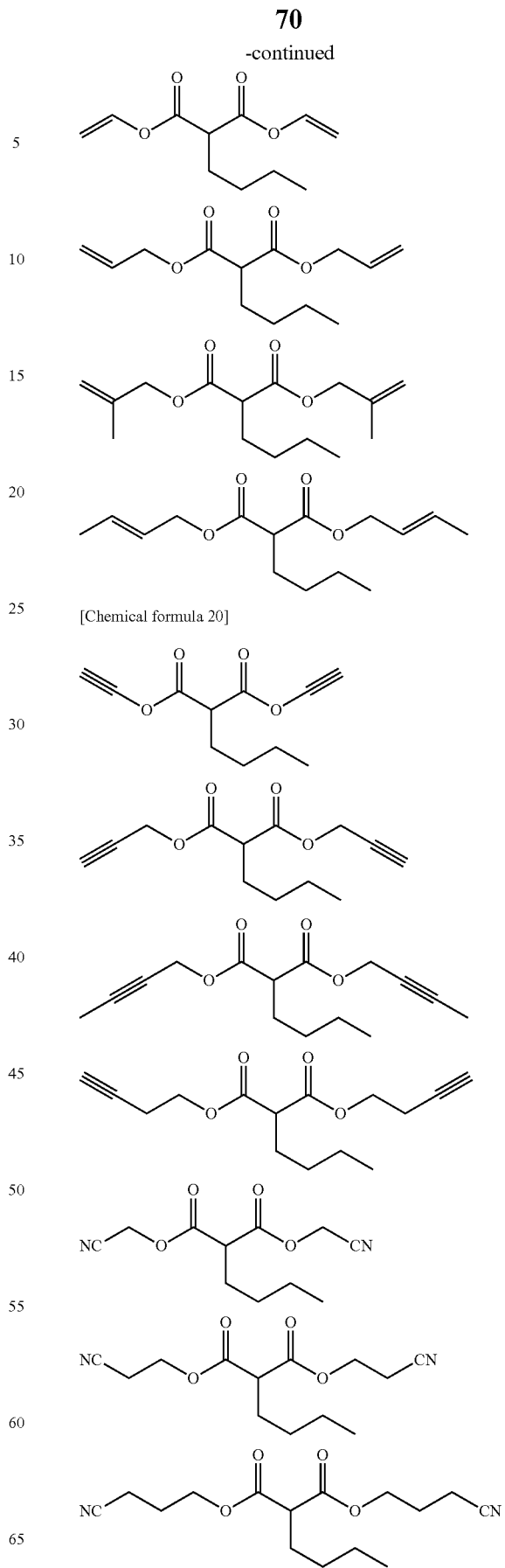

71
-continued
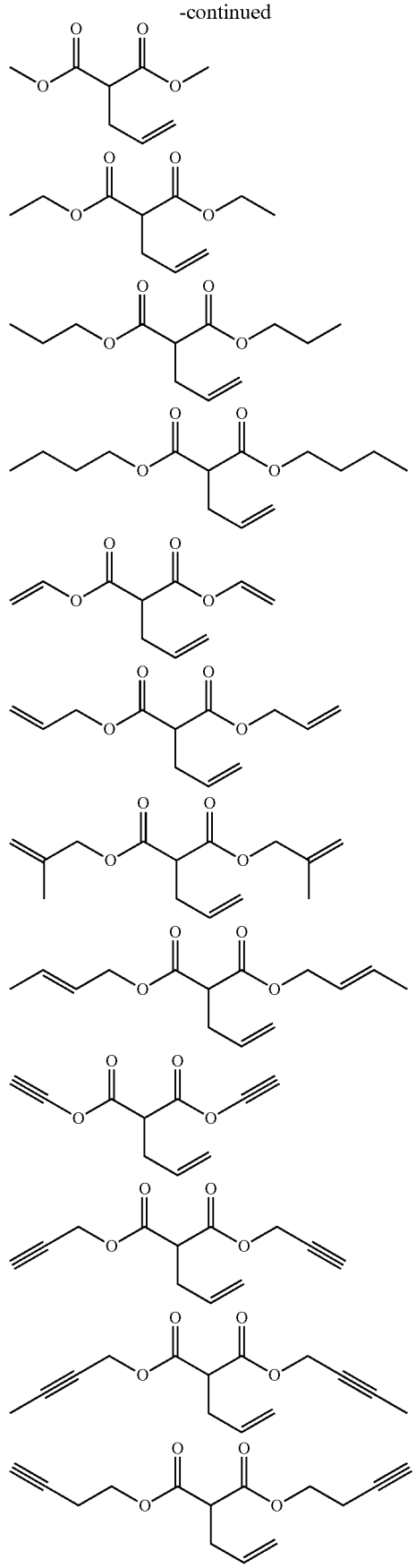
72
-continued
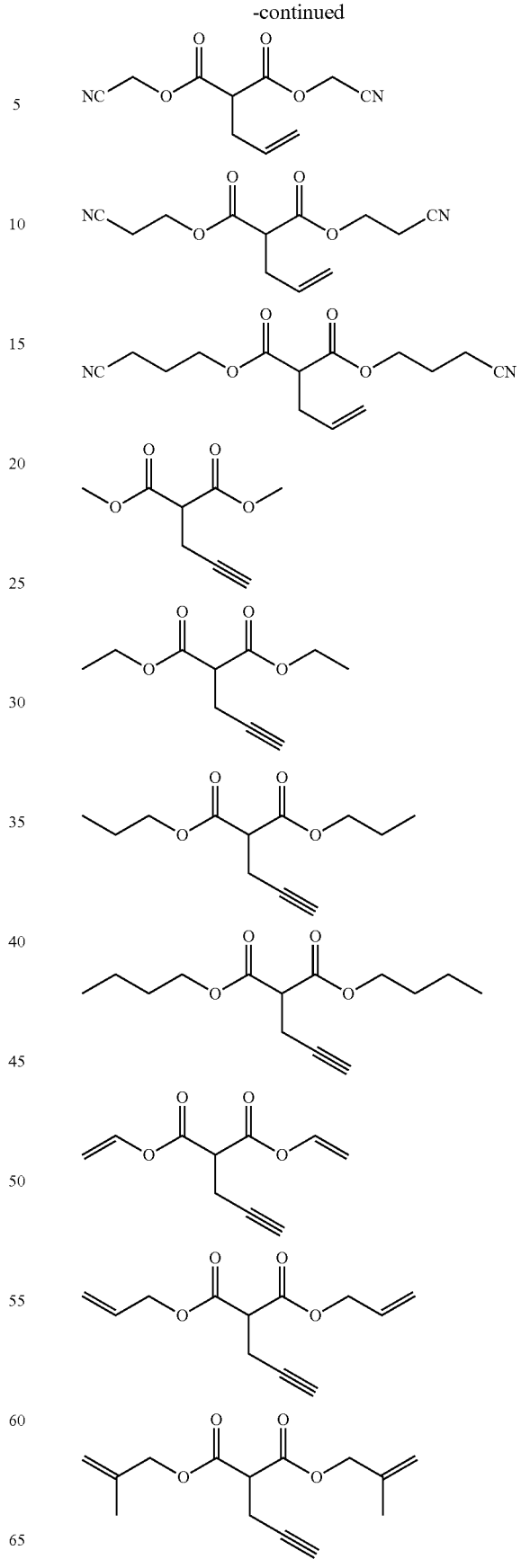

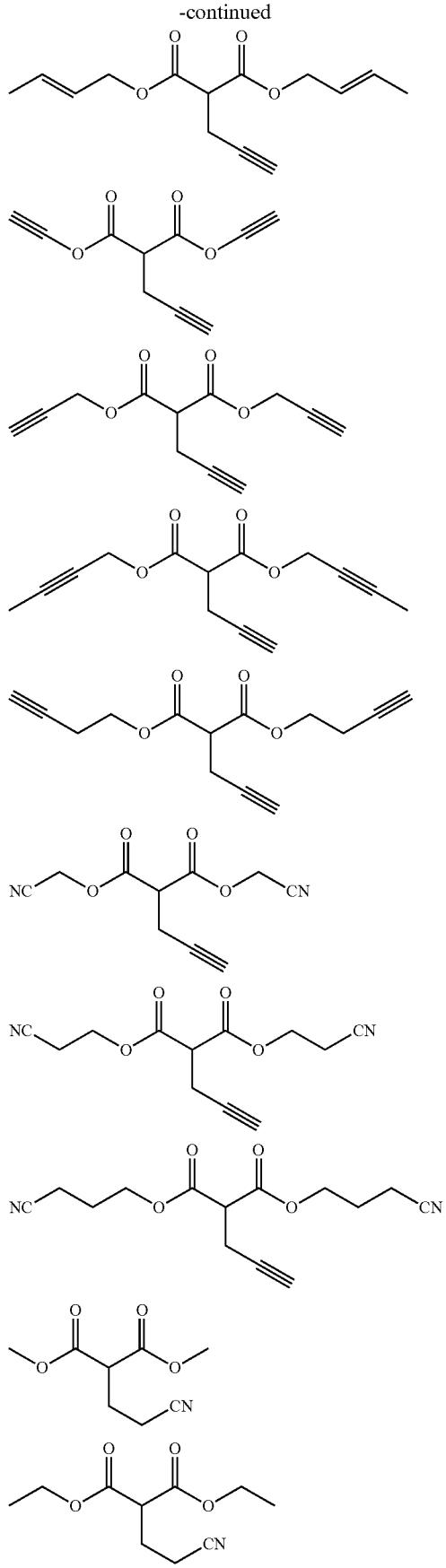
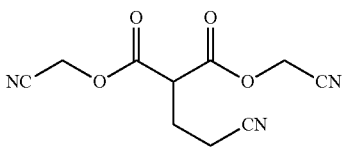
[Chemical formula 21]

75
-continued
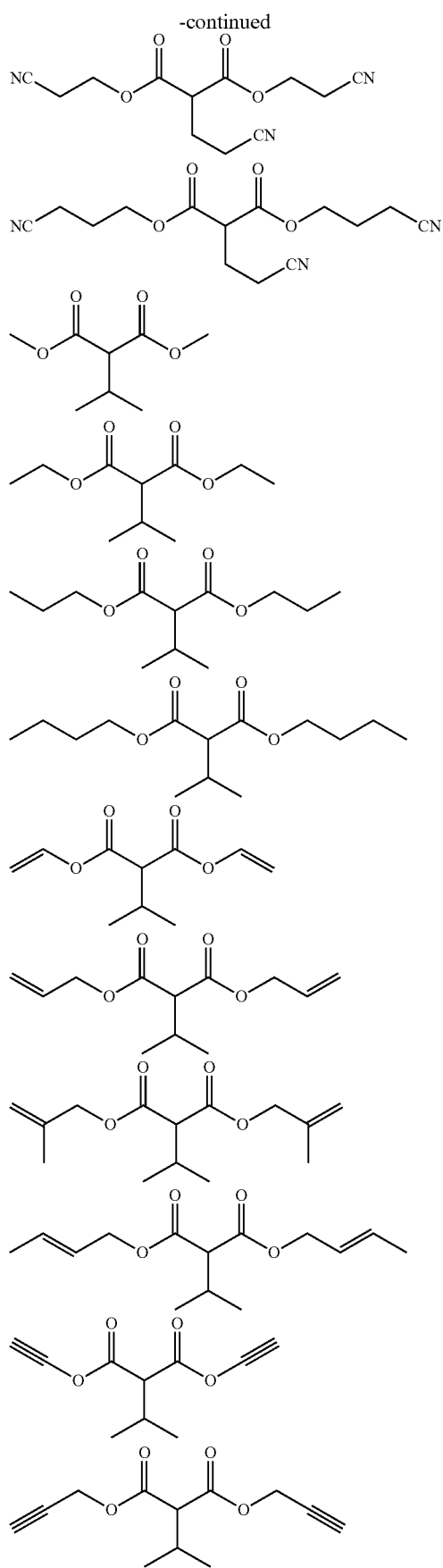
76
-continued
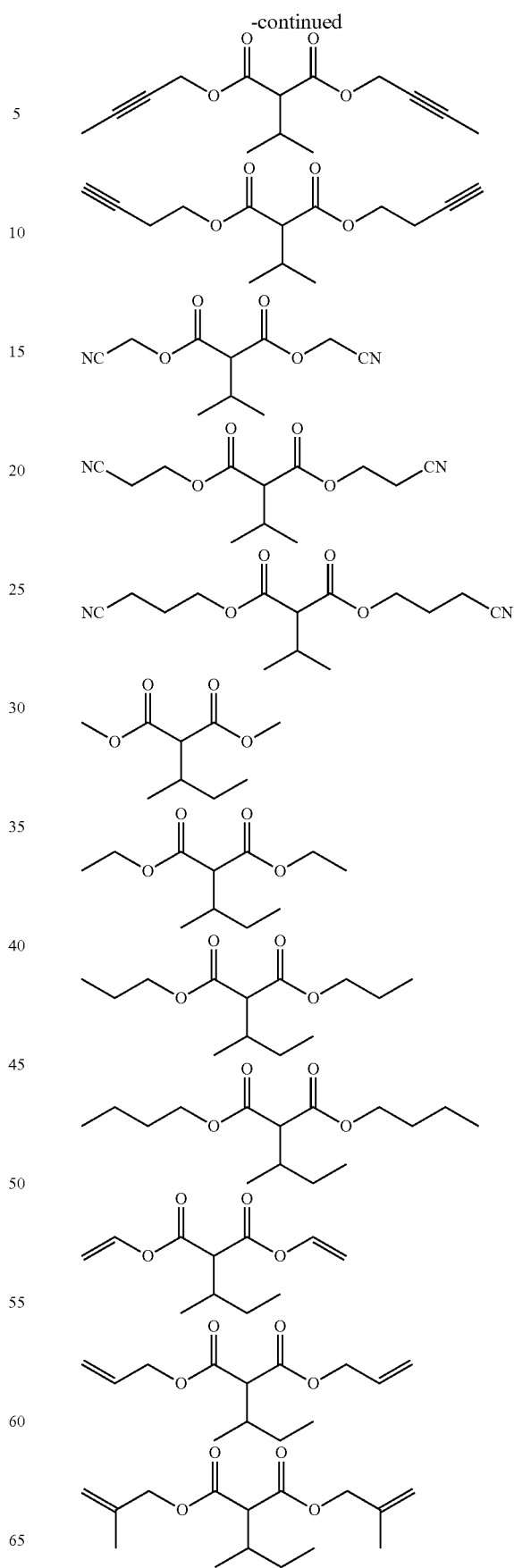

-continued
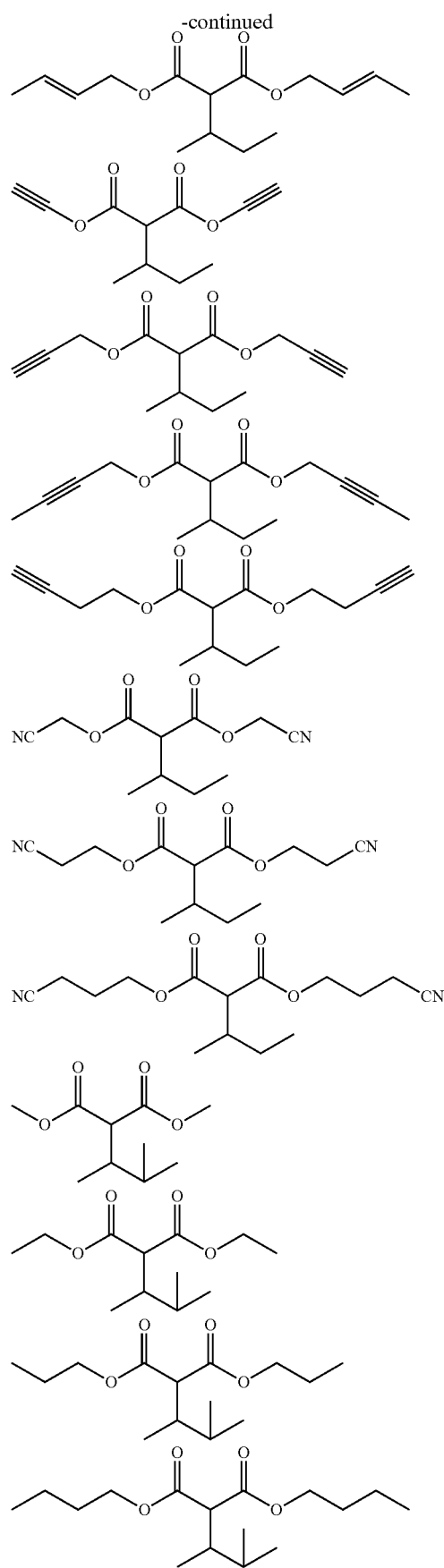
-continued
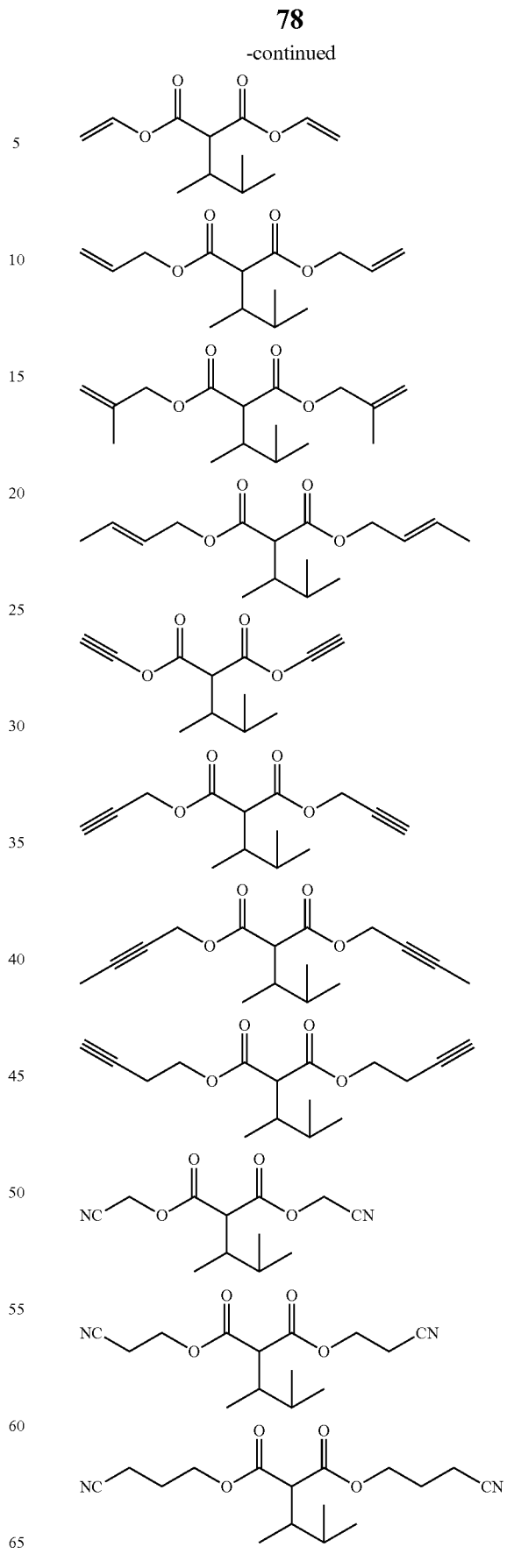

[Chemical formula 22]
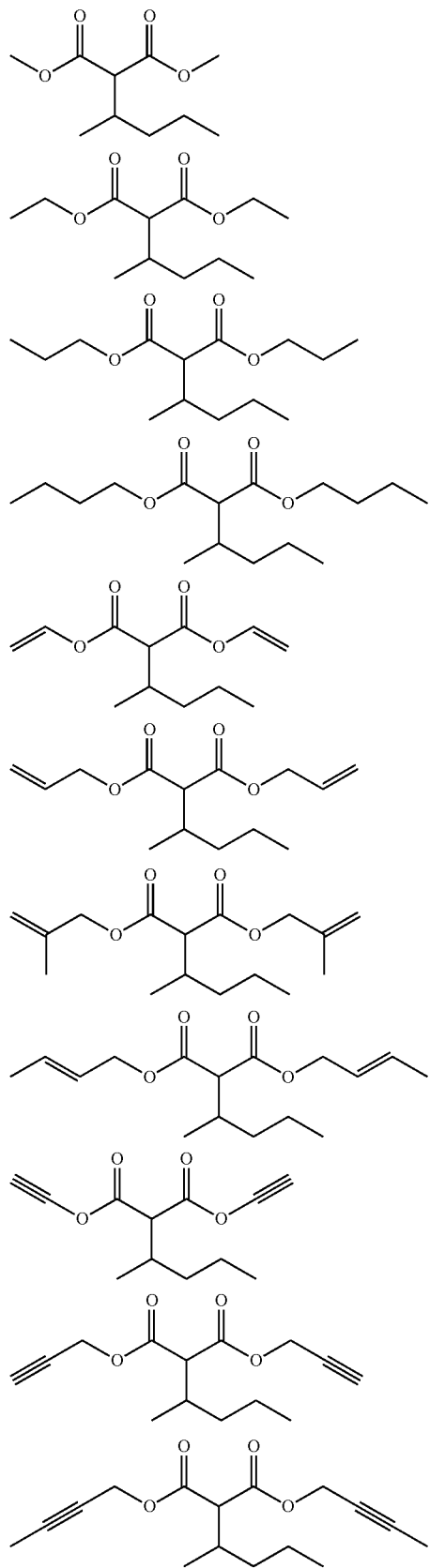
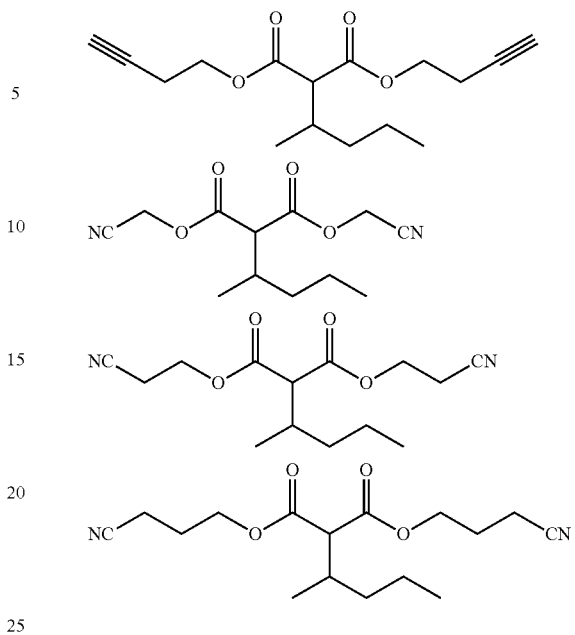
With respect to the compound represented by the general formula (A), further preferred are compounds of the structures shown below because the reaction of the compound on the electrode to increase the electrode resistance can be controlled to be at an advantageous degree.
[Chemical formula 23]
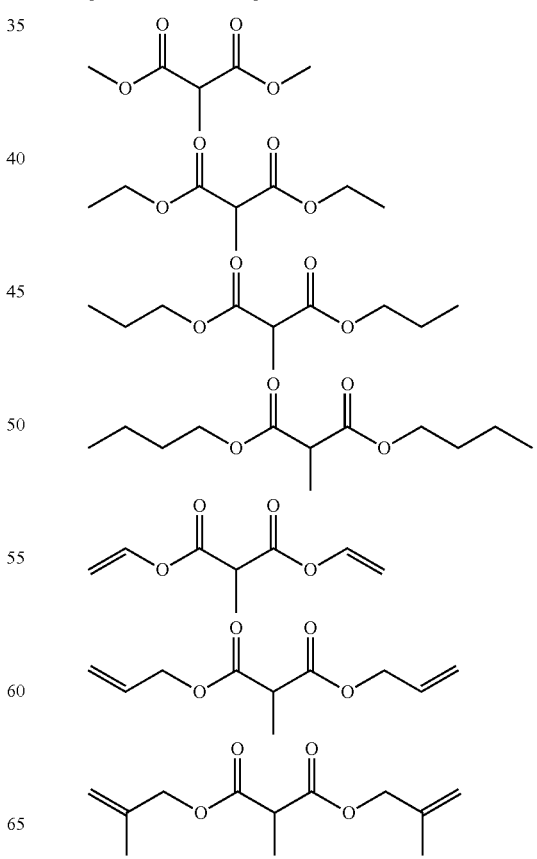

81
-continued
82
-continued
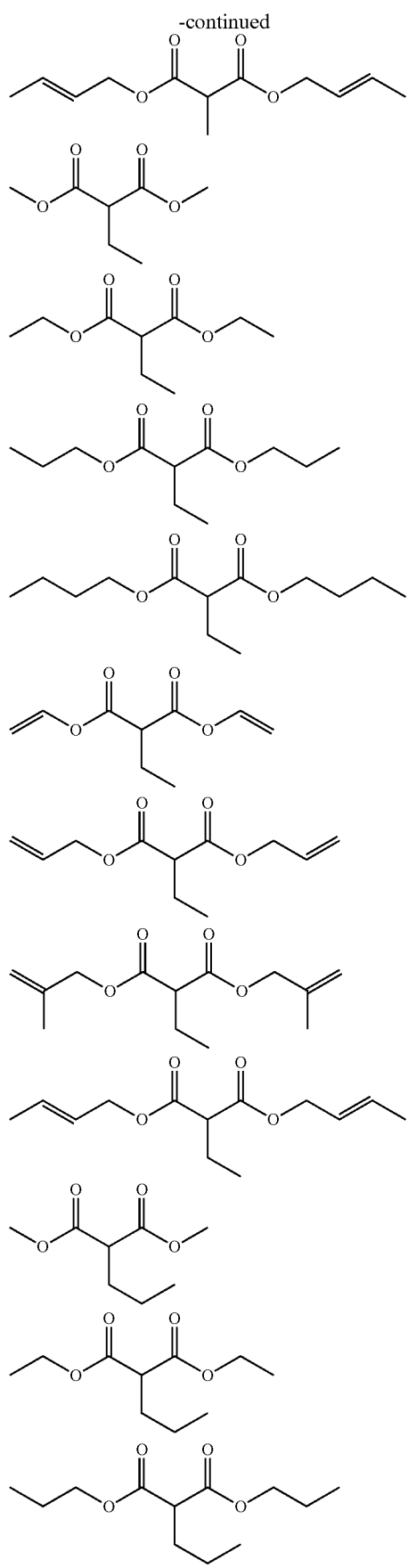
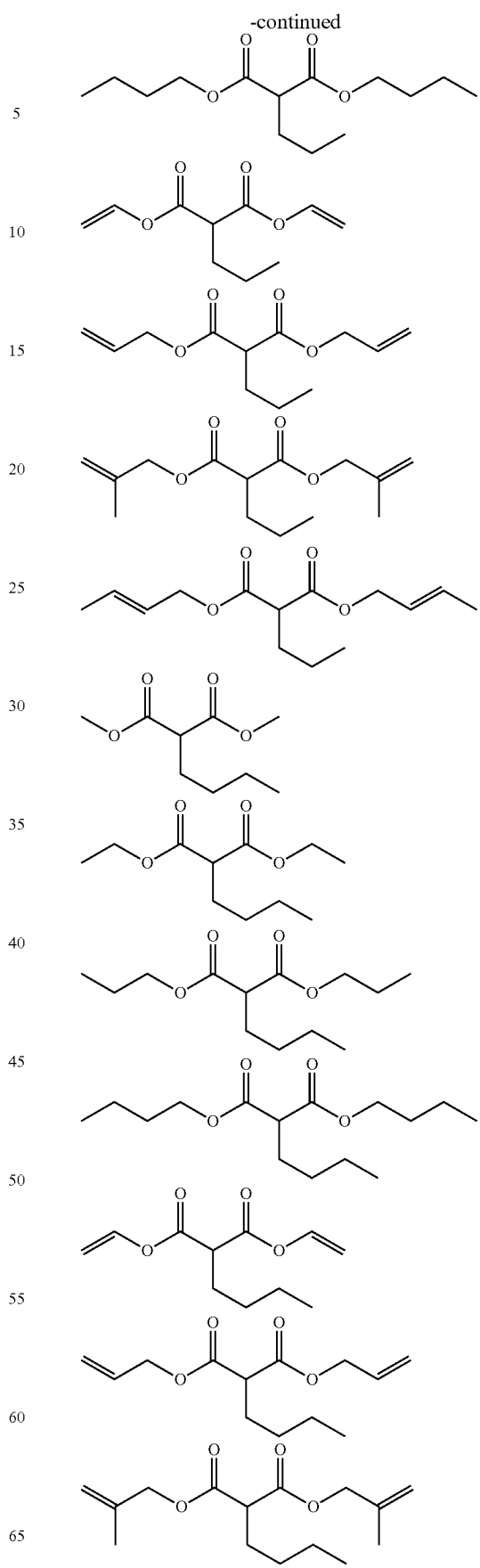

-continued
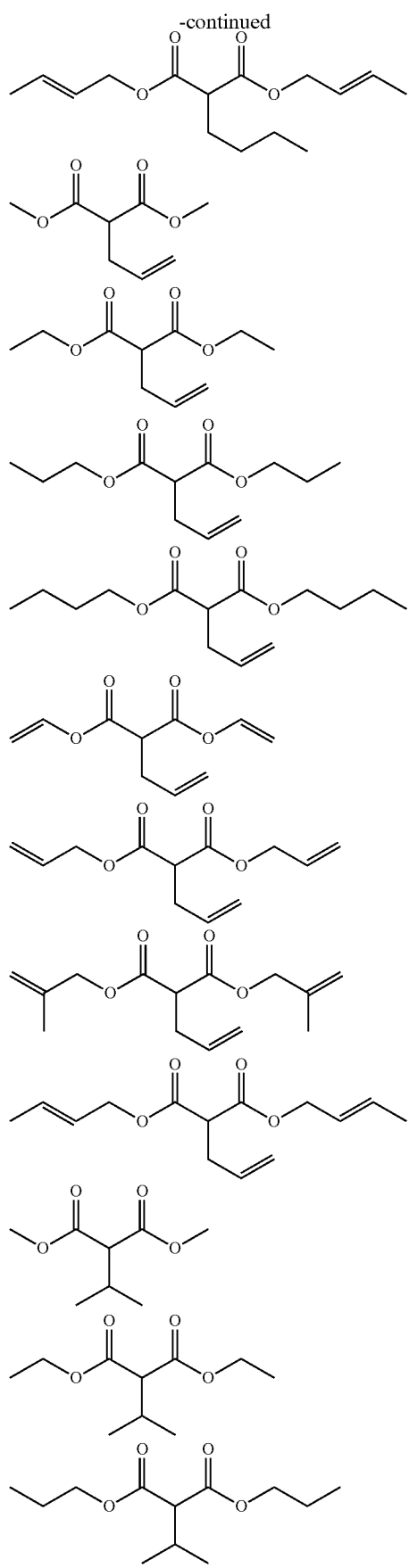
-continued
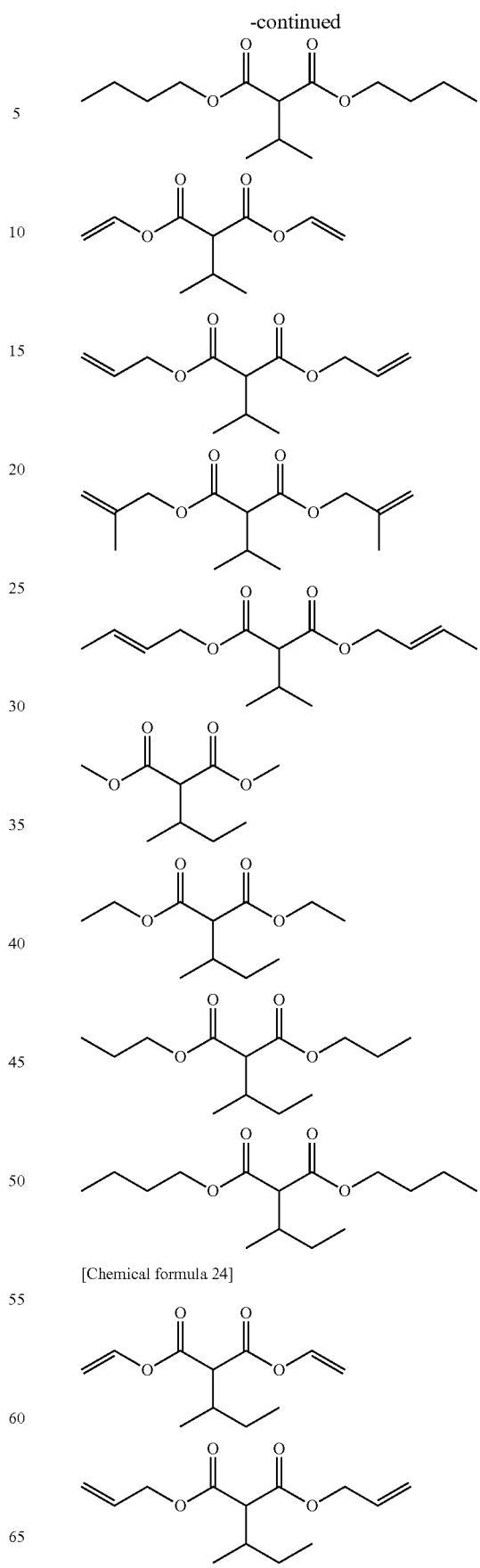
[Chemical formula 24]

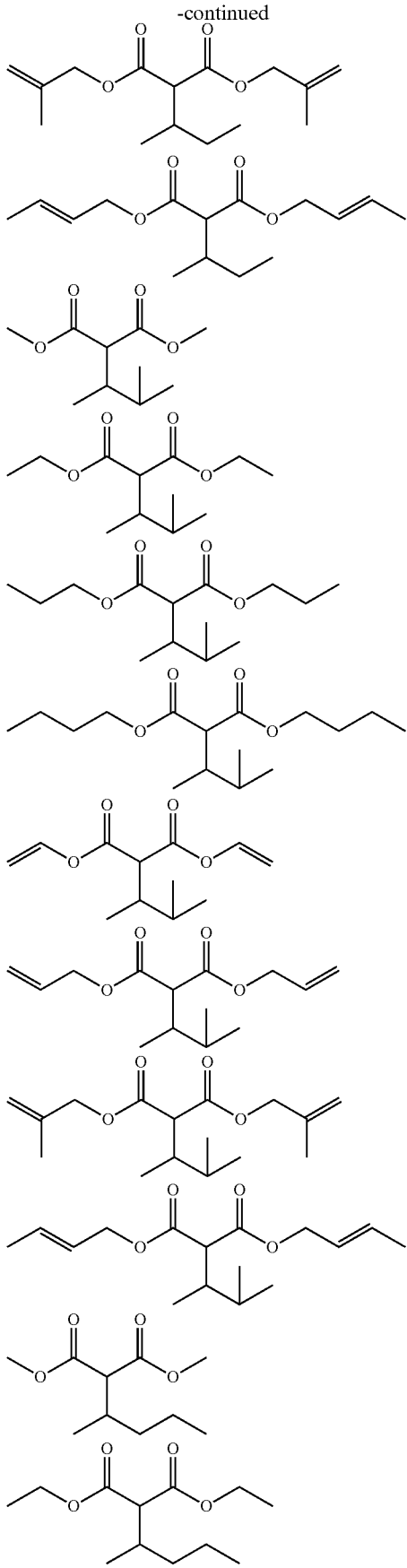
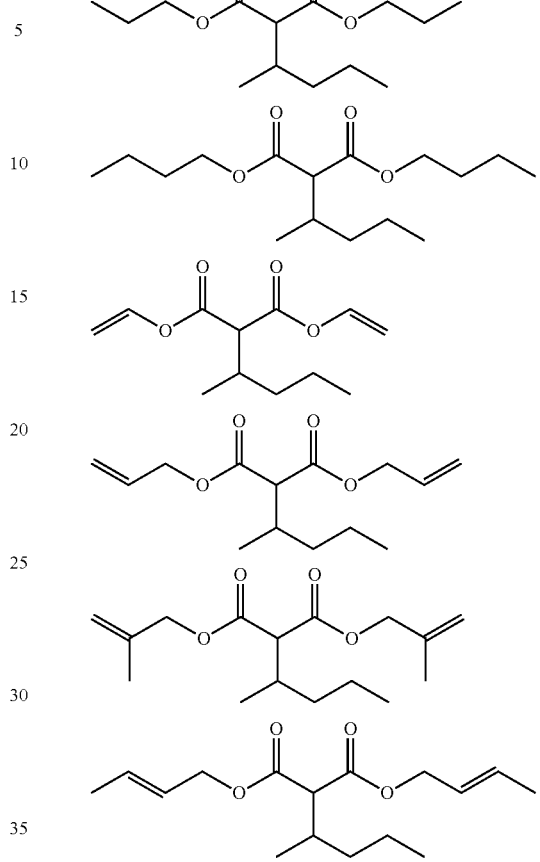
With respect to the compound represented by the general formula (A), especially preferred are compounds of the structures shown below because the reaction of the compound on the electrode to increase the electrode resistance can be controlled to be at a further advantageous degree.
[Chemical formula 25]
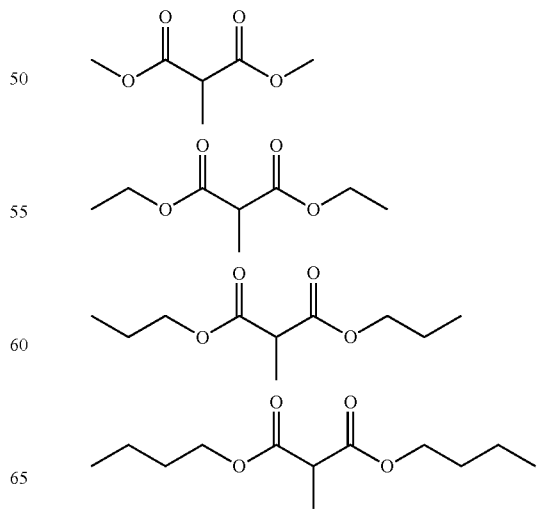

87
-continued
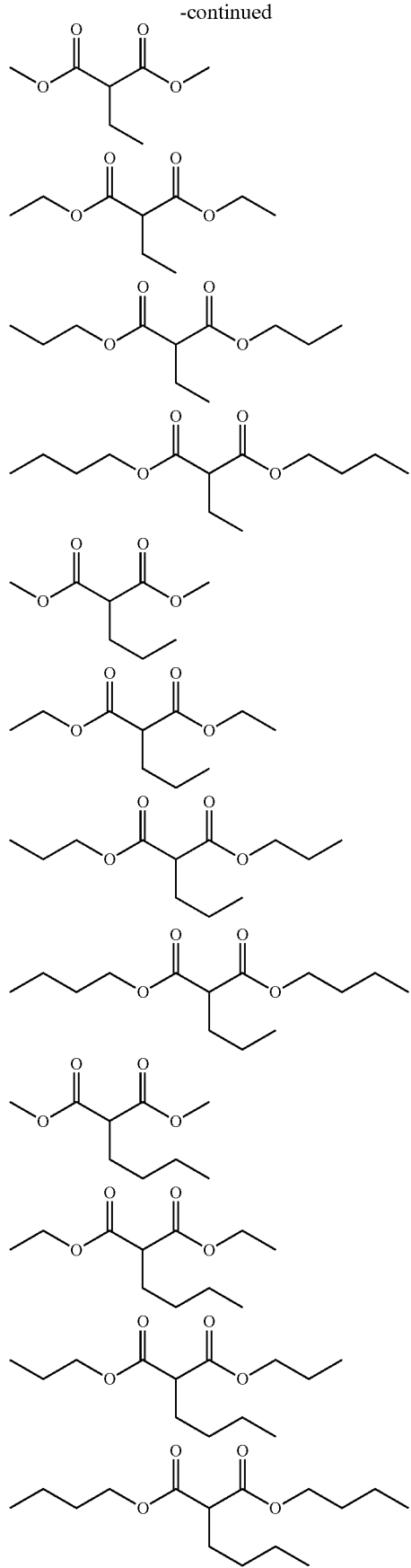
88
-continued
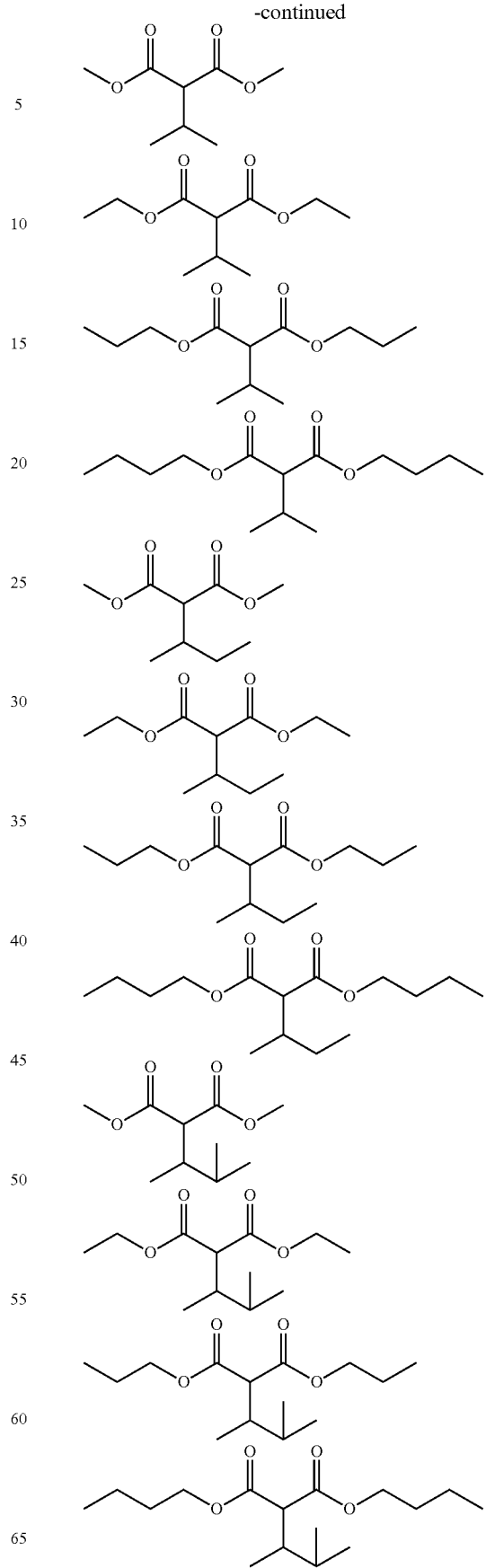

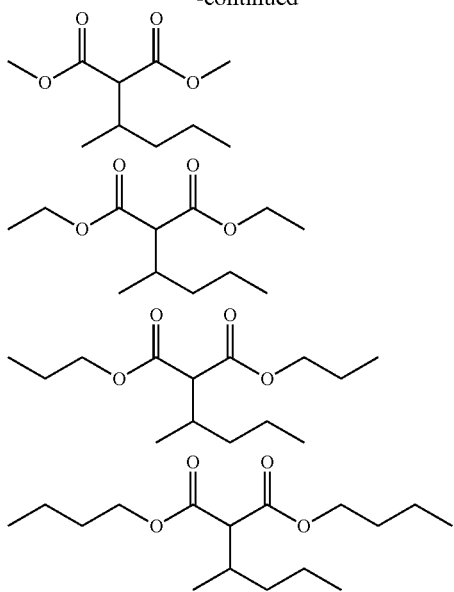

With respect to the compound represented by the general formula (A), most preferred are compounds of the structures shown below because the steric hindrance of the compound is small and an increase of the viscosity of the electrolytic solution can be suppressed.

[Chemical formula 26]

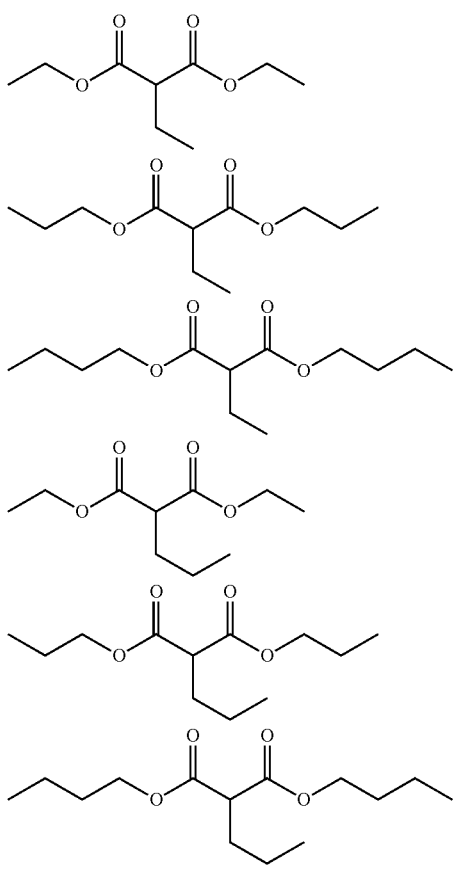

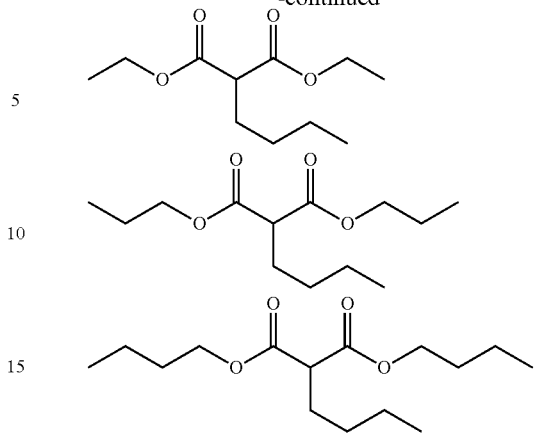

These compounds are relatively easy to obtain or produce, and have appropriate reactivity and hence exhibit a remarkable improvement effect for the battery characteristics. The non-aqueous electrolytic solution of the present invention is characterized by containing the compound represented by the general formula (A), but a single type of the compound represented by the general formula (A) is not necessarily contained, and two or more types of the compounds may be used in combination.

With respect to the amount of the compound represented by the general formula (A) incorporated into the non-aqueous electrolytic solution of the present invention, there is no particular limitation, and the amount of the compound is arbitrary as long as the effects of the present invention are not markedly sacrificed. However, the amount of the compound incorporated, based on the mass of the non-aqueous electrolytic solution of the present invention (that is, when the mass of the non-aqueous electrolytic solution is taken as 100), is generally 0.001% by mass or more, preferably 0.01% by mass or more, more preferably 0.1% by mass or more, further preferably 0.5% by mass or more, especially preferably 1% by mass or more, most preferably 2% by mass or more, and is generally 30% by mass or less, preferably 20% by mass or less, more preferably 10% by mass or less, further preferably 8% by mass or less, still further preferably 5% by mass or less, especially preferably 4% by mass or less, most preferably 3% by mass or less. When the concentration of the compound is in the above range, the reactivity of the compound on the electrode and the reactivity of the compound with a base component, such as a reduction product of the non-aqueous electrolytic solution formed on the electrode, can be controlled, enabling optimization of the battery characteristics.

That is, when the amount of the compound satisfies the above-mentioned range, effects for, for example, high-temperature storage characteristics and discharge storage characteristics are further improved.

1-2. At least one specific additive selected from the group consisting of a cyclic carbonate having a carbon-carbon unsaturated bond, a cyclic carbonate having a fluorine atom, a nitrile compound, an isocyanate compound, a compound having an isocyanuric acid skeleton, a fluorinated salt, an acid anhydride compound, an acrylate compound, an aromatic compound, a cyclic ether compound, an oxalato salt, and a cyclic sulfonic ester The non-aqueous electrolytic solution of the present invention preferably further contains, in addition to the compound represented by the general formula (A), at least one specific additive selected from the group consisting of a cyclic carbonate having a carbon-carbon unsaturated bond, a cyclic carbonate having a fluorine atom, a nitrile compound, an isocyanate compound, a compound having an isocyanuric acid skeleton, a fluorinated salt, an acid anhydride compound, an acrylate compound, an aromatic compound, a cyclic ether compound, an oxalato salt, and a cyclic sulfonic ester from the viewpoint of the improvement of the battery characteristics.

Of these, from the viewpoint of the improvement of the battery characteristics, more preferred are a cyclic carbonate having a carbon-carbon unsaturated bond, a cyclic carbonate having a fluorine atom, a nitrile compound, and a compound having an isocyanuric acid skeleton, further preferred are a cyclic carbonate having a carbon-carbon unsaturated bond, a cyclic carbonate having a fluorine atom, and a compound having an isocyanuric acid skeleton, especially preferred are a cyclic carbonate having a carbon-carbon unsaturated bond and a cyclic carbonate having a fluorine atom, and most preferred is a cyclic carbonate having a fluorine atom.

The compound represented by the general formula (A) and the specific additive suffer a reduction reaction on the active material in the electrode to form anions (nucleophilic species) in the structures. Further, these compounds have in their molecular structures a nucleophilic attack accepting site, and therefore it is considered that a composite film is formed from reduction products of the compound represented by the general formula (A) and the specific additive and a reduction product of the non-aqueous solvent.

As mentioned above, by adding both the specific additive and the compound represented by the general formula (A) to the non-aqueous electrolytic solution, they are reacted with each other on the active material to form a composite film. Therefore, a reaction of the non-aqueous electrolytic solution caused on the surface of the active material is markedly suppressed, as compared to the reaction caused in the case where the compounds are individually added, and thus the battery characteristics are improved. The specific additives are individually described below.

1-2-1. Cyclic Carbonate Having a Carbon-Carbon Unsaturated Bond

With respect to the cyclic carbonate having a carbon-carbon unsaturated bond (hereinafter, frequently referred to as "unsaturated cyclic carbonate"), there is no particular limitation as long as it is a cyclic carbonate having a carbon-carbon double bond or a carbon-carbon triple bond. With respect to the unsaturated cyclic carbonate, an arbitrary unsaturated carbonate can be used. A cyclic carbonate having an aromatic ring is included in the unsaturated cyclic carbonate. The unsaturated cyclic carbonate may have a fluorine atom (also called a fluorinated unsaturated carbonate), and, in this case, the number of fluorine atoms is generally 6 or less, preferably 4 or less, most preferably 1 or 2.

Examples of unsaturated cyclic carbonates include vinylene carbonates, ethylene carbonates substituted with a substituent having an aromatic ring, a carbon-carbon double bond, or a carbon-carbon triple bond, phenyl carbonates, vinyl carbonates, allyl carbonates, and catechol carbonates.

Examples of the vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, and 4-allyl-5-fluorovinylene carbonate.

Specific examples of the ethylene carbonates substituted with a substituent having an aromatic ring, a carbon-carbon double bond, or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Among those mentioned above, preferred examples of unsaturated cyclic carbonates include vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, and 4,5-difluoro-4,5-diallylethylene carbonate.

Especially preferred are vinylene carbonate, vinylethylene carbonate, and ethynylethylene carbonate because they form an especially stable interface protecting film.

The molecular weight of the unsaturated cyclic carbonate is not particularly limited and is arbitrary as long as the effects of the present invention are not markedly sacrificed. The molecular weight of the unsaturated cyclic carbonate is preferably 80 to 250. When the molecular weight of the unsaturated cyclic carbonate is in the above range, the solubility of the unsaturated cyclic carbonate in the non-aqueous electrolytic solution is easily secured, and the effects of the present invention are likely to be satisfactorily exhibited. The molecular weight of the unsaturated cyclic carbonate is more preferably 85 or more, and is more preferably 150 or less.

With respect to the method for producing the above-described unsaturated cyclic carbonate, there is no particular limitation, and the unsaturated cyclic carbonate can be produced by a known method arbitrarily selected.

In the non-aqueous electrolytic solution of the present invention, the unsaturated cyclic carbonates may be used individually, or two or more types of the unsaturated cyclic carbonates may be used in an arbitrary combination and in an arbitrary ratio. With respect to the amount of the unsaturated cyclic carbonate incorporated, there is no particular limitation, and the amount of the unsaturated cyclic carbonate is arbitrary as long as the effects of the present invention are not markedly sacrificed. The amount of the unsaturated cyclic carbonate incorporated, based on the mass of the non-aqueous electrolytic solution (100% by mass), is generally 0.001% by mass or more, preferably 0.01% by mass or more, more preferably 0.1% by mass or more, further preferably 0.5% by mass or more, especially preferably 1% by mass or more, and is generally 10% by mass or less, preferably 5% by mass or less, more preferably 3% by mass or less. When the amount of the unsaturated cyclic carbonate incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

1-2-2. Cyclic Carbonate Having a Fluorine Atom

As examples of cyclic carbonates having a fluorine atom which are the specific additive, there can be mentioned fluorination products of a cyclic carbonate having an alkylene group having 2 to 6 carbon atoms, and derivatives thereof. Examples of such compounds include fluorination products of ethylene carbonate and derivatives thereof. Examples of the derivatives of fluorination products of ethylene carbonate include fluorination products of ethylene carbonate substituted with an alkyl group (for example, an alkyl group having 1 to 4 carbon atoms). With respect to the cyclic carbonate having a fluorine atom, preferred are ethylene carbonate having 1 to 8 fluorine atoms and derivatives thereof. The cyclic carbonate having a fluorine atom and having an unsaturated bond is described in 1-2-1. above.

Specific examples of the cyclic carbonates having a fluorine atom include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

Of these, at least one member selected from the group consisting of monofluoroethylene carbonate, 4,4-difluoroethylene carbonate, and 4,5-difluoroethylene carbonate is more preferred from the viewpoint of giving high ionic conductivity and advantageously forming an interface protecting film.

The cyclic carbonates having a fluorine atom may be used individually, or two or more types of the cyclic carbonates having a fluorine atom may be used in an arbitrary combination and in an arbitrary ratio.

With respect to the amount of the cyclic carbonate having a fluorine atom incorporated into the non-aqueous electrolytic solution of the present invention, there is no particular limitation, and the amount of the cyclic carbonate having a fluorine atom is arbitrary as long as the effects of the present invention are not markedly sacrificed. The amount of the incorporated cyclic carbonate having a fluorine atom, based on the mass of the non-aqueous electrolytic solution (100% by mass), is generally 0.001% by mass or more, preferably 0.01% by mass or more, more preferably 0.1% by mass or more, further preferably 0.5% by mass or more, especially preferably 1% by mass or more, and is generally 10% by mass or less, preferably 7% by mass or less, more preferably 5% by mass or less, further preferably 3% by mass or less.

Monofluoroethylene carbonate may be used as a solvent, and, in such a case, the amount of the monofluoroethylene carbonate is not limited to the above-mentioned amount.

1-2-3. Nitrile Compound

With respect to the type of the nitrile compound which is the specific additive, there is no particular limitation as long as it is a compound having a cyano group in the molecule thereof.

Specific examples of nitrile compounds include:

compounds having one nitrile group, such as acetonitrile, propionitrile, butyronitrile, isobutyronitrile, valeronitrile, isovaleronitrile, decanenitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, and pentafluoropropionitrile;

compounds having two nitrile groups, such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, and 3,9-bis(2-cyanoethyl)-2,4,8,10-tetraoxaspiro[5,5]undecane; and compounds having three cyano groups, such as cyclohexanetricarbonitrile, triscyanoethylamine, triscyanoethoxypropane, tricyanoethylene, pentanetricarbonitrile, propanetricarbonitrile, and heptanetricarbonitrile.

Of these, from the viewpoint of the improvement of the storage characteristics of the non-aqueous electrolytic solution, preferred are valeronitrile, decanenitrile, lauronitrile, crotononitrile, succinonitrile, glutaronitrile, adiponitrile, pimelonitrile, suberonitrile, azelanitrile, sebaconitrile, undecanedinitrile, dodecanedinitrile, fumaronitrile, and 3,9-bis (2-cyanoethyl)-2,4,8,10-tetraoxaspiro[5,5]undecane. Especially preferred are dinitrile compounds, such as valeronitrile, decanenitrile, lauronitrile, succinonitrile, glutaronitrile, adiponitrile, pimelonitrile, suberonitrile, azelanitrile, sebaconitrile, undecanedinitrile, dodecanedinitrile, fumaronitrile, and 3,9-bis(2-cyanoethyl)-2,4,8,10-tetraoxaspiro[5,5]undecane.

The nitrile compounds may be used individually, or two or more types of the nitrile compounds may be used in an arbitrary combination and in an arbitrary ratio. With respect to the amount of the nitrile compound incorporated into the non-aqueous electrolytic solution of the present invention, there is no particular limitation, and the amount of the nitrile compound is arbitrary as long as the effects of the present invention are not markedly sacrificed. The amount of the nitrile compound incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less. When the amount of the nitrile compound incorporated satisfies the above-mentioned range, effects for, for example, output characteristics, load characteristics, low-temperature characteristics, cycle characteristics, and high-temperature storage characteristics of the non-aqueous electrolyte secondary battery are further improved.

1-2-4. Isocyanate Compound

With respect to the type of the isocyanate compound which is the specific additive, there is no particular limitation as long as it is a compound having an isocyanate group in the molecule thereof.

Specific examples of isocyanate compounds include:

hydrocarbon monoisocyanate compounds, such as methyl isocyanate, ethyl isocyanate, propyl isocyanate, isopropyl isocyanate, butyl isocyanate, tertiary-butyl isocyanate, pentyl isocyanate, hexyl isocyanate, cyclohexyl isocyanate, phenyl isocyanate, and fluorophenyl isocyanate;

monoisocyanate compounds having a carbon-carbon unsaturated bond, such as vinyl isocyanate, allyl isocyanate, ethynyl isocyanate, and propynyl isocyanate;

hydrocarbon diisocyanate compounds, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diyl bis(methylisocyanate), bicyclo[2.2.1]heptane-2,6-diylbis(methylisocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate, and 2,4,4-trimethylhexamethylene diisocyanate; and isocyanate compounds, such as diisocyanato sulfone, (ortho-, meta-, or para-)toluenesulfonyl isocyanate, benzenesulfonyl isocyanate, fluorosulfonyl isocyanate, phenoxysulfonyl isocyanate, pentafluorophenoxysulfonyl isocyanate, and methoxysulfonyl isocyanate.

Of these, from the viewpoint of the improvement of the cycle characteristics and storage characteristics of the non-aqueous electrolyte secondary battery, preferred are:

monoisocyanate compounds having a carbon-carbon unsaturated bond, such as vinyl isocyanate, allyl isocyanate, ethynyl isocyanate, and propynyl isocyanate;

hydrocarbon diisocyanate compounds, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diyl bis(methylisocyanate), bicyclo[2.2.1]heptane-2,6-diyl bis(methylisocyanate), isophorone diisocyanate, 2,2,4-trimethylhexamethylene diisocyanate, and 2,4,4-trimethylhexamethylene diisocyanate; and isocyanate compounds, such as diisocyanato sulfone, (ortho-, meta-, or para-)toluenesulfonyl isocyanate, benzenesulfonyl isocyanate, fluorosulfonyl isocyanate, phenoxysulfonyl isocyanate, pentafluorophenoxysulfonyl isocyanate, and methoxysulfonyl isocyanate.

Further preferred are allyl isocyanate, hexamethylene diisocyanate, 1,3-bis(isocyanatomethyl)cyclohexane, diisocyanato sulfone, and (ortho-, meta-, or para-)toluenesulfonyl isocyanate, especially preferred are hexamethylene diisocyanate, 1,3-bis(isocyanatomethyl)cyclohexane, and (ortho-, meta-, or para-)toluenesulfonyl isocyanate, and most preferred are hexamethylene diisocyanate and 1,3-bis(isocyanatomethyl)cyclohexane.

With respect to the isocyanate compound, an isocyanate compound having a branched chain is preferred.

Further, the isocyanate compound used in the present invention may be a trimer compound derived from a compound having at least two isocyanate groups in the molecule thereof, or an aliphatic polyisocyanate having a polyhydric alcohol added to the trimer compound. As examples of such aliphatic polyisocyanates, there can be mentioned modified polyisocyanates of biuret, isocyanurate, adduct, and difunctional types represented by basic structures of the general formulae (1-2-1) to (1-2-4) below (in the general formulae (1-2-1) to (1-2-4) below, each of R and R' is independently an arbitrary hydrocarbon group).

[Chemical formula 27]

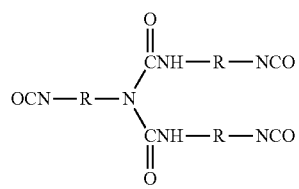

(1-2-1)

[Chemical formula 28]

(1-2-2)

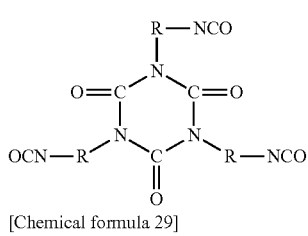

[Chemical formula 29]

(1-2-3)

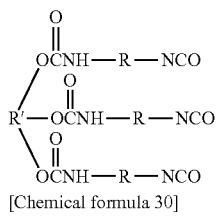

[Chemical formula 30]

(1-2-4)

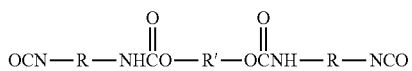

With respect to the isocyanate compound used in the present invention, the compound having at least two isocyanate groups in the molecule thereof includes a so-called blocked isocyanate having storage stability improved by blocking it using a blocking agent. Examples of the blocking agents include alcohols, phenols, organic amines, oximes, and lactams, and specific examples of these blocking agents include n-butanol, phenol, tributylamine, diethylethanolamine, methyl ethyl ketoxime, and ε-caprolactam.

For the purpose of promoting a reaction based on the compound having at least two isocyanate groups in the molecule thereof to obtain a higher effect, a metal catalyst, such as dibutyltin dilaurate, or an amine catalyst, such as 1,8-diazabicyclo[5.4.0]undecene-7, is preferably used.

The above-described isocyanate compounds may be used individually, or two or more types of the isocyanate compounds may be used in an arbitrary combination and in an arbitrary ratio.

With respect to the amount of the isocyanate compound incorporated into the non-aqueous electrolytic solution of the present invention, there is no particular limitation, and the amount of the isocyanate compound is arbitrary as long as the effects of the present invention are not markedly sacrificed. The amount of the isocyanate compound incorporated, based on the mass of the non-aqueous electrolytic solution of the present invention, is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less, most preferably 0.5% by mass or less.

When the amount of the isocyanate compound incorporated satisfies the above-mentioned range, effects for, for example, output characteristics, load characteristics, low-temperature characteristics, cycle characteristics, and high-temperature storage characteristics of the non-aqueous electrolyte secondary battery are further improved.

1-2-5. Compound Having an Isocyanuric Acid Skeleton

As examples of compounds having an isocyanuric acid skeleton, which are the specific additive, there can be mentioned compounds represented by the following general formula (U).

[Chemical formula 31]

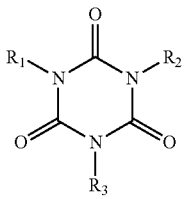

(U)

In the formula (U), $R_1$ to $R_3$ may be the same or different, and are an organic group having 1 to 20 carbon atoms and optionally having a substituent. At least one of $R_1$ to $R_3$ has a carbon-carbon unsaturated bond or a cyano group. It is preferred that, in the formula (U), $R_1$ to $R_3$ are the same or different and an organic group having 1 to 10 carbon atoms and optionally having a substituent. It is more preferred that, in the formula (U), at least one of $R_1$ to $R_3$ is an organic group having a carbon-carbon unsaturated bond.

Here, the organic group indicates a functional group comprised of an atom selected from the group consisting of a carbon atom, a hydrogen atom, a nitrogen atom, an oxygen atom, a silicon atom, a sulfur atom, and a halogen atom.

Specific examples of organic groups optionally having a substituent include an alkyl group having 1 to 20 carbon atoms, an alkenyl group, an alkynyl group, an aryl group, a cyano group, an acryl group, a methacryl group, a vinylsulfonyl group, and a vinylsulfo group.

Examples of the substituents include a halogen atom and an alkylene group. Further, for example, an unsaturated bond may be contained in part of the alkylene group. Among halogen atoms, a fluorine atom is preferred.

Specific examples of alkyl groups optionally having a substituent include linear or branched alkyl groups, such as a methyl group, an ethyl group, a n-propyl group, an i-propyl group, a n-butyl group, a sec-butyl group, and a tert-butyl group, and cyclic alkyl groups, such as a cyclopropyl group, a cyclopentyl group, and a cyclohexyl group.

Specific examples of alkenyl groups optionally having a substituent include a vinyl group, an allyl group, a methallyl group, and a 1-propenyl group.

Specific examples of alkynyl groups optionally having a substituent include an ethynyl group, a propargyl group, and a 1-propynyl group.

Specific examples of aryl groups optionally having a substituent include a phenyl group, a tolyl group, a benzyl group, and a phenethyl group.

With respect to the above-described substituent optionally having a substituent, further preferred are an alkyl group, an alkenyl group, an alkynyl group, an acryl group, a methacryl group, and a cyano group each optionally having a substituent.

Especially preferred are an alkyl group, an alkenyl group, an acryl group, a methacryl group, and a cyano group each optionally having a substituent.

Most preferred are a methyl group, an ethyl group, a propyl group, an allyl group, and a methallyl group each optionally having a substituent. Especially preferred are an unsubstituted allyl group and methallyl group. From the viewpoint of the film forming ability, an allyl group is preferred.

As specific examples of the compounds represented by the general formula (U), there can be mentioned compounds of the structures shown below.

[Chemical formula 32]
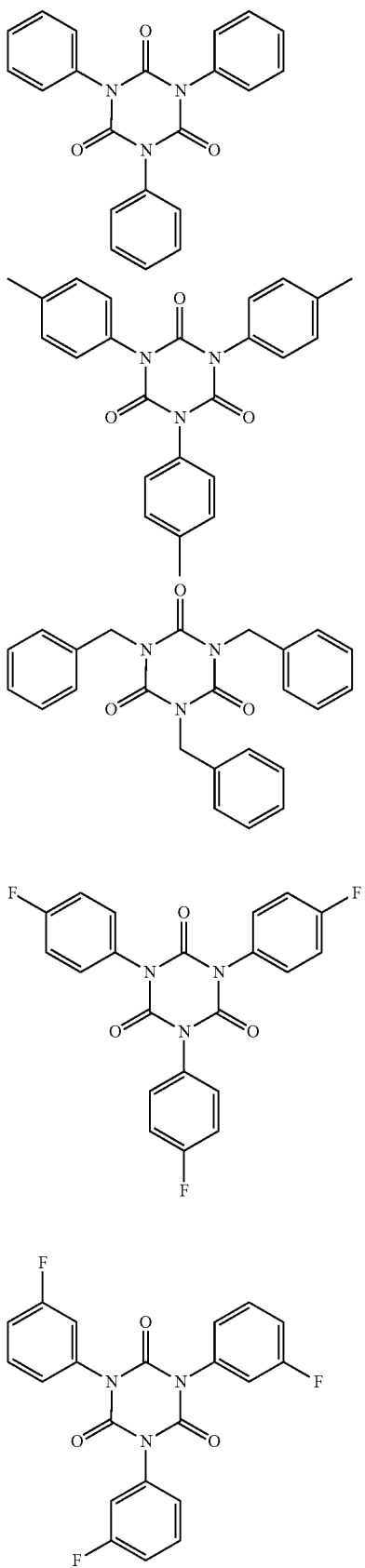

101
-continued
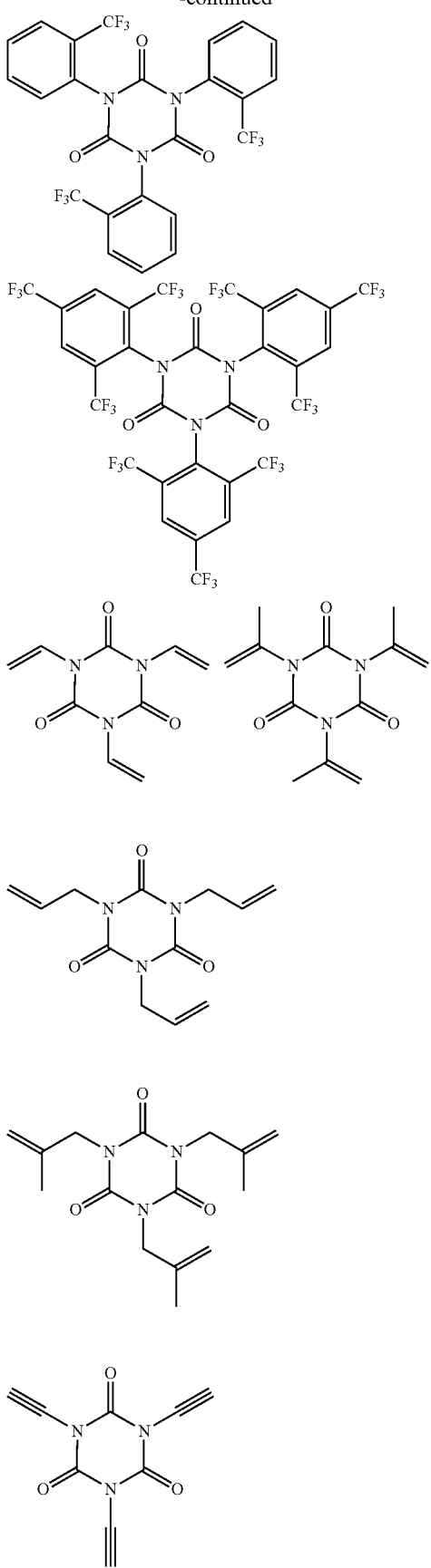
102
-continued
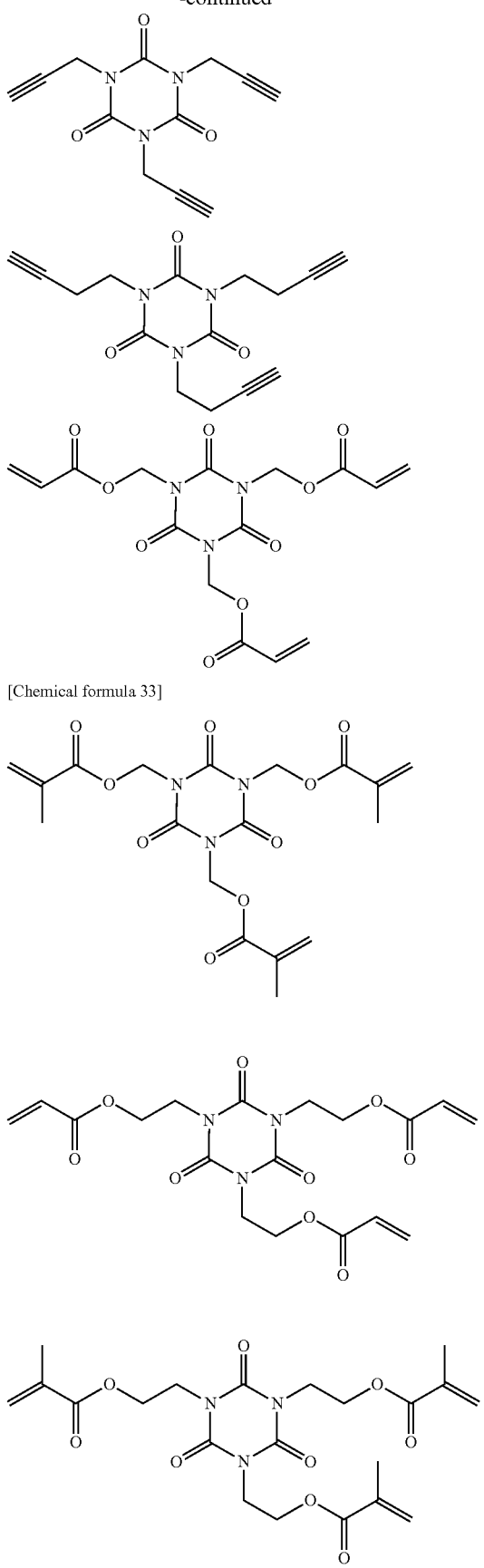
[Chemical formula 33]

103
-continued
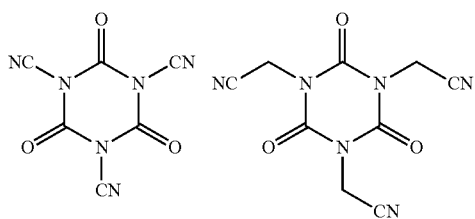
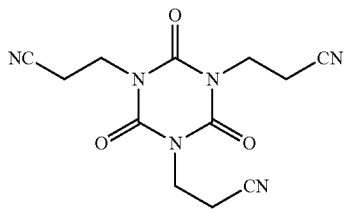
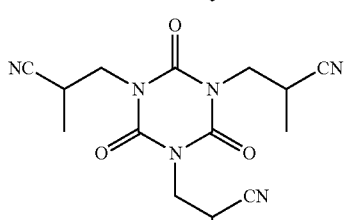
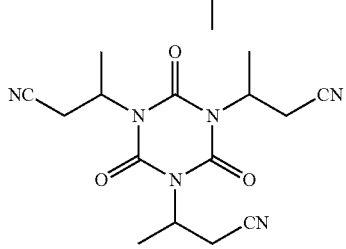
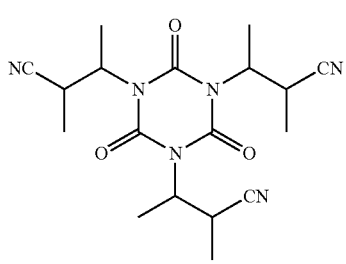
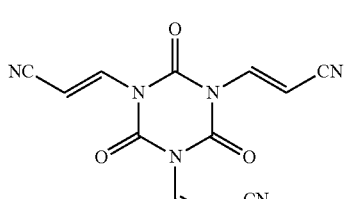
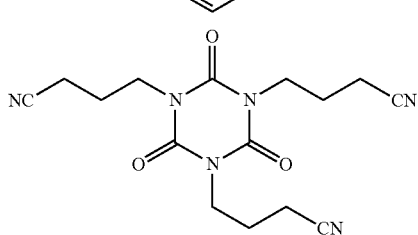
104
-continued
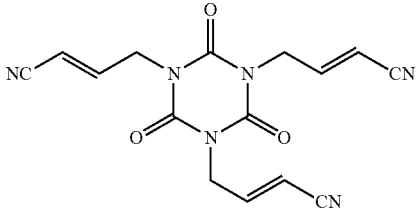
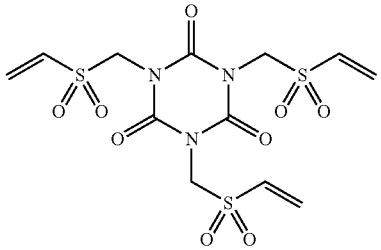
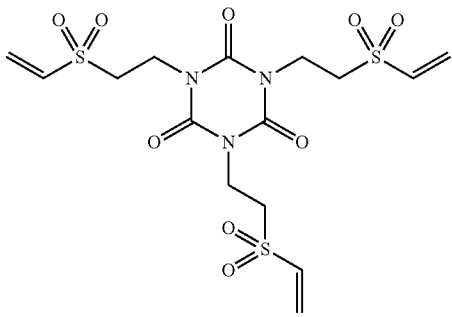
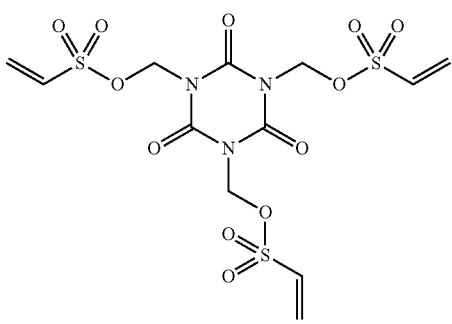
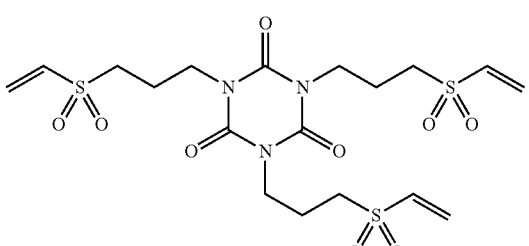
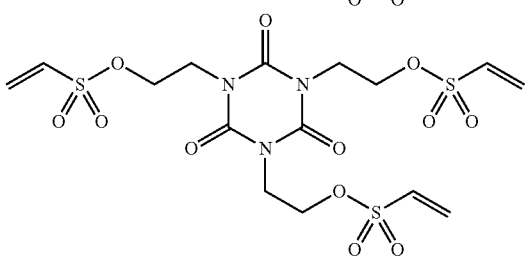

-continued
[Chemical formula 34]
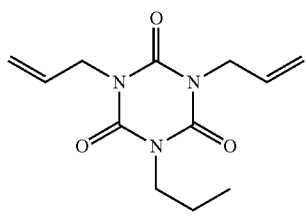
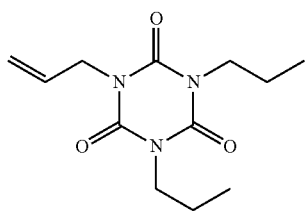
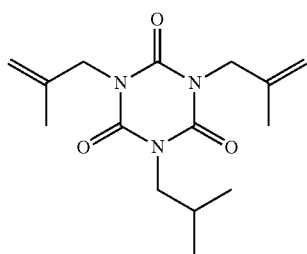
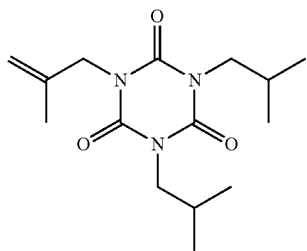
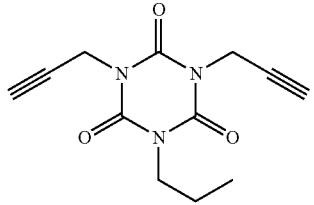
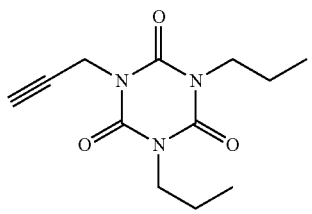
Among the compounds represented by the general formula (U) above, preferred are compounds of the structures shown below.
[Chemical formula 35]
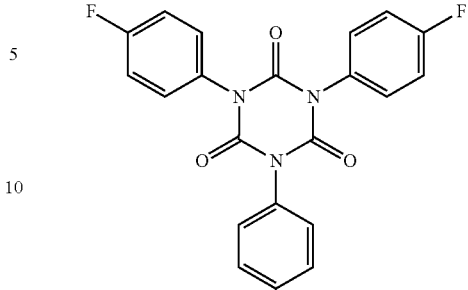
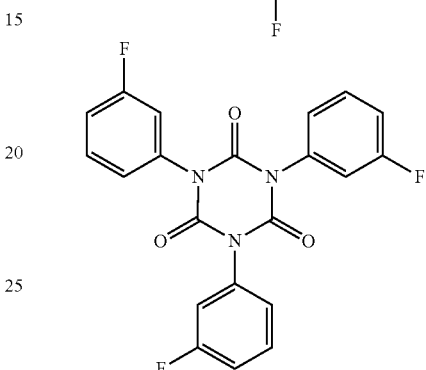
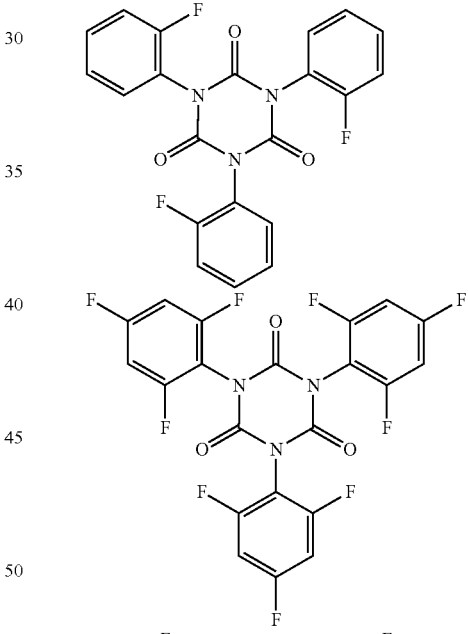
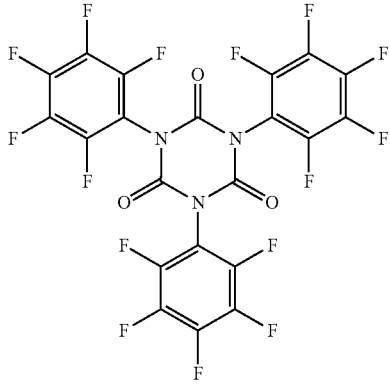

107
-continued
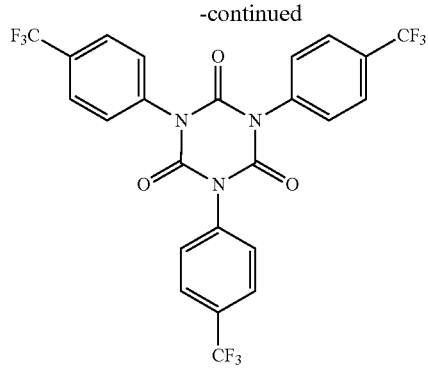
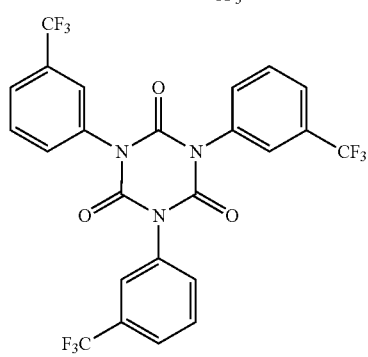
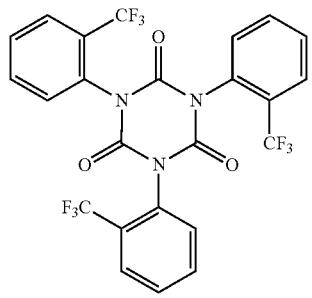
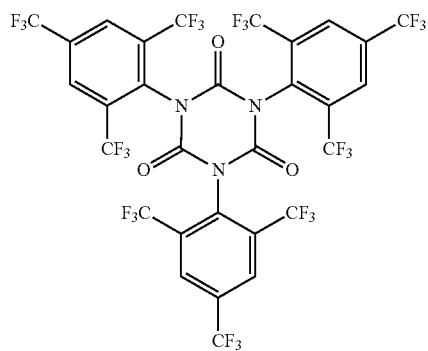
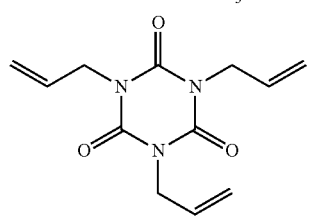
108
-continued
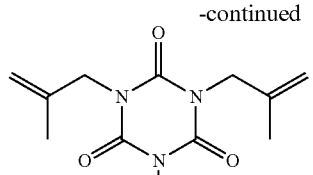
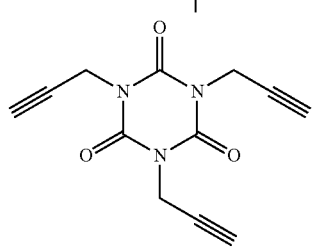
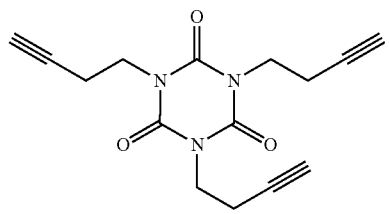
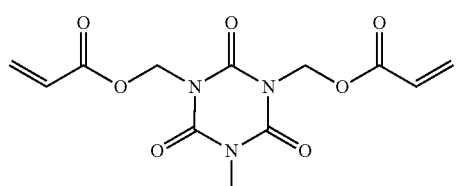
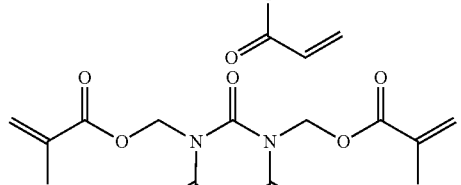
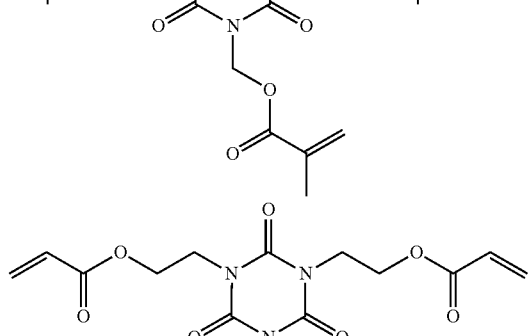
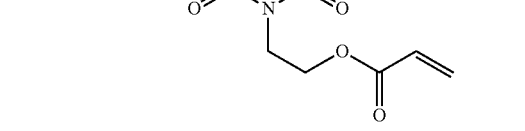

[Chemical formula 36]
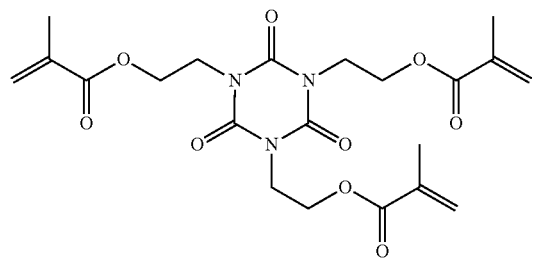
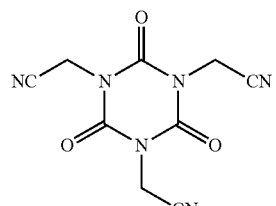
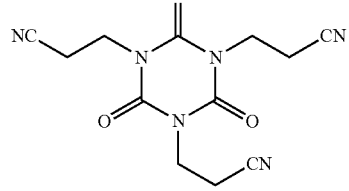
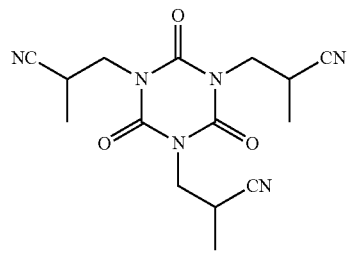
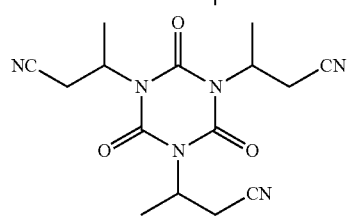
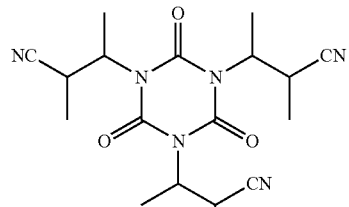
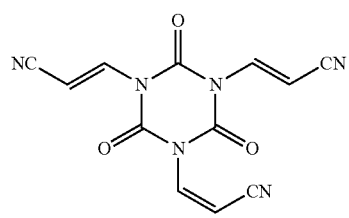
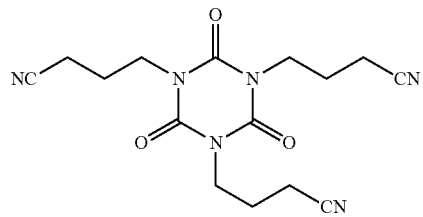
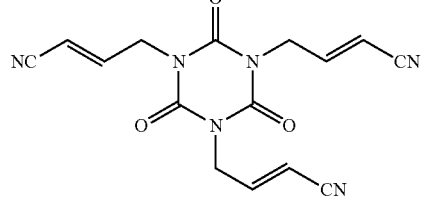
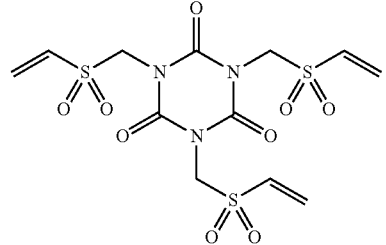
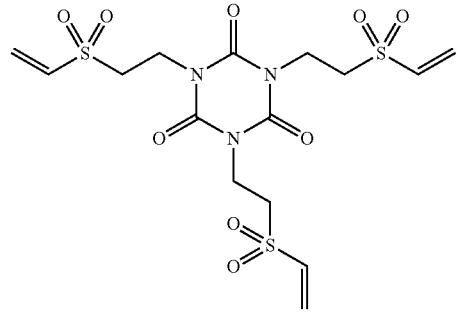
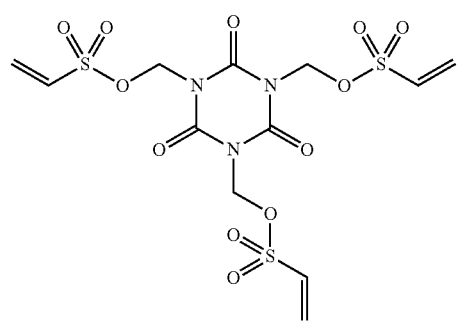
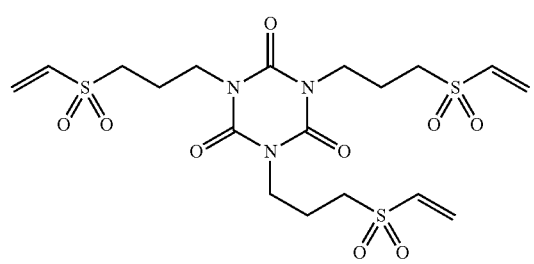

-continued
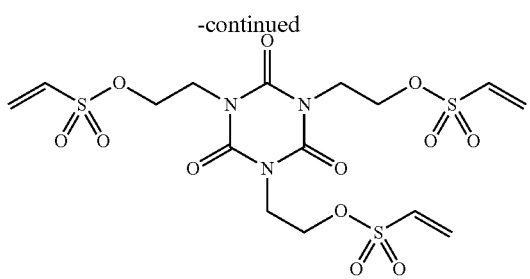
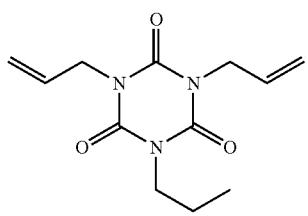
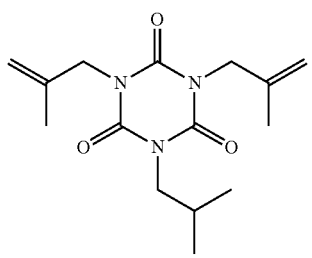
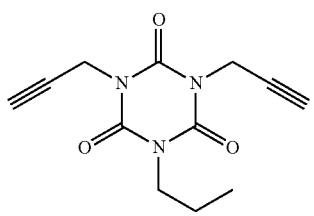
Further preferred are compounds of the structures shown below.
[Chemical formula 37]
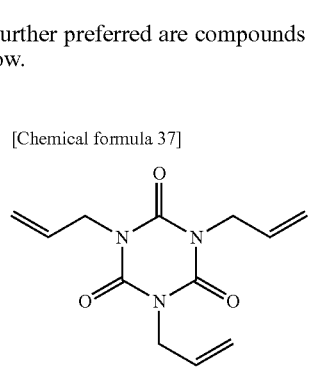
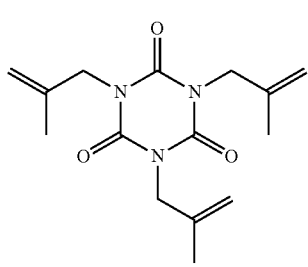
-continued
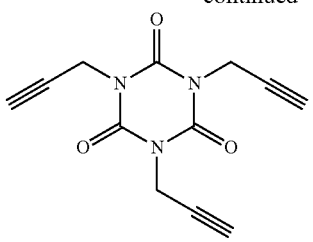
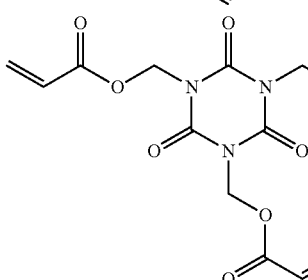
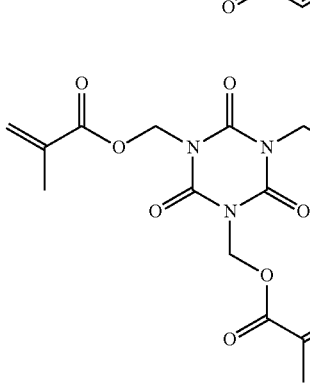
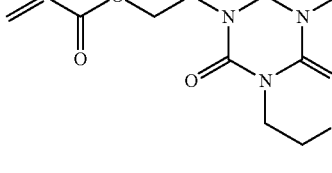
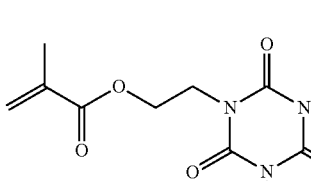
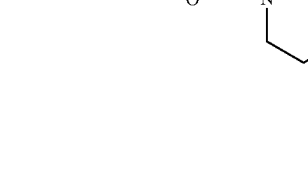

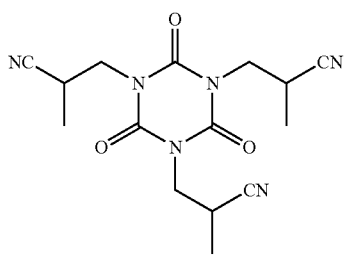
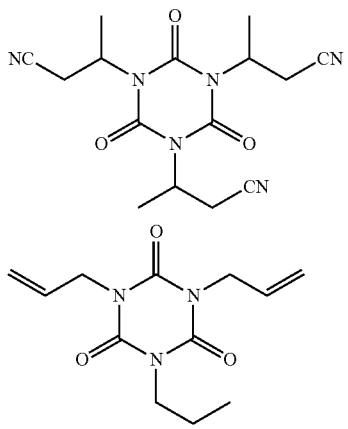
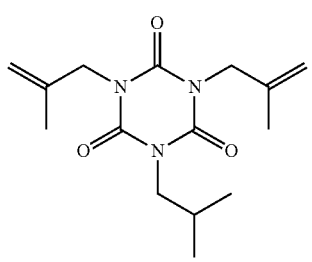 [SMILES: C=C(C)Cn1c(=O)n(CC(=C)C)c(=O)n(CC(C)C)c1=O]
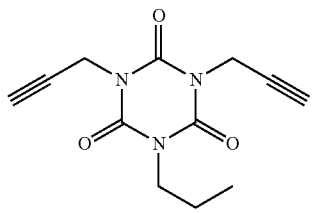
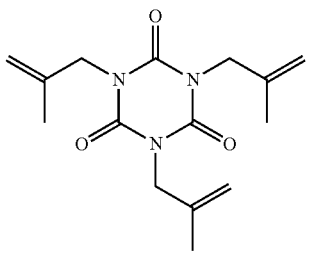
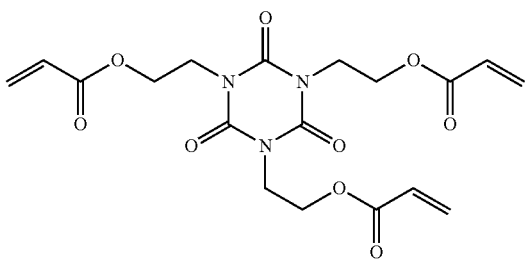
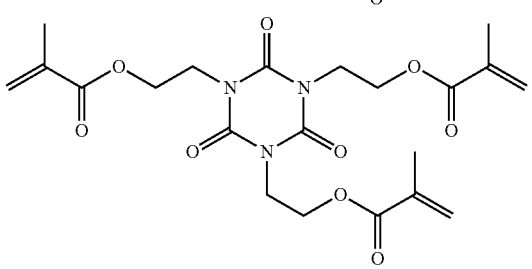
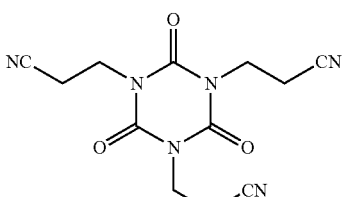
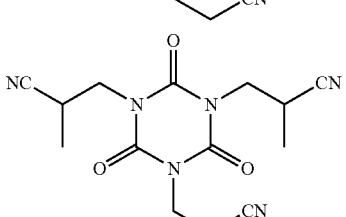
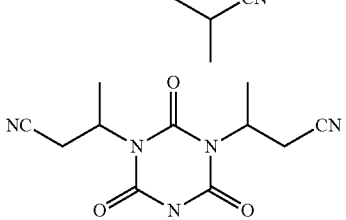
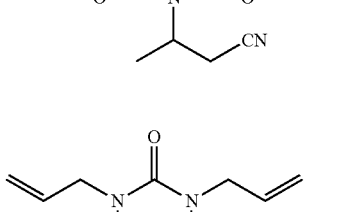
Especially preferred are compounds of the structures shown below.
[Chemical formula 38]
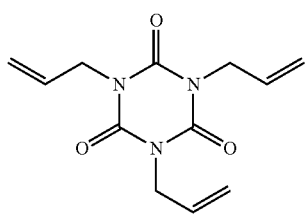
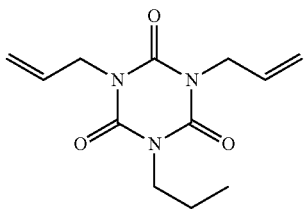

-continued

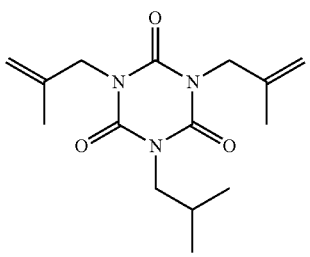

Most preferred are compounds of the structures shown below.

[Chemical formula 39]

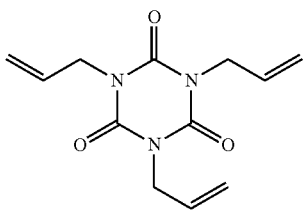

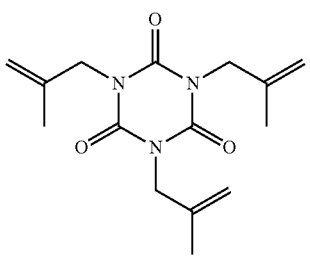

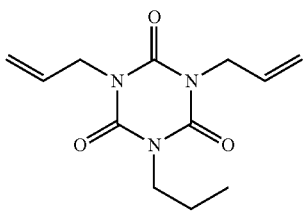

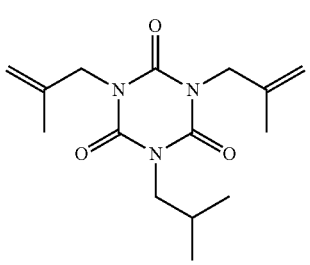

Further, among the most preferred compounds, from the viewpoint of the film forming ability, preferred is a compound of the structure shown below.

[Chemical formula 40]

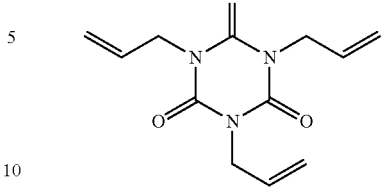

With respect to the amount of the above-described compound having an isocyanuric acid skeleton (compound represented by the general formula (U)) incorporated into the non-aqueous electrolytic solution of the present invention, there is no particular limitation, and the amount of the compound having an isocyanuric acid skeleton is arbitrary as long as the effects of the present invention are not markedly sacrificed. The amount of the incorporated compound having an isocyanuric acid skeleton, based on the mass of the non-aqueous electrolytic solution of the present invention, is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less, most preferably 0.5% by mass or less.

When the amount of the compound having an isocyanuric acid skeleton satisfies the above-mentioned range, effects for, for example, output characteristics, load characteristics, cycle characteristics, high-temperature storage characteristics, and battery expansion of the non-aqueous electrolyte secondary battery are further improved.

1-2-6. Fluorinated Salt

With respect to the fluorinated salt which is the specific additive, there is no particular limitation. However, the fluorinated salt has in the structure a fluorine atom which has high elimination properties and therefore, preferred are a difluorophosphate, a fluorosulfonate, a fluoroborate, and a fluoroimide salt because, for example, they are advantageously capable of reacting with an anion (nucleophilic species) formed due to a reduction reaction of the compound represented by the general formula (A) to form a composite film. More preferred are a fluoroborate and a fluorosulfonate because the elimination properties of a fluorine atom are especially high and a reaction of the salt with a nucleophilic species advantageously proceeds. These various salts are individually described below.

(Difluorophosphate)

With respect to the counter cation of the above-mentioned difluorophosphate, there is no particular limitation, but examples of the counter cations include lithium, sodium, potassium, rubidium, cesium, magnesium, calcium, barium, and ammonium represented by: $NR^{13}R^{14}R^{15}R^{16}$ (wherein each of $R^{13}$ to $R^{16}$ independently represents a hydrogen atom or an organic group having 1 to 12 carbon atoms).

With respect to the organic group having 1 to 12 carbon atoms and being represented by $R^{13}$ to $R^{16}$ for the ammonium, there is no particular limitation. However, examples of the organic groups include an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Especially, it is preferred that each of $R^{13}$ to $R^{16}$ is independently a hydrogen atom, an alkyl group, a cycloalkyl group, or a nitrogen atom-containing heterocyclic group.

Specific examples of difluorophosphates include lithium difluorophosphate, sodium difluorophosphate, and potassium difluorophosphate, and preferred is lithium difluorophosphate.

The difluorophosphates may be used individually, or two or more types of the difluorophosphates may be used in an arbitrary combination and in an arbitrary ratio. With respect to the amount of the difluorophosphate incorporated, there is no particular limitation, and the amount of the difluorophosphate is arbitrary as long as the effects of the present invention are not markedly sacrificed.

The amount of the difluorophosphate incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less.

When the amount of the difluorophosphate incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

(Fluorosulfonate)

With respect to the counter cation of the above-mentioned fluorosulfonate, there is no particular limitation, but examples of the counter cations include lithium, sodium, potassium, rubidium, cesium, magnesium, calcium, barium, and ammonium represented by: $NR^{13}R^{14}R^{15}R^{16}$ (wherein each of $R^{13}$ to $R^{16}$ independently represents a hydrogen atom or an organic group having 1 to 12 carbon atoms).

With respect to the organic group having 1 to 12 carbon atoms and being represented by $R^{13}$ to $R^{16}$ for the ammonium, there is no particular limitation. However, examples of the organic groups include an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Especially, it is preferred that each of $R^{13}$ to $R^{16}$ is independently a hydrogen atom, an alkyl group, a cycloalkyl group, or a nitrogen atom-containing heterocyclic group.

Specific examples of fluorosulfonates include lithium fluorosulfonate, sodium fluorosulfonate, potassium fluorosulfonate, rubidium fluorosulfonate, and cesium fluorosulfonate, and preferred is lithium fluorosulfonate.

The fluorosulfonates may be used individually, or two or more types of the fluorosulfonates may be used in an arbitrary combination and in an arbitrary ratio. With respect to the amount of the fluorosulfonate incorporated, there is no particular limitation, and the amount of the fluorosulfonate is arbitrary as long as the effects of the present invention are not markedly sacrificed.

The amount of the fluorosulfonate incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less.

When the amount of the fluorosulfonate incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

(Fluoroborate)

With respect to the counter cation of the above-mentioned fluoroborate, there is no particular limitation, but examples of the counter cations include lithium, sodium, potassium, rubidium, cesium, magnesium, calcium, barium, and ammonium represented by: $NR^{13}R^{14}R^{15}R^{16}$ (wherein each of $R^{13}$ to $R^{16}$ independently represents a hydrogen atom or an organic group having 1 to 12 carbon atoms).

With respect to the organic group having 1 to 12 carbon atoms and being represented by $R^{13}$ to $R^{16}$ for the ammonium, there is no particular limitation. However, examples of the organic groups include an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Especially, it is preferred that each of $R^{13}$ to $R^{16}$ is independently a hydrogen atom, an alkyl group, a cycloalkyl group, or a nitrogen atom-containing heterocyclic group.

Specific examples of fluoroborates include $LiBF_4$ and $LiB(C_iF_{2i+1})_j(F)_{4-j}$, and $LiBF_4$ is preferred. i represents an integer of 1 to 10, and j represents an integer of 1 to 4.

The fluoroborates may be used individually, or two or more types of the fluoroborates may be used in an arbitrary combination and in an arbitrary ratio. With respect to the amount of the fluoroborate incorporated, there is no particular limitation, and the amount of the fluoroborate is arbitrary as long as the effects of the present invention are not markedly sacrificed.

The amount of the fluoroborate incorporated, based on the mass of the non-aqueous electrolytic solution (100% by mass), is generally 0.001% by mass or more, preferably 0.01% by mass or more, more preferably 0.1% by mass or more, and is generally 3% by mass or less, preferably 1% by mass or less, more preferably 0.8% by mass or less, further preferably 0.5% by mass or less, most preferably 0.3% by mass or less.

When the amount of the fluoroborate incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

(Fluoroimide Salt)

With respect to the counter cation of the above-mentioned fluoroimide salt, there is no particular limitation, but examples of the counter cations include lithium, sodium, potassium, rubidium, cesium, magnesium, calcium, barium, and ammonium represented by: $NR^{13}R^{14}R^{15}R^{16}$ (wherein each of $R^{13}$ to $R^{16}$ independently represents a hydrogen atom or an organic group having 1 to 12 carbon atoms).

With respect to the organic group having 1 to 12 carbon atoms and being represented by $R^{13}$ to $R^{16}$ for the ammonium, there is no particular limitation. However, examples of the organic groups include an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Especially, it is preferred that each of $R^{13}$ to $R^{16}$ is independently a hydrogen atom, an alkyl group, a cycloalkyl group, or a nitrogen atom-containing heterocyclic group.

Specific examples of fluoroimide salts include LiN$(FCO)_2$, LiN(FCO)(FSO$_2$), LiN(FSO$_2$)$_2$, LiN(FSO$_2$)(CF$_3$SO$_2$), LiN(CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, and LiN(CF$_3$SO$_2$)(C$_4$F$_9$SO$_2$), and preferred are LiN(FSO$_2$)$_2$, LiN(CF$_3$SO$_2$)$_2$, and LiN(C$_2$F$_5$SO$_2$)$_2$.

The fluoroimide salts may be used individually, or two or more types of the fluoroimide salts may be used in an arbitrary combination and in an arbitrary ratio. With respect to the amount of the fluoroimide salt incorporated, there is no particular limitation, and the amount of the fluoroimide salt is arbitrary as long as the effects of the present invention are not markedly sacrificed.

The amount of the fluoroimide salt incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1% by mass or less.

When the amount of the fluoroimide salt incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

1-2-7. Acid Anhydride Compound

With respect to the structure of the acid anhydride compound, there is no particular limitation. Examples of acid anhydride compounds include carboxylic anhydrides, sulfuric anhydrides, nitric anhydrides, sulfonic anhydrides, phosphoric anhydrides, phosphorous acid anhydrides, cyclic acid anhydrides, and linear acid anhydrides.

Specific examples of acid anhydride compounds include malonic anhydride, succinic anhydride, glutaric anhydride, acipic anhydride, maleic anhydride, citraconic anhydride, 2,3-dimethylmaleic anhydride, glutaconic anhydride, itaconic anhydride, phthalic anhydride, phenylmaleic anhydride, 2,3-diphenylmaleic anhydride, cyclohexane-1,2-dicarboxylic anhydride, 4-cyclohexene-1,2-dicarboxylic anhydride, 3,4,5,6-tetrahydrophthalic anhydride, 4,4'-oxydiphthalic anhydride, 5-norbornene-2,3-dicarboxylic anhydride, methyl-5-norbornene-2,3-dicarboxylic anhydride, phenylsuccinic anhydride, 2-phenylglutaric anhydride, allylsuccinic anhydride, 2-buten-1-ylsuccinic anhydride, (2-methyl-2-propenyl)succinic anhydride, tetrafluorosuccinic anhydride, diacetyltartaric anhydride, bicyclo[2.2.2] oct-7-ene-2,3,5,6-tetracarboxylic dianhydride, 5-(2,5-dioxotetrahydrofuryl)-3-methyl-3-cyclohexene-1,2-dicarboxylic anhydride, methacrylic anhydride, acrylic anhydride, crotonic anhydride, methanesulfonic anhydride, trifluoromethanesulfonic anhydride, nonafluorohutanesulfonic anhydride, and acetic anhydride.

Of these, especially preferred are succinic anhydride, maleic anhydride, citraconic anhydride, phenylmaleic anhydride, bicyclo[2.2.2]oct-7-ene-2,3,5,6-tetracarboxylic di anhydride, 5-(2,5-dioxotetrahydrofuryl)-3-methyl-3-cyclohexene-1,2-dicarboxylic anhydride, allylsuccinic anhydride, acetic anhydride, methacrylic anhydride, acrylic anhydride, and methanesulfonic anhydride.

The acid anhydride compounds may be used individually, or two or more types of the acid anhydride compounds may be used in an arbitrary combination and in an arbitrary ratio.

With respect to the amount of the acid anhydride compound incorporated into the non-aqueous electrolytic solution of the present invention, there is no particular limitation, and the amount of the acid anhydride compound is arbitrary as long as the effects of the present invention are not markedly sacrificed. The amount of the acid anhydride compound incorporated, based on the mass of the non-aqueous electrolytic solution of the present invention, is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less, most preferably 0.5% by mass or less.

When the amount of the acid anhydride compound incorporated satisfies the above-mentioned range, effects for, for example, output characteristics, load characteristics, cycle characteristics, and high-temperature storage characteristics of the non-aqueous electrolyte secondary battery are further improved.

1-2-8. Acrylate Compound

The acrylate compound is represented by the following general formula (1):

[Chemical formula 41]

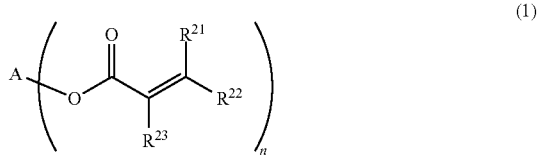

(1)

wherein $R^{21}$ to $R^{23}$ may be the same or different, and each independently represents hydrogen or a hydrocarbon group having 1 to 6 carbon atoms, n represents an integer of 4 to 8, and A represents an organic group having 1 to 12 carbon atoms and optionally having a heteroatom.

$R^{21}$ to $R^{23}$ may be the same or different, and each independently represents hydrogen or a hydrocarbon group having 1 to 6 carbon atoms. The hydrocarbon group indicates a functional group comprised of an atom selected from the group consisting of a carbon atom and a hydrogen atom. $R^{21}$ to $R^{23}$ are hydrogen, or generally a hydrocarbon group having 1 to 6 carbon atoms, preferably a hydrocarbon group having 4 carbon atoms or less, more preferably a hydrocarbon group having 2 carbon atoms or less. When the number of carbon atoms of the hydrocarbon group is in the above range, steric hindrance is suppressed so that a film can be stabilized.

Preferred examples of hydrocarbon groups include a hydrogen group, a methyl group, an ethyl group, a n-propyl group, an i-propyl group, a n-butyl group, and a t-butyl group.

Further, in the general formula (1), A represents an organic group having 1 to 12 carbon atoms and optionally having a heteroatom, and the organic group indicates a functional group comprised of an atom selected from the group consisting of a carbon atom and a hydrogen atom, and the organic group optionally having a heteroatom indicates a functional group comprised of at least one atom selected from the group consisting of a carbon atom, a hydrogen atom, a nitrogen atom, a phosphorus atom, a boron atom, a sulfur atom, a silicon atom, and an oxygen atom.

Specific examples of organic groups represented by A having 1 to 12 carbon atoms and optionally having a heteroatom include an alkylene group or a derivative thereof, an alkenylene group or a derivative thereof, a cycloalkylene group or a derivative thereof, an alkynylene group or a derivative thereof, a cycloalkenylene group or a derivative thereof, an arylene group or a derivative thereof, a carbonyl group or a derivative thereof, a sulfonyl group or a derivative thereof, a sulfinyl group or a derivative thereof, a phosphonyl group or a derivative thereof, a phosphinyl group or a derivative thereof, an amino group or a derivative thereof, an amide group or a derivative thereof, an imide group or a derivative thereof, an ether group or a derivative thereof, a thioether group or a derivative thereof, a bonnie acid group or a derivative thereof, and a borane group or a derivative thereof. The derivative indicates a functional group substituted with a halogen atom, an alkyl group, an aryl group, an alkenyl group, an alkynyl group, or an alkoxy group.

Of these, from the viewpoint of the improvement of the battery characteristics, preferred are an alkylene group or a derivative thereof, an alkenylene group or a derivative thereof, an arylene group or a derivative thereof, and an ether group or a derivative thereof. The number of carbon atom or atoms of A is 1 or more, preferably 4 or more, more preferably 5 or more. Further, the number of carbon atoms of A is 12 or less, preferably 11 or less, more preferably 10 or less. When the number of carbon atoms of A is in the above range, an increase of the resistance can be suppressed while maintaining the oxidation resistance of the electrode.

In the general formula (1), the lower limit of n is 4, and, on the other hand, the upper limit of n is 8, preferably 7, more preferably 6. When n is in the above range, a stable negative electrode SEI (solid electrolyte interface) can be formed, and the interfacial resistance is not excessively increased.

As preferred specific examples of the above-mentioned acrylate compounds (compounds represented by the general formula (1)), there can be mentioned compounds shown below.

[Chemical formula 42]

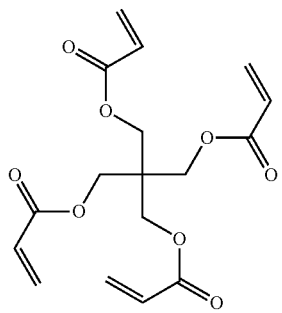

-continued

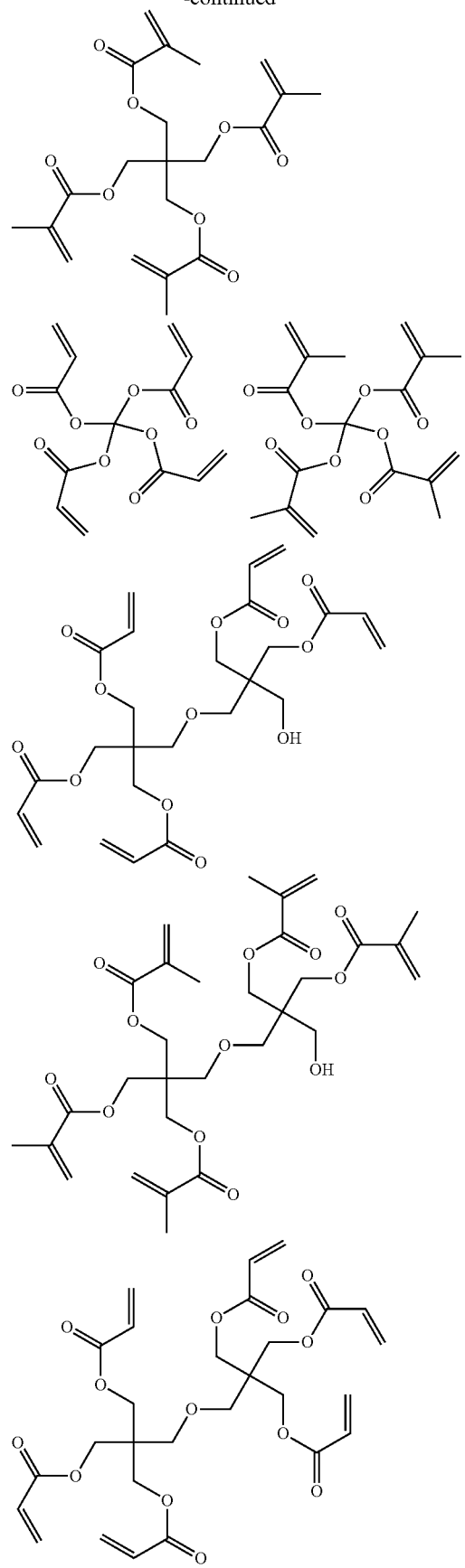

-continued

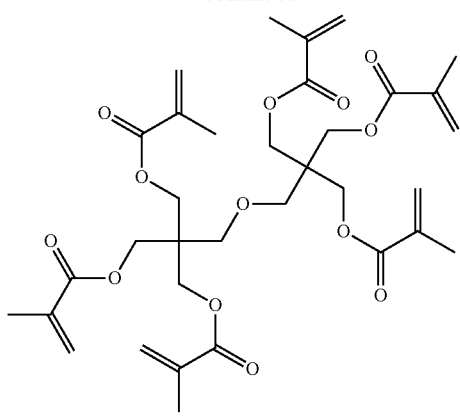

For increasing the degree of freedom of the molecule to suppress the resistance of the negative electrode SEI formed, more preferred are compounds of the structures shown below.

[Chemical formula 43]

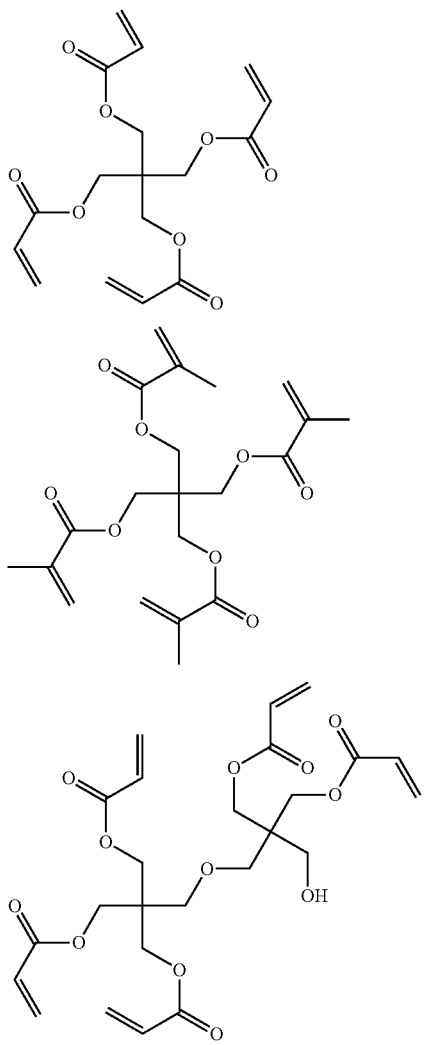

-continued

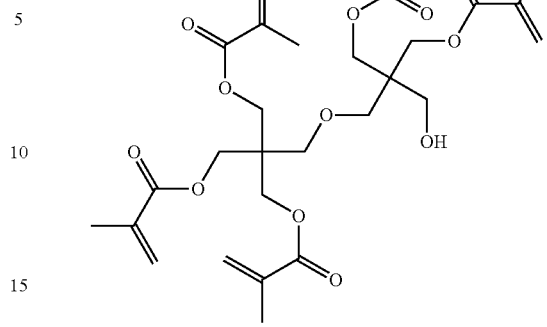

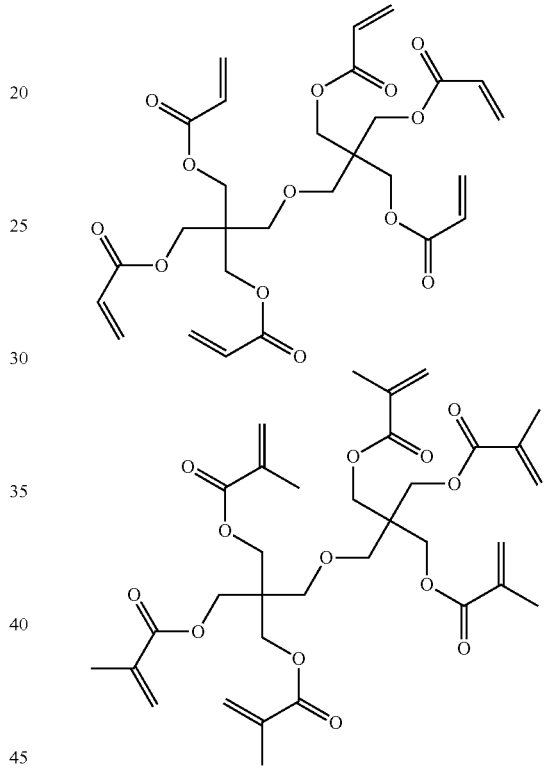

The acrylate compounds (compounds represented by the general formula (1)) may be used individually, or two or more types of the acrylate compounds may be used in an arbitrary combination and in an arbitrary ratio. With respect to the amount of the acrylate compound incorporated into the non-aqueous electrolytic solution of the present invention, there is no particular limitation, and the amount of the acrylate compound is arbitrary as long as the effects of the present invention are not markedly sacrificed. The amount of the acrylate compound incorporated, based on the mass of the non-aqueous electrolytic solution of the present invention, is generally 0.001% by mass or more, preferably 0.01% by mass or more, more preferably 0.02% by mass or more, and is generally 5% by mass or less, preferably 4% by mass or less, more preferably 2% by mass or less. When the amount of the acrylate compound satisfies the above-mentioned range, effects for, for example, output characteristics, load characteristics, low-temperature characteristics, cycle characteristics, and high-temperature storage characteristics of the non-aqueous electrolyte secondary battery are further improved.

1-2-9. Aromatic Compound

The above-mentioned aromatic compound is an aromatic compound having at least one substituent and being represented by the following general formula

[Chemical formula 44]

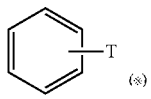

In the formula substituent (·X·) represents a halogen atom, or an organic group optionally having a halogen atom or a heteroatom.

The organic group optionally having a heteroatom indicates a linear, branched, or cyclic saturated hydrocarbon group having 3 to 12 carbon atoms, a group having a carboxylate structure, a group having a carbonate structure, a phosphorus-containing group, a sulfur-containing group, or a silicon-containing group.

Further, each substituent T may be further substituted with, for example, a halogen atom, a hydrocarbon group, an aromatic group, a halogen-containing hydrocarbon group, or a halogen-containing aromatic group. The number of substituent or substituents T is 1 to 6, and, when having a plurality of substituents, the substituents may be the same or different, and the substituents may be bonded together to form a ring.

Especially, with respect to substituent T, from the viewpoint of the battery characteristics, preferred are a linear, branched, or cyclic saturated hydrocarbon group having 3 to 12 carbon atoms, a group having a carboxylate structure, and a group having a carbonate structure. More preferred are a linear, branched, or cyclic saturated hydrocarbon group having 3 to 12 carbon atoms, and a group having a carbonate structure.

As mentioned above, substituent T represents a halogen atom, or an organic group optionally having a halogen atom or a heteroatom.

Examples of the halogen atoms include chlorine and fluorine, and preferred is fluorine.

Examples of organic groups having no heteroatom include linear, branched, or cyclic saturated hydrocarbon groups having 3 to 12 carbon atoms, and the linear or branched hydrocarbon groups include those having a cyclic structure. Specific examples of linear, branched, or cyclic saturated hydrocarbon groups having 3 to 12 carbon atoms include a propyl group, an isopropyl group, a butyl group, an isobutyl group, a tertiary-butyl group, a pentyl group, a tertiary-pentyl group, a cyclopentyl group, a cyclohexyl group, and a butylcyclohexyl group. The number of carbon atoms of the organic group having no heteroatom is preferably 3 to 12, more preferably 3 to 10, further preferably 3 to 8, still further preferably 3 to 6, most preferably 3 to 5.

Examples of heteroatoms constituting the organic group having a heteroatom include an oxygen atom, a sulfur atom, a phosphorus atom, and a silicon atom.

Examples of organic groups having an oxygen atom include a group having a carboxylate structure and a group having a carbonate structure.

Examples of organic groups having a sulfur atom include a group having a sulfonic ester structure.

Examples of organic groups having a phosphorus atom include a group having a phosphate structure and a group having a phosphonate structure.

Examples of organic groups having a silicon atom include a group having a silicon-carbon structure.

As specific examples of the aromatic compounds represented by the general formula (·X·), there can be mentioned compounds shown below.

Examples of the aromatic compounds in which T is a halogen atom or an organic group optionally having a halogen atom include chlorobenzene, fluorobenzene, difluorobenzene, trifluorobenzene, tetrafluorobenzene, pentafluorobenzene, hexafluorobenzene, and benzotrifluoride, and preferred are fluorobenzene and hexafluorobenzene. More preferred is fluorobenzene.

With respect to substituent T, examples of hydrocarbon groups having 3 to 12 carbon atoms include 2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, 2,2-diphenylbutane, 1,1-diphenylcyclohexane, 1,1-diphenyl-4-methylcyclohexane, 2,2-di-(p-fluorophenyl)propane, 1,1-di-(p-fluorophenyl)cyclohexane, 2,2-bis-(4-tertiary-butylphenyl)propane, 1,3-bis(1-methyl-1-phenylethyl)benzene, 1,4-bis(1-methyl-1-phenylethyl)benzene, 1-phenyl-1,3,3-trimethylindan, 2,3-dihydro-1,3-dimethyl-1-(2-methyl-2-phenylpropyl)-3-phenyl-1H-indan, propylbenzene, butylbenzene, t-butylbenzene, and t-amylbenzene, preferred are 2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, 1,1-diphenylcyclohexane, 1,1-diphenyl-4-methylcyclohexane, 2,2-di-(p-fluorophenyl)propane, 1,1-di-(p-fluorophenyl)cyclohexane, 2,2-bis-(4-tertiary-butylphenyl)propane, 1,3-bis(1-methyl-1-phenylethyl)benzene, 1,4-bis(1-methyl-1-phenylethyl)benzene, 1-phenyl-1,3,3-trimethylindan, 2,3-dihydro-1,3-dimethyl-1-(2-methyl-2-phenylpropyl)-3-phenyl-1H-indan, butylbenzene, t-butylbenzene, and t-amylbenzene, more preferred are 2,2-diphenylpropane, a partial hydrogenation product of terphenyl, cyclopentylbenzene, cyclohexylbenzene, 1,1-diphenylcyclohexane, 1-phenyl-1,3,3-trimethylindan, toluene, t-butylbenzene, and t-amylbenzene, further preferred are cyclohexylbenzene, 1-phenyl-1,3,3-trimethylindan, t-butylbenzene, and t-amylbenzene, and especially preferred are cyclohexylbenzene and 1-phenyl-1,3,3-trimethylindan.

With respect to substituent T, examples of groups having a carboxylate structure include phenyl acetate, benzyl acetate, 2-phenylethyl acetate, 3-phenylpropyl acetate, 3-phenylpropyl propionate, methyl benzoate, methyl phenylacetate, methyl α,α-dimethyl-phenylacetate, methyl 1-phenyl-cyclopentanoate, ethyl phenylacetate, methyl phenylpropionate, methyl phenylbutyrate, methyl phenylvaleate, ethyl phenylacetate, ethyl phenylpropionate, ethyl phenylbutyrate, ethyl phenylvaleate, phenyl phenylacetate, benzyl phenylacetate, 2-phenylethyl phenylacetate, phenyl phenylpropionate, benzyl phenylpropionate, 2-phenylethyl phenylpropionate, and an acetate of bisphenol A, preferred are 2-phenylethyl acetate, 3-phenylpropyl acetate, 3-phenylpropyl propionate, methyl phenylacetate, methyl α,α-dimethyl-phenylacetate, methyl 1-phenyl-cyclopentanoate, ethyl phenylacetate, methyl phenylpropionate, methyl phenylbutyrate, ethyl phenylacetate, ethyl phenylpropionate, ethyl phenylbutyrate, benzyl phenylacetate, 2-phenylethyl phenylacetate, benzyl phenylpropionate, 2-phenylethyl phenylpropionate, and an acetate of bisphenol A, more preferred are 2-phenylethyl acetate, 3-phenylpropyl acetate, 3-phenylpropyl propionate, methyl phenylacetate, methyl α,α,dimethyl-phenylacetate, methyl 1-phenyl-cyclopentanoate, methyl phenylpropionate, methyl phenylbutyrate, benzyl phenylacetate, 2-phenylethyl phenylacetate, benzyl phenylpropionate, 2-phenylethyl phenylpropionate, and an acetate of bisphenol A, and further preferred are 2-phenylethyl acetate, 3-phenylpropyl acetate, methyl α,α, dimethyl-phenylacetate, methyl 1-phenyl-cyclopentanoate, methyl phenylpropionate, 2-phenylethyl phenylacetate, benzyl phenylpropionate, and 2-phenylethyl phenylpropionate.

With respect to substituent T, examples of groups having a carbonate structure include a carbonate of bisphenol A, a carbonate of bisphenol Z, diphenyl carbonate, methylphenyl carbonate, 2-t-butylphenylmethyl carbonate, and 4-t-butylphenylmethyl carbonate, preferred are a carbonate of bisphenol A, a carbonate of bisphenol Z, diphenyl carbonate, and methylphenyl carbonate, more preferred are diphenyl carbonate and methylphenyl carbonate, and further preferred is methylphenyl carbonate.

With respect to substituent T, examples of groups having a sulfonic ester structure include methyl phenylsulfonate, ethyl phenylsulfonate, diphenylsulfonate, 2-t-butylphenyl methylsulfonate, 4-t-butylphenyl methylsulfonate, and cyclohexylphenyl methylsulfonate, preferred are methyl phenylsulfonate, diphenylsulfonate, 2-t-butylphenyl methylsulfonate, 4-t-butylphenyl methylsulfonate, and cyclohexylphenyl methylsulfonate, and more preferred are methyl phenylsulfonate, 2-t-butylphenyl methylsulfonate, 4-t-butylphenyl methylsulfonate, and cyclohexylphenyl methylsulfonate.

With respect to substituent T, examples of groups having a silicon-carbon structure include trimethylphenylsilane, diphenylsilane, and diphenyltetramethyldisilane, and preferred is trimethylphenylsilane.

With respect to substituent T, examples of groups having a phosphate structure include triphenyl phosphate, tris(2-t-butylphenyl) phosphate, tris(3-t-butylphenyl) phosphate, tris(4-t-butylphenyl) phosphate, tris(2-t-amylphenyl) phosphate, tris(3-t-amylphenyl) phosphate, tris(4-t-amylphenyl) phosphate, tris(2-cyclohexylphenyl) phosphate, tris(3-cyclohexylphenyl) phosphate, tris(4-cyclohexylphenyl) phosphate, and diethyl(4-methylbenzyl) phosphate, preferred are triphenyl phosphate, tris(2-t-butylphenyl) phosphate, tris(3-t-butylphenyl) phosphate, tris(4-t-butylphenyl) phosphate, tris(2-t-amylphenyl) phosphate, tris(3-t-amylphenyl) phosphate, tris(4-t-amylphenyl) phosphate, tris(2-cyclohexylphenyl) phosphate, tris(3-cyclohexylphenyl) phosphate, and tris(4-cyclohexylphenyl) phosphate, and more preferred are tris(2-t-butylphenyl) phosphate, tris(4-t-butylphenyl) phosphate, tris(2-cyclohexylphenyl) phosphate, and tris(4-cyclohexylphenyl) phosphate.

With respect to substituent T, examples of groups having a phosphonate structure include dimethyl phenylphosphonate, diethyl phenylphosphonate, methylphenyl phenylphosphonate, ethylphenyl phenylphosphonate, diphenyl phenylphosphonate, dimethyl (4-fluorophenyl)phosphonate, dimethyl benzylphosphonate, diethyl benzylphosphonate, methylphenyl benzylphosphonate, ethylphenyl benzylphosphonate, diphenyl benzylphosphonate, dimethyl (4-fluorobenzyl)phosphonate, and diethyl (4-fluorobenzyl)phosphonate, preferred are dimethyl phenylphosphonate, diethyl phenylphosphonate, dimethyl (4-fluorophenyl)phosphonate, dimethyl benzylphosphonate, diethyl benzylphosphonate, dimethyl (4-fluorobenzyl)phosphonate, and diethyl (4-fluorobenzyl)phosphonate, and more preferred are dimethyl phenylphosphonate, diethyl phenylphosphonate, dimethyl benzylphosphonate, diethyl benzylphosphonate, dimethyl (4-fluorobenzyl)phosphonate, and diethyl (4-fluorobenzyl)phosphonate.

The above-described aromatic compound may be a fluorination product thereof, and examples of the fluorination products include partial fluorination products of an aromatic compound having a hydrocarbon group, such as o-cyclohexylfluorobenzene and p-cyclohexylfluorobenzene; and partial fluorination products of an aromatic compound having a carboxylate structure, such as 2-fluorophenyl acetate and 4-fluorophenyl acetate, and preferred are partial fluorination products of an aromatic compound having a carboxylate structure, such as 2-fluorophenyl acetate and 4-fluorophenyl acetate.

The above-mentioned aromatic compounds may be used individually or in combination. The amount of the aromatic compound incorporated, based on the mass of the non-aqueous electrolytic solution, is generally 0.001% by mass or more, preferably 0.01% by mass or more, more preferably 0.1% by mass or more, further preferably 0.5% by mass or more, and is generally 10% by mass or less, preferably 8% by mass or less, more preferably 5% by mass or less, further preferably 4% by mass or less, especially preferably 3% by mass or less. When the amount of the aromatic compound is in the above range, the effects of the present invention are likely to be exhibited, and further it is possible to prevent an increase of the resistance of the non-aqueous electrolyte secondary battery.

1-2-10. Cyclic Ether Compound

Examples of cyclic ether compounds which are the specific additive include cyclic ether compounds which are an aliphatic compound having an oxygen atom in the molecule thereof, and cyclic ether compounds which are an aromatic compound having an oxygen atom in the molecule thereof. Preferred are cyclic ether compounds which are an aliphatic compound having an oxygen atom in the molecule thereof because they have an appropriate oxidation potential such that a side reaction caused at room temperature can be suppressed.

As specific examples of cyclic ether compounds, there can be mentioned the following compounds:

ethylene oxide, propylene oxide, butylene oxide, styrene oxide, oxetane, 2-methyloxetane, 3-methyloxetane, tetrahydrofuran, 2-methyltetrahydrofuran, 2-ethyltetrahydrofuran, 3-methyltetrahydrofuran, 3-ethyltetrahydrofuran, 2,2-dimethyltetrahydrofuran, 2,3-dimethyltetrahydrofuran, 2-vinyltetrahydrofuran, 3-vinyltetrahydrofuran, 2-ethynyltetrahydrofuran, 3-ethynyltetrahydrofuran, 2-phenyltetrahydrofuran, 3-phenyltetrahydrofuran, tetrahydropyran, 2-methyltetrahydropyran, 2-ethyltetrahydropyran, 3-methyltetrahydropyran, 3-ethyltetrahydropyran, 4-methyltetrahydropyran, 4-ethyltetrahydropyran, 2,2-dimethyltetrahydropyran, 2,3-dimethyltetrahydropyran, 2,4-dimethyltetrahydropyran, 3,3-dimethyltetrahydropyran, 3,4-dimethyltetrahydropyran, 4,4-dimethyltetrahydropyran, 2-vinyltetrahydropyran, 3-vinyltetrahydropyran, 4-vinyltetrahydropyran, 2-ethynyltetrahydropyran, 3-ethynyltetrahydropyran, 4-ethynyltetrahydropyran, 2-phenyltetrahydropyran, 3-phenyltetrahydropyran, 4-phenyltetrahydropyran, hexamethylene oxide, 2-methylhexamethylene oxide, 3-methylhexamethylene oxide, 4-ethylhexamethylene oxide, 2-vinylhexamethylene oxide, 3-ethynylhexamethylene oxide, 4-phenylhexamethylene oxide, heptamethylene oxide, 2-methylheptamethylene oxide, 3-methylheptamethylene oxide, 4-ethylheptamethylene oxide, octamethylene oxide, nonamethylene oxide, decamethylene oxide, 1,3-dioxolane, 2-methoxy-1,3-dioxolane, 2-methyl-1,3-dioxolane, 2,2-dimethyl-1,3-dioxolane, 4-methyl-1,3-dioxolane, 2-ethoxy-1,3-dioxolane, 2-ethyl-1,3-dioxolane, 2,2-diethyl-1,3-dioxolane, 4-ethyl-1,3-dioxolane, 2,2,4-trimethyl-1,3-dioxolane, 2,2,4-triethyl-1,3-dioxolane, 1,3-dioxane, 4-methyl-1,3-dioxane, 2,4-dimethyl-1,3-dioxane, 2,2,4-trimethyl-1,3-dioxane, 4-ethyl-1,3-dioxane, 2,4-diethyl-1,3-dioxane, 2,2,4-triethyl-1,3-dioxane, 4-phenyl-1,3-dioxane, 3-methyl-1,3-dioxane, 5,5-dimethyl-1,3-dioxane, 2,5,5-trimethyl-1,3-dioxane, 4,6-dimethyl-1,3-dioxane, 2,5-dimethyl-1,3-dioxane, and 1,4-dioxane.

Of these, preferred are propylene oxide, butylene oxide, styrene oxide, oxetane, tetrahydrofuran, 2-methyltetrahydrofuran, 2-ethyltetrahydrofuran, 3-methyltetrahydrofuran, 3-ethyltetrahydrofuran, 2,2-dimethyltetrahydrofuran, tetrahydropyran, 2-methyltetrahydropyran, 2-ethyltetrahydropyran, 3-methyltetrahydropyran, 3-ethyltetrahydropyran, 4-methyltetrahydropyran, 4-ethyltetrahydropyran, 2,2-dimethyltetrahydropyran, hexamethylene oxide, 1,3-dioxane, and 4-methyl-1,3-dioxane, further preferred are propylene oxide, styrene oxide, oxetane, tetrahydrofuran, 2-methyltetrahydrofuran, 2-ethyltetrahydrofuran, 2,2-dimethyltetrahydrofuran, tetrahydropyran, 2-methyltetrahydropyran, 2-ethyltetrahydropyran, 2,2-dimethyltetrahydropyran, hexamethylene oxide, 1,3-dioxane, and 4-methyl-1,3-dioxane, especially preferred are oxetane, tetrahydrofuran, tetrahydropyran, hexamethylene oxide, 1,3-dioxane, and 4-methyl-1,3-dioxane, more preferred are tetrahydrofuran, tetrahydropyran, and 1,3-dioxane, and most preferred is tetrahydropyran.

When the compounds mentioned above as preferred examples are used, the gas generation suppression effect is especially remarkable.

The cyclic ether compounds may be used individually, or two or more types of the cyclic ether compounds may be used in an arbitrary combination and in an arbitrary ratio. With respect to the amount of the cyclic ether compound incorporated into the non-aqueous electrolytic solution of the present invention, there is no particular limitation, and the amount of the cyclic ether compound is arbitrary as long as the effects of the present invention are not markedly sacrificed. The amount of the cyclic ether compound incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 1.5% by mass or less, most preferably 1.0% by mass or less. When the cyclic ether compound in the above-mentioned amount is used, the gas generation suppression effect can be satisfactorily exhibited, and further an unnecessary increase of the resistance can be suppressed.

1-2-11. Oxalato Salt

With respect to the counter cation of the oxalato salt which is the specific additive, there is no particular limitation, but examples of the counter cations include lithium, sodium, potassium, rubidium, cesium, magnesium, calcium, barium, and ammonium represented by: $NR^{13}R^{14}R^{15}R^{16}$ (wherein each of $R^{13}$ to $R^{16}$ independently represents a hydrogen atom or an organic group having 1 to 12 carbon atoms).

With respect to the organic group having 1 to 12 carbon atoms and being represented by $R^{13}$ to $R^{16}$ for the ammonium, there is no particular limitation. However, examples of the organic groups include an alkyl group optionally substituted with a halogen atom, a cycloalkyl group optionally substituted with a halogen atom or an alkyl group, an aryl group optionally substituted with a halogen atom or an alkyl group, and a nitrogen atom-containing heterocyclic group optionally having a substituent. Especially, it is preferred that each of $R^{13}$ to $R^{16}$ is independently a hydrogen atom, an alkyl group, a cycloalkyl group, or a nitrogen atom-containing heterocyclic group.

Specific examples of oxalato salts include lithium difluorooxalatoborate, lithium bis(oxalato)borate, lithium tetrafluorooxalatophosphate, lithium difluorobis(oxalato)phosphate, and lithium tris(oxalato)phosphate, and preferred are lithium bis(oxalato)borate and lithium difluorobis(oxalato)phosphate.

The oxalato salts may be used individually, or two or more types of the oxalato salts may be used in an arbitrary combination and in an arbitrary ratio. With respect to the amount of the oxalato salt incorporated, there is no particular limitation, and the amount of the oxalato salt is arbitrary as long as the effects of the present invention are not markedly sacrificed.

The amount of the oxalato salt incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, most preferably 1.5% by mass or less.

When the amount of the oxalato salt incorporated is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

1-2-12. Cyclic Sulfonic Ester

With respect to the type of the cyclic sulfonic ester which is the specific additive, there is no particular limitation.

Specific examples of cyclic sulfonic esters include:

sultone compounds, such as 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1-fluoro-1,4-butane sultone, 2-fluoro-1,4-butane sultone, 3-fluoro-1,4-butane sultone, 4-fluoro-1,4-butane sultone, 1-methyl-1,4-butane sultone, 2-methyl-1,4-butane sultone, 3-methyl-1,4-butane sultone, 4-methyl-1,4-butane sultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone, 4-methyl-3-butene-1,4-sultone, 1,5-pentane sultone, 1-fluoro-1,5-pentane sultone, 2-fluoro-1,5-pentane sultone, 3-fluoro-1,5-pentane sultone, 4-fluoro-1,5-pentane sultone, 5-fluoro-1,5-pentane sultone, 1-methyl-1,5-pentane sultone, 2-methyl-1,5-pentane sultone, 3-methyl-1,5-pentane sultone, 4-methyl-1,5-pentane sultone, 5-methyl-1,5-pentane sultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl-1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone, and 5-methyl-4-pentene-1,5-sultone;

sulfate compounds, such as methylene sulfate, ethylene sulfate, and propylene sulfate;

disulfonate compounds, such as methylene methanedisulfonate and ethylene methanedisulfonate;

nitrogen-containing compounds, such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide, 1,2,4-oxathiazinane-2,2-dioxide, 4-methyl-1,2,4-oxathiazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide, and 5,6-dihydro-1,2,6-oxathiazine-2,2-dioxide; and phosphorus-containing compounds, such as 1,2,3-oxathiaphosphorane-2,2-dioxide, 3-methyl-1,2,3-oxathiaphosphorane-2,2-dioxide, 3-methyl-1,2,3-oxathiaphosphorane-2,2,3-trioxide, 3-methoxy-1,2,3-oxathiaphosphorane-2,2,3-trioxide, 1,2,4-oxathiaphosphorane-2,2-dioxide, 4-methyl-1,2,4-oxathiaphosphorane-2,2-dioxide, 4-methyl-1,2,4-oxathiaphosphorane-2,2,4-trioxide, 4-methoxy-1,2,4-oxathiaphosphorane-2,2,4-trioxide, 1,2,5-oxathiaphosphorane-2,2-dioxide, 5-methyl-1,2,5-oxathiaphosphorane-2,2-dioxide, 5-methyl-1,2,5-oxathiaphosphorane-2,2,5-trioxide, 5-methoxy-1,2,5-oxathiaphosphorane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiaphosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6-oxathiaphosphinane-2,2,3-trioxide, and 6-methoxy-1,2,6-oxathiaphosphinane-2,2,3-trioxide.

Of these, from the viewpoint of the improvement of the storage characteristics of the non-aqueous electrolytic solution, preferred are 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, methylene methanedisulfonate, and ethylene methanedisulfonate, and more preferred are 1,3-propane sultone, 1-fluoro-1,3-propane sultone, 2-fluoro-1,3-propane sultone, 3-fluoro-1,3-propane sultone, and 1-propene-1,3-sultone.

The cyclic sulfonic esters may be used individually, or two or more types of the cyclic sulfonic esters may be used in an arbitrary combination and in an arbitrary ratio. With respect to the amount of the cyclic sulfonic ester incorporated into the non-aqueous electrolytic solution of the present invention, there is no particular limitation, and the amount of the cyclic sulfonic ester is arbitrary as long as the effects of the present invention are not markedly sacrificed. The amount of the cyclic sulfonic ester incorporated, based on the mass of the non-aqueous electrolytic solution (100% by mass), is generally 0.001% by mass or more, preferably 0.01% by mass or more, more preferably 0.1% by mass or more, and is generally 10% by mass or less, preferably 5% by mass or less, more preferably 3% by mass or less, especially preferably 2% by mass or less, most preferably 1% by mass or less. When the amount of the cyclic sulfonic ester incorporated satisfies the above-mentioned range, effects for, for example, output characteristics, load characteristics, low-temperature characteristics, cycle characteristics, and high-temperature storage characteristics of the non-aqueous electrolyte secondary battery are further improved.

1-3. Electrolyte

With respect to the electrolyte contained in the non-aqueous electrolytic solution of the present invention, there is no particular limitation, and various types of electrolytes used in a conventional non-aqueous electrolyte secondary battery can be used.

In the electrolytes described below, compounds which are the same as the above-described specific additives are present, which means that the compound described as a specific additive can also be used as an electrolyte depending on the amount of the compound used.

With respect to the electrolyte, an alkali metal salt is generally used, and specific examples of alkali metal salts include lithium salts and sodium salts, and lithium salts are preferably used. With respect to the lithium salt, there is no particular limitation as long as it is known to be used in this application, and an arbitrary lithium salt can be used. As specific examples of lithium salts, there can be mentioned the following lithium salts:

inorganic lithium salts, such as $LiPF_6$, $LiBF_4$, $LiClO_4$, $LiAlF_4$, $LiSbF_6$, $LiTaF_6$, and $LiWF_7$;

lithium tungstates, such as $LiWOF_5$;

lithium carboxylates, such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates, such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts, such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, and $LiN(CF_3SO_2)(C_4F_9SO_2)$;

lithium methide salts, such as $LiC(FSO_2)_3$, $LiC(CF_3SO_2)_3$, and $LiC(C_2F_5SO_2)_3$;

lithium oxalatoborates, such as lithium difluorooxalatoborate and lithium bis(oxalato)borate;

lithium oxalatophosphates, such as lithium tetrafluorooxalatophosphate, lithium difluorobis(oxalato)phosphate, and lithium tris(oxalato)phosphate; and fluorine-containing organolithium salts, such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Of these, especially preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$ from the viewpoint of the effect of improving the non-aqueous electrolyte secondary battery in, for example, output characteristics, high-rate charge-discharge characteristics, high-temperature storage characteristics, and cycle characteristics.

These lithium salts may be used individually or in combination. Preferred examples of combinations of two or more lithium salts used include a combination of $LiPF_6$ and $LiBF_4$, a combination of $LiPF_6$ and $LiN(FSO_2)_2$, and a combination of $LiPF_6$ and $FSO_3Li$. These combinations exhibit an effect of improving the non-aqueous electrolyte secondary battery in load characteristics and cycle characteristics.

In this case, with respect to the amount of the $LiBF_4$ or $FSO_3Li$ incorporated, based on the mass of the non-aqueous electrolytic solution (100% by mass), there is no particular limitation, and the amount is arbitrary as long as the effects of the present invention are not markedly sacrificed. The amount of the $LiBF_4$ or $FSO_3Li$ incorporated, based on the mass of the non-aqueous electrolytic solution of the present invention, is generally 0.01% by mass or more, preferably 0.1% by mass or more, and is generally 30% by mass or less, preferably 20% by mass or less.

Further, other examples of the combinations include combinations of an inorganic lithium salt and an organolithium salt. These combinations exhibit an effect of suppressing the deterioration of the non-aqueous electrolyte secondary battery due to high-temperature storage.

With respect to the organolithium salt, preferred are $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$.

In this case, the amount of the organolithium salt, based on the mass of the non-aqueous electrolytic solution (100% by mass), is preferably 0.1% by mass or more, especially preferably 0.5% by mass or more, and is preferably 30% by mass or less, especially preferably 20% by mass or less.

With respect to the concentration of the above-described electrolyte in the non-aqueous electrolytic solution, there is no particular limitation as long as the effects of the present invention are not sacrificed. From the viewpoint of achieving the electrolytic solution having electrical conductivity in an advantageous range so as to surely obtain excellent battery performance, the total molar concentration of the electrolyte in the non-aqueous electrolytic solution is preferably 0.3 mol/L or more, more preferably 0.4 mol/L or more, further preferably 0.5 mol/L or more, especially preferably 1.0 mol/L or more, and is preferably 3 mol/L or less, more preferably 2.5 mol/L or less, further preferably 2.0 mol/L or less.

When the total molar concentration of the electrolyte in the non-aqueous electrolytic solution is in the above range, the non-aqueous electrolytic solution has satisfactory electrical conductivity, making it possible to prevent a lowering of the electrical conductivity due to an increase of the viscosity and to prevent deterioration of the battery performance due to the lowering of the electrical conductivity.

1-4. Non-Aqueous Solvent

With respect to the non-aqueous solvent in the non-aqueous electrolytic solution of the present invention, there is no particular limitation, and a known organic solvent can be used. Examples of such organic solvents include cyclic carbonates having no fluorine atom, linear carbonates, linear carboxylates, cyclic carboxylates, ether compounds, and sulfone compounds. Of these, linear carboxylates are preferred from the viewpoint of the improvement of the high-temperature storage characteristics.

The above-mentioned non-aqueous solvents are individually described below. In the non-aqueous solvents described below, compounds which are the same as the above-described specific additives are present, which means that the compound described as a specific additive can also be used as a non-aqueous solvent depending on the amount of the compound used.

<Cyclic Carbonate Having No Fluorine Atom>

Examples of the cyclic carbonates having no fluorine atom include cyclic carbonates having an alkylene group having 2 to 4 carbon atoms.

Specific examples of cyclic carbonates having no fluorine atom and having an alkylene group having 2 to 4 carbon atoms include ethylene carbonate, propylene carbonate, and butylene carbonate. Of these, ethylene carbonate and propylene carbonate are especially preferred from the viewpoint of the improvement of the battery characteristics due to the improvement of the degree of dissociation of lithium ions.

The cyclic carbonates having no fluorine atom may be used individually, or two or more types of the cyclic carbonates having no fluorine atom may be used in an arbitrary combination and in an arbitrary ratio.

With respect to the amount of the incorporated cyclic carbonate having no fluorine atom, there is no particular limitation, and the amount is arbitrary as long as the effects of the present invention are not markedly sacrificed. When one type of the cyclic carbonate having no fluorine atom is solely used, the amount of the incorporated cyclic carbonate having no fluorine atom, based on the volume of the non-aqueous solvent (100% by volume), is generally 5% by volume or more, more preferably 10% by volume or more. When the amount of the cyclic carbonate having no fluorine atom is in the above range, a lowering of the electrical conductivity caused due to a lowering of the permittivity of the non-aqueous electrolytic solution is avoided, making it easy to achieve a non-aqueous electrolyte secondary battery having large-current discharge characteristics in an advantageous range, stability to the negative electrode in an advantageous range, or cycle characteristics in an advantageous range. Further, the amount of the incorporated cyclic carbonate having no fluorine atom is generally 95% by volume or less, more preferably 90% by volume or less, further preferably 85% by volume or less. When the amount of the cyclic carbonate having no fluorine atom is in the above range, the viscosity of the non-aqueous electrolytic solution is in an appropriate range, and a lowering of the ionic conductivity is suppressed, making it easy to achieve a non-aqueous electrolyte secondary battery having load characteristics in an advantageous range.

<Linear Carbonate>

With respect to the linear carbonate, linear carbonates having 3 to 7 carbon atoms are preferred, and dialkyl carbonates having 3 to 7 carbon atoms are more preferred.

Specific examples of linear carbonates include dimethyl carbonate, diethyl carbonate, di-n-propyl carbonate, diisopropyl carbonate, n-propylisopropyl carbonate, ethylmethyl carbonate, methyl-n-propyl carbonate, n-butylmethyl carbonate, isobutylmethyl carbonate, t-butylmethyl carbonate, ethyl-n-propyl carbonate, n-butylethyl carbonate, isobutylethyl carbonate, and t-butylethyl carbonate.

Of these, dimethyl carbonate, diethyl carbonate, di-n-propyl carbonate, diisopropyl carbonate, n-propylisopropyl carbonate, ethylmethyl carbonate, and methyl-n-propyl carbonate are preferred, and dimethyl carbonate, diethyl carbonate, and ethylmethyl carbonate are especially preferred.

Further, a linear carbonate having a fluorine atom (hereinafter, frequently referred to as "fluorinated linear carbonate") can be preferably used.

With respect to the number of fluorine atoms of the fluorinated linear carbonate, there is no particular limitation as long as it is 1 or more, but the number of fluorine atoms is generally 6 or less, preferably 4 or less. When the fluorinated linear carbonate has a plurality of fluorine atoms, the fluorine atoms may be bonded to the same carbon, or may be bonded to different carbons.

Examples of fluorinated linear carbonates include fluorinated dimethyl carbonates and derivatives thereof; fluorinated ethylmethyl carbonates and derivatives thereof, and fluorinated diethyl carbonates and derivatives thereof.

Examples of the fluorinated dimethyl carbonates and derivatives thereof include fluoromethylmethyl carbonate, difluoromethylmethyl carbonate, trifluoromethylmethyl carbonate, bis(fluoromethyl) carbonate, bis(difluoromethyl) carbonate, and bis(trifluoromethyl) carbonate.

Examples of the fluorinated ethylmethyl carbonates and derivatives thereof include 2-fluoroethylmethyl carbonate, ethylfluoromethyl carbonate, 2,2-difluoroethylmethyl carbonate, 2-fluoroethylfluoromethyl carbonate, ethyldifluoromethyl carbonate, 2,2,2-trifluoro ethylmethyl carbonate, 2,2-difluoroethylfluoromethyl carbonate, 2-fluoroethyldifluoromethyl carbonate, and ethyltrifluoromethyl carbonate.

Examples of the fluorinated diethyl carbonates and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

The above-described linear carbonates may be used individually, or two or more types of the linear carbonates may be used in an arbitrary combination and in an arbitrary ratio.

The amount of the linear carbonate incorporated, based on the volume of the non-aqueous solvent (100% by volume), is preferably 5% by volume or more, more preferably 10% by volume or more, further preferably 15% by volume or more. When the lower limit of the amount is set as shown above, the viscosity of the non-aqueous electrolytic solution is in an appropriate range, and a lowering of the ionic conductivity is suppressed, making it easy to achieve a non-aqueous electrolyte secondary battery having large-current discharge characteristics in an advantageous range. Further, the amount of the linear carbonate incorporated, based on the volume of the non-aqueous solvent (100% by volume), is preferably 90% by volume or less, more preferably 85% by volume or less, especially preferably 80% by volume or less. When the upper limit of the amount is set as shown above, a lowering of the electrical conductivity caused due to a lowering of the permittivity of the non-aqueous electrolytic solution is avoided, making it easy to achieve a non-aqueous electrolyte secondary battery having large-current discharge characteristics in an advantageous range.

<Linear Carboxylate>

With respect to the linear carboxylate, those having 3 to 7 carbon atoms are preferred. Specific examples of such linear carboxylates include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Of these, methyl acetate, ethyl acetate, n-propyl acetate, n-butyl acetate, methyl propionate, ethyl propionate, n-propyl propionate, isopropyl propionate, methyl butyrate, and ethyl butyrate are preferred from the viewpoint of the improvement of the ionic conductivity due to a lowering of the viscosity.

The linear carboxylates may be used individually, or two or more types of the linear carboxylates may be used in an arbitrary combination and in an arbitrary ratio.

The amount of the linear carboxylate incorporated, generally, based on the volume of the non-aqueous solvent (100% by volume), is preferably 10% by volume or more, more preferably 15% by volume or more. When the lower limit of the amount is set as shown above, the non-aqueous electrolytic solution is improved in electrical conductivity, making it easy to achieve a non-aqueous electrolyte secondary battery having improved large-current discharge characteristics. Further, the amount of the linear carboxylate incorporated, based on the volume of the non-aqueous solvent (100% by volume), is preferably 60% by volume or less, more preferably 50% by volume or less, especially preferably 30% by volume or less, most preferably 20% by volume or less. When the upper limit of the amount is set as shown above, an increase of the negative electrode resistance is suppressed, making it easy to achieve a non-aqueous electrolyte secondary battery having large-current discharge characteristics or cycle characteristics in an advantageous range.

<Cyclic Carboxylate>

With respect to the cyclic carboxylate, those having 3 to 12 carbon atoms are preferred.

Specific examples of the cyclic carboxylates include gamma-butyrolactone, gamma-valerolactone, gamma-caprolactone, and epsilon-caprolactone. Of these, gamma-butyrolactone is preferred from the viewpoint of the improvement of the battery characteristics due to an improvement of the degree of dissociation of lithium ions.

The cyclic carboxylates may be used individually, or two or more types of the cyclic carboxylates may be used in an arbitrary combination and in an arbitrary ratio.

The amount of the cyclic carboxylate incorporated, based on the volume of the non-aqueous solvent (100% by volume), is preferably 5% by volume or more, more preferably 10% by volume or more. When the amount of the cyclic carboxylate incorporated is in the above range, the non-aqueous electrolytic solution is improved in electrical conductivity, making it easy to achieve a non-aqueous electrolyte secondary battery having improved large-current discharge characteristics. Further, the amount of the cyclic carboxylate incorporated is preferably 50% by volume or less, more preferably 40% by volume or less. When the upper limit of the amount is set as shown above, the viscosity of the non-aqueous electrolytic solution is in an appropriate range, and a lowering of the electrical conductivity is avoided to suppress an increase of the negative electrode resistance, making it easy to achieve a non-aqueous electrolyte secondary battery having large-current discharge characteristics in an advantageous range.

<Ether Compound>

With respect to the ether compound, preferred are linear ethers having 3 to 10 carbon atoms and optionally having part of hydrogens substituted with fluorine, and cyclic ethers having 3 to 6 carbon atoms.

Examples of the linear ethers having 3 to 10 carbon atoms include diethyl ether, di(2-fluoroethyl) ether, di(2,2-difluoroethyl) ether, di(2,2,2-trifluoroethyl) ether, ethyl(2-fluoroethyl) ether, ethyl(2,2,2-trifluoroethyl) ether, ethyl(1,1,2,2-tetrafluoroethyl) ether, (2-fluoroethyl)(2,2,2-trifluoroethyl) ether, (2-fluoroethyl)(1,1,2,2-tetrafluoroethyl) ether, (2,2,2-trifluoroethyl)(1,1,2,2-tetrafluoroethyl) ether, ethyl-n-propyl ether, ethyl(3-fluoro-n-propyl) ether, ethyl(3,3,3-trifluoro-n-propyl) ether, ethyl(2,2,3,3-tetrafluoro-n-propyl) ether, ethyl (2,2,3,3,3-pentafluoro-n-propyl) ether, 2-fluoroethyl-n-propyl ether, (2-fluoroethyl)(3-fluoro-n-propyl) ether, (2-fluoroethyl)(3,3,3-trifluoro-n-propyl) ether, (2-fluoroethyl)(2,2,3,3-tetrafluoro-n-propyl) ether, (2-fluoroethyl)(2,2,3,3,3-pentafluoro-n-propyl) ether, 2,2,2-trifluoroethyl-n-propyl ether, (2,2,2-trifluoroethyl)(3-fluoro-n-propyl) ether, (2,2,2-trifluoroethyl)(3,3,3-trifluoro-n-propyl) ether, (2,2,2-trifluoroethyl)(2,2,3,3-tetrafluoro-n-propyl) ether, (2,2,2-trifluoroethyl)(2,2,3,3,3-pentafluoro-n-propyl) ether, 1,1,2,2-tetrafluoroethyl-n-propyl ether, (1,1,2,2-tetrafluoroethyl)(3-fluoro-n-propyl) ether, (1,1,2,2-tetrafluoroethyl)(3,3,3-trifluoro-n-propyl) ether, (1,1,2,2-tetrafluoroethyl)(2,2,3,3-tetrafluoro-n-propyl) ether, (1,1,2,2-tetrafluoroethyl)(2,2,3,3,3-pentafluoro-n-propyl) ether, di-n-propyl ether, (n-propyl)(3-fluoro-n-propyl) ether, (n-propyl)(3,3,3-trifluoro-n-propyl) ether, (n-propyl)(2,2,3,3-tetrafluoro-n-propyl) ether, (n-propyl)(2,2,3,3,3-pentafluoro-n-propyl) ether, di(3-fluoro-n-propyl) ether, (3-fluoro-n-propyl)(3,3,3-trifluoro-n-propyl) ether, (3-fluoro-n-propyl)(2,2,3,3-tetrafluoro-n-propyl) ether, (3-fluoro-n-propyl)(2,2,3,3,3-pentafluoro-n-propyl) ether, di(3,3,3-trifluoro-n-propyl) ether, (3,3,3-trifluoro-n-propyl)(2,2,3,3-tetrafluoro-n-propyl) ether, (3,3,3-trifluoro-n-propyl)(2,2,3,3,3-pentafluoro-n-propyl) ether, di(2,2,3,3-tetrafluoro-n-propyl) ether, (2,2,3,3-tetrafluoro-n-propyl)(2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy) methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy) methane, dimethoxyethane, methoxyethoxyethane, methoxy (2-fluoroethoxy)ethane, methoxy(2,2,2-trifluoroethoxy) ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy) ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane, and fluorinated compounds thereof.

Among the above-mentioned ether compounds, from the viewpoint of high solvating power for lithium ions for improvement of the ionic dissociation, preferred are dimethoxymethane, diethoxymethane, ethoxymethoxymethane, ethylene glycol di-n-propyl ether, ethylene glycol di-n-butyl ether, and diethylene glycol dimethyl ether. Especially preferred are dimethoxymethane, diethoxymethane, and ethoxymethoxymethane because they have a low viscosity and give high ionic conductivity.

The ether compounds may be used individually, or two or more types of the ether compounds may be used in an arbitrary combination and in an arbitrary ratio.

The amount of the ether compound incorporated, based on the volume of the non-aqueous solvent (100% by volume), is preferably 5% by volume or more, more preferably 10% by volume or more, further preferably 15% by volume or more, and is preferably 70% by volume or less, more preferably 60% by volume or less, further preferably 50% by volume or less.

When the amount of the ether compound incorporated is in the above range, an improvement effect for ionic conductivity due to an improvement of the degree of dissociation of lithium ions and a lowering of the viscosity achieved by the ether compound can be easily obtained. When the negative electrode active material is a carbonaceous material, it is easy to avoid a problem in that, for example, the ether compound is co-inserted together with lithium ions to lower the capacity.

<Sulfone Compound>

With respect to the sulfone compound, preferred are cyclic sulfones having 3 to 6 carbon atoms and linear sulfones having 2 to 6 carbon atoms. The number of sulfonyl group or groups per molecule of the sulfone compound is preferably 1 or 2.

Examples of the cyclic sulfones having 3 to 6 carbon atoms include monosulfone compounds, such as trimethylene sulfones, tetramethylene sulfones, and hexamethylene sulfones; and disulfone compounds, such as trimethylene disulfones, tetramethylene disulfones, and hexamethylene disulfones.

Of these, from the viewpoint of the permittivity and viscosity, more preferred are tetramethylene sulfones, tetramethylene disulfones, hexamethylene sulfones, and hexamethylene disulfones, and especially preferred are tetramethylene sulfones.

With respect to the above-mentioned tetramethylene sulfones, sulfolane and/or sulfolane derivatives (hereinafter, frequently referred to as "sulfolanes" including sulfolane) are preferred. With respect to the sulfolane derivatives, preferred are ones in which one or more hydrogen atoms bonded to the carbon atom(s) constituting the sulfolane ring are replaced by a fluorine atom or an alkyl group.

Of these, from the viewpoint of high ionic conductivity for improvement of the input/output characteristics of the non-aqueous electrolyte secondary battery, preferred are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane.

Examples of the linear sulfones having 2 to 6 carbon atoms include dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, and pentafluoroethyl-t-butyl sulfone.

Of these, from the viewpoint of high ionic conductivity for improvement of the input/output characteristics of the non-aqueous electrolyte secondary battery, preferred are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, and trifluoromethyl-t-butyl sulfone.

The above-described sulfone compounds may be used individually, or two or more types of the sulfone compounds may be used in an arbitrary combination and in an arbitrary ratio.

The amount of the sulfone compound incorporated, based on the volume of the non-aqueous solvent (100% by volume), is preferably 0.3% by volume or more, more preferably 1% by volume or more, further preferably 5% by volume or more, and is preferably 40% by volume or less, more preferably 35% by volume or less, further preferably 30% by volume or less.

When the amount of the sulfone compound incorporated is in the above range, an improvement effect for durability of the non-aqueous electrolyte secondary battery, such as cycle characteristics or storage characteristics, is easily obtained, and further the viscosity of the non-aqueous electrolytic solution is in an appropriate range, making it possible to avoid a lowering of the electrical conductivity. Consequently, when the non-aqueous electrolyte secondary battery is charged or discharged at a high current density, it is easy to avoid a problem in that, for example, the charge-discharge capacity maintaining ratio is lowered.

<In the Case where the Cyclic Carbonate Having a Fluorine Atom is Used as a Non-Aqueous Solvent>

In the non-aqueous electrolytic solution of the present invention, as mentioned in 1-2. above, the cyclic carbonate having a fluorine atom is used as a specific additive, but can also be used as a non-aqueous solvent.

In the present invention, when the cyclic carbonate having a fluorine atom is used as a non-aqueous solvent, as a non-aqueous solvent other than the cyclic carbonate having a fluorine atom, one of the above-exemplified non-aqueous solvents may be used in combination with the cyclic carbonate having a fluorine atom, and two or more types of the above-exemplified non-aqueous solvents may be used in combination with the cyclic carbonate having a fluorine atom.

For example, as a preferred combination of the non-aqueous solvents, there can be mentioned a combination of mainly a cyclic carbonate having a fluorine atom and a linear carbonate. Especially, an advantageous combination is such that the proportion of the total of the cyclic carbonate having a fluorine atom and the linear carbonate to the whole non-aqueous solvent is preferably 60% by volume or more, more preferably 80% by volume or more, further preferably 90% by volume or more, and the proportion of the cyclic carbonate having a fluorine atom to the total of the cyclic carbonate having a fluorine atom and the linear carbonate is 3% by volume or more, preferably 5% by volume or more, more preferably 10% by volume or more, further preferably 15% by volume or more, and is generally 60% by volume or less, preferably 50% by volume or less, more preferably 40% by volume or less, further preferably 35% by volume or less, especially preferably 30% by volume or less, most preferably 20% by volume or less.

When the above combination of the non-aqueous solvents is used, a non-aqueous electrolyte secondary battery produced using the combination of the non-aqueous solvents is likely to have excellent balance between the cycle characteristics and the high-temperature storage characteristics (particularly, residual capacity and high-load discharge capacity after stored at a high temperature).

Examples of preferred specific combinations of a cyclic carbonate having a fluorine atom and a linear carbonate include a combination of monofluoroethylene carbonate and dimethyl carbonate, a combination of monofluoroethylene carbonate and diethyl carbonate, a combination of monofluoroethylene carbonate and ethylmethyl carbonate, a combination of monofluoroethylene carbonate, dimethyl carbonate, and diethyl carbonate, a combination of monofluoroethylene carbonate, dimethyl carbonate, and ethylmethyl carbonate, a combination of monofluoroethylene carbonate, diethyl carbonate, and ethylmethyl carbonate, and a combination of monofluoroethylene carbonate, dimethyl carbonate, diethyl carbonate, and ethylmethyl carbonate.

Among the combinations of a cyclic carbonate having a fluorine atom and a linear carbonate, those containing a symmetric linear alkyl carbonate as a linear carbonate are further preferred. Especially, a non-aqueous solvent containing a monofluoroethylene carbonate, a symmetric linear carbonate, and an asymmetric linear carbonate, such as a combination of monofluoroethylene carbonate, dimethyl carbonate, and ethylmethyl carbonate, a combination of monofluoroethylene carbonate, diethyl carbonate, and ethylmethyl carbonate, or a combination of monofluoroethylene carbonate, dimethyl carbonate, diethyl carbonate, and ethylmethyl carbonate, is preferred because the resultant non-aqueous electrolyte secondary battery has excellent balance between the cycle characteristics and the large-current discharge characteristics. Of these, preferred is the combination wherein the symmetric linear carbonate is dimethyl carbonate, or the alkyl group of the linear carbonate has 1 to 2 carbon atoms.

As a preferred combination, there can be mentioned a combination such that a cyclic carbonate having no fluorine atom is further combined with the above-mentioned combination of a cyclic carbonate having a fluorine atom and a linear carbonate. Especially, an advantageous combination is such that the proportion of the total of the cyclic carbonate having a fluorine atom and the cyclic carbonate having no fluorine atom to the whole non-aqueous solvent is preferably 10% by volume or more, more preferably 15% by volume or more, further preferably 20% by volume or more, and the proportion of the cyclic carbonate having a fluorine atom to the total of the cyclic carbonate having a fluorine atom and the cyclic carbonate having no fluorine atom is generally 1% by volume or more, preferably 3% by volume or more, more preferably 5% by volume or more, further preferably 10% by volume or more, especially preferably 20% by volume or more, and is preferably 95% by volume or less, more preferably 85% by volume or less, further preferably 75% by volume or less, especially preferably 60% by volume or less.

When the non-aqueous solvent contains a cyclic carbonate having no fluorine atom at a concentration in the above range, a stable protective film can be formed on the negative electrode while maintaining the electrical conductivity of the non-aqueous electrolytic solution.

Examples of preferred specific combinations of a cyclic carbonate having a fluorine atom, a cyclic carbonate having no fluorine atom, and a linear carbonate include a combination of monofluoroethylene carbonate, ethylene carbonate, and dimethyl carbonate, a combination of monofluoroethylene carbonate, ethylene carbonate, and diethyl carbonate, a combination of monofluoroethylene carbonate, ethylene carbonate, and ethylmethyl carbonate, a combination of monofluoroethylene carbonate, ethylene carbonate, dimethyl carbonate, and diethyl carbonate, a combination of monofluoroethylene carbonate, ethylene carbonate, dimethyl carbonate, and ethylmethyl carbonate, a combination of monofluoroethylene carbonate, ethylene carbonate, diethyl carbonate, and ethylmethyl carbonate, a combination of monofluoroethylene carbonate, ethylene carbonate, dimethyl carbonate, diethyl carbonate, and ethylmethyl carbonate, a combination of monofluoroethylene carbonate, propylene carbonate, and dimethyl carbonate, a combination of monofluoroethylene carbonate, propylene carbonate, and diethyl carbonate, a combination of monofluoroethylene carbonate, propylene carbonate, and ethylmethyl carbonate, a combination of monofluoroethylene carbonate, propylene carbonate, dimethyl carbonate, and diethyl carbonate, a combination of monofluoroethylene carbonate, propylene carbonate, dimethyl carbonate, and ethylmethyl carbonate, a combination of monofluoroethylene carbonate, propylene carbonate, diethyl carbonate, and ethylmethyl carbonate, a combination of monofluoroethylene carbonate, propylene carbonate, dimethyl carbonate, diethyl carbonate, and ethylmethyl carbonate, a combination of monofluoroethylene carbonate, ethylene carbonate, propylene carbonate, and dimethyl carbonate, a combination of monofluoroethylene carbonate, ethylene carbonate, propylene carbonate, and diethyl carbonate, a combination of monofluoroethylene carbonate, ethylene carbonate, propylene carbonate, and ethylmethyl carbonate, a combination of monofluoroethylene carbonate, ethylene carbonate, propylene carbonate, dimethyl carbonate, and diethyl carbonate, a combination of monofluoroethylene carbonate, ethylene carbonate, propylene carbonate, dimethyl carbonate, and ethylmethyl carbonate, a combination of monofluoroethylene carbonate, ethylene carbonate, propylene carbonate, diethyl carbonate, and ethylmethyl carbonate, and a combination of monofluoroethylene carbonate, ethylene carbonate, propylene carbonate, dimethyl carbonate, diethyl carbonate, and ethylmethyl carbonate.

Among the combinations of a cyclic carbonate having a fluorine atom, a cyclic carbonate having no fluorine atom, and a linear carbonate, those containing an asymmetric linear alkyl carbonate as a linear carbonate are further preferred. Especially, a non-aqueous solvent containing a monofluoroethylene carbonate and an asymmetric linear carbonate, such as a combination of monofluoroethylene carbonate, ethylene carbonate, and ethylmethyl carbonate, a combination of monofluoroethylene carbonate, propylene carbonate, and ethylmethyl carbonate, a combination of monofluoroethylene carbonate, ethylene carbonate, dimethyl carbonate, and ethylmethyl carbonate, a combination of monofluoroethylene carbonate, propylene carbonate, dimethyl carbonate, and ethylmethyl carbonate, a combination of monofluoroethylene carbonate, ethylene carbonate, propylene carbonate, dimethyl carbonate, and ethylmethyl carbonate, a combination of monofluoroethylene carbonate, ethylene carbonate, diethyl carbonate, and ethylmethyl carbonate, a combination of monofluoroethylene carbonate, propylene carbonate, diethyl carbonate, and ethylmethyl carbonate, a combination of monofluoroethylene carbonate, ethylene carbonate, propylene carbonate, diethyl carbonate, and ethylmethyl carbonate, a combination of monofluoroethylene carbonate, ethylene carbonate, dimethyl carbonate, diethyl carbonate, and ethylmethyl carbonate, a combination of monofluoroethylene carbonate, propylene carbonate, dimethyl carbonate, diethyl carbonate, and ethylmethyl carbonate, or a combination of monofluoroethylene carbonate, ethylene carbonate, propylene carbonate, dimethyl carbonate, diethyl carbonate, and ethylmethyl carbonate is preferred because the resultant non-aqueous electrolyte secondary battery has excellent balance between the cycle characteristics and the large-current discharge characteristics. Of these, preferred is the combination wherein the asymmetric linear carbonate is ethylmethyl carbonate, or the alkyl group of the linear carbonate has 1 to 2 carbon atoms.

When ethylmethyl carbonate is contained in the non-aqueous solvent, the proportion of ethylmethyl carbonate to the whole non-aqueous solvent is preferably 10% by volume or more, more preferably 20% by volume or more, further preferably 25% by volume or more, especially preferably 30% by volume or more, and is preferably 95% by volume or less, more preferably 90% by volume or less, further preferably 85% by volume or less, especially preferably 80% by volume or less. When the ethylmethyl carbonate is contained in the proportion in the above range, the resultant non-aqueous electrolyte secondary battery is likely to have improved load characteristics.

In the combination of mainly a cyclic carbonate having a fluorine atom and a linear carbonate, solvents other than the cyclic carbonate having no fluorine atom, such as a cyclic carboxylate, a linear carboxylate, a cyclic ether, a linear ether, a sulfur-containing organic solvent, a phosphorus-containing organic solvent, and a fluorine-containing aromatic solvent, may be mixed.

<In the Case where the Cyclic Carbonate Having a Fluorine Atom is Used as a Specific Additive>

In the present invention, when the cyclic carbonate having a fluorine atom is used as a specific additive as described in 1-2. above, the above-exemplified non-aqueous solvents other than the cyclic carbonate having a fluorine atom may be used individually, or two or more types of the above-exemplified non-aqueous solvents other than the cyclic carbonate having a fluorine atom may be used in an arbitrary combination and in an arbitrary ratio.

For example, as a preferred combination of the non-aqueous solvents, there can be mentioned a combination of mainly a cyclic carbonate having no fluorine atom and a linear carbonate.

Especially, an advantageous combination is such that the proportion of the total of the cyclic carbonate having no fluorine atom and the linear carbonate to the whole non-aqueous solvent is preferably 70% by volume or more, more preferably 80% by volume or more, further preferably 90% by volume or more, and the proportion of the cyclic carbonate having no fluorine atom to the total of the cyclic carbonate and the linear carbonate is preferably 5% by volume or more, more preferably 10% by volume or more, further preferably 15% by volume or more, and is preferably 50% by volume or less, more preferably 35% by volume or less, further preferably 30% by volume or less, especially preferably 25% by volume or less.

When the above combination of the non-aqueous solvents is used, a non-aqueous electrolyte secondary battery produced using the combination of the non-aqueous solvents is likely to have excellent balance between the cycle characteristics and the high-temperature storage characteristics (particularly, residual capacity and high-load discharge capacity after stored at a high temperature).

Examples of preferred specific combinations of a cyclic carbonate having no fluorine atom and a linear carbonate include a combination of ethylene carbonate and dimethyl carbonate, a combination of ethylene carbonate and diethyl carbonate, a combination of ethylene carbonate and ethylmethyl carbonate, a combination of ethylene carbonate, dimethyl carbonate, and diethyl carbonate, a combination of ethylene carbonate, dimethyl carbonate, and ethylmethyl carbonate, a combination of ethylene carbonate, diethyl carbonate, and ethylmethyl carbonate, a combination of ethylene carbonate, dimethyl carbonate, diethyl carbonate, and ethylmethyl carbonate, a combination of propylene carbonate and ethylmethyl carbonate, a combination of propylene carbonate, ethylmethyl carbonate, and diethyl carbonate, and a combination of propylene carbonate, ethylmethyl carbonate, and dimethyl carbonate.

Among the combinations of a cyclic carbonate having no fluorine atom and a linear carbonate, those containing an asymmetric linear alkyl carbonate as a linear carbonate are further preferred. Especially, a combination of ethylene carbonate and ethylmethyl carbonate, a combination of propylene carbonate and ethylmethyl carbonate, a combination of ethylene carbonate, ethylmethyl carbonate, and dimethyl carbonate, a combination of ethylene carbonate, ethylmethyl carbonate, and diethyl carbonate, a combination of propylene carbonate, ethylmethyl carbonate, and dimethyl carbonate, and a combination of propylene carbonate, ethylmethyl carbonate, and diethyl carbonate are preferred because the resultant non-aqueous electrolyte secondary battery has excellent balance between the cycle characteristics and the large-current discharge characteristics.

Of these, preferred is the combination wherein the asymmetric linear carbonate is ethylmethyl carbonate, or the alkyl group of the linear carbonate has 1 to 2 carbon atoms.

When dimethyl carbonate is contained in the non-aqueous solvent, the proportion of dimethyl carbonate to the whole non-aqueous solvent is preferably 10% by volume or more, more preferably 20% by volume or more, further preferably 25% by volume or more, especially preferably 30% by volume or more, and is preferably 90% by volume or less, more preferably 80% by volume or less, further preferably 75% by volume or less, especially preferably 70% by volume or less. When dimethyl carbonate is contained in the proportion in the above range, the resultant non-aqueous electrolyte secondary battery is likely to have improved load characteristics.

Especially, when dimethyl carbonate and ethylmethyl carbonate are contained and the amount of the dimethyl carbonate contained is larger than the amount of the ethylmethyl carbonate contained, it is likely that the battery characteristics after stored at a high temperature are improved while maintaining the electrical conductivity of the non-aqueous electrolytic solution. For this reason, the combination of carbonates having the above-mentioned amounts of the carbonates is preferred.

In the non-aqueous solvent, from the viewpoint of the improvement of the electrical conductivity of the non-aqueous electrolytic solution and improvement of the battery characteristics after storage, the volume ratio of dimethyl carbonate to ethylmethyl carbonate (dimethyl carbonate/ ethylmethyl carbonate) is preferably 1.1 or more, more preferably 1.5 or more, further preferably 2.5 or more. From the viewpoint of the improvement of the battery characteristics, the volume ratio (dimethyl carbonate/ethylmethyl carbonate) is preferably 40 or less, more preferably 20 or less, further preferably 10 or less, especially preferably 8 or less.

In the combination of mainly a cyclic carbonate having no fluorine atom and a linear carbonate, other solvents, such as a cyclic carboxylate, a linear carboxylate, a cyclic ether, a linear ether, a sulfur-containing organic solvent, a phosphorus-containing organic solvent, and a fluorine-containing aromatic solvent, may be mixed.

In the present specification, with respect to the volume of a non-aqueous solvent, a value of volume measured at 25° C. is used. However, with respect to a non-aqueous solvent which is in a solid state at 25° C., such as ethylene carbonate, a value of volume measured at the melting temperature of a non-aqueous solvent is regarded as a volume of the non-aqueous solvent.

1-5. Auxiliary

In the non-aqueous electrolytic solution of the present invention, in addition to the compound represented by the general formula (A) and the specific additive, an auxiliary may be appropriately used according to the purpose. Examples of auxiliaries include the below-shown compounds having a triple bond and other auxiliaries.

1-5-1. Compound Having a Triple Bond

With respect to the type of the compound having a triple bond, there is no particular limitation as long as it is a compound having one or more triple bonds in the molecule thereof.

As specific examples of compounds having a triple bond, there can be mentioned the following compounds:

hydrocarbon compounds, such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene, and dicyclohexylacetylene;

monocarbonates, such as 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, di-2-propynyl carbonate, 1-methyl-2-propynylmethyl carbonate, 1,1-dimethyl-2-propynylmethyl carbonate, 2-butynylmethyl carbonate, 3-butynylmethyl carbonate, 2-pentynylmethyl carbonate, 3-pentynylmethyl carbonate, and 4-pentynylmethyl carbonate;

dicarbonates, such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate, and 2-butyne-1,4-diol dicyclohexyl dicarbonate;

monocarboxylates, such as 2-propynyl acetate, 2-propynyl propionate, 2-propynyl butyrate, 2-propynyl benzoate, 2-propynyl cyclohexylcarboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexylcarboxylate, 2-butynyl acetate, 3-butynyl acetate, 2-pentynyl acetate, 3-pentynyl acetate, 4-pentynyl acetate, methyl 2-propynoate, ethyl 2-propynoate, propyl 2-propynoate, vinyl 2-propynoate, 2-propenyl 2-propynoate, 2-butenyl 2-propynoate, 3-butenyl 2-propynoate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate, and 3-butenyl 4-pentynoate;

dicarboxylates, such as 2-butyne-1,4-diol diacetate, 2-butyne-1,4-diol dipropionate, 2-butyne-1,4-diol dibutyrate, 2-butyne-1,4-diol dibenzoate, and 2-butyne-1,4-diol dicyclohexanecarboxylate;

oxalic acid diesters, such as methyl 2-propynyl oxalate, ethyl 2-propynyl oxalate, propyl 2-propynyl oxalate, 2-propynyl vinyl oxalate, allyl 2-propynyl oxalate, di-2-propynyl oxalate, 2-butynyl methyl oxalate, 2-butynyl ethyl oxalate, 2-butynyl propyl oxalate, 2-butynyl vinyl oxalate, allyl 2-butyryl oxalate, di-2-butynyl oxalate, 3-butynyl methyl oxalate, 3-butynyl ethyl oxalate, 3-butynyl propyl oxalate, 3-butynyl vinyl oxalate, allyl 3-butynyl oxalate, and di-3-butynyl oxalate;

phosphine oxides, such as methyl(2-propynyl)(vinyl)phosphine oxide, divinyl(2-propynyl)phosphine oxide, di(2-propynyl)(vinyl)phosphine oxide, di(2-propenyl) (2-propynyl)phosphine oxide, di(2-propynyl)(2-propenyl)phosphine oxide, di(3-butenyl)(2-propynyl)phosphine oxide, and di(2-propynyl)(3-butenyl)phosphine oxide;

phosphinates, such as 2-propynyl methyl(2-propenyl) phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl (methyl)phosphinate, 1,1-dimethyl-2-propynyl di(2-propenyl)phosphinate, 1,1-dimethyl-2-propynyl di(3-butenyephosphinate, 2-propenyl methyl(2-propynyl) phosphinate, 3-butenyl methyl(2-propynyl)phosphinate, 2-propenyl di(2-propynyl)phosphinate, 3-butenyl di(2-propynyl)phosphinate, 2-propenyl 2-propynyl(2-propenyl) phosphinate, and 3-butenyl 2-propynyl(2-propenyl)phosphinate;

phosphonates, such as methyl 2-propynyl 2-propenylphosphonate, methyl(2-propynyl) 2-butenylphosphonate, (2-propynyl)(2-propenyl) 2-propenylphosphonate, (3-butenyl)(2-propynyl) 3-butenylphosphonate, (1,1-dimethyl-2-propynyl)(methyl) 2-propenylphosphonate, (1,1-dimethyl-2-propynyl)(methyl) 2-butenylphosphonate, (1,1-dimethyl-2-propynyl)(2-propenyl) 2-propenylphosphonate, (3-butenyl)(1,1-dimethyl-2-propynyl) 3-butenylphosphonate, (2-propynyl)(2-propenyl) methylphosphonate, (3-butenyl)(2-propynyl) methylphosphonate, (1,1-dimethyl-2-propynyl)(2-propenyl) methylphosphonate, (3-butenyl)(1,1-dimethyl-2-propynyl) methylphosphonate, (2-propynyl)(2-propenyl) ethylphosphonate, (3-butenyl)(2-propynyl) ethylphosphonate, (1,1-dimethyl-2-propynyl)(2-propenyl) ethylphosphonate, and (3-butenyl)(1,1-dimethyl-2-propynyl) ethylphosphonate; and phosphates, such as (methyl)(2-propenyl)(2-propynyl) phosphate, (ethyl)(2-propenyl)(2-propynyl) phosphate, (2-butenyl)(methyl)(2-propynyl) phosphate, (2-butenyl) (ethyl)(2-propynyl) phosphate, (1,1-dimethyl-2-propynyl) (methyl)(2-propenyl) phosphate, (1,1-dimethyl-2-propynyl) (ethyl)(2-propenyl) phosphate, (2-butenyl)(1,1-dimethyl-2-propynyl)(methyl) phosphate, and (2-butenyl)(ethyl)(1,1-dimethyl-2-propynyl) phosphate.

Of these, compounds having an alkynyloxy group are preferred because they more stably form a negative electrode film in the non-aqueous electrolytic solution.

Further, from the viewpoint of the improvement of the storage characteristics, especially preferred are compounds, such as 2-propynylmethyl carbonate, di-2-propynyl carbonate, 2-butyne-1,4-diol dimethyl dicarbonate, 2-propynyl acetate, 2-butyne-1,4-diol diacetate, methyl 2-propynyl oxalate, and di-2-propynyl oxalate.

The compounds having a triple bond may be used individually, or two or more types of the compounds having a triple bond may be used in an arbitrary combination and in an arbitrary ratio. With respect to the amount of the compound having a triple bond incorporated into the non-aqueous electrolytic solution of the present invention, there is no particular limitation, and the amount of the compound having a triple bond is arbitrary as long as the effects of the present invention are not markedly sacrificed. The amount of the incorporated compound having a triple bond, based on the mass of the non-aqueous electrolytic solution of the present invention, is generally 0.01% by mass or more, preferably 0.05% by mass or more, more preferably 0.1% by mass or more, and is generally 5% by mass or less, preferably 3% by mass or less, more preferably 1% by mass or less. When the amount of the incorporated compound having a triple bond satisfies the above-mentioned range, effects for, for example, output characteristics, load characteristics, cycle characteristics, and high-temperature storage characteristics of the non-aqueous electrolyte secondary battery are further improved.

1-5-2. Other Auxiliaries

As other auxiliaries, known auxiliaries other than the above-mentioned specific additive, fluorinated unsaturated cyclic carbonate, and compound having a triple bond can be used. Examples of other auxiliaries include:

carbonate compounds, such as erythritan carbonate, spirobis-dimethylene carbonate, and methoxyethyl-methyl carbonate;

spiro compounds, such as 2,4,8,10-tetraoxaspiro[5.5]undecane and 3,9-divinyl-2,4,8,10-tetraoxaspiro[5.5]undecane;

sulfur-containing compounds, such as ethylene sulfite, methyl fluorosulfonate, ethyl fluorosulfonate, methyl methanesulfonate, ethyl methanesulfonate, busulfane, sulfolene, diphenyl sulfone, N,N-dimethylmethanesulfonamide, N,N-diethylmethanesulfonamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane;

nitrogen-containing compounds, such as 1-methyl-2-pyrrolidinone, 1-methyl-2-piperidone, 3-methyl-2-oxazolidinone, 1,3-dimethyl-2-imidazolidinone, and N-methylsuccinimide;

phosphorus-containing compounds, such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, methyl dimethylphosphinate, ethyl diethylphosphinate, trimethylphosphine oxide, and triethylphosphine oxide;

hydrocarbon compounds, such as heptane, octane, nonane, decane, and cycloheptane; and fluorine-containing aromatic compounds, such as fluorobenzene, difluorobenzene, hexafluorobenzene, and benzotrifluoride. These auxiliaries may be used individually or in combination. By adding the above auxiliary to the non-aqueous electrolytic solution, the non-aqueous electrolyte secondary battery can be improved in the capacity maintaining characteristics after high-temperature storage and cycle characteristics.

With respect to the amount of the other auxiliary incorporated, there is no particular limitation, and the amount of the other auxiliary is arbitrary as long as the effects of the present invention are not markedly sacrificed. The amount of the other auxiliary incorporated, based on the mass of the non-aqueous electrolytic solution (100% by mass), is preferably 0.01% by mass or more, and is generally 5% by mass or less. When the amount of the other auxiliary incorporated is in the above range, the other auxiliary is likely to satisfactorily exhibit an effect, and it is easy to avoid a problem in that, for example, characteristics of the non-aqueous electrolyte secondary battery, such as high-load discharge characteristics, become poor.

Hereinabove, the non-aqueous electrolytic solution of the present invention was described, but the above-described non-aqueous electrolytic solution includes a mode of a non-aqueous electrolytic solution which is present inside the non-aqueous electrolyte secondary battery of the present invention.

The mode of a non-aqueous electrolytic solution which is present inside the non-aqueous electrolyte secondary battery is specifically, for example, a mode of a non-aqueous electrolytic solution present inside a non-aqueous electrolyte battery which is obtained by separately synthesizing individual constituents of the non-aqueous electrolytic solution, such as an electrolyte, a non-aqueous solvent, and a specific additive, and preparing a non-aqueous electrolytic solution from the substantially isolated constituents, and injecting the prepared non-aqueous electrolytic solution into a battery separately assembled by the method mentioned below; a mode of a non-aqueous electrolytic solution present inside a non-aqueous electrolyte secondary battery in which individual constituents of the non-aqueous electrolytic solution of the present invention are placed in the battery and mixed together in the battery so that the same composition as that of the non-aqueous electrolytic solution of the present invention is obtained inside the battery; or a mode of a non-aqueous electrolytic solution present inside a non-aqueous electrolyte secondary battery in which the compounds constituting the non-aqueous electrolytic solution of the present invention are caused to be generated in the non-aqueous electrolyte secondary battery so that the same composition as that of the non-aqueous electrolytic solution of the present invention is obtained.

2. Construction of a Battery

The non-aqueous electrolytic solution of the present invention is advantageously used as an electrolytic solution for a non-aqueous electrolyte secondary battery, especially for, for example, a lithium secondary battery. Hereinbelow, a non-aqueous electrolyte secondary battery using the non-aqueous electrolytic solution of the present invention will be described.

The non-aqueous electrolyte secondary battery of the present invention can employ a known structure, and typically comprises a negative electrode and a positive electrode each being capable of having occluded therein and releasing metal ions (for example, lithium ions), and the above-described non-aqueous electrolytic solution of the present invention. Hereinbelow, the negative electrode, the positive electrode, and the other constituents of the non-aqueous electrolyte secondary battery will be described in this order.

2-1. Negative Electrode

A negative electrode active material used in the negative electrode is described below. With respect to the negative electrode active material, there is no particular limitation as long as it is capable of electrochemically having occluded therein and releasing metal ions. Specific examples of negative electrode active materials include materials having carbon as a constituent element, such as carbonaceous materials, and alloy materials. These materials may be used individually or in combination arbitrarily.

<Negative Electrode Active Material>

Examples of negative electrode active materials include carbonaceous materials and alloy materials as mentioned above.

Examples of the carbonaceous materials include (1) natural graphite, (2) artificial graphite, (3) amorphous carbon, (4) carbon-coated graphite, (5) graphite-coated graphite, and (6) resin-coated graphite.

(1) Examples of natural graphite include scale graphite, flake graphite, soil graphite and/or graphite particles obtained by subjecting the above graphite as a raw material to, for example, sphere forming treatment or densifying treatment. Among these, from the viewpoint of the filling properties of particles and the charge-discharge rate characteristics, especially preferred is graphite of a spherical shape or an ellipsoidal shape which has been subjected to sphere forming treatment.

As an apparatus used for performing a sphere forming treatment, there can be used, for example, an apparatus that repeatedly exerts to particles a mechanical action, such as a compression, friction, or shearing force, which is mainly an impact force and includes an interaction between the particles.

Specifically, preferred is an apparatus which has in a casing a rotor having disposed thereon a number of blades, and which performs a sphere forming treatment by rotating the rotor at a high speed to exert a mechanical action, such as an impact compression, friction, or shearing force, to a raw material for natural graphite (1) introduced into the apparatus. Further, the apparatus preferably has a mechanism that circulates the raw material so as to repeatedly exert a mechanical action to the material.

For example, when a sphere forming treatment is performed using the above-mentioned apparatus, the circumferential velocity of the rotating rotor is set at preferably 30 to 100 m/second, more preferably 40 to 100 m/second, further preferably 50 to 100 m/second. Further, the sphere forming treatment can be made merely by passing the raw material through the apparatus. However, the treatment is preferably performed by circulating the raw material through or allowing the raw material to reside in the apparatus for 30 seconds or more, more preferably performed by circulating the raw material through or allowing the raw material to reside in the apparatus for one minute or more.

(2) Examples of artificial graphite include ones which are produced by graphitizing an organic compound, such as coal tar pitch, a coal heavy oil, an atmospheric residual oil, a petroleum heavy oil, an aromatic hydrocarbon, a nitrogen-containing cyclic compound, a sulfur-containing cyclic compound, polyphenylene, polyvinyl chloride, polyvinyl alcohol, polyacrylonitrile, polyvinyl butyral, a natural polymer, polyphenylene sulfide, polyphenylene oxide, a furfuryl alcohol resin, a phenol-formaldehyde resin, or an imide resin, at a temperature generally in the range of from 2,500 to 3,200° C., and, if necessary, subjecting the resultant material to pulverization and/or classification.

In the above graphitization, for example, a silicon-containing compound or a boron-containing compound can be used as a graphitizing catalyst. In addition, there can be mentioned artificial graphite obtained by graphitizing mesocarbon microbeads separated during the heat treatment for pitch. Further, there can be mentioned artificial graphite of granulated particles comprising primary particles. Examples of such artificial graphite particles include graphite particles having a plurality of flattened-shaped particles which are gathered or bonded together so that the orientation planes of the particles are not parallel to each other, wherein the graphite particles are obtained by mixing together a graphitizable carbonaceous material powder, such as mesocarbon microbeads or coke, a graphitizable binder, such as tar or pitch, and a graphitizing catalyst, and graphitizing the resultant mixture and, if necessary, subjecting the resultant material to pulverization.

(3) Examples of amorphous carbon include amorphous carbon particles obtained by subjecting a graphitizable carbon precursor, such as tar or pitch, as a raw material to heat treatment once or more times in a temperature region in which the material is not graphitized (in the range of from 400 to 2,200° C.), and amorphous carbon particles obtained by subjecting a non-graphitizable carbon precursor, such as a resin, as a raw material to heat treatment.

(4) As an example of carbon-coated graphite, there can be mentioned one which is obtained as follows. Natural graphite and/or artificial graphite, and a carbon precursor which is an organic compound, such as tar, pitch, or a resin, are mixed together, and the resultant mixture is subjected to heat treatment once or more times at a temperature in the range of from 400 to 2,300° C. The resultant natural graphite and/or artificial graphite as nucleus graphite is coated with amorphous carbon to obtain a carbon-graphite composite. As an example of carbon-coated graphite (4), there can be mentioned the obtained carbon-graphite composite.

The form of the composite may be a form in which all of or part of the surface of nucleus graphite is coated with amorphous carbon, and may be a form in which the composite is formed from a plurality of graphite primary particles bound using carbon derived from the above carbon precursor as a binder. Alternatively, the above carbon-graphite composite can be obtained by reacting natural graphite and/or artificial graphite with a hydrocarbon gas, such as benzene, toluene, methane, propane, or an aromatic volatile component, at a high temperature to deposit carbon on the surface of the graphite (CVD).

(5) As an example of graphite-coated graphite, there can be mentioned one which is obtained as follows. Natural graphite and/or artificial graphite, and a carbon precursor which is a graphitizable organic compound, such as tar, pitch, or a resin, are mixed together, and the resultant mixture is subjected to heat treatment once or more times at a temperature in the range of from about 2,400 to 3,200° C. All of or part of the surface of the resultant natural graphite and/or artificial graphite as nucleus graphite is coated with a graphitization product to obtain graphite-coated graphite (5).

(6) Resin-coated graphite is obtained by, for example, mixing together natural graphite and/or artificial graphite and, for example, a resin, and drying the resultant mixture at a temperature lower than 400° C., and coating the resultant natural graphite and/or artificial graphite as nucleus graphite with, for example, a resin.

The above-described carbonaceous materials (1) to (6) may be used individually, or two or more types of the carbonaceous materials may be used in an arbitrary combination and in an arbitrary ratio.

Examples of organic compounds used for producing the carbonaceous materials (2) to (5) above, such as tar, pitch, and a resin, include carbonizable organic compounds selected from the group consisting of a coal heavy oil, a straight-run heavy oil, a cracked petroleum heavy oil, an aromatic hydrocarbon, an N-ring compound, an S-ring compound, polyphenylene, an organic synthetic polymer, a natural polymer, a thermoplastic resin, and a thermosetting resin. Further, for adjusting the viscosity of the raw material organic compound being mixed, the raw material organic compound may be dissolved in a low-molecular organic solvent.

With respect to the natural graphite and/or artificial graphite which is used as a raw material for the nucleus graphite, natural graphite which has been subjected to sphere forming treatment is preferred.

With respect to the alloy material used as a negative electrode active material, there is no particular limitation as long as it is capable of having occluded therein and releasing lithium, and any of lithium simple substance, a metal simple substance or alloy forming an alloy together with lithium, and a compound thereof, such as an oxide, a carbide, a nitride, a silicide, a sulfide, or a phosphide, may be used. With respect to the metal simple substance or alloy forming an alloy together with lithium, preferred are materials containing a metal or semi-metal element belonging to Group 13 or 14 of the Periodic Table (namely, excluding carbon), more preferred are metal simple substances of aluminum, silicon, and tin and alloys or compounds containing these atoms, and further preferred are materials having silicon or tin as a constituent element, such as metal simple substances of silicon and tin and alloys or compounds containing these atoms.

These materials may be used individually, or two or more types of the materials may be used in an arbitrary combination and in an arbitrary ratio.

<Physical Properties of a Carbonaceous Material>

When a carbonaceous material is used as the negative electrode active material, the carbonaceous material desirably has the physical properties mentioned below.

(X-Ray Parameter)

With respect to the carbonaceous material, the d value (distance between layers) on the lattice plane (002 plane) as determined by X-ray diffraction in accordance with a Gakushin method is generally 0.335 nm or more, and is generally 0.360 nm or less, preferably 0.350 nm or less, further preferably 0.345 nm or less. Further, the crystallite size (Lc) of the carbonaceous material as determined by X-ray diffraction in accordance with a Gakushin method is preferably 1.0 nm or more, further preferably 1.5 nm or more.

(Volume-Based Average Particle Diameter)

The volume-based average particle diameter of the carbonaceous material is a volume-based average particle diameter (median diameter) as determined by a laser diffraction/scattering method, and is generally 1 μm or more, preferably 3 μm or more, further preferably 5 μm or more, especially preferably 7 μm or more, and is generally 100 μm or less, preferably 50 μm or less, more preferably 40 μm or less, further preferably 30 μm or less, especially preferably 25 μm or less.

When the volume-based average particle diameter of the carbonaceous material is smaller than the above range, the resultant non-aqueous electrolyte secondary battery is likely to be increased in irreversible capacity to cause a loss of the initial battery capacity. On the other hand, when the volume-based average particle diameter of the carbonaceous material is larger than the above range, a non-uniform coating surface is likely to be formed in the preparation of (a negative electrode active material layer of) an electrode by application and this is not desirable in view of the battery production process.

The measurement of a volume-based average particle diameter is conducted using a laser diffraction/scattering-type particle size distribution meter (for example, LA-700, manufactured by HORIBA, Ltd.) with respect to a carbonaceous material dispersed in a 0.2% by mass aqueous solution (about 10 mL) of polyoxyethylene (20) sorbitan monolaurate which is a surfactant. The median diameter determined by the above measurement is defined as a volume-based average particle diameter of the carbonaceous material.

(Raman R value)

The Raman R value of the carbonaceous material is a value measured using a laser Raman spectrum method, and is generally 0.01 or more, preferably 0.03 or more, further preferably 0.1 or more, and is generally 1.5 or less, preferably 1.2 or less, further preferably 1.0 or less, especially preferably 0.5 or less.

When the Raman R value of the carbonaceous material is smaller than the above range, the surface of the particles is likely to be extremely highly crystalline, so that sites between the layers which Li goes into are reduced due to charging and discharging of the non-aqueous electrolyte secondary battery. That is, the charge acceptance properties of the battery are likely to deteriorate. Further, when the negative electrode is increased in density by applying the negative electrode material containing the carbonaceous material onto a current collector and then pressing it, the crystals are likely to be oriented in the direction parallel to the electrode plate, so that the load characteristics of the battery become poor.

On the other hand, when the Raman R value of the carbonaceous material is larger than the above range, the crystalline properties of the surface of the particles are likely to be poor, so that the reactivity of the particles with the non-aqueous electrolytic solution increases to lower the efficiency of the battery and increase the gas generation.

The measurement of a Raman spectrum is conducted using a Raman spectrometer (for example, Raman Spectrometer, manufactured by JASCO Corporation) by allowing a sample (carbonaceous material) to freely fall in a measurement cell so as to fill the cell with the sample and, while irradiating the surface of the sample in the cell with an argon-ion laser (or a semiconductor laser), rotating the cell within the plane perpendicular to the laser. With respect to the obtained Raman spectrum, intensity IA of peak PA appearing at around 1,580 cm$^{-1}$ and intensity IB of peak PB appearing at around 1,360 cm$^{-1}$ are measured, and intensity ratio R (R=IB/IA) is determined by calculation. The Raman R value determined by the above measurement is defined as a Raman R value of the carbonaceous material.

Conditions for the above Raman measurement are as follows.

Wavelength of laser:
Ar ion laser: 514.5 nm (semiconductor laser: 532 nm)
Measuring range: 1,100 to 1,730 cm$^{-1}$
Raman R value: Background processing
Smoothing processing: Simple average, convolution 5 points (BET Specific Surface Area)

The BET specific surface area of the carbonaceous material is a value of a specific surface area measured using a BET method, and is generally 0.1 m$^2 \cdot$g$^{-1}$ or more, preferably 0.7 m$^2 \cdot$g$^{-1}$ or more, further preferably 1.0 m$^2 \cdot$g$^{-1}$ or more, especially preferably 1.5 m$^2 \cdot$g$^{-1}$ or more, and is generally 100 m$^2 \cdot$g$^{-1}$ or less, preferably 25 m$^2 \cdot$g$^{-1}$ or less, further preferably 15 m$^2 \cdot$g$^{-1}$ or less, especially preferably 10 m$^2 \cdot$g$^{-1}$ or less.

When the value of the BET specific surface area of the carbonaceous material is smaller than the above range, lithium is unlikely to be accepted during charging of the non-aqueous electrolyte secondary battery using such a carbonaceous material as a negative electrode material, so that lithium is likely to be deposited on the surface of the electrode, causing the stability of the battery to be poor. On the other hand, when the BET specific surface area of the carbonaceous material is larger than the above range, the reactivity with the non-aqueous electrolytic solution in the non-aqueous electrolyte secondary battery using such a carbonaceous material as a negative electrode material is likely to be enhanced to increase gas generation, making it difficult to obtain a preferred battery.

The measurement of a specific surface area by a BET method is conducted using a surface area meter (for example, Fully-automatic surface area measurement apparatus, manufactured by Ohkura Riken Inc.) by subjecting a sample (carbonaceous material) to predrying under a nitrogen gas flow at 350° C. for 15 minutes, and then making a measurement in accordance with a nitrogen adsorption BET single-point method by a gas flow method using a nitrogen-helium mixed gas accurately prepared so that the nitrogen pressure relative to atmospheric pressure becomes 0.3.

(Roundness)

When a roundness is measured as the degree of sphere of the carbonaceous material, the roundness preferably falls within the range shown below. The roundness is defined by "Roundness=(Length of the circumference of the particle equivalent circle having the same area as that of the projected particle shape)/(Length of the actual circumference of the projected particle shape)", and, when the material has a roundness of 1, it is theoretically a true sphere.

The roundness of the particles of the carbonaceous material having a particle diameter in the range of from 3 to 40 μm is desirably close to 1, and is preferably 0.1 or more, preferably 0.5 or more, more preferably 0.8 or more, further preferably 0.85 or more, especially preferably 0.9 or more. The larger the roundness, the more the high current-density charge-discharge characteristics of non-aqueous electrolyte secondary battery are improved. Therefore, when the roundness of the carbonaceous material is smaller than the above range, the filling properties of the negative electrode active material are likely to become poor to increase the resistance between the particles, so that the short-time, high current-density charge-discharge characteristics of the battery become poor.

The measurement of a roundness is conducted using a flow-type particle image analyzer (for example, FPIA, manufactured by Sysmex Corporation). About 0.2 g of a sample (carbonaceous material) is dispersed in a 0.2% by mass aqueous solution (about 50 mL) of polyoxyethylene (20) sorbitan monolaurate which is a surfactant, and irradiated with ultrasonic waves with 28 kHz at a power of 60 W for one minute and then, a detection range of from 0.6 to 400 μm is designated, and a roundness is measured with respect to the particles having a particle diameter in the range from 3 to 40 μm.

With respect to the method for improving the roundness, there is no particular limitation. However, preferred are particles of the carbonaceous material which have been subjected to sphere forming treatment so as to be spherical because an electrode formed from such particles is advantageous in that the shapes of voids between the particles are uniform, and thus the improvement of the roundness by a sphere forming treatment is preferred. As examples of the sphere forming treatments, there can be mentioned a method in which a shearing force or a compressive force is applied to particles to mechanically force them to be close to a sphere, and a mechanical or physical treatment method in which a plurality of microparticles are subjected to granulation using a binder or an adhesive force of the particles themselves.

(Tap Density)

The tap density of the carbonaceous material is generally 0.1 g·cm$^{-3}$ or more, preferably 0.5 g·cm$^{-3}$ or more, further preferably 0.7 g·cm$^{-3}$ or more, especially preferably 1 g·cm$^{-3}$ or more, and is preferably 2 g·cm$^{-3}$ or less, further preferably 1.8 g·cm$^{-3}$ or less, especially preferably 1.6 g·cm$^{-3}$ or less. When the tap density of the carbonaceous material is smaller than the above range, the filling density of the negative electrode active material in the negative electrode prepared using the carbonaceous material is unlikely to be increased, making it difficult to obtain a non-aqueous electrolyte secondary battery having high capacity. On the other hand, when the tap density of the carbonaceous material is larger than the above range, the voids between the particles in the electrode are markedly reduced in size, and the conductivity between the particles is unlikely to be secured, making it difficult to obtain preferred battery characteristics.

The measurement of a tap density is conducted as follows. A sample (carbonaceous material) is passed through a sieve having a sieve opening of 300 μm, and allowed to fall in a 20 cm$^3$ tapping cell to fill the cell with the sample so that the sample reaches the upper end surface of the cell. Then, using a powder density measurement apparatus (for example, Tap Denser, manufactured by Seishin Enterprise Co., Ltd.), the cell filled with the sample is subjected to 1,000-time tapping with a stroke length of 10 mm, and a tap density is determined by making a calculation from a volume measured at that time and the mass of the sample.

(Orientation Ratio)

The orientation ratio of the carbonaceous material is generally 0.005 or more, preferably 0.01 or more, further preferably 0.015 or more, and is generally 0.67 or less. When the orientation ratio of the carbonaceous material is smaller than the above range, the high current-density charge-discharge characteristics of the non-aqueous electrolyte secondary battery may become poor. The above-mentioned upper limit of the range is the theoretical upper limit of the orientation ratio of the carbonaceous material.

An orientation ratio is measured by X-ray diffraction with respect to a sample (carbonaceous material) which has been subjected to press molding. A molding machine having a diameter of 17 mm is filled with 0.47 g of a sample, and the sample is compressed at 58.8 MN·m$^{-2}$, and the resultant molded material is set using clay so as to be on the same plane as the plane of a sample holder for measurement, and subjected to X-ray diffraction measurement. From the obtained peak intensities of the (110) diffraction and (004) diffraction of carbon, an orientation ratio represented by (110) diffraction peak intensity/(004) diffraction peak intensity is determined by calculation.

Conditions for the X-ray diffraction measurement are as follows. "2θ" indicates an angle of diffraction.

Target: Cu (Kα-line) graphite monochromator
Slit:
 Divergence slit=0.5°
 Receiving slit=0.15 mm
 Scatter slit=0.5°
Measuring range and step angle/measuring time:
 (110) plane: 75°≤2θ≤80° 1°/60 seconds
 (004) plane: 52°≤2θ≤57° 1°/60 seconds (Aspect Ratio (Powder))

The aspect ratio of the carbonaceous material is generally 1 or more, and is generally 10 or less, preferably 8 or less, further preferably 5 or less. When the aspect ratio of the carbonaceous material is larger than the above range, it is likely that a streak line occurs upon forming an electrode plate or a uniform coating surface is not obtained, so that the high current-density charge-discharge characteristics of the non-aqueous electrolyte secondary battery become poor. The above-mentioned lower limit of the range is the theoretical lower limit of the aspect ratio of the carbonaceous material.

The aspect ratio is measured by observing the particles of carbonaceous material magnified by means of a scanning electron microscope. 50 Arbitrary carbonaceous material particles fixed to the edge face of a metal having a thickness of 50 μm or less are selected. The selected particles are individually three-dimensionally observed while rotating and slanting the stage having the particles fixed thereto. Diameter A, which is the largest diameter of the carbonaceous material particle, and diameter B, which is the shortest diameter perpendicular to diameter A, are measured. Then, an average of the A/B values with respect to the 50 particles is determined.

<Metal Particles Capable of Forming an Alloy Together with Li>

When a simple substance metal or alloy forming an alloy together with lithium, or a compound, such as an oxide, carbide, nitride, silicide, sulfide, or phosphide of the above metal or alloy, is used as a negative electrode active material, the metal capable of forming an alloy together with Li is in the form of particles. As examples of methods for confirming that the metal particles are metal particles capable of forming an alloy together with Li, there can be mentioned identification of a metal particle phase by X-ray diffraction, examination of the particle structure and elemental analysis by means of an electron microscope, and elemental analysis by fluorescent X-ray.

With respect to the metal particles capable of forming an alloy together with Li, any of those which are conventionally known can be used. However, from the viewpoint of the capacity and cycle life of the non-aqueous electrolyte secondary battery, the metal particles are preferably, for example, a metal selected from the group consisting of Fe, Co, Sb, Bi, Pb, Ni, Ag, Si, Sn, Al, Zr, Cr, P, S, V, Mn, As, Nb, Mo, Cu, Zn, Ge, In, Ti, and W, or a compound thereof. An alloy of two or more metals may be used, and the metal particles may be alloy particles formed from two or more metal elements. Of these, preferred is a metal selected from the group consisting of Si, Sn, As, Sb, Al, Zn, and W or a metal compound thereof.

Examples of the metal compounds include metal oxides, metal nitrides, and metal carbides. An alloy of two or more metals may be used.

Among the metal particles capable of forming an alloy together with Li, Si or a Si metal compound is preferred. The Si metal compound is preferably a Si metal oxide. Si or a Si metal compound is preferred from the viewpoint of increasing the capacity of the battery. In the present specification, Si and Si metal compounds are collectively referred to as "Si compound". Specific examples of Si compounds include $SiO_x$, $SiN_x$, $SiC_x$, and $SiZ_xO_y$ (Z=C, N). The Si compound is preferably a Si metal oxide, and the Si metal oxide is represented by the general formula: $SiO_x$. The general formula $SiO_x$ is obtained from Si dioxide ($SiO_2$) and metal Si (Si) as raw materials, and x value generally satisfies: $0 \leq x < 2$. $SiO_x$ has a large theoretical capacity as compared to graphite, and further amorphous Si or a Si crystal of a nano-scale size is likely to cause alkali ions, such as lithium ions, to go into and out of Si itself, making it possible to obtain a high capacity.

The Si metal oxide is specifically represented by $SiO_x$, wherein x satisfies: $0 \leq x < 2$, more preferably is 0.2 to 1.8, further preferably 0.4 to 1.6, especially preferably 0.6 to 1.4. When x in the Si metal oxide is in the above range, the resultant battery has a high capacity, and further it is possible to reduce the irreversible capacity due to bonding of Li and oxygen.

Average Particle Diameter (d50) of the Metal Particles Capable of Forming an Alloy Together with Li From the viewpoint of the cycle life of the non-aqueous electrolyte secondary battery, the average particle diameter (d50) of the metal particles capable of forming an alloy together with Li is generally 0.01 μm or more, preferably 0.05 μm or more, more preferably 0.1 μm or more, further preferably 0.3 μm or more, and is generally 10 μm or less, preferably 9 μm or less, more preferably 8 μm or less. When the average particle diameter (d50) of the metal particles is in the above range, volume expansion caused due to discharging of the charged battery is suppressed, so that excellent cycle characteristics can be obtained while maintaining the charge-discharge capacity.

The average particle diameter (d50) of the metal particles is determined by, for example, a laser diffraction/scattering-type particle size distribution measurement method.

BET Method Specific Surface Area of the Metal Particles Capable of Forming an Alloy Together with Li The specific surface area of the metal particles capable of forming an alloy together with Li, as measured by a BET method, is generally 0.5 to 60 m²/g, preferably 1 to 40 m²/g. When the specific surface area of the metal particles capable of forming an alloy together with Li, as measured by a BET method, is in the above range, the resultant battery has so high charge-discharge efficiency and high discharge capacity that lithium rapidly goes into and out of the particles during the high-rate charging/discharging, advantageously achieving excellent rate characteristics.

Oxygen Content of the Metal Particles Capable of Forming an Alloy Together with Li With respect to the oxygen content of the metal particles capable of forming an alloy together with Li, there is no particular limitation, but the oxygen content of the metal particles is generally 0.01 to 8% by mass, preferably 0.05 to 5% by mass. With respect to the state of oxygen distribution in the particles, oxygen may be present near the surface of the particles, may be present in the particles, or may be present thoroughly inside the particles, but, particularly, is preferably present near the surface of the particles. When the oxygen content of the metal particles capable of forming an alloy together with Li is in the above range, strong bonding of the metal particles and O advantageously suppresses volume expansion due to charging and discharging of the non-aqueous electrolyte secondary battery, achieving excellent cycle characteristics.

<Negative Electrode Active Material Containing the Metal Particles Capable of Forming an Alloy Together with Li and Graphite Particles>

The negative electrode active material may be one containing the metal particles capable of forming an alloy together with Li and graphite particles. Such a negative electrode active material may be a mixture of the metal particles capable of forming an alloy together with Li and graphite particles wherein the metal particles and the graphite particles each in the state of independent particle are mixed with each other, or a composite such that the metal particles capable of forming an alloy together with Li are present on the surface of and/or inside of the graphite particles.

With respect to the composite (referred to also as "composite particles") of the metal particles capable of forming an alloy together with Li and graphite particles, there is no particular limitation as long as it is particles containing the metal particles capable of forming an alloy together with Li and graphite particles. However, the composite is preferably particles having unified together the metal particles capable of forming an alloy together with Li and the graphite particles through physical and/or chemical bonding. A more preferred mode of the composite is such that the solid components of the metal particles capable of forming an alloy together with Li and the graphite particles are dispersed in the particles to such an extent that the metal particles and the graphite particles are present at least both on the surface of the composite particles and inside of the bulk, wherein the graphite particles are present for unifying the solid components together through physical and/or chemical bonding. A further specific preferred mode is a composite material (negative electrode active material) comprising at least the metal particles capable of forming an alloy together with Li and the graphite particles, which is characterized in that the metal particles capable of forming an alloy together with Li are present in the voids of the structure of the graphite particles, preferably particles of natural graphite having a folded structure having a curved surface. Further, the voids may be vacant, or a material which cushions expansion or shrinkage of the metal particles capable of forming an alloy together with Li, such as amorphous carbon, a graphite material, or a resin, may be present in the voids.

Amount of the Contained Metal Particles Capable of Forming an Alloy Together with Li The amount of the contained metal particles capable of forming an alloy together with Li, based on the total mass of the metal particles capable of forming an alloy together with Li and the graphite particles, is generally 0.1% by mass or more, preferably 0.5% by mass or more, more preferably 1.0% by mass or more, further preferably 2.0% by mass or more. Further, the amount of the metal particles contained is generally 99% by mass or less, preferably 50% by mass or less, more preferably 40% by mass or less, further preferably 30% by mass or less, still further preferably 25% by mass or less, still further preferably 20% by mass or less, especially preferably 15% by mass or less, most preferably 10% by mass or less. When the amount of the metal particles contained is in the above range, the resultant non-aqueous electrolyte secondary battery can advantageously achieve a satisfactory capacity.

(Coating Ratio)

The negative electrode active material in the present invention may be coated with a carbonaceous material or a graphite material. Especially, it is preferred that the negative electrode active material is coated with an amorphous carbonaceous material from the viewpoint of the acceptance properties for lithium ions. The coating ratio is generally 0.5 to 30%, preferably 1 to 25%, more preferably 2 to 20%. When the coating ratio is too large, it is likely that the amorphous carbon portion of the carbonaceous material is increased, so that the reversible capacity of the battery assembled using the resultant active material is reduced. When the coating ratio is too small, it is likely that the carbonaceous material as a nucleus is not uniformly coated with amorphous carbon and further strong granulation is not made, so that pulverization of the active material after being calcined causes the particle diameter to be too small.

With respect to the finally obtained negative electrode active material, the coating ratio with (content of) the carbide derived from the organic compound can be determined from the amount of the negative electrode active material, the amount of the organic compound, and a residual carbon ratio as measured in accordance with the micro-method described in JIS K 2270 using the following formula.

Formula:

$$\text{Coating ratio with the carbide derived from the organic compound}(\%) = (\text{Mass of the organic compound} \times \text{Residual carbon ratio} \times 100) / \{\text{Mass of the negative electrode active material} + (\text{Mass of the organic compound} \times \text{Residual carbon ratio})\}$$

(Internal Void Content)

The internal void content of the negative electrode active material is generally 1% or more, preferably 3% or more, more preferably 5% or more, further preferably 7% or more. Further, the internal void content of the negative electrode active material is generally less than 50%, preferably 40% or less, more preferably 30% or less, further preferably 20% or less. When the internal void content of the negative electrode active material is too small, the amount of the electrolytic solution in the particles of the negative electrode active material in the non-aqueous electrolyte secondary battery is likely to be reduced to cause the charge-discharge characteristics to be poor. On the other hand, when the internal void content of the negative electrode active material is too large, voids between the particles in the resultant electrode are likely to be reduced, so that diffusion of the non-aqueous electrolytic solution through the electrode is unsatisfactory. Further, a material which cushions expansion or shrinkage of the metal particles capable of forming an alloy together with Li, such as amorphous carbon, a graphite material, or a resin, may be present in the voids, or the voids may be filled with such a material.

<Construction of a Negative Electrode and Method for Preparing the Negative Electrode>

In the production of the negative electrode, any known method can be used as long as the effects of the present invention are not markedly sacrificed. For example, the negative electrode can be formed by adding a binder, a solvent, and, if necessary, for example, a thickening agent, a conductor, and a filler to the negative electrode active material to form a slurry, and applying the slurry to a current collector, and drying the applied slurry and then pressing it.

Further, the alloy material negative electrode can be produced using any known method. Specifically, as examples of the methods for producing the negative electrode, there can be mentioned a method in which the above-mentioned negative electrode active material having, for example, a binder and a conductor added thereto is directly rolled into a sheet electrode, and a method in which the above negative electrode active material is subjected to compression molding to form a pellet electrode. However, generally, there is used a method in which a thin film layer (negative electrode active material layer) containing the above-mentioned negative electrode active material is formed on a current collector for negative electrode (hereinafter, frequently referred to as "negative electrode current collector") by a method, such as an application method, a deposition method, a sputtering method, or a plating method. In this case, for example, a binder, a thickening agent, a conductor, and a solvent are added to the above-mentioned negative electrode active material to prepare a slurry, and the prepared slurry is applied to a negative electrode current collector, and dried, and then pressed so as to be increased in density, forming a negative electrode active material layer on the negative electrode current collector.

Examples of materials for the negative electrode current collector include steel, copper, a copper alloy, nickel, a nickel alloy, and stainless steel. Of these, from the viewpoint of easy processing into a thin film and the cost, a copper foil is preferred.

The thickness of the negative electrode current collector is generally 1 µm or more, preferably 5 µm or more, and is generally 100 µm or less, preferably 50 µm or less. When the thickness of the negative electrode current collector is too large, the capacity of the whole of the non-aqueous electrolyte secondary battery is likely to be markedly reduced. Conversely, when the thickness of the negative electrode current collector is too small, it may be difficult to handle the current collector.

For improving the binding effect of the current collector and the negative electrode active material layer formed on the surface of the current collector, it is preferred that the surface of the negative electrode current collector is preliminarily subjected to surface roughening treatment. Examples of surface roughening methods include a blast treatment, a method in which rolling is performed using a surface-roughened roll, a mechanical polishing method in which the surface of the current collector is polished using, for example, a coated abrasive having abrasive particles fixed thereonto, a sand grindstone, an emery buff, or a wire brush having a steel wire, an electrolytic polishing method, and a chemical polishing method.

Further, for lowering the mass of the negative electrode current collector to improve the energy density per mass of the battery, a perforated negative electrode current collector, such as an expanded metal or a punching metal, can be used. The negative electrode current collector of this type can be arbitrarily changed in mass by changing the perforation rate of the current collector. Further, when the negative electrode active material layers are formed on both surfaces of the negative electrode current collector of this type, a rivet effect due to the openings further prevents the negative electrode active material layers from peeling off. However, when the perforation rate is too high, the contact area of the negative electrode active material layer and the negative electrode current collector is likely to be reduced, so that the bonding strength is rather lowered.

A slurry for forming the negative electrode active material layer is generally prepared by adding to the negative electrode material, for example, a binder and a thickening agent. In the present specification, the "negative electrode material" means a material including both the negative electrode active material and the conductor.

The content of the negative electrode active material in the negative electrode material is generally 70% by mass or more, especially preferably 75% by mass or more, and is generally 97% by mass or less, especially preferably 95% by mass or less. When the negative electrode active material content is too small, the secondary battery using the resultant negative electrode is likely to be unsatisfactory in capacity. When the negative electrode active material content is too large, the conductor content is likely to be relatively unsatisfactory, making it difficult to secure electrical conductivity of the negative electrode. When two or more negative electrode active materials are used in combination, the amounts of the negative electrode active materials may be selected so that the total of the negative electrode active materials satisfies the above-mentioned range.

Examples of conductors used in the negative electrode include metal materials, such as copper and nickel; and carbonaceous materials, such as graphite and carbon black. These materials may be used individually, or two or more types of the materials may be used in an arbitrary combination and in an arbitrary ratio. Especially when a carbonaceous material is used as a conductor, the carbonaceous material advantageously acts also as an active material. The content of the conductor in the negative electrode material is generally 3% by mass or more, preferably 5% by mass or more, and is generally 30% by mass or less, preferably 25% by mass or less. When the conductor content is too small, the resultant negative electrode is likely to be unsatisfactory in conductivity. When the conductor content is too large, for example, the negative electrode active material content is likely to be relatively unsatisfactory, lowering the battery capacity or strength. When two or more conductors are used in combination, the amounts of the conductors may be selected so that the total of the conductors satisfies the above-mentioned range.

With respect to the binder used in the negative electrode, an arbitrary binder can be used as long as it is a safe material to the solvent and electrolytic solution used when producing the electrode. Examples of such binders include polyvinylidene fluoride, polytetrafluoroethylene, polyethylene, polypropylene, a styrene-butadiene rubber, an isoprene rubber, a butadiene rubber, an ethylene-acrylic acid copolymer, and an ethylene-methacrylic acid copolymer. These materials may be used individually, or two or more types of the materials may be used in an arbitrary combination and in an arbitrary ratio. The amount of the binder contained is, relative to 100 parts by mass of the negative electrode material, generally 0.5 part by mass or more, preferably 1 part by mass or more, and is generally 10 parts by mass or less, preferably 8 parts by mass or less. When the amount of the binder contained is too small, the resultant negative electrode is likely to be unsatisfactory in strength. When the amount of the binder contained is too large, the amount of, for example, the negative electrode active material contained is likely to be relatively unsatisfactory, so that the battery capacity or conductivity is unsatisfactory. When two or more binders are used in combination, the amounts of the binders may be selected so that the total of the binders satisfies the above-mentioned range.

Examples of thickening agents used in the negative electrode include carboxymethyl cellulose, methyl cellulose, hydroxymethyl cellulose, ethyl cellulose, polyvinyl alcohol, oxidized starch, starch phosphate, and casein. These thickening agents may be used individually, or two or more types of the thickening agents may be used in an arbitrary combination and in an arbitrary ratio. A thickening agent may be used if necessary, but, when a thickening agent is used, it is preferred that the thickening agent is used so that the content of the thickening agent in the negative electrode active material layer is generally in the range of from 0.5 to 5% by mass.

A slurry for forming the negative electrode active material layer is prepared by mixing, if necessary, a conductor, a binder, and a thickening agent into the above-mentioned negative electrode active material using an aqueous solvent or an organic solvent as a dispersing medium. As an aqueous solvent, generally, water is used, and water and an organic solvent, e.g., an alcohol, such as ethanol, or a cyclic amide, such as N-methylpyrrolidone, in an amount in the range of 30% by mass or less, based on the mass of water, can be used in combination. Examples of organic solvents include cyclic amides, such as N-methylpyrrolidone; linear amides, such as N,N-dimethylformamide and N,N-dimethylacetamide; aromatic hydrocarbons, such as anisole, toluene, and xylene; and alcohols, such as butanol and cyclohexanol. Of these, preferred are cyclic amides, such as N-methylpyrrolidone, and linear amides, such as N,N-dimethylformamide and N,N-dimethylacetamide. These organic solvents may be used individually, or two or more types of the organic solvents may be used in an arbitrary combination and in an arbitrary ratio.

The obtained slurry is applied to the above-mentioned negative electrode current collector, and dried and then pressed to form a negative electrode active material layer, obtaining a negative electrode. With respect to the method for applying the slurry, there is no particular limitation, and a known method can be used. With respect to the method for drying the applied slurry, there is no particular limitation, and a known method, such as air drying, heating drying, or drying under a reduced pressure, can be used.

(Electrode Density)

With respect to the electrode structure obtained after forming the electrode from the negative electrode active material, there is no particular limitation, but the density of the negative electrode active material present on the current collector is preferably 1 g·cm$^{-3}$ or more, further preferably 1.2 g·cm$^{-3}$ or more, especially preferably 1.3 g·cm$^{-3}$ or more, and is preferably 2.2 g·cm$^{-3}$ or less, more preferably 2.1 g·cm$^{-3}$ or less, further preferably 2.0 g·cm$^{-3}$ or less, especially preferably 1.9 g·cm$^{-3}$ or less. When the density of the negative electrode active material present on the current collector is larger than the above range, the negative electrode active material particles are likely to suffer a breakage, causing an increase of the initial irreversible capacity of the non-aqueous electrolyte secondary battery or deterioration of the high current-density charge-discharge characteristics due to poor penetration of the non-aqueous electrolytic solution to around the current collector/negative electrode active material interface. On the other hand, when the density of the negative electrode active material present on the current collector is smaller than the above range, the conductivity between the negative electrode active materials is likely to be reduced to increase the battery resistance, lowering the capacity per unit volume.

2-2. Positive Electrode

<Positive Electrode Active Material>

Hereinbelow, the positive electrode active material (lithium-transition metal compound) used in the positive electrode will be described.

<Lithium-Transition Metal Compound>

The lithium-transition metal compound is a compound having a structure which can eliminate Li ions therefrom and insert Li ions thereinto, and examples of such compounds include sulfides, phosphate compounds, and lithium-transition metal composite oxides. As examples of the sulfides, there can be mentioned compounds having a two-dimensional layer structure, such as $TiS_2$ and $MoS_2$, and Chevrel compounds having a strong, three-dimensional skeletal structure and being represented by the general formula: $Me_xMo_6S_8$ (wherein Me is a transition metal, such as Pb, Ag, or Cu). As examples of the phosphate compounds, there can be mentioned those of an olivine structure, and they are generally represented by $LiMePO_4$ (wherein Me is at least one transition metal), and specific examples of such compounds include $LiFePO_4$, $LiCoPO_4$, $LiNiPO_4$, and $LiMnPO_4$. As examples of the lithium-transition metal composite oxides, there can be mentioned those of a spinel structure that enables three-dimensional diffusion, and those of a layer structure that enables two-dimensional diffusion of lithium ions. The oxides having a spinel structure are generally represented by $LiMe_2O_4$ (wherein Me is at least one transition metal), and specific examples of such oxides include $LiMn_2O_4$, $LiCoMnO_4$, $LiNi_{0.5}Mn_{1.5}O_4$, and $LiCoVO_4$. The oxides having a layer structure are generally represented by $LiMeO_2$ (wherein Me is at least one transition metal). Specific examples of such oxides include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

<Composition>

Further, with respect to the lithium-transition metal compound, for example, there can be mentioned compounds represented by the following compositional formulae (F) and (G).

1) Lithium-transition metal compound represented by the following compositional formula (F)

$$Li_{1+x}MO_2 \quad\quad\quad (F)$$

In the above formula, x is generally 0 to 0.5. M is an element comprising Ni and Mn, or Ni, Mn, and Co, and the Mn/Ni molar ratio is generally 0.1 to 5. The Ni/M molar ratio is generally 0 to 0.5. The Co/M molar ratio is generally 0 to 0.5. The Li-rich moiety indicated by x is optionally replaced by transition metal site M.

In the compositional formula (F) above, the atomic ratio for the oxygen amount is shown to be 2 for convenience's sake, and may be nonstoichiometric to some extent. Further, in the above compositional formula, x indicates the composition of the material charged on the stage of production of the lithium-transition metal compound. Generally, with respect to the non-aqueous electrolyte secondary battery, the battery assembled is subjected to aging before put into the market. For this reason, the Li amount in the positive electrode may be reduced due to charging and discharging of the battery for the aging. In such a case, the result of the measurement by a composition analysis may show that x is −0.65 to 1 when discharging is performed until the voltage becomes 3 V.

With respect to the lithium-transition metal compound, for improving the crystalline properties of the positive electrode active material, one which is calcined in an atmosphere of oxygen-containing gas at a high temperature exhibits excellent battery characteristics.

Further, the lithium-transition metal compound represented by the compositional formula (F) may be a solid solution with $Li_2MO_3$ called a 213 layer as shown in the following general formula (F').

$$\alpha Li_2MO_3 \cdot (1-\alpha)LiM'O_2 \qquad (F')$$

In the general formula above, a is a number which satisfies the relationship: $0<\alpha<1$.

M is at least one metal element having an average oxidation number of 4+, specifically, at least one metal element selected from the group consisting of Mn, Zr, Ti, Ru, Re, and Pt.

M' is at least one metal element having an average oxidation number of 3+, preferably at least one metal element selected from the group consisting of V, Mn, Fe, Co, and Ni, more preferably at least one metal element selected from the group consisting of Mn, Co, and Ni.

2) Lithium-transition metal compound represented by the following compositional formula (G)

$$Li[Li_aM_bMn_{2-b-a}]O_{4+\delta} \qquad (G)$$

In the above formula, M is an element comprising at least one transition metal selected from Ni, Cr, Fe, Co, Cu, Zr, Al, and Mg.

b value is generally 0.4 to 0.6.

When b value is in this range, the energy density of the lithium-transition metal compound per unit weight is high.

a value is generally 0 to 0.3. Further, in the above compositional formula, a indicates the composition of the material charged on the stage of production of the lithium-transition metal compound. Generally, the battery assembled is subjected to aging before put into the market. For this reason, the Li amount in the positive electrode may be reduced due to charging and discharging of the battery for the aging. In such a case, the result of the measurement by a composition analysis may show that a is −0.65 to 1 when discharging is performed until the voltage becomes 3 V.

When a value is in the above range, the energy density of the lithium-transition metal compound per unit weight is not markedly sacrificed, and further excellent load characteristics can be achieved.

Further, δ value is generally in the range of ±0.5.

When δ value is in the above range, the lithium-transition metal compound has high stability in respect of the crystal structure, and a battery having a positive electrode produced using such a lithium-transition metal compound has excellent cycle characteristics and excellent high-temperature storage properties.

In the compositional formula (G) above, which is the composition of the lithium-transition metal compound, meanings of the lithium composition from a chemical point of view are described below in detail.

a and b in the above compositional formula of the lithium-transition metal compound are determined by analyzing the individual transition metals and lithium using an inductively coupled plasma emission spectrometry analyzer (ICP-AES) and determining a Li/Ni/Mn ratio.

From a structural point of view, lithium for a is considered to be replaced by the same transition metal site. On the principle that the charge is neutral, lithium for a causes an average valence of M and manganese to be larger than 3.5-valence.

Further, the lithium-transition metal compound may be substituted with fluorine, and such a compound is represented by $LiMn_2O_{4-x}F_{2x}$.

<Blend>

Specific examples of lithium-transition metal compounds having the above composition include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}CO_{0.1}O_2$, $Li_{1+x}Mn_{1.8}Al_{0.2}O_4$, and $Li_{1+x}Mn_{1.5}Ni_{0.5}O_4$. These lithium-transition metal compounds may be used individually or a blend of two or more of them may be used.

<Introduction of a Hetero-Element>

A hetero-element may be introduced into the lithium-transition metal compound. The hetero-element is at least one member selected from B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn. The hetero-element may be incorporated into the crystal structure of the lithium-transition metal compound, or is not incorporated into the crystal structure of the lithium-transition metal compound but may be unevenly present on the surface of the particles of the compound or on the grain boundary in the form of a simple substance or a compound.

[Positive Electrode for Non-Aqueous Electrolyte Secondary Battery]

The positive electrode for a non-aqueous electrolyte secondary battery has formed on a current collector a positive electrode active material layer containing a powder of the above-described lithium-transition metal compound and a binder.

The positive electrode active material layer is generally formed by mixing together a positive electrode material and a binder, and further, for example, a conductor and a thickening agent used if necessary by a dry process and forming the resultant mixture into a sheet form, and bonding the sheet onto a current collector for positive electrode by pressing, or by dissolving or dispersing the above materials in a liquid medium to form a slurry, and applying the slurry to a current collector for positive electrode, and drying the applied slurry to form a positive electrode active material layer on the current collector.

Examples of materials for the positive electrode current collector generally include metal materials, such as aluminum, stainless steel, nickel plating, titanium, and tantalum; and carbonaceous materials, such as carbon cloth and carbon paper. With respect to the form of the positive electrode current collector, in the case of a metal material, examples of forms include a metal foil, a metal cylinder, a metal coil, a metal plate, a metal thin film, an expanded metal, a punching metal, and a foamed metal, and, in the case of a carbonaceous material, examples of forms include a carbon plate, a carbon thin film, and a carbon cylinder. The metal thin film may be appropriately formed into a mesh form.

When a metal thin film is used as the positive electrode current collector, the thickness of the metal thin film is arbitrary, but, generally, is preferably in the range of from 1 μm to 100 mm. When the thickness of the metal thin film is smaller than the above range, strength needed for the current collector may be unsatisfactory. On the other hand, when the thickness of the metal thin film is larger than the above range, the handling properties may become poor.

With respect to the binder used in producing the positive electrode active material layer, there is no particular limitation, and, in the case of an application method, the binder may be a material stable to the liquid medium used for producing the electrode. Specific examples of binders include resin polymers, such as polyethylene, polypropylene, polyethylene terephthalate, polymethyl methacrylate, aromatic polyimide, cellulose, and nitrocellulose; rubber polymers, such as an SBR (styrene-butadiene rubber), an NBR (acrylonitrile-butadiene rubber), a fluororubber, an isoprene rubber, a butadiene rubber, and an ethylene-propylene rubber; thermoplastic elastomer polymers, such as a styrene-butadiene-styrene block copolymer and hydrogenation products thereof, an EPDM (ethylene-propylene-diene-terpolymer), a styrene-ethylene-butadiene-ethylene copolymer, a styrene-isoprene-styrene block copolymer and hydrogenation products thereof; soft resin polymers, such as syndiotactic-1,2-polybutadiene, polyvinyl acetate, an ethylene-vinyl acetate copolymer, and a propylene-α-olefin copolymer; fluorine polymers, such as polyvinylidene fluoride, polytetrafluoroethylene, fluorinated polyvinylidene fluoride, and a polytetrafluoroethylene-ethylene copolymer; and polymer compositions having ionic conductivity for alkali metal ions (particularly for lithium ions). These materials may be used individually, or two or more types of the materials may be used in an arbitrary combination and in an arbitrary ratio.

The content of the binder in the positive electrode active material layer is generally 0.1 to 80% by mass. When the binder content is too small, it is likely that the positive electrode active material cannot be satisfactorily held, so that the mechanical strength of the positive electrode is unsatisfactory, causing battery performance, such as cycle characteristics, to become poor. On the other hand, when the binder content is too large, the battery capacity or conductivity is likely to be lowered.

The positive electrode active material layer generally contains a conductor for improving the conductivity. With respect to the type of the conductor, there is no particular limitation, but specific examples of conductors include metal materials, such as copper and nickel, and carbonaceous materials, e.g., graphite, such as natural graphite and artificial graphite; carbon black, such as acetylene black; and amorphous carbon, such as needle coke. These materials may be used individually, or two or more types of the materials may be used in an arbitrary combination and in an arbitrary ratio. The content of the conductor in the positive electrode active material layer is generally 0.01 to 50% by mass. When the conductor content is too small, the conductivity is likely to be unsatisfactory. Conversely, when the conductor content is too large, the battery capacity is likely to be lowered.

With respect to the type of the liquid medium for forming a slurry, there is no particular limitation as long as it is a solvent capable of having dissolved or dispersed therein a lithium-transition metal compound powder which is a positive electrode material, a binder, and a conductor and a thickening agent used if necessary, and either an aqueous solvent or an organic solvent may be used. Examples of aqueous solvents include water and alcohols. Examples of organic solvents include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. Especially when an aqueous solvent is used, a slurry is formed using a dispersant and a latex of, e.g., an SBR as well as a thickening agent.

The above-described solvents may be used individually, or two or more types of the solvents may be used in an arbitrary combination and in an arbitrary ratio.

The content of the lithium-transition metal compound powder as a positive electrode material in the positive electrode active material layer is generally 10 to 99.9% by mass. When the content of the lithium-transition metal compound powder in the positive electrode active material layer is too large, the resultant positive electrode is likely to be unsatisfactory in strength. When the lithium-transition metal compound powder content is too small, the capacity is likely to be unsatisfactory.

Further, the thickness of the positive electrode active material layer is generally about 10 to 200 µm.

The electrode density of the positive electrode after being pressed is generally 2.2 to 4.2 $g/cm^3$.

For increasing the filling density of the positive electrode active material, the positive electrode active material layer obtained by applying the slurry and drying it is preferably pressed and increased in density by means of, for example, a roller press.

Thus, the positive electrode for a non-aqueous electrolyte secondary battery can be prepared.

2-3. Separator

The positive electrode and the negative electrode generally have disposed therebetween a separator for preventing the occurrence of short-circuiting. In this case, the separator is generally impregnated with the non-aqueous electrolytic solution of the present invention.

With respect to the material for and the form of the separator, there is no particular limitation, and a separator of a known material or form can be arbitrarily employed as long as the effects of the present invention are not markedly sacrificed. Especially, a separator formed from a material stable to the non-aqueous electrolytic solution of the present invention, such as a resin, a glass fiber, or an inorganic material, is used, and, for example, a separator in the form of a porous sheet or nonwoven fabric having excellent liquid retaining property is preferably used.

As a material for the resin or glass fiber separator, for example, a polyolefin, such as polyethylene or polypropylene, an aromatic polyamide, polytetrafluoroethylene, polyether sulfone, or a glass filter can be used. Of these, preferred are a glass filter and polyolefin, and further preferred is polyolefin. These materials may be used individually, or two or more types of the materials may be used in an arbitrary combination and in an arbitrary ratio.

The thickness of the separator is arbitrary, but is generally 1 µm or more, preferably 5 µm or more, further preferably 10 µm or more, and is generally 50 µm or less, preferably 40 µm or less, further preferably 30 µm or less. When the thickness of the separator is smaller than the above range, the insulation properties and mechanical strength may be lowered. On the other hand, when the thickness of the separator is larger than the above range, not only may battery performance, such as rate characteristics, become poor, but also the energy density of the whole of non-aqueous electrolyte secondary battery may be lowered.

Further, when a porous material, such as a porous sheet or nonwoven fabric, is used as a separator, the porosity of the separator is arbitrary, but is generally 20% or more, preferably 35% or more, further preferably 45% or more, and is generally 90% or less, preferably 85% or less, further preferably 75% or less. When the porosity of the separator is smaller than the above range, the film resistance is likely to be increased to cause deterioration of the rate characteristics. On the other hand, when the porosity of the separator is larger than the above range, the mechanical strength of the separator is likely to be lowered to cause a lowering of the insulation.

Further, the average pore diameter of the separator is arbitrary, but is generally 0.5 μm or less, preferably 0.2 μm or less, and is generally 0.05 μm or more. When the average pore diameter of the separator is larger than the above range, short-circuiting is likely to occur. On the other hand, when the average pore diameter of the separator is smaller than the above range, the film resistance is likely to be increased to lower the rate characteristics.

On the other hand, as an inorganic material, for example, an oxide, such as alumina or silicon dioxide, a nitride, such as aluminum nitride or silicon nitride, or a sulfate, such as barium sulfate or calcium sulfate, is used, and an inorganic material in a particle form or in a fiber form is used.

With respect to the form of the separator, a separator in the form of a thin film, such as nonwoven fabric, woven fabric, or a microporous film, is used. In the separator in the form of a thin film, one having a pore diameter of 0.01 to 1 μm and a thickness of 5 to 50 μm is preferably used. As a separator other than the separator in the form of the above-mentioned independent thin film, there can be used a separator having a composite porous layer containing particles of the above-mentioned inorganic material formed on the surface layer of the positive electrode and/or negative electrode using a binder made of a resin. For example, there can be mentioned a separator having on both sides of the positive electrode porous layers formed from alumina particles having a 90% particle diameter of less than 1 μm using a fluororesin as a binder.

The properties of the separator in the non-aqueous electrolyte secondary battery can be grasped by a Gurley value. The Gurley value indicates how difficult air passes through a film in the thicknesswise direction of the film, and is represented by a period of time, in terms of a second, which is required for 100 ml of air to pass through the film. Thus, a smaller Gurley value means that air is more likely to pass through the film, and a larger Gurley value means that air is more unlikely to pass through the film. That is, a smaller Gurley value means that the communicating properties in the thicknesswise direction of the film are more excellent, and a larger Gurley value means that the communicating properties in the thicknesswise direction of the film are poorer. The communicating properties indicate the degree of communicating of pores in the thicknesswise direction of the film. A separator having a small Gurley value can be used in various applications. For example, when a separator having a small Gurley value is used as a separator for a non-aqueous electrolyte secondary battery, lithium ions easily move through the separator, which means that excellent battery performance is advantageously obtained. The Gurley value of the separator is arbitrary, but is preferably 10 to 1,000 seconds/100 ml, more preferably 15 to 800 seconds/100 ml, further preferably 20 to 500 seconds/100 ml. When the Gurley value of the separator is 1,000 seconds/100 ml or less, the electric resistance of the separator is substantially low, which is advantageous to the separator.

2-4. Design of the Battery
<Electrode Group>

The electrode group may have any of a stacked structure in which the above-mentioned positive electrode plate and negative electrode plate are stacked through the above-mentioned separator, and a structure in which the above positive electrode plate and negative electrode plate have the above separator disposed therebetween and are spirally wound. The proportion of the volume of the electrode group to the internal volume of the battery (hereinafter, referred to as "electrode group occupancy") is generally 40% or more, preferably 50% or more, and is generally 90% or less, preferably 80% or less.

When the electrode group occupancy is smaller than the above range, the battery capacity is likely to be reduced. On the other hand, when the electrode group occupancy is larger than the above range, the void space is reduced, and therefore a problem is likely to occur in that the battery is exposed to a high temperature so that the members in the battery expand or the vapor pressure of the liquid component of the electrolyte becomes higher to increase the internal pressure, causing deterioration of various characteristics of the battery, such as charging/discharging repeating performance or high-temperature storage characteristics, and further causing a gas release valve to operate to lower the internal pressure.

<Outer Casing>

With respect to the material for the outer casing, there is no particular limitation as long as it is a material stable to the non-aqueous electrolytic solution used. Specifically, a metal, such as a nickel-plated steel plate, stainless steel, aluminum, an aluminum alloy, or a magnesium alloy, or a stacked film of a resin and an aluminum foil (laminate film) is used. From the viewpoint of the weight reduction, a metal, such as aluminum or an aluminum alloy, or a laminate film is preferably used.

Examples of the outer casings using the above metal include outer casings having a sealed structure obtained by welding the metals together by laser welding, resistance welding, or ultrasonic welding, and outer casings having a calked structure obtained by caulking the above metals through a gasket made of a resin. Examples of the outer casings using the above-mentioned laminate film include outer casings having a sealed structure obtained by heat-fusing the resin layers together. For improving the sealing properties, a resin different from the resin used in the laminate film may be disposed between the above resin layers. Particularly, when the resin layers are heat-fused through a current collector terminal to form a closed structure, bonding of a metal and a resin is to be made, and therefore, as a resin to be present between the metals, a resin having a polar group or a modified resin having introduced a polar group is preferably used.

<Protective Device>

As a protective device, there can be used, for example, a PTC (positive temperature coefficient) thermistor which is increased in the resistance when abnormal heat generation occurs or too large a current flows, a temperature fuse, and a valve which cuts out the current flowing the circuit due to a rapid increase of the pressure or temperature in the battery upon abnormal heat generation (current cut-out valve). With respect to the above-mentioned protective device, one having conditions in which the device does not operate in the general use at a high current is preferably selected, and a battery design is more preferably employed such that abnormal heat generation or heat runaway is not caused without a protective device.

(Outer Casing)

The non-aqueous electrolyte secondary battery of the present invention generally comprises the above-mentioned non-aqueous electrolytic solution, negative electrode, positive electrode, separator and others which are contained in an outer casing. With respect to the outer casing, there is no particular limitation, and a known outer casing can be arbitrarily employed as long as the effects of the present invention are not markedly sacrificed.

With respect to the material for the outer casing, there is no particular limitation as long as it is a material stable to the non-aqueous electrolytic solution used. Specifically, a metal, such as a nickel-plated steel plate, stainless steel, aluminum, an aluminum alloy, a magnesium alloy, nickel, or titanium, or a stacked film of a resin and an aluminum foil (laminate film) is used. From the viewpoint of the weight reduction, a metal, such as aluminum or an aluminum alloy, or a laminate film is preferably used.

Examples of the outer casings using the above metal include outer casings having a sealed structure obtained by welding the metals together by laser welding, resistance welding, or ultrasonic welding, and outer casings having a calked structure obtained by caulking the above metals through a gasket made of a resin. Examples of the outer casings using the above-mentioned laminate film include outer casings having a sealed structure obtained by heat-fusing the resin layers together. For improving the sealing properties, a resin different from the resin used in the laminate film may be disposed between the above resin layers. Particularly, when the resin layers are heat-fused through a current collector terminal to form a closed structure, bonding of a metal and a resin is to be made, and therefore, as a resin to be present between the metals, a resin having a polar group or a modified resin having introduced a polar group is preferably used.

Further, the shape of the outer casing is arbitrary and, for example, any of a cylinder shape, a rectangle shape, a laminate type, a coin shape, and a large-size type may be used.

EXAMPLES

3. Examples

Hereinbelow, the present invention will be described in more detail with reference to the following Examples and Comparative Examples, which should not be construed as limiting the scope of the present invention.

The compounds used in the Examples and Comparative Examples are shown below.

[Chemical formula 45]

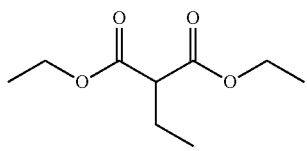

Compound 1: Diethyl ethylmalonate

[Chemical formula 46]

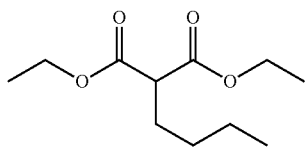

Compound 2: Diethyl butylmalonate

[Chemical formula 47]

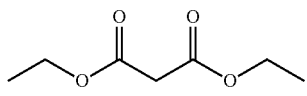

Compound 3: Diethyl malonate

-continued

[Chemical formula 48]

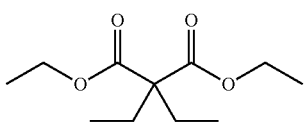

Compound 4: Diethyl diethylmalonate

[Chemical formula 49]

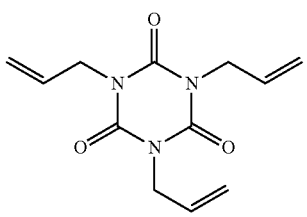

Compound 5: Triallyl isocyanurate

[Chemical formula 50]

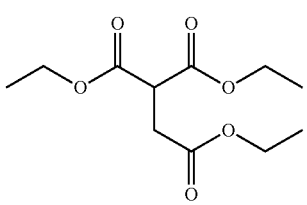

Compound 6: Triethyl 1,1,2-ethanetricarboxylate

[Chemical formula 51]

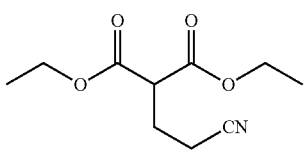

Compound 7: Diethyl 2-(2-cyanoethyl)malonate

[Chemical formula 52]

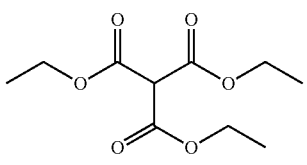

Compound 8: Triethyl methanetricarboxylate

[Chemical formula 53]

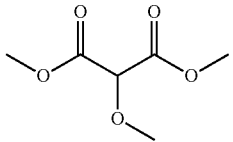

Compound 9: Dimethyl methoxymalonate

[Chemical formula 54]

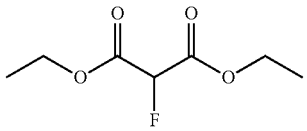

Compound 10: Diethyl fluoromalonate

-continued

[Chemical formula 55]

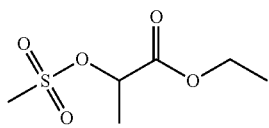

Compound 11: Ethyl 2-(methanesulfonyloxy)propionate

[Chemical formula 56]

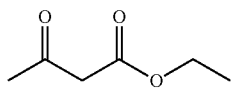

Compound 12: Ethyl acetoacetate

[Chemical formula 57]

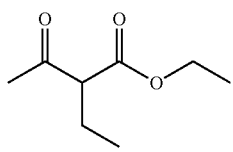

Compound 13: Ethyl 2-ethylacetoacetate

[Chemical formula 58]

LiBF$_4$
Compound 14: Lithium tetrafluoroborate

[Chemical formula 59]

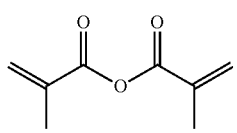

Compound 15: Methacrylic anhydride

[Chemical formula 60]

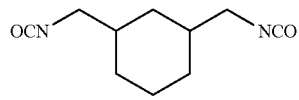

Compound 16: 1,3-Bis(isocyanatomethyl)cyclohexane

[Chemical formula 61]

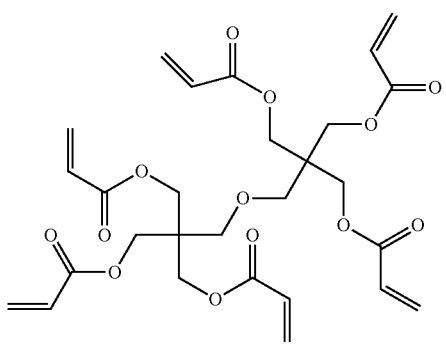

Compound 17: Dipentaerythritol hexaacrylate

-continued

[Chemical formula 62]

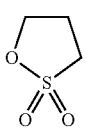

Compound 18: 1,3-Propane sultone

[Chemical formula 63]

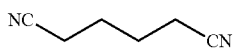

Compound 19: Adiponitrile

[Chemical formula 64]

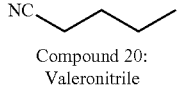

Compound 20: Valeronitrile

[Chemical formula 65]

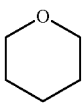

Compound 21: Tetrahydropyran

[Chemical formula 66]

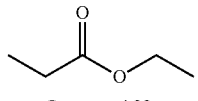

Compound 22: Ethyl propionate

[Chemical formula 67]

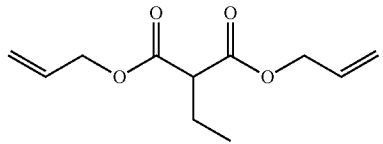

Compound 23: Diallyl ethylmalonate

[Chemical formula 68]

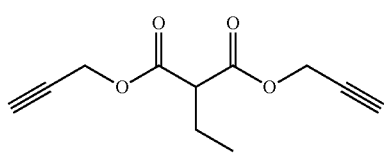

Compound 24: Dipropargyl ethylmalonate

[Chemical formula 69]

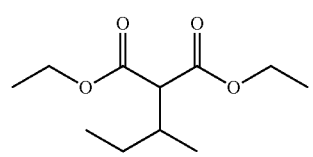

Compound 25: Diethl sec-butylmalonate

-continued

[Chemical formula 70]

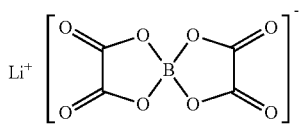

Compound 26:
Lithium bis(oxalato)borate

[Chemical formula 71]

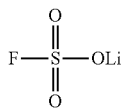

Compound 27:
Lithium fluorosulfonate

[Chemical formula 72]

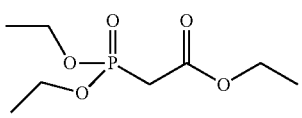

Compound 28: Triethyl phosphonoacetate

[Chemical formula 73]

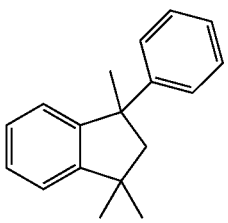

Compound 29: 1-Phenyl-1,3,3-trimethylindan

Examples 1-1 to 1-19, Comparative Examples 1-1 to 1-15, and Reference Examples 1-1 and 1-2

[Preparation of a Non-Aqueous Electrolytic Solution]

In a dry argon atmosphere, satisfactorily dried $LiPF_6$ was dissolved at 1.2 mol/L (in terms of a concentration of $LiPF_6$ in the non-aqueous electrolytic solution) in a mixture of ethylene carbonate (EC), ethylmethyl carbonate (EMC), and diethyl carbonate (DEC) (volume ratio: 3:4:3) (the resultant solution is referred to as "preliminary solution").

Vinylene carbonate (VC) and monofluoroethylene carbonate (MFEC) each in an amount of 2.0% by mass (based on the mass of the solution (100% by mass)) were added to the obtained preliminary solution to prepare an electrolytic solution (this solution is referred to as "reference electrolytic solution 1").

VC in an amount of 5.0% by mass (based on the mass of the solution (100% by mass)) was added to the preliminary solution to prepare an electrolytic solution (this solution is referred to as "reference electrolytic solution 2").

MFEC in an amount of 5.0% by mass (based on the mass of the solution (100% by mass)) was added to the preliminary solution to prepare an electrolytic solution (this solution is referred to as "reference electrolytic solution 3").

The compounds were added in the formulations shown in Table 1 below to each of reference electrolytic solutions 1 to 3 to prepare non-aqueous electrolytic solutions. In Comparative Example 1-1, reference electrolytic solution 1 was solely used. In Comparative Example 1-14, reference electrolytic solution 2 was solely used. In Comparative Example 1-15, reference electrolytic solution 3 was solely used. The "Amount (wt %)" shown in the Table indicates a concentration of each compound in the non-aqueous electrolytic solution (100% by weight).

[Preparation of a Positive Electrode]

97% by mass of lithium cobalt oxide ($LiCoO_2$) as a positive electrode active material, 1.5% by mass of acetylene black as a conductor, and 1.5% by mass of polyvinylidene fluoride (PVdF) as a binder were mixed into an N-methylpyrrolidone solvent using a disperser to obtain a slurry. The obtained slurry was uniformly applied to both sides of an aluminum foil having a thickness of 21 μm and dried, and then pressed to prepare a positive electrode.

[Preparation of a Negative Electrode]

To a natural graphite powder as a negative electrode active material were added an aqueous dispersion of carboxymethyl cellulose sodium (carboxymethyl cellulose sodium concentration: 1% by mass) as a thickening agent and an aqueous dispersion of a styrene-butadiene rubber (styrene-butadiene rubber concentration: 50% by mass) as a binder, and the resultant mixture was mixed using a disperser to obtain a slurry. The obtained slurry was uniformly applied to one side of a copper foil having a thickness of 12 μm and dried, and then pressed to prepare a negative electrode. The slurry was prepared so that the [natural graphite:carboxymethyl cellulose sodium:styrene-butadiene rubber] mass ratio in the dried negative electrode became 98:1:1.

[Production of a Non-Aqueous Electrolyte Secondary Battery (Laminate Type)]

The above-prepared positive electrode and negative electrode and a separator made of polyolefin were stacked in the order of the negative electrode, separator, positive electrode, separator, and negative electrode. The thus obtained battery element was wrapped in an aluminum laminate film, and the above-prepared non-aqueous electrolytic solution was injected into the wrapped element, followed by vacuum sealing, to produce a non-aqueous electrolyte secondary battery in a sheet form.

<Evaluation of the Non-Aqueous Electrolyte Secondary Battery>

[Initial Conditioning]

In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[Charged Battery Storage Test]

The battery which had been subjected to initial conditioning was further subjected to CC-CV charging at 0.2 C until the voltage became 4.4 V, and then subjected to high-temperature storage under conditions at 85° C. for 24 hours. The battery was satisfactorily cooled, and then immersed in an ethanol bath to measure a volume. From a change of the volume of the battery before and after the storage test, an amount of the gas generated was determined, and this was taken as "charged battery storage gas amount".

The values of charged battery storage gas amount in the Examples and Comparative Examples, which are individually standardized by the value in Comparative Example 1-1, are shown in Table 1 below.

TABLE 1

| | Electrolytic solution | Additive | Amount (wt %) | Additive | Amount (wt %) | Charged battery storage gas amount (%) |
|---|---|---|---|---|---|---|
| Example 1-1 | 1.2M LiPF$_6$ | Compound 1 | 1.0 | — | — | 80 |
| Example 1-2 | EC/EMC/ | | 3.0 | — | — | 49 |
| Example 1-3 | DEC = 3/4/3 + | Compound 2 | 0.5 | — | — | 81 |
| Example 1-4 | 2.0% VC + | | 1.0 | — | — | 74 |
| Example 1-5 | 2.0% MFEC | | 3.0 | — | — | 45 |
| Example 1-6 | | Compound 6 | 1.0 | — | — | 78 |
| Example 1-7 | | Compound 7 | 1.0 | — | — | 73 |
| Example 1-8 | | Compound 2 | 1.0 | Compound 14 | 0.3 | 58 |
| Example 1-9 | | Compound 2 | 1.0 | Compound 15 | 0.5 | 42 |
| Example 1-10 | | Compound 2 | 1.0 | Compound 16 | 0.5 | 52 |
| Example 1-11 | | Compound 2 | 1.0 | Compound 17 | 0.5 | 56 |
| Example 1-12 | | Compound 23 | 0.5 | — | — | 69 |
| Example 1-13 | | | 1.0 | — | — | 61 |
| Example 1-14 | | | 3.0 | — | — | 50 |
| Example 1-15 | | Compound 24 | 3.0 | — | — | 73 |
| Example 1-16 | | Compound 25 | 1.0 | — | — | 81 |
| Example 1-17 | | Compound 2 | 3.0 | Compound 19 | 1.0 | 39 |
| Comparative Example 1-1 | | — | — | — | — | 100 |
| Comparative Example 1-2 | | Compound 3 | 1.0 | — | — | 168 |
| Comparative Example 1-3 | | Compound 4 | 1.0 | — | — | 105 |
| Comparative Example 1-4 | | Compound 8 | 1.0 | — | — | 151 |
| Comparative Example 1-5 | | | 3.0 | — | — | 368 |
| Comparative Example 1-6 | | Compound 9 | 1.0 | — | — | 126 |
| Comparative Example 1-7 | | | 3.0 | — | — | 178 |
| Comparative Example 1-8 | | Compound 10 | 1.0 | — | — | 110 |
| Comparative Example 1-9 | | | 3.0 | — | — | 250 |
| Comparative Example 1-10 | | Compound 11 | 1.0 | — | — | 111 |
| Comparative Example 1-11 | | Compound 14 | 0.3 | — | — | 101 |
| Comparative Example 1-12 | | Compound 15 | 0.5 | — | — | 79 |
| Comparative Example 1-13 | | Compound 19 | 1.0 | — | — | 77 |
| Reference Example 1-1 | | Compound 12 | 1.0 | — | — | 162 |
| Reference Example 1-2 | | Compound 13 | 1.0 | — | — | 103 |
| Example 1-18 | 1.2M LiPF$_6$ | Compound 2 | 3.0 | — | — | 67 |
| Comparative Example 1-14 | EC/EMC/ DEC = 3/4/3 + 5.0% VC | — | — | — | — | 100 |
| Example 1-19 | 1.2M LiPF$_6$ | Compound 2 | 3.0 | — | — | 61 |
| Comparative Example 1-15 | EC/EMC/ DEC = 3/4/3 + 5.0% MFEC | — | — | — | — | 100 |

As apparent from Table 1, when the non-aqueous electrolytic solution of the present invention containing the compound represented by the general formula (A) is used, the charged battery storage gas can be suppressed, as compared to that in Comparative Examples 1-1, 1-14, and 1-15 in which the above compound is not contained. Further, the results show that, in Comparative Examples 1-2 to 1-9 in which a compound other than the compound represented by the general formula (A) is added to the electrolytic solution, the charged battery storage gas is disadvantageously increased. From the above, it is found that, by using the non-aqueous electrolytic solution having added thereto the compound represented by the general formula (A), battery expansion caused during storage of the charged battery is suppressed.

Further, it is found that when the compound represented by the general formula (A) and a specific additive, such as an isocyanate compound, an acid anhydride, an acrylate compound, a nitrile compound, or a fluorinated borate, are used in combination, the charged battery storage gas amount is suppressed, as compared to that in the case where the above compounds are individually used. The results indicate that synergy is obtained by using the above compounds in combination.

Examples 2-1 and 2-2 and Comparative Examples 2-1 and 2-2

The compounds were added in the formulations shown in Table 2 below to reference electrolytic solution 1 to prepare non-aqueous electrolytic solutions. In Comparative Example 2-1, reference electrolytic solution 1 was solely used. The "Amount (wt %)" shown in the Table indicates a concentration of each compound in the non-aqueous electrolytic solution (100% by weight). A positive electrode, a negative electrode, and a non-aqueous electrolyte secondary battery were prepared in the same manner as in Example 1, and experiments were conducted.

<Evaluation of the Non-Aqueous Electrolyte Secondary Battery>
[Initial Conditioning]
In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[After-Storage 1.0 C/0.2 C Load Test]
The battery which had been subjected to initial conditioning was further subjected to CC-CV charging at 0.2 C until the voltage became 4.4 V, and then subjected to high-temperature storage under conditions at 85° C. for 24 hours. Then, the resultant battery was discharged at 0.2 C until the voltage became 3.0 V. Subsequently, the battery was subjected to CC-CV at 0.2 C until the voltage became 4.4 V, and then discharged at 0.2 C or 1.0 C until the voltage became 3.0 V, and the obtained 0.2 C/1.0 C capacity ratio (1.0 C/0.2 C) in terms of a percentage was taken as "after-storage 1.0 C/0.2 C load".

The values of after-storage 1.0 C/0.2 C load in the Examples and Comparative Examples, which are individually standardized by the value in Comparative Example 2-1, are shown in Table 2 below.

TABLE 2

| | Electrolytic solution | Additive 1 | Amount (wt %) | Additive 2 | Amount (wt %) | After-storage 1.0 C./ 0.2 C. load (5.0) |
|---|---|---|---|---|---|---|
| Example 2-1 | 1.2M LiPF$_6$ EC/EMC/ DEC = 3/4/3 + 2.0% VC + 2.0% MFEC | Compound 2 | 3.0 | — | — | 101 |
| Example 2-2 | | Compound 2 | 3.0 | Compound 5 | 0.5 | 103 |
| Comparative Example 2-1 | | — | — | — | — | 100 |
| Comparative Example 2-2 | | Compound 5 | 0.5 | — | — | 100 |

As apparent from Table 2, when the compound represented by the general formula (A) and a compound having an isocyanuric acid skeleton are used in combination, the after-storage 1.0 C/0.2 C load characteristics are improved, as compared to those in the case where the above compounds are individually used. Particularly, when the compound having an isocyanuric acid skeleton is solely used, no improvement effect for the characteristics is confirmed. The results indicate that synergy is obtained by using the above compounds in combination.

Examples 3-1 and 3-2 and Comparative Example 3-1

[Preparation of a Non-Aqueous Electrolytic Solution]
The compounds were added in the formulations shown in Table 3 below to reference electrolytic solution 3 to prepare non-aqueous electrolytic solutions. In Comparative Example 3-1, reference electrolytic solution 3 was solely used. The "Amount (wt %)" shown in the Table indicates a concentration of each compound in the non-aqueous electrolytic solution (100% by weight).

[Preparation of a Positive Electrode]
A positive electrode was prepared in the same manner as in Example 1 and used.

[Preparation of a Negative Electrode]
A negative electrode was prepared in the same manner as in Example 1 and used.

[Production of a Non-Aqueous Electrolyte Secondary Battery (Laminate Type)]
A non-aqueous electrolyte secondary battery was produced in the same manner as in Example 1 and used.

<Evaluation of the Non-Aqueous Electrolyte Secondary Battery>
[Initial Conditioning]
In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[60° C. Charged Battery Storage Test]

The battery which had been subjected to initial conditioning was further subjected to CC-CV charging at 0.2 C until the voltage became 4.4 V, and then subjected to high-temperature storage under conditions at 60° C. for 168 hours. The battery was satisfactorily cooled, and then immersed in an ethanol bath to measure a volume. From a change of the volume of the battery before and after the storage test, an amount of the gas generated was determined, and this was taken as "60° C. charged battery storage gas amount".

The values of 60° C. charged battery storage gas amount in the Examples and Comparative Examples, which are individually standardized by the value in Comparative Example 3-1, are shown in Table 3 below.

[Table 3]

TABLE 3

| | Electrolytic solution | Additive | Amount (wt %) | 60° C. harged battery storage gas amount (%) |
|---|---|---|---|---|
| Example 3-1 | 1.2M LiPF$_6$ | Compound 2 | 1.0 | 58 |
| Example 3-2 | EC/EMC/DEC = | Compound 2 | 3.0 | 36 |
| Comparative Example 3-1 | 3/4/3 5.0% MFEC | — | — | 100 |

As apparent from Table 3, when the non-aqueous electrolytic solution of the present invention containing the specific compound represented by the general formula (A) is used, the 60° C. charged battery storage gas amount can be suppressed, as compared to that in Comparative Example 3-1 in which the above compound is not contained.

Examples 4-1 to 4-5 and Comparative Examples 4-1 to 4-3

The compounds were added in the formulations shown in Table 4 below to reference electrolytic solution 1 to prepare non-aqueous electrolytic solutions. In Comparative Example 4-1, reference electrolytic solution 1 was solely used. The "Amount (wt %)" shown in the Table indicates a concentration of each compound in the non-aqueous electrolytic solution (100% by weight). A positive electrode, a negative electrode, and a non-aqueous electrolyte battery were prepared in the same manner as in Example 1 and evaluated.

<Evaluation of the Non-Aqueous Electrolyte Secondary Battery>

[Initial Conditioning]

In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[Continuous Charging Test]

The non-aqueous electrolyte battery which had been subjected to initial conditioning was subjected to CC-CV charging at 0.2 C at 60° C. (168 hours cut) until the voltage became 4.4 V, and thus a continuous charging test was performed. After the test was completed, the battery was satisfactorily cooled, and then immersed in an ethanol bath to measure a volume. From a change of the volume of the battery before and after the continuous charging test, an amount of the gas generated was determined, and this was taken as "continuous charging test gas amount".

The values of continuous charging test gas amount in the Examples and Comparative Examples, which are individually standardized by the value in Comparative Example 4-1, are shown in Table 4 below.

[Table 4]

TABLE 4

| | Electrolytic solution | Additive 1 | Amount (wt %) | Additive 2 | Amount (wt %) | Continuous charging gas amount (%) |
|---|---|---|---|---|---|---|
| Example 4-1 | 1.2M LiPF$_6$ EC/EMC/DEC = 3/4/3 + 2.0% VC + 2.0% MFEC | Compound 2 | 1.0 | — | — | 83 |
| Example 4-2 | | Compound 2 | 3.0 | — | — | 76 |
| Example 4-3 | | Compound 2 | 1.0 | Compound 20 | 2.5 | 17 |
| Example 4-4 | | Compound 2 | 3.0 | Compound 20 | 2.5 | 14 |
| Example 4-5 | | Compound 2 | 1.0 | Compound 19 | 1.0 | 12 |
| Comparative Example 4-1 | | — | — | — | — | 100 |
| Comparative Example 4-2 | | Compound 20 | 2.5 | — | — | 47 |
| Comparative Example 4-3 | | Compound 19 | 1.0 | — | — | 15 |

As apparent from Table 4, when the compound represented by the general formula (A) and a nitrile compound are used in combination, the continuous charging test gas amount can be suppressed, as compared to that in the case where the above compounds are individually used. The results indicate that synergy is obtained by using the above compounds in combination.

Examples 5-1 and 5-2 and Comparative Examples 5-1 and 5-2

The compounds were added in the formulations shown in Table 5 below to reference electrolytic solution 1 to prepare non-aqueous electrolytic solutions. In Comparative Example 5-1, reference electrolytic solution 1 was solely used. The "Amount (wt %)" shown in the Table indicates a concentration of each compound in the non-aqueous electrolytic solution (100% by weight). A positive electrode, a negative electrode, and a non-aqueous electrolyte secondary battery were prepared in the same manner as in Example 1, and experiments were conducted.

<Evaluation of the Non-Aqueous Electrolyte Secondary Battery>

[Evaluation of Initial Battery Characteristics]

The non-aqueous electrolyte secondary battery was immersed in an ethanol bath, and an initial battery volume was determined from the buoyancy measured in this instance (Archimedean principle). Then, the battery in the state of being disposed between glass plates to which a pressure was applied was subjected to constant-current charging at a current corresponding to 0.05 C at 25° C. for 6 hours, and then discharged at a constant current at 0.2 C until the voltage became 3.0 V. Further, the resultant battery was subjected to constant-current constant-voltage charging (referred to also as "CC-CV charging")(0.05 C cut) at a current corresponding to 0.2 C until the voltage became 4.1 V, and then allowed to stand under conditions at 45° C. for 72 hours. Then, the resultant battery was discharged at a constant current at 0.2 C until the voltage became 3.0 V. Subsequently, the battery was subjected to CC-CV charging (0.05 C cut) at 0.2 C until the voltage became 4.4 V, and then further discharged at 0.2 C until the voltage became 3.0 V, so that the initial battery characteristics were stabilized.

The non-aqueous electrolyte secondary battery which had been subjected to evaluation of initial battery characteristics was subjected to CC-CV charging (0.05 C cut) at 0.2 C at 25° C. until the voltage became 4.4 V, and then immersed in an ethanol bath, and a battery volume was determined from the buoyancy measured in this instance, and a change of the battery volume from the initial battery volume was taken as an "initial gas amount" in the state before being stored.

The values of initial gas amount in the Examples and Comparative Examples, which are individually standardized by the value in Comparative Example 5-1, are shown in Table 5 below.

TABLE 5

|  | Electrolytic solution | Additive 1 | Amount (wt %) | Additive 2 | Amount (wt %) | Initial gas amount (%) |
|---|---|---|---|---|---|---|
| Example 5-1 | 1.2M LiPF$_6$ EC/EMC/ DEC = 3/4/3 + | Compound 2 | 1.0 | — | — | 93 |
| Example 5-2 |  | Compound 2 | — | Compound 18 | 2.0 | 90 |
| Comparative Example 5-1 | 2.0% VC + 2.0% MFEC | — | — | — | — | 100 |
| Comparative Example 5-2 |  | Compound 18 | 2.0 | — | — | 114 |

As apparent from Table 5, when the non-aqueous electrolytic solution of the present invention containing the compound represented by the general formula (A) is used, the initial gas amount can be suppressed, as compared to that in Comparative Example 5-1 in which the above compound is not contained. Further, it is found that, in Example 5-2 in which the compound represented by the general formula (A) and a cyclic sulfonic ester are used in combination, the initial gas amount is suppressed, as compared to that in the case where the above compounds are individually used. Particularly, when the cyclic sulfonic ester is solely added (Comparative Example 5-2), the initial gas amount is increased. Thus, the results indicate that synergy is obtained by using the above compounds in combination.

Examples 6-1 and 6-2 and Comparative Examples 6-1 and 6-2

[Preparation of a Non-Aqueous Electrolytic Solution]

In a dry argon atmosphere, satisfactorily dried LiPF$_6$ was dissolved at 1.2 mol/L (in terms of a concentration of LiPF$_6$ in the non-aqueous electrolytic solution) in a mixture of EC, EMC, and DEC (volume ratio: 3:4:3), and to the resultant solution were added VC, MFEC, and compound 19 in respective amounts of 2.0% by mass, 2.0% by mass, and 1.0% by mass to prepare an electrolytic solution (this solution is referred to as "reference electrolytic solution 4"). The compounds were added in the formulations shown in Table 6 below to reference electrolytic solution 4 to prepare electrolytic solutions. In Comparative Example 6-1, reference electrolytic solution 4 was solely used. The "Amount (wt %)" shown in the Table indicates a concentration of each compound in the non-aqueous electrolytic solution (100% by weight).

[Preparation of a Positive Electrode]

A positive electrode was prepared in the same manner as in Example 1 and used.

[Preparation of a Negative Electrode]

A negative electrode was prepared in the same manner as in Example 1 and used.

[Production of a Non-Aqueous Electrolyte Secondary Battery (Laminate Type)]

A non-aqueous electrolyte secondary battery was produced in the same manner as in Example 1 and used.

<Evaluation of the Non-Aqueous Electrolyte Secondary Battery>

[Initial Conditioning]

In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[Charged Battery Storage Test]

The battery which had been subjected to initial conditioning was further subjected to CC-CV charging at 0.2 C until the voltage became 4.4 V, and then subjected to high-temperature storage under conditions at 80° C. for 72 hours. The battery was satisfactorily cooled, and then immersed in an ethanol bath to measure a volume. From a change of the volume of the battery before and after the storage test, an amount of the gas generated was determined, and this was taken as "80° C. charged battery storage gas amount".

The values of 80° C. charged battery storage gas amount in the Examples and Comparative Examples, which are individually standardized by the value in Comparative Example 6-1, are shown in Table 6 below.

TABLE 6

|  | Electrolytic solution | Additive 1 | Amount (wt %) | Additive 2 | Amount (wt %) | 80° C. Charged battery storage gas amount (%) |
|---|---|---|---|---|---|---|
| Example 6-1 | 1.2M LiPF$_6$ EC/EMC/ DEC = 3/4/3 + 2.0% VC + | Compound 2 | 1.0 | — | — | 84 |
| Example 6-2 |  | Compound 2 | — | Compound 21 | 2.0 | 48 |
| Comparative Example 6-1 | 2.0% MFEC + 1.0% | — | — | — | — | 100 |
| Comparative Example 6-2 | Compound 19 | Compound 21 | 2.0 | — | — | 63 |

As apparent from Table 6, when the compound represented by the general formula (A) and a cyclic ether compound are used in combination, the 80° C. charged battery storage gas amount can be suppressed, as compared to that in the case where the above compounds are individually used. The results indicate that synergy is obtained by using the above compounds in combination.

Examples 7-1 and 7-2 and Comparative Examples 7-1 and 7-2

[Preparation of a Non-Aqueous Electrolytic Solution]

In a dry argon atmosphere, satisfactorily dried $LiPF_6$ was dissolved at 1.2 mol/L (in terms of a concentration of $LiPF_6$ in the non-aqueous electrolytic solution) in a mixture of EC, compound 22, and DEC (volume ratio: 3:4:3), and to the resultant solution was added MFEC in an amount of 5.0% by mass (based on the mass of the solution (100% by mass)) to prepare an electrolytic solution (this solution is referred to as "reference electrolytic solution 5"). The compound was added in the formulations shown in Table 7 below to reference electrolytic solution 3 or 5 to prepare electrolytic solutions. In Comparative Example 7-1, reference electrolytic solution 3 was solely used. In Comparative Example 7-2, reference electrolytic solution 5 was solely used. The "Amount (wt %)" shown in the Table indicates a concentration of the compound in the non-aqueous electrolytic solution (100% by weight).

[Preparation of a Positive Electrode]

A positive electrode was prepared in the same manner as in Example 1 and used.

[Preparation of a Negative Electrode]

A negative electrode was prepared in the same manner as in Example 1 and used.

[Production of a Non-Aqueous Electrolyte Secondary Battery (Laminate Type)]

A non-aqueous electrolyte secondary battery was produced in the same manner as in Example 1 and used.

<Evaluation of the Non-Aqueous Electrolyte Secondary Battery>

[Initial Conditioning]

In a thermostatic chamber at 25° C., the non-aqueous electrolyte secondary battery which is a laminate type cell was subjected to constant-current charging at a current corresponding to 0.05 C for 6 hours, and then discharged at 0.2 C until the voltage became 3.0 V. Then, the battery was subjected to CC-CV charging at 0.2 C until the voltage became 4.1 V. Subsequently, the battery was subjected to aging under conditions at 45° C. for 72 hours. Then, the resultant battery was discharged at 0.2 C until the voltage became 3.0 V, so that the non-aqueous electrolyte secondary battery was stabilized. Further, the battery was subjected to CC-CV charging at 0.2 C until the voltage became 4.4 V, and then discharged at 0.2 C until the voltage became 3.0 V, and thus initial conditioning for the battery was performed.

[60° C. Charged Battery Storage Test]

The battery which had been subjected to initial conditioning was further subjected to CC-CV charging at 0.2 C until the voltage became 4.4 V, and then subjected to high-temperature storage under conditions at 60° C. for 168 hours. Then, the resultant battery was discharged at 0.2 C at 25° C. until the voltage became 3 V, and further subjected to CC-CV charging (0.05 C cut) at a constant current at 0.2 C at 25° C. until the voltage became 4.40 V, and then further discharged at 0.2 C until the voltage became 3 V, and this was taken as "recovery 0.2 C capacity".

The values of recovery 0.2 C capacity in the Examples and Comparative Examples, which are individually standardized by the value in Comparative Example 7-1, are shown in Table 7 below.

TABLE 7

| | Electrolytic solution | Additive 1 | Amount (wt %) | Recovery 0.2 C capacity (%) |
|---|---|---|---|---|
| Example 7-1 | 1.2M LiPF6 EC/EMC/DEC = 3/4/3 + MFEC(5) | Compound 2 | 3.0 | 100.4 |
| Example 7-2 | 1.2M LiPF6 EC/Compound22/DEC = 3/4/3 + MFEC(5) | | | 100.6 |
| Comparative Example 7-1 | 1.2M LiPF6 EC/EMC/DEC = 3/4/3 + MFEC(5) | — | — | 100.0 |
| Comparative Example 7-2 | 1.2M LiPF6 EC/Compound22/DEC = 3/4/3 + MFEC(5) | — | — | 100.1 |

As apparent from Table 7, when the compound represented by the general formula (A) is used, the recovery 0.2 C capacity is improved. It is found that the improvement effect is remarkable especially when the electrolytic solution using compound 22 which is a linear carboxylate and the compound represented by the general formula (A) are used in combination.

Example 8-1 and Comparative Example 8-1

[Preparation of a Non-Aqueous Electrolytic Solution]

In a dry argon atmosphere, satisfactorily dried $LiPF_6$ was dissolved at 1.0 mol/L (in terms of a concentration of $LiPF_6$ in the non-aqueous electrolytic solution) in a mixture of EC, dimethyl carbonate (DMC), and EMC (volume ratio: 3:3:4), and to the resultant solution was added VC in an amount of 1.2% by mass (based on the mass of the solution (100% by mass)) to prepare an electrolytic solution (this solution is referred to as "reference electrolytic solution 6"). The compound was added in the formulation shown in Table 8 below to reference electrolytic solution 6 to prepare an electrolytic solution. In Comparative Example 8-1, reference electrolytic solution 6 was solely used. The "Amount (wt %)" shown in the Table indicates a concentration of the compound in the non-aqueous electrolytic solution (100% by weight).

[Preparation of a Positive Electrode]

83.5 Parts by mass of iron lithium phosphate (LiFePO4) as a positive electrode active material, 10 parts by mass of carbon black, and 6.5 parts by mass of polyvinylidene fluoride were mixed with one another. N-Methyl-2-pyrrolidone was added to the resultant mixture to obtain a slurry, and the obtained slurry was uniformly applied to both sides of an aluminum foil having a thickness of 15 μm so that the coating weight became 13.8 mg·cm$^{-2}$, and dried, and then pressed so that the density of the positive electrode active material layer became 1.85 g·cm$^{-3}$ to prepare a positive electrode.

[Preparation of a Negative Electrode]

To graphite were added an aqueous dispersion of carboxymethyl cellulose sodium (carboxymethyl cellulose sodium concentration: 1% by mass) as a thickening agent and an aqueous dispersion of a styrene-butadiene rubber (styrene-butadiene rubber concentration: 50% by mass) as a binder, and the resultant mixture was mixed using a disperser to obtain a slurry. The obtained slurry was uniformly applied to one side of a copper foil having a thickness of 12 µm so that the coating weight became 6.0 mg·cm$^{-2}$, and dried, and then pressed so that the density of the negative electrode active material layer became 1.36 g·cm$^{-3}$ to prepare a negative electrode. The graphite used has a d50 value of 10.9 µm, a specific surface area of 3.41 m$^2$·g$^{-1}$, and a tap density of 0.985 g·cm$^{-3}$. The slurry was prepared so that the [graphite:carboxymethyl cellulose sodium:styrene-butadiene rubber] mass ratio in the dried negative electrode became 97.5:1.5:1.

[Production of a Non-Aqueous Electrolyte Secondary Battery (Laminate Type)]

The above-prepared positive electrode and negative electrode and a separator were stacked in the order of the negative electrode, separator, and positive electrode. The separator made of polypropylene having a thickness of 20 µm and having a porosity of 54% was used. The thus obtained battery element was wrapped in an aluminum laminate film in a cylindrical form, and the above-prepared electrolytic solution was injected into the wrapped element, followed by vacuum sealing, to produce a non-aqueous electrolyte secondary battery in a sheet form. Further, for improving the adhesion between the electrodes, the battery in a sheet form was sandwiched between glass plates to apply a pressure to the battery.

<Evaluation of the Non-Aqueous Electrolyte Secondary Battery>

[Initial Conditioning]

In an atmosphere at 25° C., the sheet-form non-aqueous electrolyte secondary battery was charged at 0.05 C for 10 hours and then allowed to rest for 3 hours, and then charged at a constant current at 0.2 C until the voltage became 3.8 V. The resultant battery was further allowed to rest for 3 hours, and then subjected to constant-current constant-voltage charging at 0.2 C until the voltage became 3.8 V, and then subjected to constant-current discharging at ⅓C until the voltage became 2.5 V. Then, a series of constant-current constant-voltage charging at ⅓C made until the voltage became 3.8 V and subsequent constant-current discharging at ⅓C made until the voltage became 2.5 V was taken as one charging-discharging cycle, and two cycles were performed. Further, the resultant battery was subjected to constant-current constant-voltage charging at ⅓C until the voltage became 3.8 V, and then the battery was stored at 60° C. for 12 hours, so that the battery was stabilized. Then, a series of constant-current constant-voltage charging at ⅓C at 25° C. made until the voltage became 3.8 V and subsequent constant-current discharging at ⅓C made until the voltage became 2.5 V was taken as one charging-discharging cycle, and two cycles were performed. The discharge capacity finally obtained at that time was determined as an initial capacity.

[High-Temperature Storage Test]

The battery which had been subjected to initial conditioning was controlled to have a voltage of 3.8 V, and stored at 60° C. for one week. With respect to the battery which had been subjected to initial conditioning, the battery before the high-temperature storage and the battery obtained after the high-temperature storage were individually immersed completely in ethanol, and respective buoyancy A (g) and buoyancy B (g) generated in this instance were measured using an electronic balance. A value obtained by subtracting buoyancy A from buoyancy B and dividing the obtained difference by the specific gravity of ethanol (=0.789 g·mL$^{-1}$) was determined as an "after-storage cell expansion".

The values of after-storage cell expansion in the Examples and Comparative Examples, which are individually standardized by the value in Comparative Example 8-1, are shown in Table 8 below.

TABLE 8

| | Electrolytic solution | Additive 1 | Amount (wt %) | After-storage cell expansion (%) |
|---|---|---|---|---|
| Example 8-1 | 1.2M LiPF$_6$ | Compound 2 | 0.5 | 90 |
| Comparative Example 8-1 | EC/DMC/EMC = 3/3/4 + 1.2% VC | — | — | 100 |

As apparent from Table 8, when the compound represented by the general formula (A) is used, the after-storage cell expansion is suppressed.

Examples 9-1 and 9-2 and Comparative Example 9-1

[Preparation of a Non-Aqueous Electrolytic Solution]

In a dry argon atmosphere, satisfactorily dried LiPF$_6$ was dissolved at 1.0 mol/L (in terms of a concentration of LiPF$_6$ in the non-aqueous electrolytic solution) in a mixture of EC and DEC (volume ratio: 3:7), and to the resultant solution were added VC and MFEC each in an amount of 2.0% by mass (based on the mass of the solution (100% by mass)) to prepare an electrolytic solution (this solution is referred to as "reference electrolytic solution 7"). The compound was added in the formulations shown in Table 10 below to reference electrolytic solution 7 to prepare electrolytic solutions. In Comparative Example 9-1, reference electrolytic solution 7 was solely used. The "Amount (wt %)" shown in the Table indicates a concentration of the compound in the non-aqueous electrolytic solution (100% by weight).

[Preparation of a Positive Electrode]

85% by mass of lithium-nickel-cobalt-manganese composite oxide (Li$_{1.05}$Ni$_{0.33}$Mn$_{0.33}$Co$_{0.33}$O$_2$) as a positive electrode active material, 10% by mass of acetylene black as a conductor, and 5% by mass of polyvinylidene fluoride (PVdF) as a binder were mixed into an N-methylpyrrolidone solvent using a disperser to obtain a slurry. The obtained slurry was uniformly applied to both sides of an aluminum foil having a thickness of 21 µm and dried, and then pressed to prepare a positive electrode.

[Preparation of a Si-Containing Negative Electrode Active Material]

50 g of Si fine particles having an average particle diameter of 0.2 µm were dispersed in 2,000 g of flake graphite having an average particle diameter of 35 µm, and the resultant dispersion was placed in a hybridization system (manufactured by Nara Machinery Co., Ltd.), and treated by circulating it or permitting it to reside in the system at the number of revolutions of 7,000 rpm for a rotor for 180 seconds to obtain a composite of Si and graphite particles. The obtained composite was mixed into coal tar pitch as an organic compound which forms a carbonaceous material so that the coating ratio after calcination became 7.5%, and kneaded and dispersed using a twin-screw kneader. The resultant dispersion was introduced into a calcination furnace and calcined in a nitrogen atmosphere at 1,000° C. for 3 hours. The resultant calcined material was further pulverized using a hammer mill, and then subjected to sieving (45 µm) to prepare negative electrode active material 1. The silicon element content, average particle diameter d50, tap density, and specific surface area of negative electrode active material 1 measured by the above-mentioned methods were, respectively, 2.0% by mass, 20 μm, 1.0 g/cm³, and 7.2 m²/g.

Negative electrode active materials 2 and 3 having respective Si contents shown in Table 9 below were individually prepared by the same method as that for negative electrode active material 1. The Si content is a concentration by mass (% by mass) of the Si fine particles in the total of the Si fine particles and the graphite particles (100% by mass).

TABLE 9

| | Si Content wt % | Average particle diameter (d50) μm | Tap density g/cm3 | Specific surface area m2/g |
|---|---|---|---|---|
| Negative electrode active material 1 | 2.0 | 20 | 1.0 | 7.2 |
| Negative electrode active material 2 | 12.0 | 17 | 1.1 | 6.3 |
| Negative electrode active material 3 | 17.0 | 20 | 1.1 | 8.1 |

[Preparation of a Negative Electrode Using the Active Material Having a Si Content of 0, 2.0, 12.0, or 17.0% by Mass]

Using a negative electrode active material (natural graphite) and negative electrode active materials 1 to 3, to each negative electrode active material were added an aqueous dispersion of carboxymethyl cellulose sodium (carboxymethyl cellulose sodium concentration: 1% by mass) as a thickening agent and an aqueous dispersion of a styrene-butadiene rubber (styrene-butadiene rubber concentration: 50% by mass) as a binder, and the resultant mixture was mixed using a disperser to obtain a slurry. The obtained slurry was uniformly applied to one side of a copper foil having a thickness of 10 μm and dried, and then pressed to obtain a negative electrode using the active material having a Si content of 0, 2.0, 12.0, or 17.0% by mass. The slurry was prepared so that the [negative electrode active material:carboxymethyl cellulose sodium:styrene-butadiene rubber] mass ratio in the dried negative electrode became 97.5:1.5:1.

[Production of a Non-Aqueous Electrolyte Secondary Battery (Laminate Type)]

The above-prepared positive electrode and negative electrode having each Si content and a separator made of polyolefin were stacked in the order of the negative electrode, separator, and positive electrode. The thus obtained battery element was wrapped in an aluminum laminate film, and the above-prepared non-aqueous electrolytic solution was injected into the wrapped element, followed by vacuum sealing, to produce a non-aqueous electrolyte secondary battery in a sheet form having the negative electrode having each Si content.

<Evaluation of the Non-Aqueous Electrolyte Secondary Battery>

[Initial Conditioning]

In a thermostatic chamber at 25° C., the non-aqueous electrolyte secondary battery having the negative electrode having the above-mentioned Si content, which is a laminate type cell, was subjected to constant-current constant-voltage charging at a current corresponding to 0.05 C until the voltage became 4.0 V. Then, the resultant battery was discharged at 0.05 C until the voltage became 2.5 V. Subsequently, the battery was subjected to CC-CV at 0.2 C until the voltage became 4.0 V, and then discharged at 0.2 C until the voltage became 2.5 V. Further, the battery was subjected to CC-CV at 0.2 C until the voltage became 4.2 V, and then discharged at 0.2 C until the voltage became 2.5 V, so that the non-aqueous electrolyte secondary battery was stabilized. Then, the battery was subjected to CC-CV charging at 0.2 C until the voltage became 4.3 V, and then discharged at 0.2 C until the voltage became 2.5 V, and thus initial conditioning was performed.

[High-Temperature Storage Test]

The battery which had been subjected to initial conditioning was further subjected to CC-CV charging at 0.2 C until the voltage became 4.3 V, and subjected to high-temperature storage under conditions at 60° C. for 168 hours. The battery was satisfactorily cooled, and then immersed in an ethanol bath to measure a volume. From a change of the volume of the battery before and after the storage test, an amount of the gas generated was determined, and this was taken as "storage gas amount".

The values of storage gas amount in the Examples and Comparative Examples, which are individually standardized by the value in Comparative Example 9-1, are shown in Table 10 below.

TABLE 10

| | Electrolytic solution | Additive 1 | Amount (wt %) | Storage gas amount/% Si Concentration/ wt % | | | |
|---|---|---|---|---|---|---|---|
| | | | | 0.0 | 2.0 | 12.0 | 17.0 |
| Example 9-1 | 1.0M LiPF₆ EC/DEC = 3/7 + 2.0% VC + 2.0% MFEC | Compound 2 | 1.0 | 96 | 83 | 82 | 75 |
| Example 9-2 | | | 3.0 | 88 | 64 | 59 | 78 |
| Comparative Example 9-1 | | — | — | 100 | 100 | 100 | 100 |

As apparent from Table 10, when the compound represented by the general formula (A) is used, gas generation during storage of the battery is suppressed. It is found that the suppression effect for gas generation during storage of the battery is remarkable especially when the negative electrode active material comprised of a combination of Si fine particles and graphite particles is used.

Examples 10-1 and 10-2 and Comparative Example 10-1

[Preparation of a Non-Aqueous Electrolytic Solution]

The compound was added in the formulations shown in Table 11 below to reference electrolytic solution 7 in the same manner as in Example 9 to prepare electrolytic solutions. In Comparative Example 10-1, reference electrolytic solution 7 was solely used. The "Amount (wt %)" shown in the Table indicates a concentration of the compound in the non-aqueous electrolytic solution (100% by weight).

[Preparation of a Positive Electrode]

A positive electrode was prepared in the same manner as in Example 9 and used.

[Preparation of a Negative Electrode]

To a negative electrode active material (graphite:SiO (mass ratio)=100:0, 95:5, 90:10) were added an aqueous dispersion of carboxymethyl cellulose sodium (carboxymethyl cellulose sodium concentration: 1% by mass) as a thickening agent and an aqueous dispersion of a styrene-butadiene rubber (styrene-butadiene rubber concentration: 50% by mass) as a binder, and the resultant mixture was mixed using a disperser to obtain a slurry. The obtained slurry was uniformly applied to one side of a copper foil having a thickness of 10 μm and dried, and then pressed to prepare a negative electrode. The slurry was prepared so that the [negative electrode active material:carboxymethyl cellulose sodium:styrene-butadiene rubber] mass ratio in the dried negative electrode became 97.5:1.5:1.

[Production of a Non-Aqueous Electrolyte Secondary Battery (Laminate Type)]

A non-aqueous electrolyte secondary battery was produced in the same manner as in Example 9 and used.

<Evaluation of the Non-Aqueous Electrolyte Secondary Battery>

[Initial Conditioning]

In a thermostatic chamber at 25° C., the non-aqueous electrolyte secondary battery which is a laminate type cell was subjected to constant-current constant-voltage charging at a current corresponding to 0.05 C until the voltage became 4.0 V. Then, the resultant battery was discharged at 0.05 C until the voltage became 2.5 V. Subsequently, the battery was subjected to CC-CV at 0.2 C until the voltage became 4.0 V, and then discharged at 0.2 C until the voltage became 2.5 V. Further, the battery was subjected to CC-CV at 0.2 C until the voltage became 4.2 V, and then discharged at 0.2 C until the voltage became 2.5 V, so that the non-aqueous electrolyte secondary battery was stabilized. Then, the resultant battery was subjected to CC-CV charging at 0.2 C until the voltage became 4.3 V, and then discharged at 0.2 C until the voltage became 2.5 V, and thus initial conditioning was performed.

[High-Temperature Storage Test]

The battery which had been subjected to initial conditioning was further subjected to CC-CV charging at 0.2 C until the voltage became 4.3 V, and subjected to high-temperature storage under conditions at 60° C. for 168 hours. Then, the resultant battery was subjected to CC-CV at 0.2 C at 25° C. until the voltage became 4.3 V, and then discharged at 0.2 C or 0.5 C until the voltage became 2.5 V, and the obtained 0.2 C/0.5 C capacity ratio (0.5 C/0.2 C) was taken as "after-storage 0.5 C/0.2 C load".

The values of after-storage 0.5 C/0.2 C load in the Examples and Comparative Examples, which are individually standardized by the value in Comparative Example 10-1, are shown in Table 11 below.

TABLE 11

| | Electrolytic solution | Additive 1 | Amount (wt %) | After-storage 0.5 C./0.2 C. load/% Si Concentration/wt % | | |
|---|---|---|---|---|---|---|
| | | | | 0.0 | 5.0 | 10.0 |
| Example 10-1 | 1.0M LiPF$_6$ EC/DEC = 3/7 + 2.0% VC + 2.0% MFEC | Compound 2 | 1.0 | 100.1 | 100.2 | 100.2 |
| Example 10-2 | | | 3.0 | 100.2 | 100.3 | 100.3 |
| Comparative Example 10-1 | | — | — | 100.0 | 100.0 | 100.0 |

As apparent from Table 11, when the compound represented by the general formula (A) is used, the after-storage 0.5 C/0.2 C load is improved. It is found that the improvement effect for the after-storage 0.5 C/0.2 C load is remarkable especially when the negative electrode active material comprised of a combination of SiO fine particles and graphite particles is used.

Example 11-1 and Comparative Examples 11-1 and 11-2

[Preparation of a Non-Aqueous Electrolytic Solution]

In a dry argon atmosphere, satisfactorily dried LiPF$_6$ was dissolved at 1.0 mol/L (in terms of a concentration of LiPF$_6$ in the non-aqueous electrolytic solution) in a mixture of EC, DMC, and EMC (volume ratio: 3:3:4), and to the resultant solution were added MFEC, compound 26, and compound 27 in respective amounts of 3.0, 1.5, and 1.0% by mass (based on the mass of the solution (100% by mass)) to prepare an electrolytic solution (this solution is referred to as "reference electrolytic solution 8"). The compounds were added in the formulations shown in Table 12 below to reference electrolytic solution 8 to prepare electrolytic solutions. In Comparative Example 11-1, reference electrolytic solution 8 was solely used. The "Amount (wt %)" shown in the Table indicates a concentration of each compound in the non-aqueous electrolytic solution (100% by weight).

[Preparation of a Positive Electrode]

90% by mass of lithium-nickel-cobalt-manganese composite oxide (Li$_{1.05}$Ni$_{0.33}$Mn$_{0.33}$Co$_{0.33}$O$_2$) as a positive electrode active material, 7% by mass of acetylene black as a conductor, and 3% by mass of polyvinylidene fluoride (PVdF) as a binder were mixed into an N-methylpyrrolidone solvent using a disperser to obtain a slurry. The obtained slurry was uniformly applied to both sides of an aluminum foil having a thickness of 15 μm and dried, and then pressed to prepare a positive electrode.

[Preparation of a Negative Electrode]

To graphite were added an aqueous dispersion of carboxymethyl cellulose sodium (carboxymethyl cellulose sodium concentration: 1% by mass) as a thickening agent and an aqueous dispersion of a styrene-butadiene rubber (styrene-butadiene rubber concentration: 50% by mass) as a binder, and the resultant mixture was mixed using a disperser to obtain a slurry. The obtained slurry was uniformly applied to one side of a copper foil having a thickness of 12 μm and dried, and then pressed to prepare a negative electrode. The slurry was prepared so that the [graphite:carboxymethyl cellulose sodium:styrene-butadiene rubber] mass ratio in the dried negative electrode became 97.5:1.5:1.

[Production of a Non-Aqueous Electrolyte Battery (Laminate Type)]

The above-prepared positive electrode and negative electrode and a separator made of polyolefin were stacked in the order of the negative electrode, separator, positive electrode, separator, and negative electrode. The thus obtained battery element was wrapped in an aluminum laminate film, and the mentioned electrolytic solution was injected into the wrapped element, followed by vacuum sealing, to produce a non-aqueous electrolyte secondary battery in a sheet form.

<Evaluation of the Non-Aqueous Electrolyte Secondary Battery>

[Initial Conditioning]

In an atmosphere at 25° C., the sheet-form non-aqueous electrolyte secondary battery was charged at 0.05 C for 10 hours, and then allowed to rest for 3 hours, and then charged at a constant current at 0.2 C until the voltage became 3.8 V. The resultant battery was further allowed to rest for 3 hours, and then subjected to constant-current constant-voltage charging at 0.2 C until the voltage became 4.3 V, and then subjected to constant-current discharging at ⅓C until the voltage became 3.0 V. Then, a series of constant-current constant-voltage charging at ⅓C made until the voltage became 4.3 V and subsequent constant-current discharging at ⅓C made until the voltage became 3.0 V was taken as one charging-discharging cycle, and two cycles were performed, and thus initial conditioning was performed.

[High-Temperature Storage Test]

The battery which had been subjected to initial conditioning was subjected to CC-CV charging at 0.2 C until the voltage became 4.3 V, and subjected to high-temperature storage test under conditions at 60° C. for 30 days. The battery was satisfactorily cooled, and then immersed in an ethanol bath to measure a volume. From a change of the volume of the battery before and after the storage test, an amount of the gas generated was determined, and this was taken as "60° C. storage gas amount".

The values of 60° C. storage gas amount in the Examples and Comparative Examples, which are individually standardized by the value in Comparative Example 11-1, are shown in Table 12 below.

<Evaluation of the Non-Aqueous Electrolyte Secondary Battery>

[Initial Conditioning]

In a thermostatic chamber at 25° C., the non-aqueous electrolyte secondary battery was subjected to constant-current charging at a current corresponding to 0.05 C for 6 hours, and then discharged at 0.2 C until the voltage became 3.0 V. Then, the battery was subjected to CC-CV charging (0.05 C cut) at 0.2 C until the voltage became 4.1 V. Then, the resultant battery was discharged at 0.2 C until the voltage became 3.0 V, so that the non-aqueous electrolyte secondary battery was stabilized. Further, the battery was subjected to CC-CV charging (0.05 C cut) at 0.2 C until the voltage became 4.4 V, and then discharged at 0.2 C until the voltage became 3.0 V, determining an initial discharge capacity.

TABLE 12

| | Electrolytic solution | Additive 1 | Amount (wt %) | Additive 2 | Amount (wt %) | Additive 3 | Amount (wt %) | 60° C. Storage gas amount (%) |
|---|---|---|---|---|---|---|---|---|
| Example 11-1 | 1.0M LiPF$_6$ EC/EMC/ DMC = 3/4/3 + 3.0% MFEC | Compound 26 | 1.5 | Compound 27 | 1.0 | Compound 2 | 0.5 | 93 |
| Comparative Example 11-1 | | Compound 26 | 1.5 | Compound 27 | 1.0 | — | — | 100 |
| Comparative Example 11-2 | | Compound 26 | 1.5 | Compound 27 | 1.0 | Compound 25 | 0.5 | 98 |

As apparent from Table 12, when the compound represented by the general formula (A) is used, the 60° C. storage gas amount is suppressed.

Examples 12-1 and 12-2 and Comparative Examples 12-1 and 12-2

[Preparation of a Non-Aqueous Electrolytic Solution]

The compounds were added in the formulations shown in Table 13 below to reference electrolytic solution 1 to prepare non-aqueous electrolytic solutions. In Comparative Example 12-1, reference electrolytic solution 1 was solely used. The "Amount (wt %)" shown in the Table indicates a concentration of each compound in the non-aqueous electrolytic solution (100% by weight).

[Preparation of a Positive Electrode] A positive electrode was prepared in the same manner as in Example 1 and used.

[Preparation of a Negative Electrode]

A negative electrode was prepared in the same manner as in Example 1 and used.

[Production of a Non-Aqueous Electrolyte Secondary Battery (Coin Type)]

The above-prepared positive electrode was contained in a casing made of stainless steel which serves also as a positive electrode conductor, and the above-prepared negative electrode was disposed on the positive electrode through a separator made of polypropylene impregnated with the above-prepared non-aqueous electrolytic solution. The casing and a sealing plate which serves also as a negative electrode conductor are caulked through a gasket for insulation to seal the casing, producing a non-aqueous electrolyte secondary battery (coin type).

[Evaluation of High-Temperature Storage Characteristics]

The battery which had been subjected to initial conditioning was further subjected to CC-CV charging (0.05 C cut) at 0.2 C until the voltage became 4.4 V, and then subjected to high-temperature storage under conditions at 85° C. for 24 hours. Then, the resultant battery was discharged at a constant current at 0.2 C at 25° C. until the voltage became 3 V to measure a residual capacity after the high-temperature storage test. A ratio of the residual discharge capacity after the storage test to the initial capacity ((residual discharge capacity after storage test/initial capacity)×100) was determined, and this was taken as "high-temperature storage residual capacity ratio (%)".

The values of "high-temperature storage residual capacity ratio (%)" in the Examples and Comparative Examples, which are individually standardized by the value in Comparative Example 12-1, are shown in Table 13 below.

TABLE 13

| | Electrolytic solution | Additive 1 | Amount (wt %) | Additive 2 | Amount (wt %) | High-temperature storage residual capacity ratio (%) |
|---|---|---|---|---|---|---|
| Example 12-1 | 1.2M LiPF$_6$ EC/EMC/ DEC = 3/4/3 + 2.0% VC + 2.0% MFEC | Compound 2 | 1.0 | — | — | 101 |
| Example 12-2 | | Compound 2 | 1.0 | Compound 29 | 1.0 | 103 |
| Comparative Example 12-1 | | — | — | — | — | 100 |
| Comparative Example 12-2 | | Compound 29 | 1.0 | — | — | 99 |

As apparent from Table 13, when the compound represented by the general formula (A) is used, the high-temperature storage residual capacity ratio is improved. Further, the results show that when the compound represented by the general formula (A) and compound 29 are used in combination, the properties are further improved. On the other hand, when compound 29 is solely added (Comparative Example 12-2), the properties become poor. Thus, the results indicate that synergy is obtained by using the above compounds in combination.

INDUSTRIAL APPLICABILITY

The non-aqueous electrolytic solution of the present invention can improve the discharge storage characteristics and high-temperature storage characteristics with excellent balance, and therefore can be advantageously used in various fields for electronic devices and others in which a non-aqueous electrolyte secondary battery is used. Further, the non-aqueous electrolytic solution of the present invention can also be advantageously used in electrolytic capacitors, such as a lithium-ion capacitor, using a non-aqueous electrolytic solution.

With respect to the application of the non-aqueous electrolytic solution and non-aqueous electrolyte secondary battery of the present invention, there is no particular limitation, and they can be used in known various applications. Specific examples of applications include a laptop computer, an electronic book player, a cell phone, a portable facsimile, a portable copying machine, a portable printer, a portable audio player, a small-size video camera, a liquid crystal television set, a hand-held cleaner, a transceiver, an electronic organizer, a calculator, a memory card, a portable tape recorder, a radio receiver, a backup power source, an automobile, a bike, a bicycle fitted with a motor, a bicycle, a lighting fixture, a toy, a video game machine, a clock, an electric tool, a stroboscope, and a camera.

The invention claimed is:

1. A non-aqueous electrolytic solution suitable for use in a non-aqueous electrolyte secondary battery which comprises a positive electrode and a negative electrode each being capable of having occluded therein and releasing metal ions, the non-aqueous electrolytic solution containing:
   an electrolyte, which is an alkali metal salt;
   a non-aqueous solvent; and
   a compound represented by general formula (A):

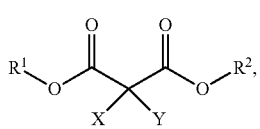

(A)

wherein:
$R^1$, $R^2$, and Y each independently represents a hydrocarbon group having 1 to 12 carbon atoms and optionally having a substituent selected from the group consisting of a cyano group, an isocyanato group, an acyl group (—(C=O)—Ra), an acyloxy group (—O(C=O)—Ra), an alkoxycarbonyl group (—(C=O)O—Ra), a sulfonyl group (—SO$_2$—Ra), a sulfonyloxy group (—O(SO$_2$)—Ra), an alkoxysulfonyl group (—(SO$_2$)—O—Ra), an alkoxycarbonyloxy group (—O—(C=O)—O—Ra), an ether group (—O—Ra), an acryl group, a methacryl group, a halogen, and a trifluoromethyl group,
   where Ra represents an alkyl group having 1 to 10 carbon atoms, an alkenyl group having 2 to 10 carbon atoms, or an alkynyl group having 2 to 10 carbon atoms; and
X represents a hydrogen or fluorine atom,
wherein an amount of the compound represented by formula (A) is 0.001 to 10% by mass, based on the mass of the non-aqueous electrolytic solution.

2. The non-aqueous electrolytic solution according to claim 1, wherein, in the general formula (A), X is a hydrogen atom.

3. The non-aqueous electrolytic solution according to claim 1, wherein, in the general formula (A), each of $R^1$, $R^2$, and Y represents a hydrocarbon group having 1 to 12 carbon atoms and having no substituent.

4. The non-aqueous electrolytic solution according to claim 1, wherein, in the general formula (A), each of $R^1$, $R^2$, and Y represents an alkyl group having 1 to 12 carbon atoms and having no substituent.

5. The non-aqueous electrolytic solution according to claim 1, which further comprises at least one additive selected from the group consisting of a cyclic carbonate having a carbon-carbon unsaturated bond, a cyclic carbonate having a fluorine atom, a nitrile compound, an isocyanate compound, a compound having an isocyanuric acid skeleton, a fluorinated salt, an acid anhydride compound, an acrylate compound, an aromatic compound, a cyclic ether compound, an oxalato salt, and a cyclic sulfonic ester.

6. The non-aqueous electrolytic solution according to claim 1, wherein the non-aqueous solvent comprises a linear carboxylate.

7. A non-aqueous electrolyte secondary battery comprising a positive electrode and a negative electrode each being capable of having occluded therein and releasing metal ions, and a non-aqueous electrolytic solution, wherein the non-aqueous electrolytic solution is the non-aqueous electrolytic solution according to claim 1.

8. The non-aqueous electrolyte secondary battery according to claim 7, wherein a negative electrode active material of the negative electrode capable of having occluded therein and releasing metal ions has carbon as a constituent element.

9. The non-aqueous electrolyte secondary battery according to claim 7, wherein a negative electrode active material of the negative electrode capable of having occluded therein and releasing metal ions has silicon (Si) or tin (Sn) as a constituent element.

10. The non-aqueous electrolyte secondary battery according to claim 7, wherein a negative electrode active material of the negative electrode capable of having occluded therein and releasing metal ions is a mixture or composite of metal particles capable of forming an alloy together with Li and graphite particles.

* * * * *